United States Patent
Koitabashi et al.

(10) Patent No.: US 6,332,675 B1
(45) Date of Patent: *Dec. 25, 2001

(54) INK CONTAINER, INK AND INK JET RECORDING APPARATUS USING INK CONTAINER

(75) Inventors: Noribumi Koitabashi, Yokohama; Masami Ikeda, Tokyo; Sadayuki Sugama, Tsukuba; Naohito Asai; Hiromitsu Hirabayashi, both of Yokohama; Tsutomu Abe, Isehara; Hiroshi Sato, Yokahama; Shigeyasu Nagoshi, Yokohama; Eiichiro Shimizu, Yokohama; Masahiko Higuma, Tohgane; Yuji Akiyama; Hitoshi Sugimoto, both of Yokohama; Miyuki Fujita, Tokyo; Shinichi Sato; Fumihiro Gotoh, both of Kawasaki; Masaya Uetsuki; Hiroki Tajima, both of Yokohama; Toshio Kashino, Fujisawa; Takeshi Okazaki, Sagamihara, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/414,892

(22) Filed: Oct. 8, 1999

Related U.S. Application Data

(63) Continuation-in-part of application No. 08/696,517, filed on Aug. 14, 1996, which is a continuation-in-part of application No. 08/612,299, filed on Mar. 7, 1996, now Pat. No. 6,012,808, which is a continuation of application No. 08/605,587, filed on Feb. 22, 1996, now abandoned, which is a continuation of application No. 08/266,479, filed on Jun. 27, 1994, now abandoned, which is a division of application No. 08/094,317, filed on Jul. 21, 1993, now Pat. No. 5,509,140.

(30) Foreign Application Priority Data

| Jul. 24, 1992 | (JP) | 4-198661 |
| Jul. 24, 1992 | (JP) | 4-198680 |
| Jul. 24, 1992 | (JP) | 4-198681 |
| Jul. 24, 1992 | (JP) | 4-198733 |
| Jul. 24, 1992 | (JP) | 4-198734 |
| Feb. 4, 1993 | (JP) | 5-017562 |
| May 25, 1993 | (JP) | 5-122618 |
| Jun. 29, 1993 | (JP) | 5-159494 |
| Jun. 30, 1993 | (JP) | 5-161135 |
| Jun. 30, 1993 | (JP) | 5-161790 |
| Jul. 2, 1993 | (JP) | 5-164845 |
| Aug. 2, 1993 | (JP) | 5-191379 |
| Sep. 3, 1993 | (JP) | 5-219787 |
| Jun. 8, 1994 | (JP) | 6-125965 |

(51) Int. Cl.$^7$ .................................................. B41J 2/175
(52) U.S. Cl. ............................................................ 347/86
(58) Field of Search ........................................ 347/85–87

(56) References Cited

U.S. PATENT DOCUMENTS 4,017,871   4/1977   Hubbard ........................... 346/140 R (List continued on next page.)

FOREIGN PATENT DOCUMENTS 4025319   2/1992   (DE) .

(List continued on next page.)

*Primary Examiner*—John Barlow
*Assistant Examiner*—Craig A. Hallacher
(74) *Attorney, Agent, or Firm*—Fitzpatrick, Cella, Harper & Scinto

(57) ABSTRACT

A liquid container for a liquid jet recording apparatus comprises a first chamber containing negative pressure producing material and having a liquid outlet connectable to a liquid jet head to supply liquid from the container to the liquid jet head and an air vent for allowing ambient air into the container, wherein the liquid outlet is provided in a bottom portion of the first chamber. A second chamber communicates with the first chamber by a communication path and is substantially hermetically sealed. A wall extends upwardly from the communication path of the first chamber. An ambient air introducing path is provided for between the wall and the negative pressure producing material extending from a point partly up the wall toward the communication path for introducing ambient air into the second chamber.

95 Claims, 81 Drawing Sheets

U.S. PATENT DOCUMENTS

| | | | |
|---|---|---|---|
| 4,119,034 | 10/1978 | Wax | 101/366 |
| 4,202,267 | 5/1980 | Heinzl et al. | 347/7 |
| 4,313,124 | 1/1982 | Hara | 346/140 R |
| 4,336,767 | 6/1982 | Wade | 118/264 |
| 4,345,262 | 8/1982 | Shirato et al. | 346/140 R |
| 4,368,478 | 1/1983 | Koto | 347/86 |
| 4,395,476 | 7/1983 | Kanb et al. | 430/102 |
| 4,441,422 | 4/1984 | Dreeben | 101/25 |
| 4,459,600 | 7/1984 | Sato et al. | 346/140 R |
| 4,463,359 | 7/1984 | Ayata et al. | 346/1.1 |
| 4,509,062 | 4/1985 | Low et al. | 346/140 R |
| 4,530,961 | 7/1985 | Nguyen et al. | 347/100 |
| 4,545,694 | 10/1985 | Ninomiya et al. | 400/124 |
| 4,558,333 | 12/1985 | Sugitani et al. | 347/87 |
| 4,571,599 | 2/1986 | Rezanaka | 346/140 R |
| 4,608,577 | 8/1986 | Hori | 346/140 R |
| 4,610,202 | 9/1986 | Ebinuma et al. | 347/7 X |
| 4,630,758 | 12/1986 | Mutoh | 222/189 |
| 4,658,273 | 4/1987 | Yuk et al. | 347/86 |
| 4,677,448 | 6/1987 | Mizusawa et al. | 347/7 |
| 4,723,129 | 2/1988 | Endo et al. | 346/1.1 |
| 4,740,796 | 4/1988 | Endo et al. | 346/1.1 |
| 4,771,295 | 9/1988 | Baker et al. | 346/1.1 |
| 4,794,409 | 12/1988 | Cowger et al. | 346/140 R |
| 4,920,362 | 4/1990 | Cowger | 346/140 R |
| 4,994,824 | 2/1991 | Winslow | 347/87 |
| 4,994,828 | 2/1991 | Smart | 354/21 |
| 5,025,271 | 6/1991 | Baker et al. | 346/140 R |
| 5,070,346 | 12/1991 | Mochizuki | 347/7 |
| 5,095,321 | 3/1992 | Saito et al. | 346/140 R |
| 5,103,243 | 4/1992 | Cowger | 346/1.1 |
| 5,119,115 | 6/1992 | Buat et al. | 347/86 |
| 5,136,305 | 8/1992 | Ims | 347/7 |
| 5,155,502 | 10/1992 | Kimura et al. | 346/140 R |
| 5,157,421 | 10/1992 | Kitahara et al. | 347/86 |
| 5,162,817 | 11/1992 | Tajika et al. | 346/140 R |
| 5,182,579 | 1/1993 | Haruta et al. | 347/87 |
| 5,182,581 | 1/1993 | Kashimura et al. | 347/87 |
| 5,221,148 | 6/1993 | Suzuki et al. | 400/124 |
| 5,221,334 | 6/1993 | Ma et al. | 347/100 |
| 5,233,369 | 8/1993 | Carlotta et al. | 347/87 |
| 5,237,342 | 8/1993 | Saikawa et al. | 346/140 R |
| 5,245,361 | 9/1993 | Kashimura et al. | 347/50 |
| 5,262,802 | 11/1993 | Karita et al. | 347/87 |
| 5,289,212 | 2/1994 | Carlotta | 347/87 |
| 5,308,180 | 5/1994 | Pournoor et al. | 401/205 |
| 5,430,471 | 7/1995 | Nakajima et al. | 347/87 |
| 5,448,275 | 9/1995 | Fong | 347/87 |
| 5,489,932 | 2/1996 | Ceschin | 347/87 |
| 5,491,501 | 2/1996 | Dietl et al. | 347/86 |
| 5,500,666 | 3/1996 | Hatori et al. | |
| 5,509,140 | 4/1996 | Koitabashi | 347/87 X |
| 5,619,237 | 4/1997 | Inoue et al. | 347/86 |
| 5,619,238 | 4/1997 | Higuma et al. | 347/86 |
| 5,621,446 | 4/1997 | Tanaka et al. | 347/85 |
| 5,629,728 | 5/1997 | Karita | 347/87 |
| 5,657,058 | 8/1997 | Lin | 347/87 |
| 5,657,065 | 8/1997 | Mochizuki et al. | 347/86 |
| 5,673,074 | 9/1997 | Miyauchi et al. | 347/86 |
| 5,742,311 | 4/1998 | Koitabashi et al. | 347/86 |
| 5,805,188 | 9/1998 | Nakajima | 347/87 |

FOREIGN PATENT DOCUMENTS

| | | |
|---|---|---|
| 82718 | 6/1983 | (EP) . |
| 139508 | 5/1985 | (EP) . |
| 261764 | 3/1988 | (EP) . |
| 320165 | 6/1989 | (EP) . |
| 322131 | 6/1989 | (EP) . |
| 373302 | 6/1990 | (EP) . |
| 378240 | 7/1990 | (EP) . |
| 406983 | 1/1991 | (EP) . |
| 419189 | 3/1991 | (EP) . |
| 419192 | 3/1991 | (EP) . |
| 424133 | 4/1991 | (EP) . |
| 486309 | 5/1992 | (EP) . |
| 488292 | 6/1992 | (EP) . |
| 488829 | 6/1992 | (EP) . |
| 490579 | 6/1992 | (EP) . |
| 493058 | 7/1992 | (EP) . |
| 529625 | 3/1993 | (EP) . |
| 536980 | 4/1993 | (EP) . |
| 524247 | 5/1993 | (EP) . |
| 581531 | 2/1994 | (EP) . |
| 625424 | 11/1994 | (EP) . |
| 2229320 | 12/1974 | (FR) . |
| 57-16385 | 6/1955 | (JP) . |
| 50-84311 | 8/1975 | (JP) . |
| 54-056847 | 5/1979 | (JP) . |
| 55-70775 | 5/1980 | (JP) . |
| 55-161873 | 12/1980 | (JP) . |
| 56-067289 | 6/1981 | (JP) . |
| 2-039213 | 1/1982 | (JP) . |
| 57-073623 | 5/1982 | (JP) . |
| 59-68985 | 5/1984 | (JP) . |
| 59-123670 | 7/1984 | (JP) . |
| 61-22952 | 7/1984 | (JP) . |
| 59-138461 | 8/1984 | (JP) . |
| 59-098857 | 6/1987 | (JP) . |
| 63-013749 | 1/1988 | (JP) . |
| 63-087242 | 4/1988 | (JP) . |
| 63-165467 | 7/1988 | (JP) . |
| 7-021423 | 2/1989 | (JP) . |
| 64-035215 | 6/1989 | (JP) . |
| 2-522 | 1/1990 | (JP) . |
| 2-034351 | 2/1990 | (JP) . |
| 2-55184 | 2/1990 | (JP) . |
| 2-214666 | 8/1990 | (JP) . |
| 4-156339 | 5/1992 | (JP) . |
| 4-198474 | 7/1992 | (JP) . |
| 4-198681 | 7/1992 | (JP) . |
| 4-282256 | 10/1992 | (JP) . |
| 5-96743 | 4/1993 | (JP) . |

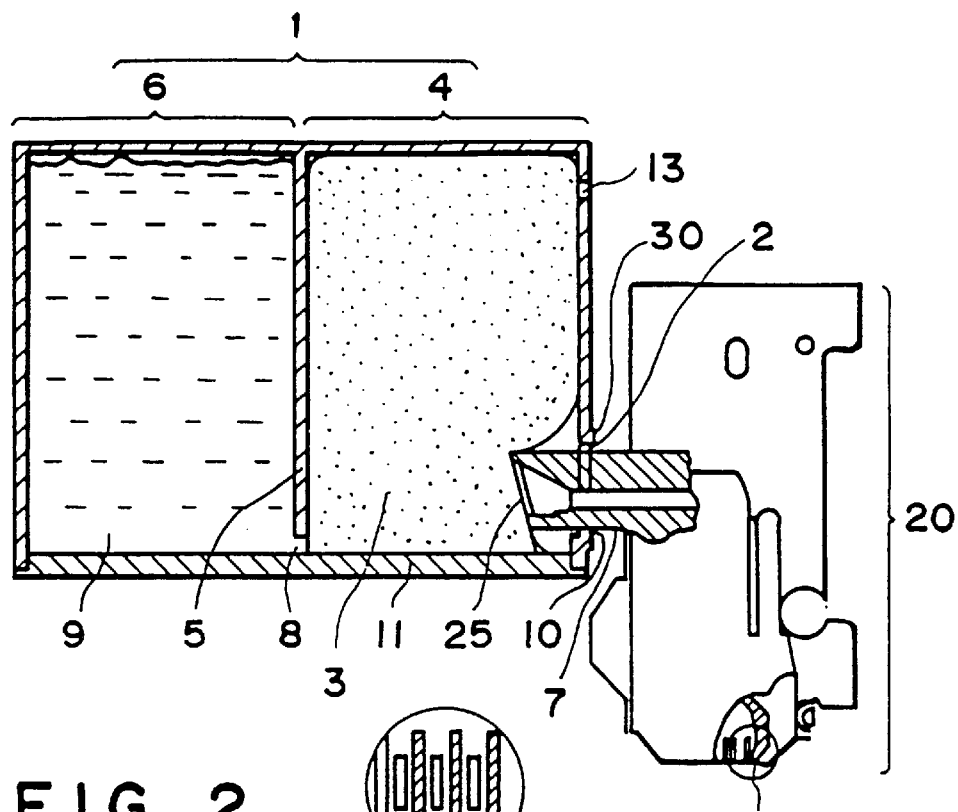
FIG. 2
FIG. 2a
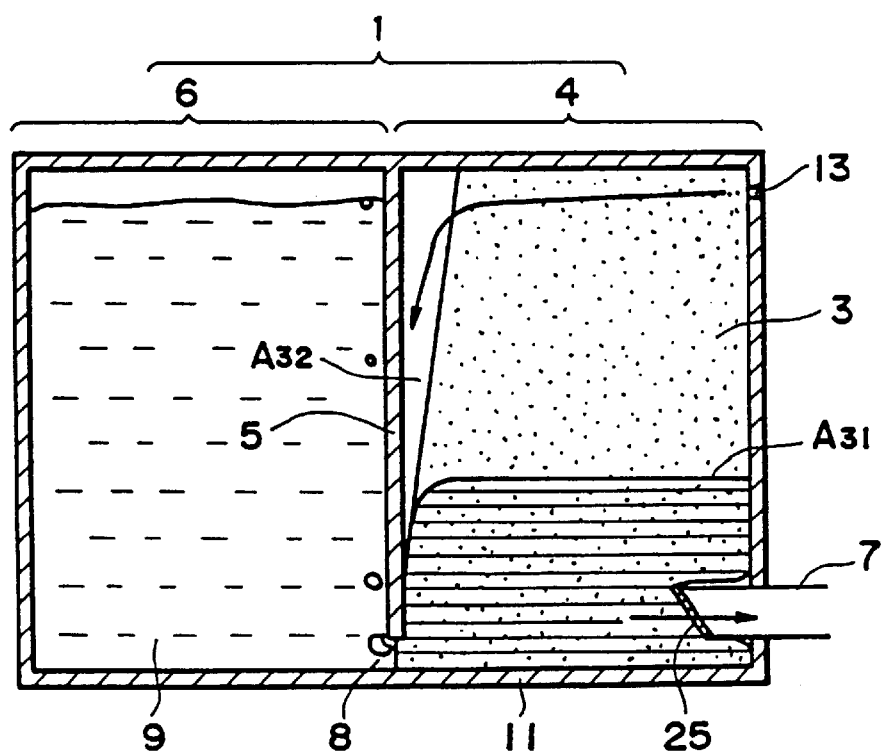
FIG. 3

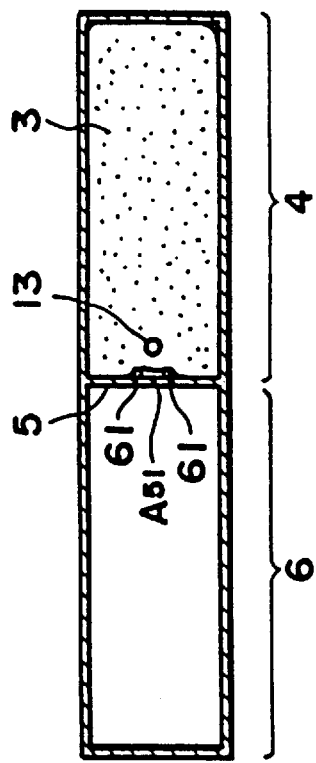
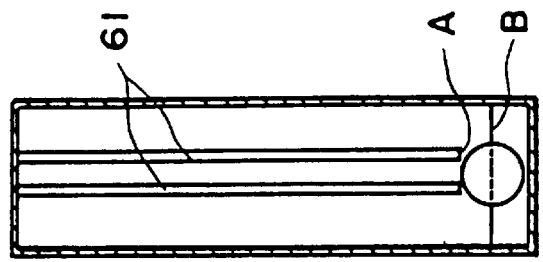
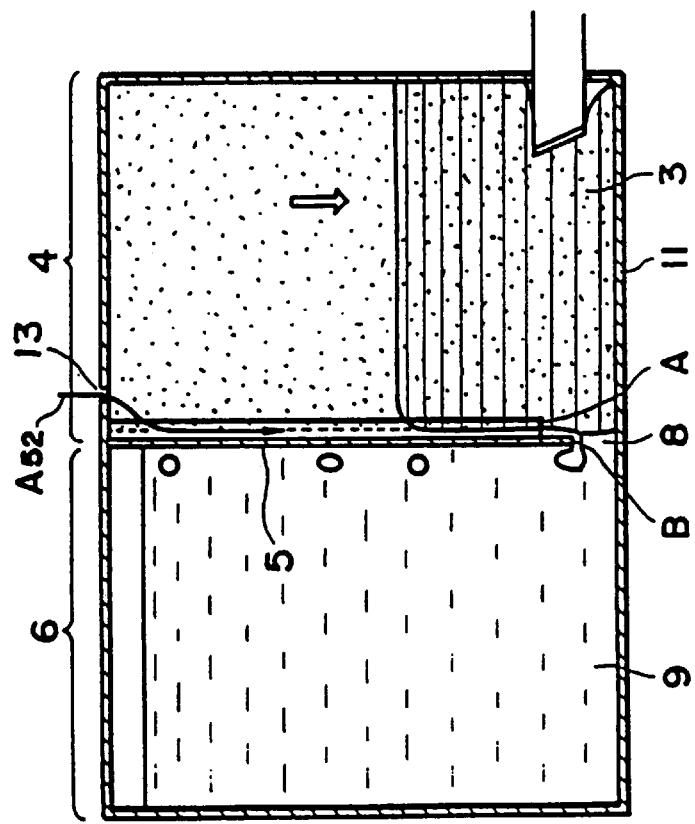

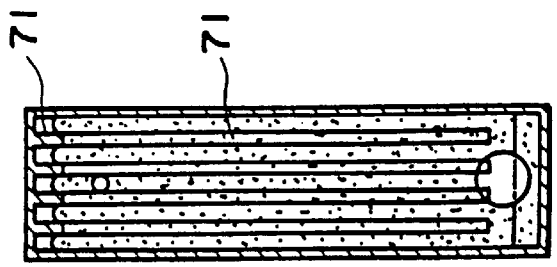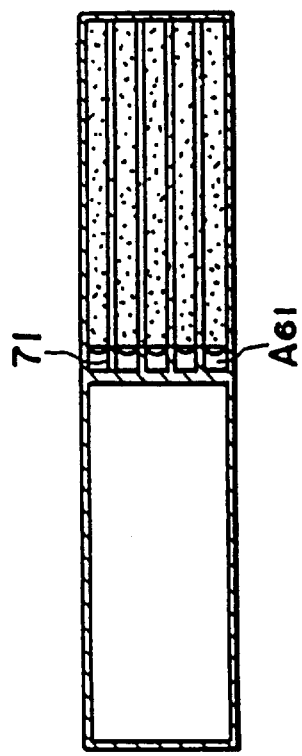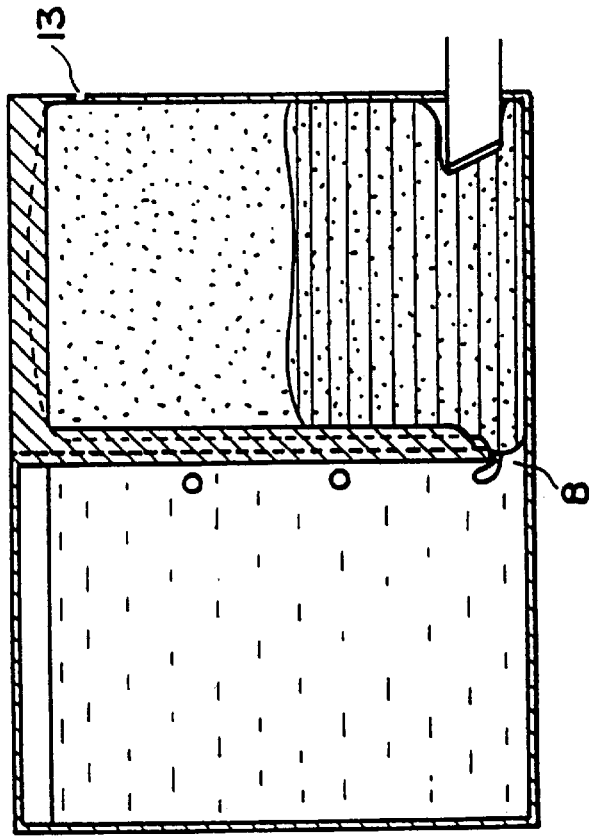

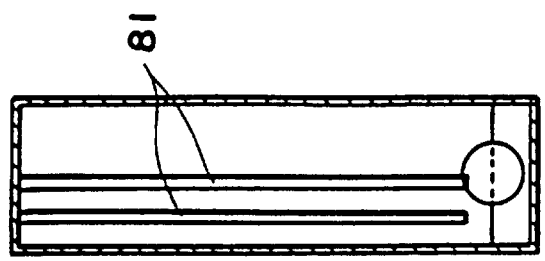
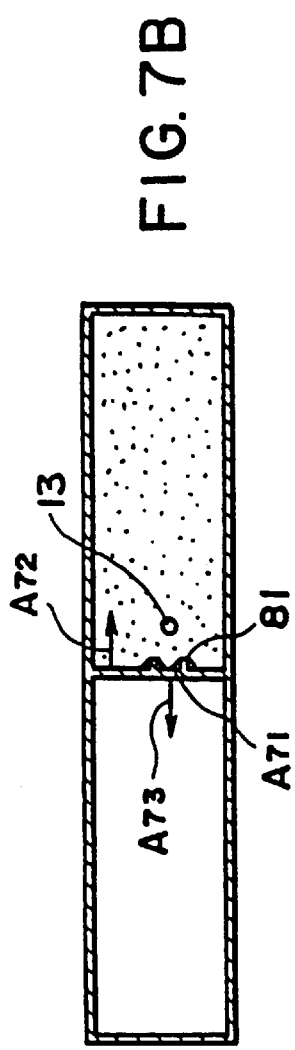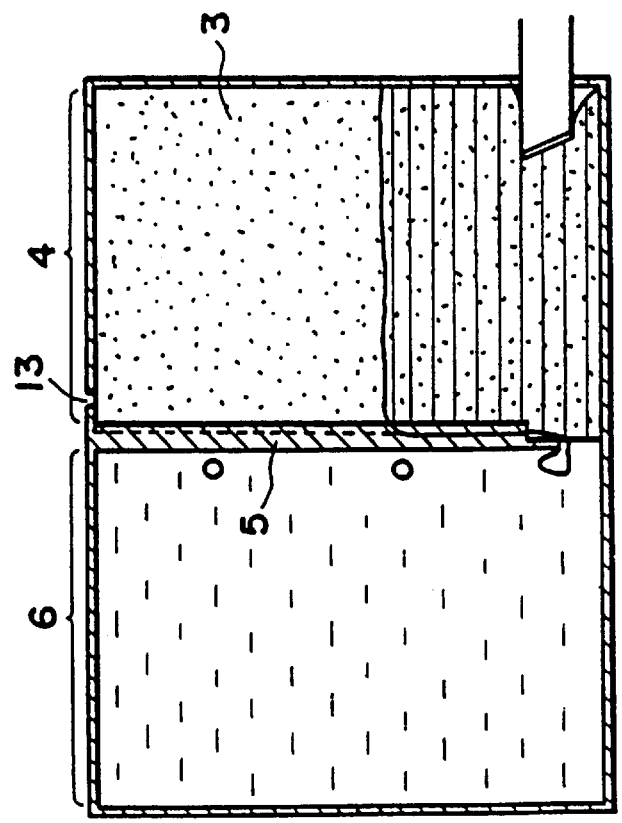

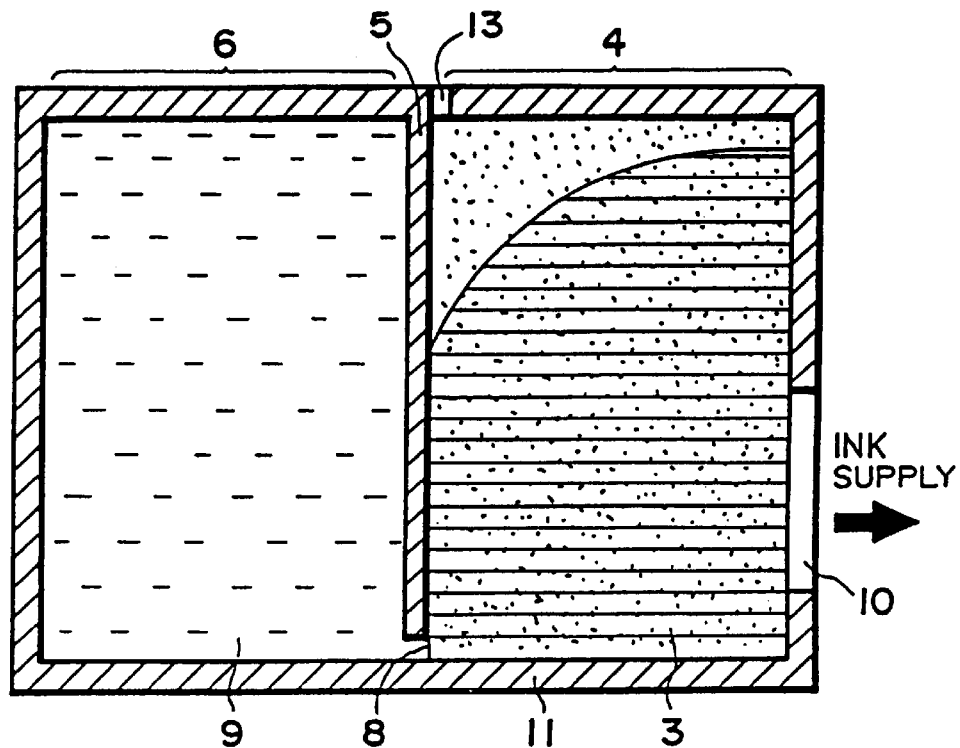
F I G. 14
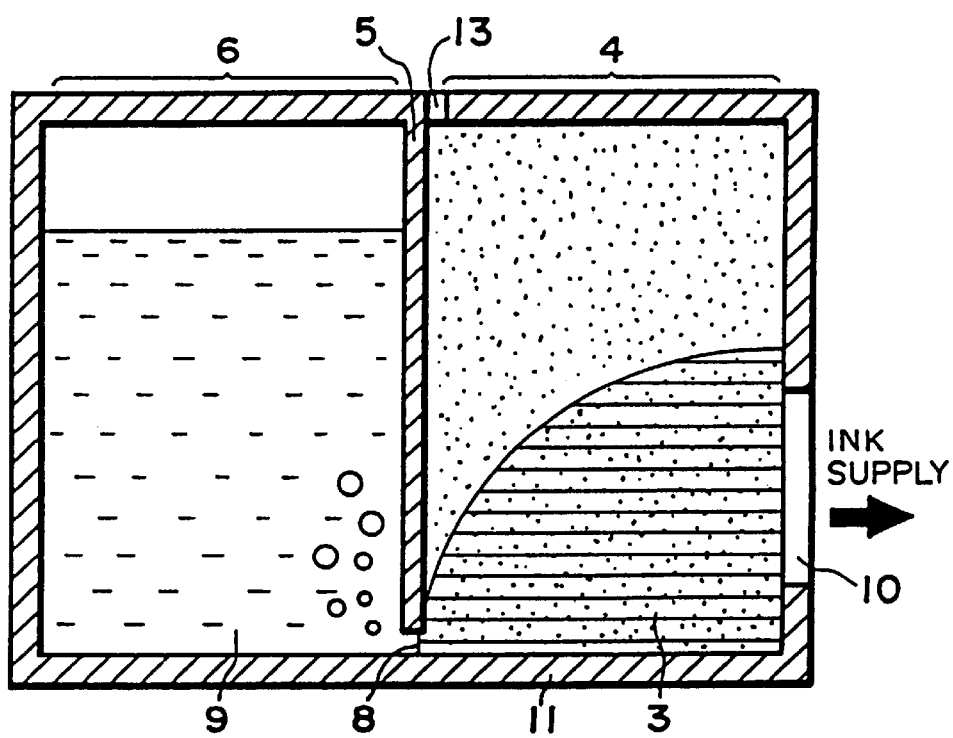
F I G. 15

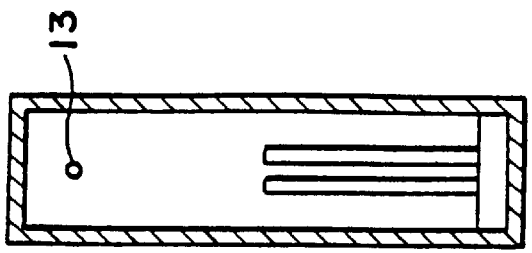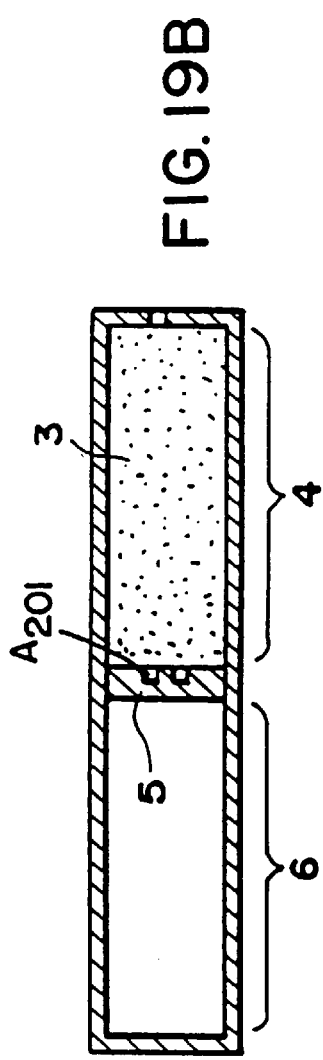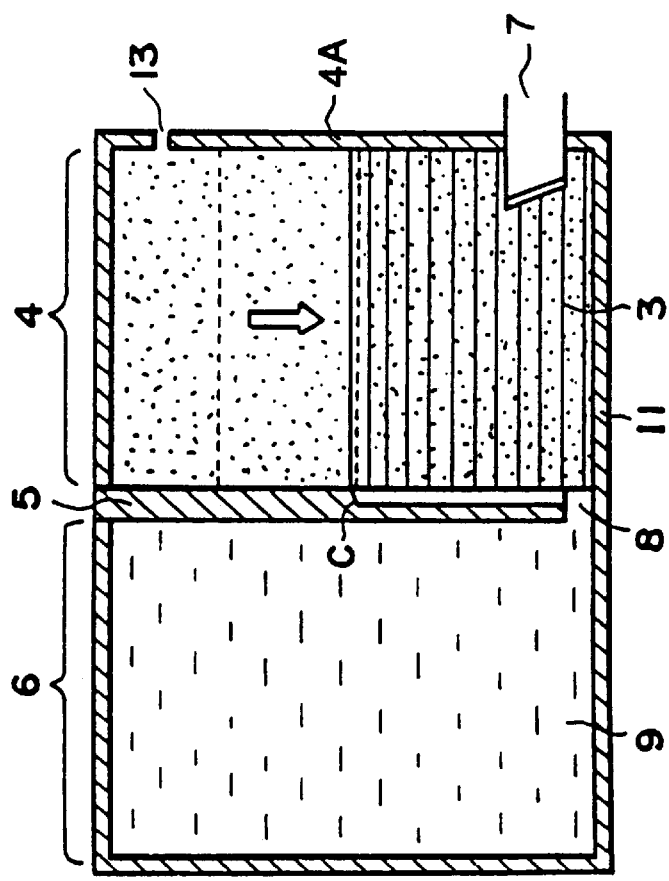

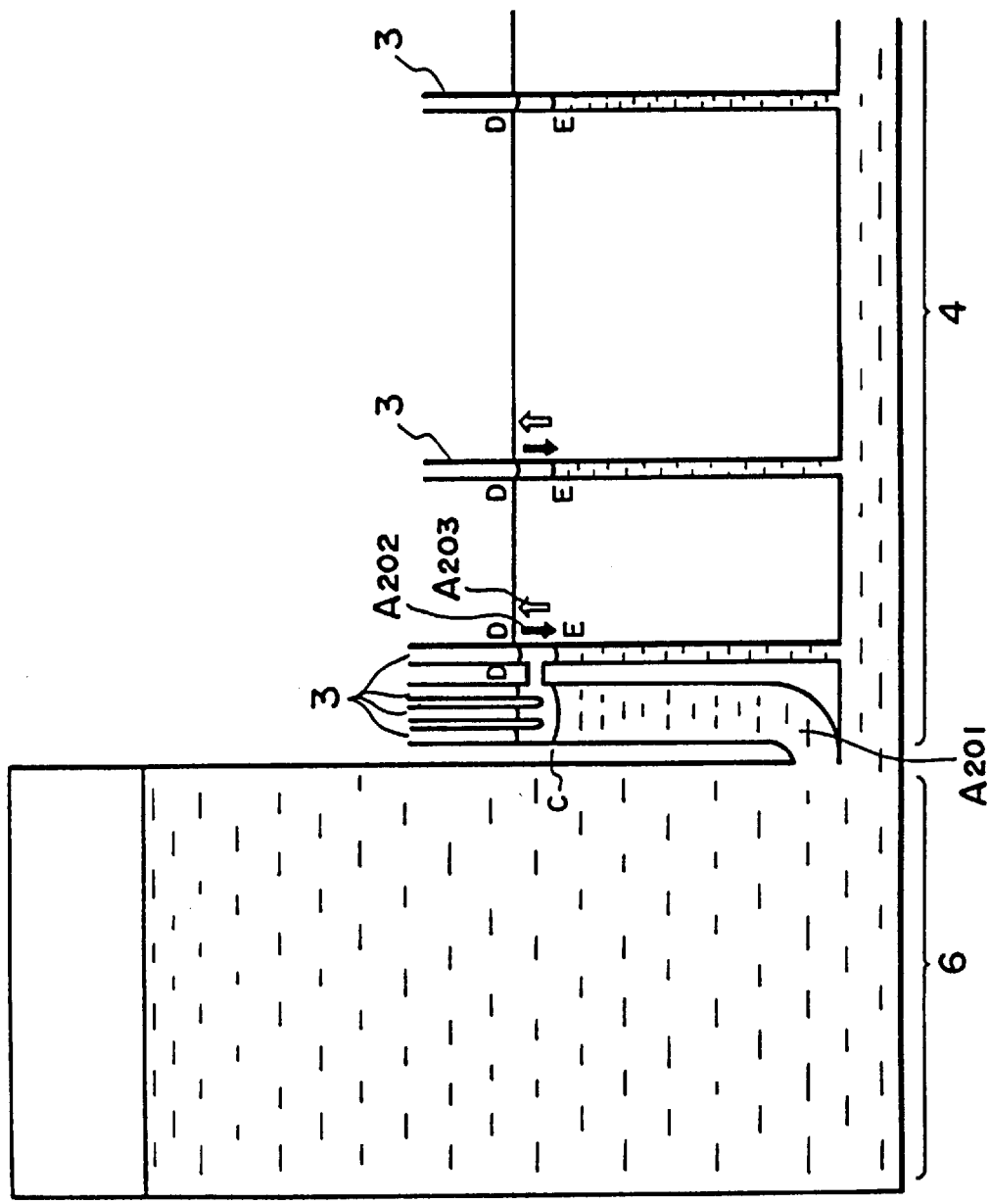

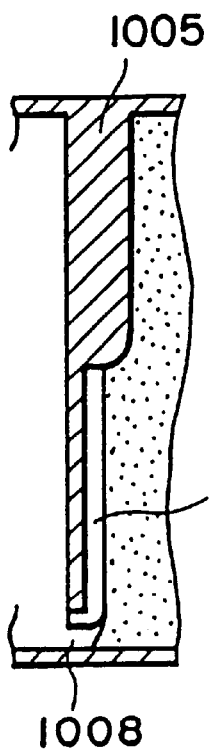
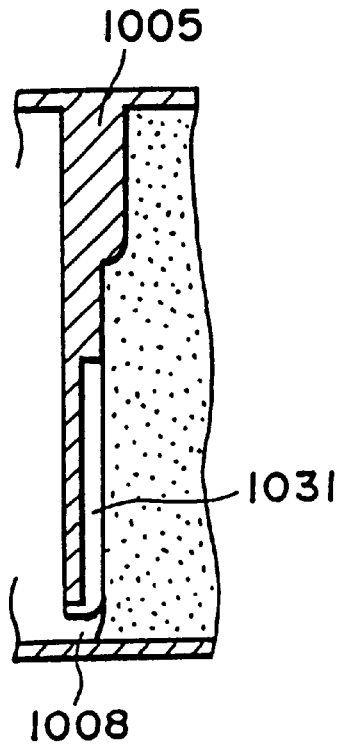
FIG. 24A  FIG. 24B
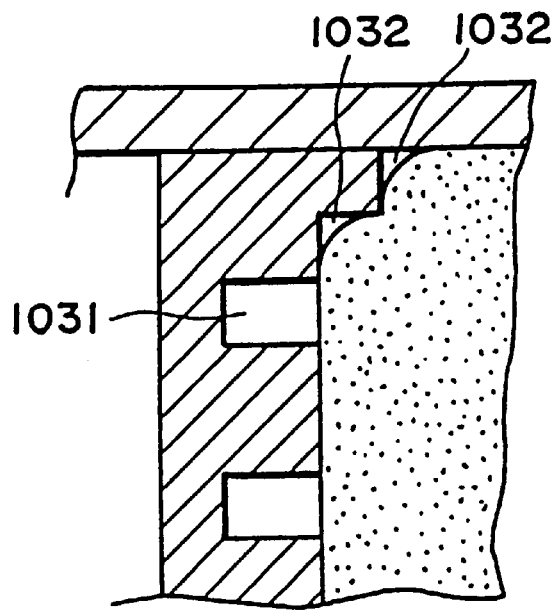
FIG. 25

DISCHARGE DIRECTION

MAIN SCAN DIRECTION

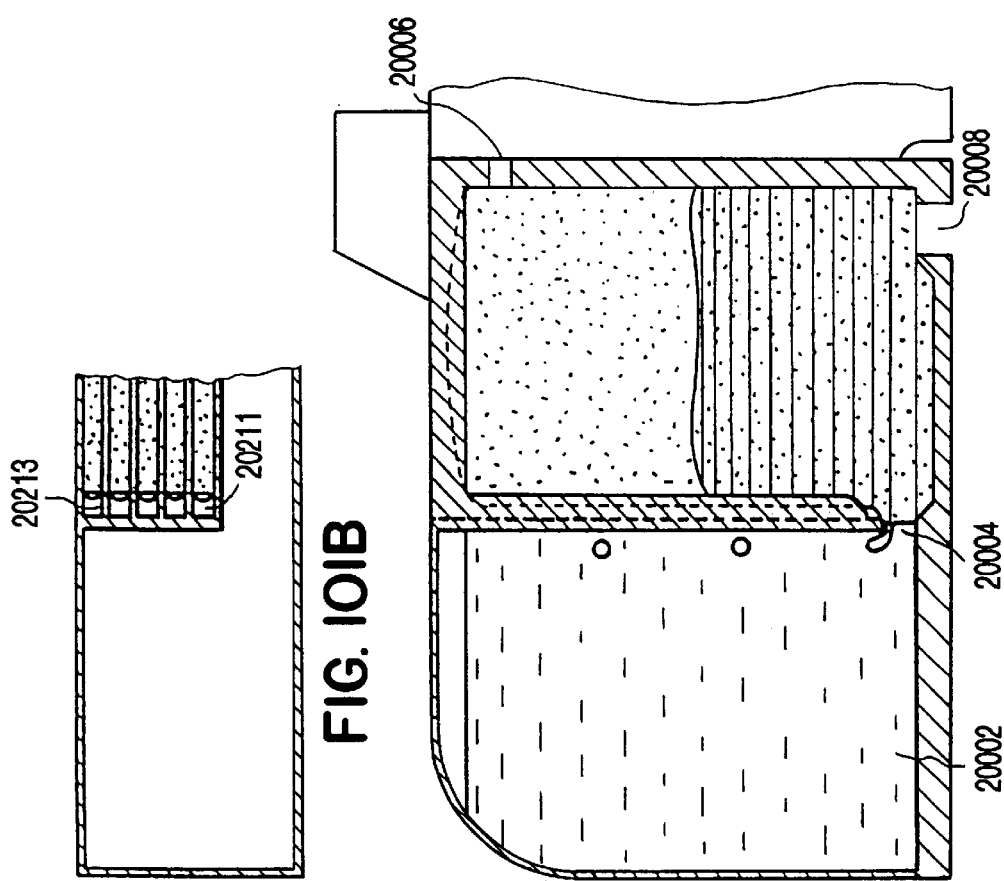

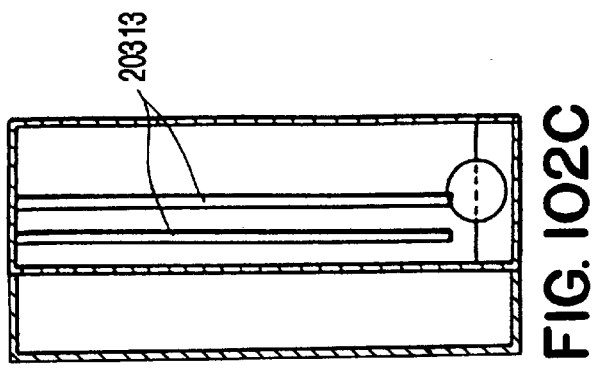
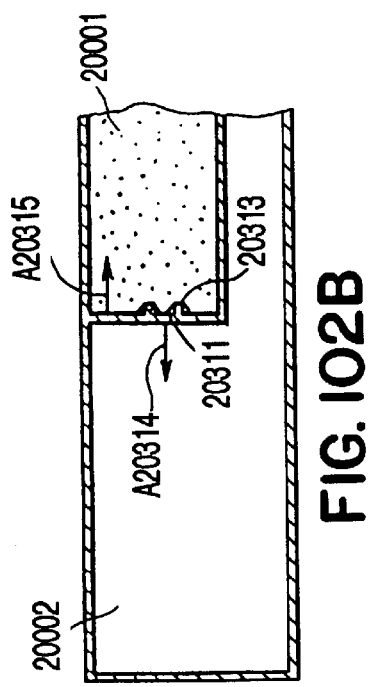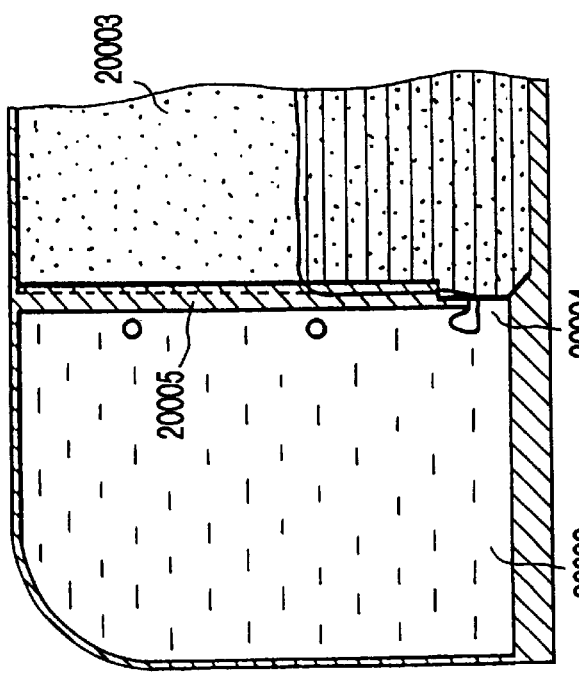

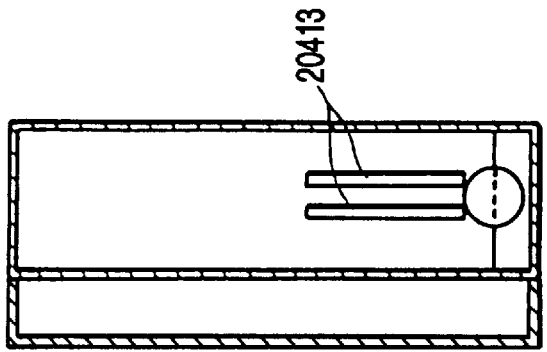
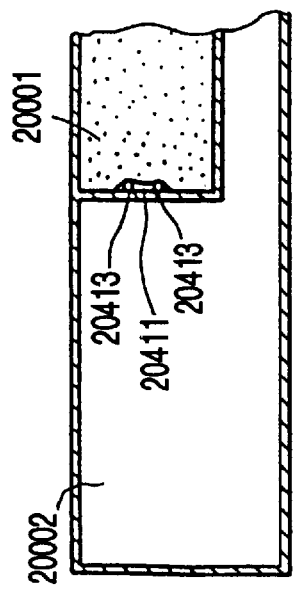
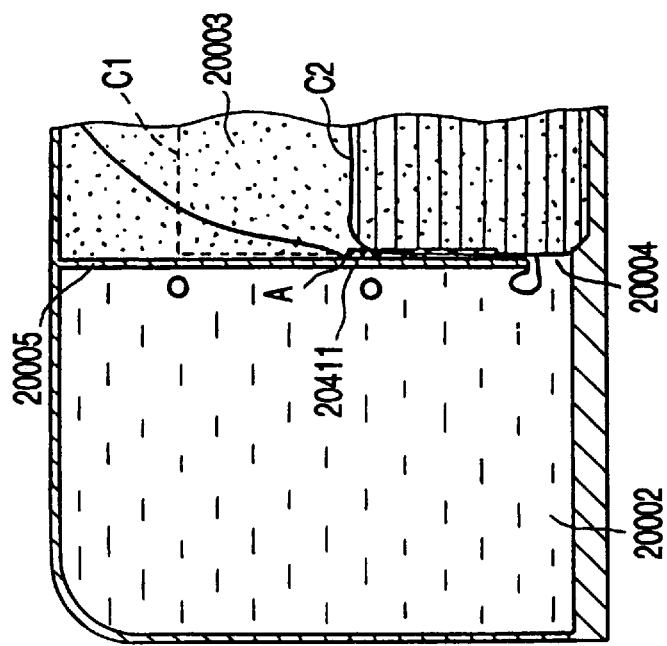

INK CONTAINER, INK AND INK JET RECORDING APPARATUS USING INK CONTAINER

This application is a continuation-in-part of application Ser. No. 08/612,299, filed Mar. 7, 1996 now U.S. Pat. No. 6,012,808, and of application Ser. No. 08/696,517, filed Aug. 14, 1996. Application Ser. No. 08/612,299, in turn, is a division of application Ser. No. 08/094,317, filed Jul. 21, 1993, now U.S. Pat. No. 5,509,140. Application Ser. No. 08/612,299 is related to application Ser. No. 08/612,498, filed Mar. 7, 1996, now U.S. Pat. No. 5,742,311, to application Ser. No. 08/612,439, filed Mar. 7, 1996, pending, to Ser. No. 08/612,429, filed Mar. 7, 1996, pending, to application Ser. No. 09/184,032, filed Nov. 2, 1998, pending, to application Ser. No. 09/184,038, filed Nov. 2, 1998, pending, and to application Ser. No. 09/184,039, filed Nov. 2, 1998, pending, all of which are divisions of the afore-mentioned application Ser. No. 08/094,317. Application Ser. No. 08/696,517, in turn, is a continuation of application Ser. No. 08/605,587, filed Feb. 22, 1996 now abandoned, which is a continuation of application Ser. No. 08/266,479, filed Jun. 27, 1994, now abandoned. Application Ser. No. 08/696,517 is related to application Ser. No. 09/190,120, filed Nov. 12, 1998, pending, to application Ser. No. 09/190,119, filed Nov. 12, 1998, pending, to application Ser. No. 09/190,121, filed Nov. 12, 1998, pending, all of which are divisions of the afore-mentioned application Ser. No. 08/696,517.

BACKGROUND OF THE INVENTION

1. Field of the Invention

The present invention relates to an ink container for containing ink to be supplied to an ink jet recording head, ink, and an ink jet recording apparatus using the ink container.

2. Description of the Related Art

The ink container used with an ink jet recording apparatus is required to be capable of properly supplying the amount of the ink corresponding to the amount of the ink ejected from a recording head during the recording operation and to be free of ink leakage through the ejection outlets of the recording head when the recording operation is not executed.

In the case that the ink container is an exchangeable type, it is required that the ink container can be easily mounted or demounted relative to the recording apparatus without ink leakage, and that the ink can be supplied to the recording head with certainty.

A conventional example of an ink container usable with the ink jet recording apparatus is disclosed in Japanese Laid-Open Patent Application No. 87242/1988 (first prior art), in which the ink jet recording cartridge has an ink container containing foamed material and having a plurality of ink ejecting orifices. With the ink container, the ink is contained in the porous material such as foamed polyurethane material, and therefore, it is possible to produce negative pressure by the capillary force in the foamed material and to prevent the ink leakage from the ink container.

Japanese Laid-Open Patent Application No. 522/1990 (second prior art) discloses an ink jet recording cartridge in which a first ink container and a second ink container are connected with a porous material, and a second ink container and an ink jet recording head are connected with a porous material. In this prior art, the porous material is not contained in the ink container, and it is disposed only in the ink passage, by which the use efficiency of the ink is improved. By the provision of the secondary ink containing portion, the ink flowing out of the first ink container due to the air expansion in the first ink container due to the temperature increase (pressure decrease), is stored, by which the vacuum in the recording head during the recording operation is maintained substantially constant.

However, in the first prior art, the foamed material is required to occupy substantially the entire space in the ink container layer, and therefore, the ink capacity is limited, and in addition, the amount of the non-usable remaining ink is relatively large, that is, the use efficiency of the ink is poor. These are the problems therewith. In addition, it is difficult to detect the remaining amount of the ink, and it is difficult to maintain substantially constant vacuum during the ink consumption period. These are additional problems.

In the second prior art, when the recording operation is not carried out, the vacuum producing material is disposed in the ink passage, and therefore, the porous material contains a sufficient amount of the ink, and the production of the negative pressure by the capillary force of the porous material is insufficient, with the result that the ink is leaked through the orifices of the ink jet recording head by small impact or the like. This is a problem. In the case of an exchangeable ink cartridge in which the ink jet recording head is formed integrally with the ink container, and the ink container is mounted on the ink recording head, the second prior art is not usable. This is another problem.

Japanese Laid-Open Patent Applications Nos. 67269/1981 and 98857/1984 disclose an ink container using an ink bladder urged by a spring. This is advantageous in that the internal negative pressure is stably produced at the ink supply portion, using the spring force. However, these system involve problems that a limited configuration of the spring is required to provide a desired internal negative pressure, that the process of fixing the ink container to the bladder is complicated, and therefore, the manufacturing cost is high. In addition, for a thin ink container, the ink retaining ratio is small.

Japanese Laid-Open Patent Application No. 214666/1990 discloses a separated chamber type in which the inside space of the ink container is separated into a plurality of ink chambers, which communicate with each other by a fine hole capable of providing the vacuum pressure. In the separate chamber type, the internal negative pressure at the ink supply portion is produced by the capillary force of the fine opening communicating the ink chambers. In this system, the structure of the ink container is simpler than the spring bladder system, and therefore, it is advantageous from the standpoint of the manufacturing cost and the configuration of the ink container in not limited from the structure. However, the separated chamber type involves the problem that when the ink container position is changed, the fine opening becomes short of ink depending on the remaining amount of the ink with the result of instable internal vacuum pressure even to the extent that the ink is leaked, and therefore, the ink container is imposed by limitation in the handling thereof.

Also, in the technical fields of recording using ink, there is a contact recording technique for use with plotters. In this contact recording technique, the ink supply is typically made to a recording core or wick having ink absorbability and retainability like a felt-tipped pen.

One example of the ink supply form in the above contact recording technique is Japanese Laid-Open Utility Model Application No. 57-16385. This discloses a recording instrument pen relying on the use of a recording core (porous ink absorptive core) for recording in contact with the recording medium.

The invention which this document discloses adopts a constitution comprising a central chamber having a recording core, a first flocculent fiber in contact with the recording core, and a second flocculent fiber having a small amount of ink absorbed in the upper atmosphere communicating port side and being less permeable to the ink than the first flocculent fiber, and a closed type ink storing chamber from which the ink can be supplied via a communicating hole to either side of the central chamber.

With this constitution, air within the closed type ink storing chamber expands due to rises in the ambient temperature, so that the ink within the closed type ink storing chamber flows into the first flocculent fiber. The ink exceeding the acceptable impregnated amount of the first flocculent fiber is impregnated by the second flocculent fiber, thereby preventing the ink from overflowing from the recording core and dripping down.

Also, there is provided a groove of fixed width to cause the expanded air to escape into the atmosphere communicating port when one of two closed type ink storing chambers is only filled with the air. The groove extends from the uppermost end to the lowermost end of a lateral surface different from that of a partition wall between the central chamber and the closed type ink storing chamber, as disclosed above.

However, in the above contact recording instrument pen, no attention is paid to the stable generation of negative pressure serving to prevent ink leakage from the recording unit in the ink jet technique which involves a non-contact recording.

Also, the consumption of the ink from the ink storing chambers on both sides is not necessarily identical, but it is pointed out that the ink of one ink storing chamber may be possibly exhausted ahead. Some attention is paid concerning the ink leakage from the recording core due to environmental changes in this case, but in the ink jet recording field, some problem such as the disruption of ink flow passage, or the penetration of air bubbles into the recording portion may occur.

To solve the above background problems, the present inventors have previously made applications or as the ink vessel suitable for the ink jet print technical field, an ink jet cartridge having both features of the capability of supplying excellently the ink in the amount corresponding to that discharged from the recording head during printing, and the expedience of having no ink leakage from the discharge ports when the printing is not performed (Japanese Laid-Open Patent Application No. 4-198474, Japanese Laid-Open Patent Application No. 4-198681).

Herein, it has been found that the fundamental constitution effective for the ink jet characteristics is one having a first accommodating chamber which is a negative pressure generating member receiving portion having an atmosphere communicating portion for communicating to the atmosphere as well as receiving a negative pressure generating member, and a second accommodating chamber which communicates to the first accommodating chamber but lies in substantially closed state, and which is an ink storing portion for directly storing the ink to be supplied to the first accommodating chamber (hereinafter referred to as a pre-supposed constitution).

Because this constitution has a tank structure in which the negative pressure can be made substantially constant for most of the term from the initiation of using the head cartridge to the termination thereof, it is possible to provide a replacement-type head cartridge and an ink jet head and a printer which can cope with the high speed recording.

Further, in recent years, the ink jet recording art is not only applied to the printer, but also employed in the communication technical field such as facsimile, the copying machine field usable for the large paper (large size), and in the printing field onto cloth. With this trend, the larger capacity of the ink vessel is desired for the apparatus.

SUMMARY OF THE INVENTION

Accordingly, it is a principal object of the present invention to provide an ink container, an ink jet recording head using the same and an ink jet recording apparatus using the same, which is easy to handle.

It is another object of the present invention to provide an ink container, an ink jet recording head using the same and an ink jet recording apparatus using the same in which the ink retaining ratio is high.

It is a further object of the present invention to provide an ink container, an ink jet recording head using the same and an ink jet recording apparatus using the name in which the ink is not leaked even if the ambient condition changes.

It is a further object of the present invention to provide an ink container, an ink jet recording head using the same and the ink jet recording apparatus using the same in which the vacuum in the ink supply is stabilized against the ambient condition change, and therefore, the ink supplied can be supplied to the recording head without influence to the ejection property of the ink.

It is a yet further object of the present invention to provide an ink container, ink, recording head, and ink jet recording apparatus in which the ink is efficiently used by the use of vacuum producing means.

It is a further object of the present invention to provide an ink container, ink, an ink jet recording head and an ink jet recording apparatus in which the ink leakage is reliably prevented even when mechanical impact such as vibration or thermal impact such as temperature change is given to the recording head or the ink container under the condition of use or transportation of the ink jet recording apparatus.

The present invention also aims to increase the ink storable amount in an ink tank unit for storing the ink to be supplied to an ink jet recording apparatus, and enhance the use efficiency of the ink.

Also, the present invention aims to produce evenly the back pressure to an ink jet head unit in an ink tank unit as well as making it substantially constant, and further to facilitate the formation of an ink flow passage from the ink tank unit to the ink jet head unit to maintain the ink supply performance at high level.

Further, the present invention aims to enhance the reliability in preventing ink leakage through a discharge portion or an atmosphere communicating port portion in the ink jet cartridge.

Also, it is another object of the present invention to provide an ink jet head cartridge of the integral type which is highly reliable in preventing the ink leakage through an atmosphere communicating port portion against various changes in the attitude during physical distribution and changes in the ambient temperature and humidity, and which is inexpensive in the manufacturing costs.

According to one aspect of the invention, a liquid container for a liquid jet recording apparatus comprises a first chamber containing negative pressure producing material and having a liquid outlet connectable to a liquid jet head to supply liquid from the container to the liquid jet head, and an air vent for allowing ambient air into the container, wherein the liquid outlet is provided in a bottom portion of said first chamber. A second chamber communicates with the first chamber by means of a communication path, except for which said second chamber is substantially hermetically sealed. A wall extends upwardly from the communication path of the first chamber. An ambient air introducing path is provided between the wall and the negative pressure producing material and extends from a point partly up the wall toward the communication path, and is for introducing ambient air into the second chamber.

In another aspect of the invention, a liquid container for a liquid jet recording apparatus comprises a first chamber containing negative pressure producing material and having a liquid outlet arranged, in use, at a lower part of the container and contactable to a liquid jet head to supply liquid from the container to the liquid jet head and an air vent for allowing ambient air into the container, wherein the liquid outlet is provided in a bottom portion of the first chamber. A second chamber communicates with the first chamber by means of a communication part, except for which the second chamber is substantially hermetically sealed and which is disposed in use at the lower part of the container and providing a liquid reservoir for the first chamber. An ambient air introducing means is provided for and comprises an air path substantially free of negative pressure producing material having an inlet in the first chamber separated from the air vent by the negative pressure producing material and an outlet arranged to be lower than the inlet during use of the container to enable air to be supplied to the second chamber through the negative pressure producing material and the air path as liquid is withdrawn from the liquid outlet.

In yet another aspect of the invention, a liquid container for a liquid jet recording apparatus comprises a first chamber containing negative pressure producing material and having a liquid outlet connectable to a liquid jet head to supply liquid from the container to the liquid jet head, and an air vent for allowing ambient air into the container, wherein the liquid outlet is provided in a bottom portion of the first chamber. A second chamber communicates with the first chamber by means of a communication path, except for which said second chamber is substantially hermetically sealed. An ambient air introducing path for introduces the ambient air into the second chamber by permitting air-liquid exchange at the communication path when the liquid is supplied out through the liquid outlet while a liquid level in the first chamber is above the communication path, the air introducing path being provided as a gap formed by the negative pressure producing material being apart from an inside surface of the first chamber.

In yet a further aspect of the invention, a liquid container for a liquid jet recording apparatus comprises a first chamber containing negative pressure producing material and having a liquid outlet connectable to a liquid jet head to supply liquid from the container to the liquid jet head and an air vent for allowing ambient air into the container, wherein the liquid outlet is provided in a bottom portion of the first chamber. A second chamber communicates with the first chamber by means of a communication path, except for which the second chamber is substantially hermetically sealed. An ambient air introducing path is provided for introducing the ambient air into the second chamber by permitting air-liquid exchange at said communication path when the liquid is supplied out through the liquid outlet while a liquid level in the first chamber is above the communication path, the air introducing path being provided as a gap formed between the negative pressure producing material and an inside surface of the first chamber.

In yet another aspect of the invention, a liquid container for a liquid jet recording apparatus comprises a first chamber containing negative pressure producing material and having a liquid outlet connectable to a liquid jet head to supply liquid from the container to the liquid jet head and an air vent for allowing ambient air into the container. A second chamber communicates with the first chamber by means of a communication path, except for which the second chamber is substantially hermetically sealed. An ambient air introducing means is provided for introducing the ambient air into the second chamber by permitting air-liquid exchange at the communication path when the liquid is supplied out through the liquid outlet while a liquid level in the negative pressure producing material in the first chamber is above the communication path, the ambient air introducing means being formed between the negative pressure producing material and an inside surface of the first chamber.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 2 and 2A illustrate a recording head and an ink container according to another embodiment of the present invention.

FIG. 3 illustrates an ink container according to an embodiment of the present invention.

FIGS. 5A to 5C illustrate an ink container according to a further embodiment of the present invention.

FIGS. 6A to 6C illustrate an ink container according to a further embodiment of the present invention.

FIGS. 7A and 7C illustrate an ink container according to a further embodiment of the present invention.

FIG. 14 illustrates an initial state in which the ink container is filled with the ink.

FIG. 15 illustrates a state in which the air-liquid interface starts to be formed.

FIGS. 19A to 19C illustrate an ink container according to a further embodiment of the present invention.

FIG. 20 shown a model of ink supply.

FIGS. 24A and 24B are sectional views of the ink cartridge main body, showing the surface of the rib according to a further embodiment of the present invention.

FIG. 25 is an enlarged sectional view of a rib according to a further embodiment of the present invention.

FIGS. 67A and 67B are views showing embodiment 20 of an ink jet cartridge, in which FIG. 67A is a schematic perspective view and FIG. 67B is a perspective view.

FIGS. 70A and 70B are views showing an ink jet cartridge according to an embodiment 22 of the present invention, in which FIG. 70A is a cross-sectional view of the inside along the ink discharge direction and FIG. 70B is a cross-sectional view of the inside along the main scan direction of the ink jet cartridge.

FIGS. 71A and 71B are views showing an ink jet cartridge according to an embodiment 22 of the present invention, in which FIG. 71A is a cross-sectional view of the inside along the ink discharge direction and FIG. 71B is a cross-sectional view of the inside along the main scan direction of the ink jet cartridge.

FIGS. 73A and 73B are views showing an ink jet cartridge according to an embodiment 24 of the present invention, in which FIG. 73A is a cross-sectional view of the inside along the ink discharge direction and FIG. 73B is a cross-sectional view of the inside along the main scan direction of the ink jet cartridge.

FIGS. 74A and 74B are views showing an ink tank unit according to an embodiment 25 of the present invention, in which FIG. 74A is a cross-sectional view of the ink tank unit, and FIG. 74B is a cross-sectional view the tank of FIG. 74A taken along the line X—X, which is a schematic view with a negative pressure generating member 10205 as shown in FIG. 74A removed to better represent the features of this embodiment.

FIGS. 76A and 76B are views showing an ink jet cartridge according to an embodiment 26 of the present invention, in which FIG. 76A is a cross-sectional view of the inside along the ink discharge direction and FIG. 76B is a cross-sectional view of the inside along the main scan direction of the ink jet cartridge.

FIGS. 78A and 78B are views showing an ink jet cartridge according to an embodiment 27 of the present invention, in which FIG. 78A is a cross-sectional view of the inside along the ink discharge direction and FIG. 78B is a cross-sectional view of the inside along the main scan direction of the ink jet cartridge.

FIGS. 97A and 97B are views showing an ink jet cartridge according to an embodiment 29 of the present invention, in which FIG. 97A is a cross-sectional view of the inside along the ink discharge direction and FIG. 97B is a cross-sectional view of the inside along the main scan direction of the ink jet cartridge.

FIGS. 101A, 101B and 101C are views of an alternate arrangement utilizing a plurality of ribs for the air introduction path in an embodiment 29 of the present invention.

FIGS. 102A, 102B and 102C are views of an alternate arrangement utilizing asymmetrical ribs for the air introduction path in an embodiment 29 of the present invention.

FIG. 103A, 103B and 103C are views of an alternate arrangement utilizing ribs partially extending along the wall for the air introduction path in an embodiment 29 of the present invention.

DETAILED DESCRIPTION OF THE PREFERRED EMBODIMENT

Figure 1:
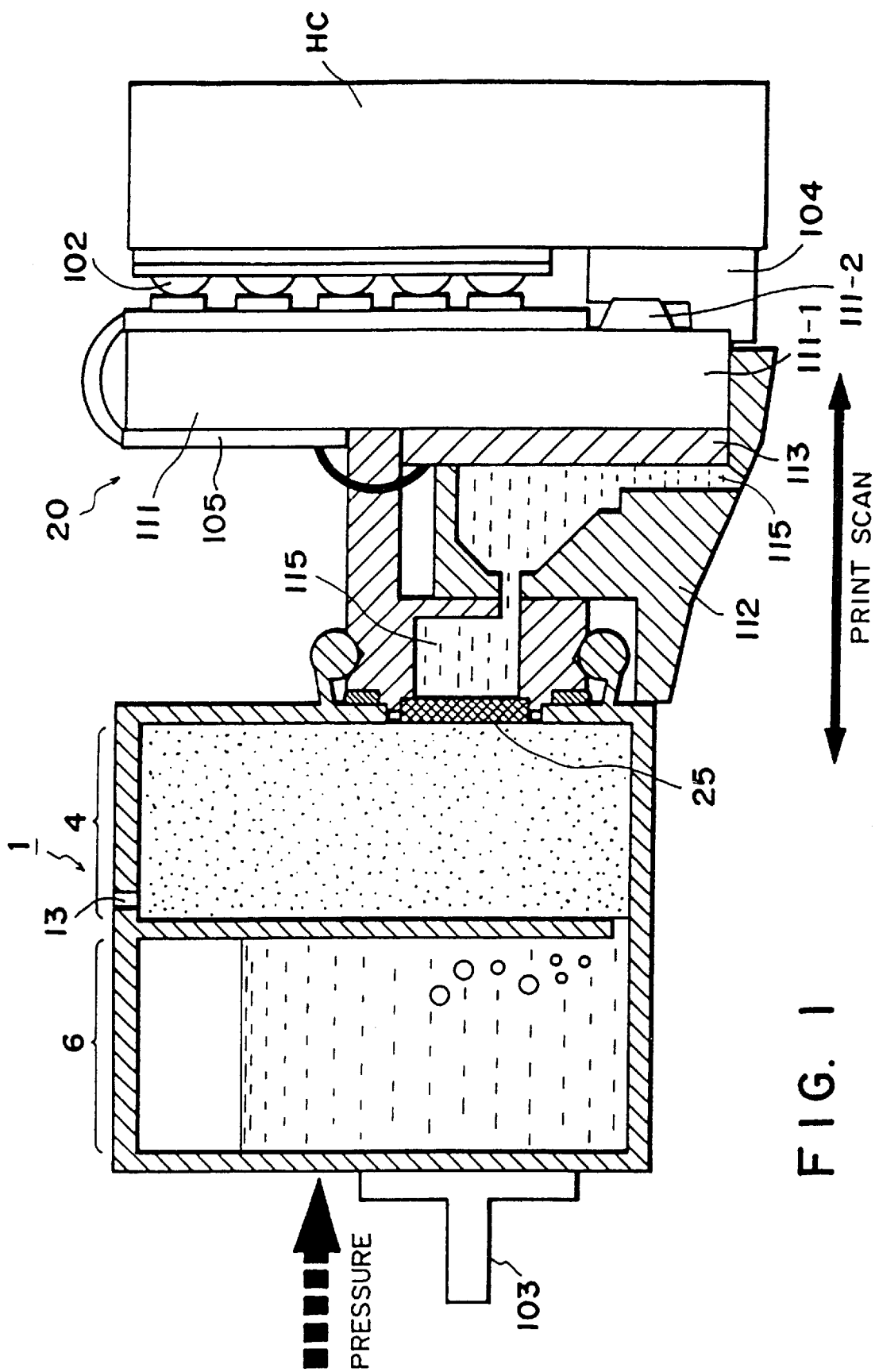
FIG. 1 shows coupling between a recording head and an ink container according to an embodiment of the present invention.

FIG. 1 is a sectional view showing connection among the recording head, ink container, carriage in an ink jet recording apparatus according to an embodiment of the present invention. The recording head 20 in this embodiment is of an ink jet type using electrothermal transducers for generating thermal energy for causing film boiling in the ink in accordance with electric signal. In FIG. 1, major parts of the recording head 20 are bonded or pressed into a laminated structure on a head base plate 111 with positioning reference projections 111-1 and 111-2 on the head base plate 111. In the vertical direction on the surface of FIG. 1 drawing, the positioning is effected by the head positioning portion 104 of a carriage HC and a projection 111-2. In the vertical direction in the cross-section of FIG. 1, a part of the projection 111-2 projects to cover the head positioning portion 104, and the cut-away portion (not shown) of the projection 111-2 and the head positioning portion 104 are used for the correct positioning. The heater board 113 is produced through film formation process, and includes electrothermal transducers (ejection heaters) arranged on a Si substrate and electric wiring for supplying electric power thereto, the wiring being made of aluminum or the like. The wiring is made correspond to the head flexible base (head PCB) having the wiring which has at the end portion pads for receiving electric signals from the main assembly. They are connected by wire bonding. A top plate 112 integrally formed of polysulfone or the like comprises walls for separating a plurality of ink passages corresponding to the ejection heaters, a common liquid chamber for receiving ink from an exchangeable ink container through a passage and for supplying the ink into the plurality of ink passages, and orifices for providing the plurality of ejection outlets. The top plate 112 is urged to the heater board 113 by an unshown spring, and it is pressed and shield using a sealing member, thus constituting the ink ejection outlet part.

For the purpose of communication with the exchangeable ink container 1, the passage 115 provided by sealingly combining with the top plate 112, penetrates through the holes of the head PCB 113 and the head base plate 111 to the opposite side of the head base plate 111. In addition, it is bonded and fixed to the head base plate 111 at the penetrating portion. At an end connecting with the ink container 1 of the passage 115, there is provided a filter 25 for preventing introduction of foreign matter or bubble into the ink ejection part.

The exchangeable ink container is connected with the recording head 20 by an engaging guide and pressing means 103, and an ink absorbing material in the ink supplying portion is brought into contact with the filter 25 at an end of the passage 115, by which the mechanical connection is established. After the connection, using a recording head sucking recovery pump 5015 of the main assembly of the recording apparatus, the ink is forcedly supplied from the exchangeable ink container 1 into the recording head 20, by which the ink is supplied.

In this embodiment, upon the engagement by the pressing means, the recording head 20 and the exchangeable ink container 1 are connected with each other, and simultaneously, the recording head 20 and the carriage MC are mechanically and electrically connected in the same direction, and therefore, the positioning between the pad on the head PCE 105 and the head driving electrodes 102, are assuredly effected.

A ring seal is of a relatively thick elastic material ring in thin embodiment so that the joint portion with the outer wall of the exchangeable ink container is wide enough to permit play in the ink supply portion.

Figure 4:
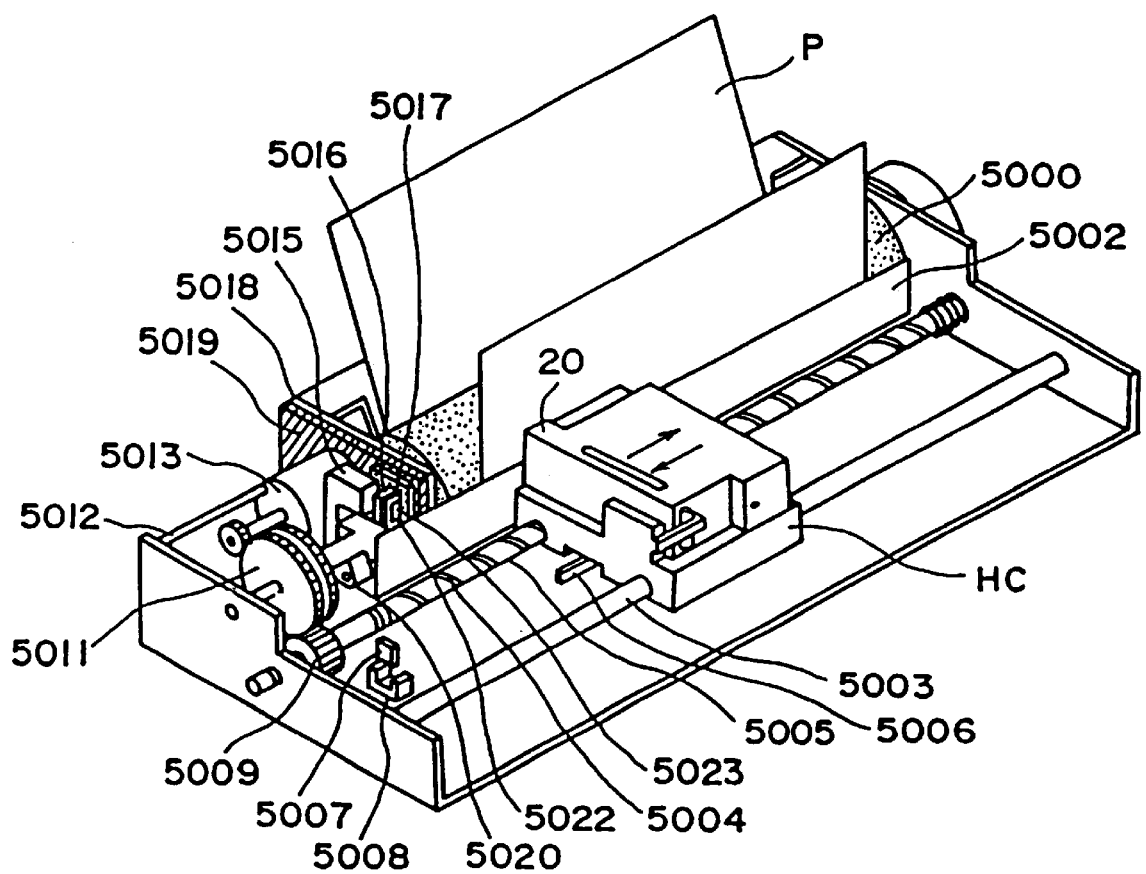
FIG. 4 is a perspective view of a recording apparatus.

As described in the foregoing, in this embodiment, the exchangeable ink container 1 and the recording head 20 are sufficiently combined, and thereafter, the exchangeable ink container is urged, by which the carriage and the recording head can be assuredly positioned relatively to each other with simple structure, and simultaneously, the recording head and the exchangeable ink container are connected outside the main assembly with simple structure, and thereafter, it is mounted to the carriage. Therefore, the exchanging operation is easy. In this embodiment, the electric connection between the carriage (recording apparatus main assembly) and the recording head is simultaneously effected. Therefore, the operativity upon the exchange of the recording head and the exchangeable ink container is good. It is a possible alternative that a separate connector is used to establish the electric connection, by which the latitude for the structure to assure the recording head positioning and the connection with the exchangeable ink container. FIG. 4 shows a recording apparatus of a horizontal position type. Referring to this Figure, the arrangement and the operation of the recording head in the ink jet recording apparatus of this embodiment will be described. In this Figure, a recording material P is fed upwardly by a platen roller 5000, and it is urged to the platen roller 5000 over the range in the carriage moving direction by a sheet confining plate 5002. A carriage moving pin of the carriage HC is engaged in a helical groove 5004. The carriage is supported by the lead screw 5005 (driving source) and a slider 5003 extending parallel with the lead screw, and it reciprocates along the surface of the recording material P on the platen roller 5000. The lead screw 5005 is rotated by the forward and backward rotation of the driving roller through a drive transmission gears 5011 and 5009. Designated by reference numerals 5007 and 5008 are photocouplers, which serve to detect the presence of the carriage lever 5006 to switching the direction of the motor 5013 (home position sensor). The recording image signal is transmitted to the recording head in timed relation with the movement of the carriage carrying the recording head, and the ink droplets are ejected at the proper positions, thus effecting the recording. Designated by a reference numeral 5016 is a member for supporting a capping member 5022 for capping the front surface of the recording head. Designated by a reference numeral 5015 is a sucking means for sucking the inside of the cap. Thus, it is effective to refresh or recover the recording head by the sucking through the opening 5021 in the cap. A cleaning blade-5017 is supported by a supporting member 5019 for moving the blade to and fro. They are supported on a supporting plate 5018 of the main assembly. The sucking means, the blade or the like may be of another known type. A lever 5012 for determining the sucking and recovery operation timing moves together with the movement of the cam 5020 engaged with the carriage. The driving force from the driving motor is controlled by a known transmitting means such as clutch or the like. The recovery means carries out the predetermined process at the predetermining timing by the lead screw 5005 at the corresponding positions, when the carriage comes into the region adjacent or at the home position.

Figure 33:
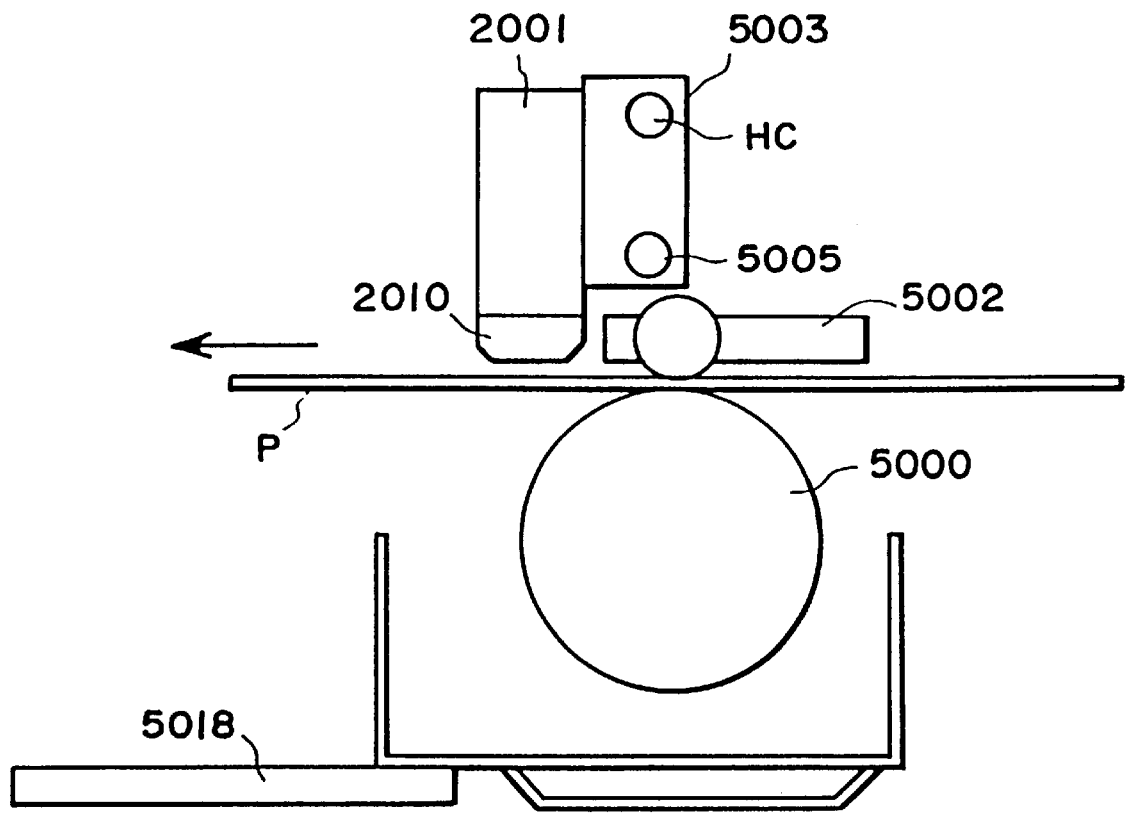
FIG. 33 illustrates horizontal printing position.

As shown in FIG. 33, the ink jet recording apparatus of this embodiment is operable in the vertical printing position. In the vertical position, the recording scanning operation is carried out while the recording material P is faced to the bottom surface of the recording head 2010. In this case, the sheet feeding, printing and sheet discharging operations are possible in substantially the same plane, and therefore, it is possible to effect the printing to a thick and high rigidity recording material such an a post card and an OHP sheet. Therefore, the outer casing of the position changeable ink jet recording apparatus of this embodiment is provided with four rubber pads on the bottom surface of FIG. 4, and with two ribs and retractable auxiliary leg 5018 on the left side surface. By this, the printing apparatus can be stably positioned in the respective printing positions. In the vertical printing position, the exchangeable ink container 2001 is above the ejection part of the recording head 2010 faced to the recording material P, and therefore, it is desirable to support the resulting static head of the ink and to maintain slightly positive, preferably, slightly negative internal pressure of the ink at the ejection part, so that the meniscus of the ink of the ejection part is stabilized.

The recording apparatus shown in FIG. 4 and FIG. 33 is usable with the embodiments of the present invention which will be described hereinafter.

The description will be made in detail as to the ink container of this invention. First, the structure and the operation of the ink container will be described.
(Structure)

As shown in FIG. 2, the main body of the ink container comprises an opening 2 for connection with an ink Jet recording head, a vacuum producing material chamber or container 4 for accommodating a vacuum producing material 3, and an ink containing chamber or an ink container 6 for containing the ink, the ink container 6 being adjacent to the vacuum producing material container by way of ribs 5 and being in communication with the vacuum producing material container 4 at a bottom portion 11 of the ink container.
Operation (1)

FIG. 2 is a schematic sectional view of the ink container when a Joint member 7 for supplying the ink into the ink jet recording head is inserted into the ink container, and is urged to the vacuum producing material, and therefore, the ink jet recording apparatus is in the operable state. At the end of the joint member, a filter may be provided to exclude the foreign matter in the ink container.

When the ink jet recording apparatus is operated, the ink is ejected through the orifice or orifices of the ink jet recording head, so that the ink sucking force is produced in the ink container. The ink 9 is introduced into the joint member 7 by the sucking force from the ink container 6 through the clearance 8 between ends of the ribs and the bottom 11 of the ink cartridge, and through the vacuum producing material 3 into the vacuum producing material container 4, and thereafter, the ink is supplied into the ink jet recording head. Then, the internal pressure of the ink container 6 which is hermetically sealed except for the clearance 8, decreases with the result of pressure difference between the ink container 6 and the vacuum producing material container 4. With the continued recording operation, the pressure difference continues to increase. Since the vacuum producing material container 4 is opened to the ambient air through an air vent, the air is introduced into the ink container 4 through the clearance 8 between the rib ends 8 and the ink cartridge bottom 11 through the vacuum producing material. At this time, the pressure difference between the ink container 6 and the vacuum producing material container 4 is eliminated. During the ink jet recording operation, the above process is repeated, so that substantially a constant vacuum is maintained in the ink cartridge. The ink in the ink container can be substantially thoroughly used, except for the ink deposited on the internal wall surface of the ink container, and therefore, the ink use efficiency is improved.
Operation (2)

Figure 10:
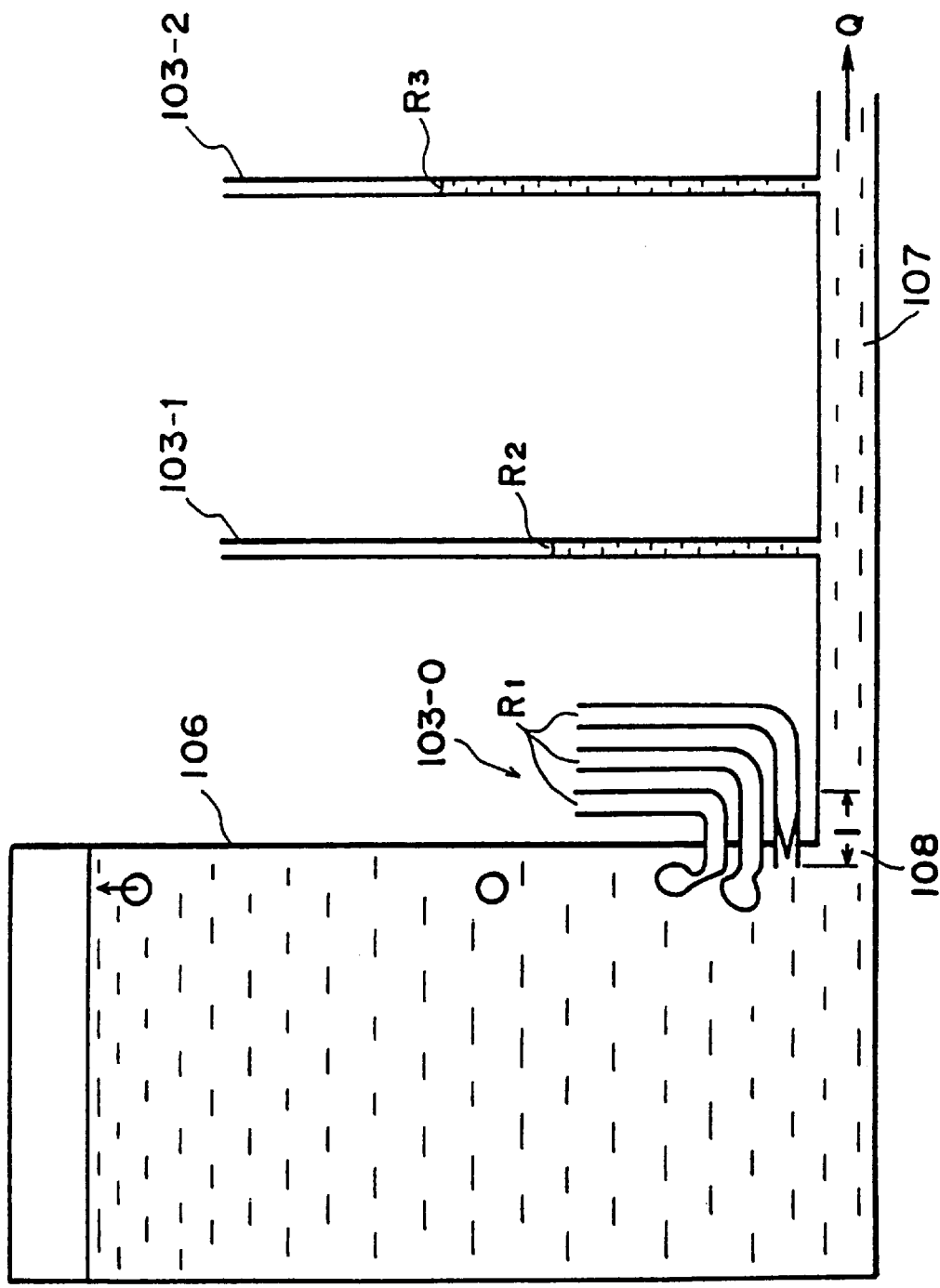
FIG. 10 illustrates a model of ink supply.

The principal operation of the ink container is further described in detail on the basis of a model shown in FIG. 10.

In FIG. 10, an ink container 106 corresponds to the ink container 6 and contains the ink. Designated by reference numerals 102, 103-1 and 103-2 are capillary tubes equivalent to the vacuum producing material 3. By the meniscus force thereof, the vacuum is produced in the ink container. An element 107 corresponds to the joint member 7, and is connected with an ink Jet recording head not shown. It supplies the ink from the ink container. The ink is ejected through the orifices, by which the ink flows an indicated by an arrow Q.

The state shown in this Figure is the state in which a small amount of the ink has been supplied out from the vacuum producing material, and therefore, the ink container, from the filled state of the ink container and the vacuum producing material. The balance is established among the static head in the orifice of the recording head, the reduced pressure in the ink container 106 and the capillary forces in the capillary tubes 102, 103-1 and 103-2. When the ink is supplied from this state, the height of the ink level in the capillary tubes 103-1 and 103-2 hardly change, and the ink is supplied from the ink container 106 through a clearance 108 corresponding to the clearance 8. This increases the vacuum in the ink container 106, so that the meniscus of the capillary tube 102 changes to produce air bubble or bubbles. By the breakdown of the meniscus, the air bubble or bubbles are introduced into the ink container 106. In this, manner, the consumed amount of the ink is supplied from the ink container 106 without a substantial change in the level in the capillary tubes 103-1 and 103-2, that is, without substantial change in the ink distribution in the vacuum producing material, that is, with the balanced internal pressure maintained.

When an amount Q of the ink in supplied, the volume change appears as the meniscus level change in the capillary tube 102, and the surface energy change of the meniscus thereby increases the negative pressure of the ink supply portion. However, the break down of the meniscus permits introduction of the air into the ink container, so that the air is exchanged with the ink, and therefore, the meniscus returns to the original position. Thus, the internal pressure of the ink supply portion is maintained at the predetermined internal pressure by the capillary force of the tube 102.

Figure 11:
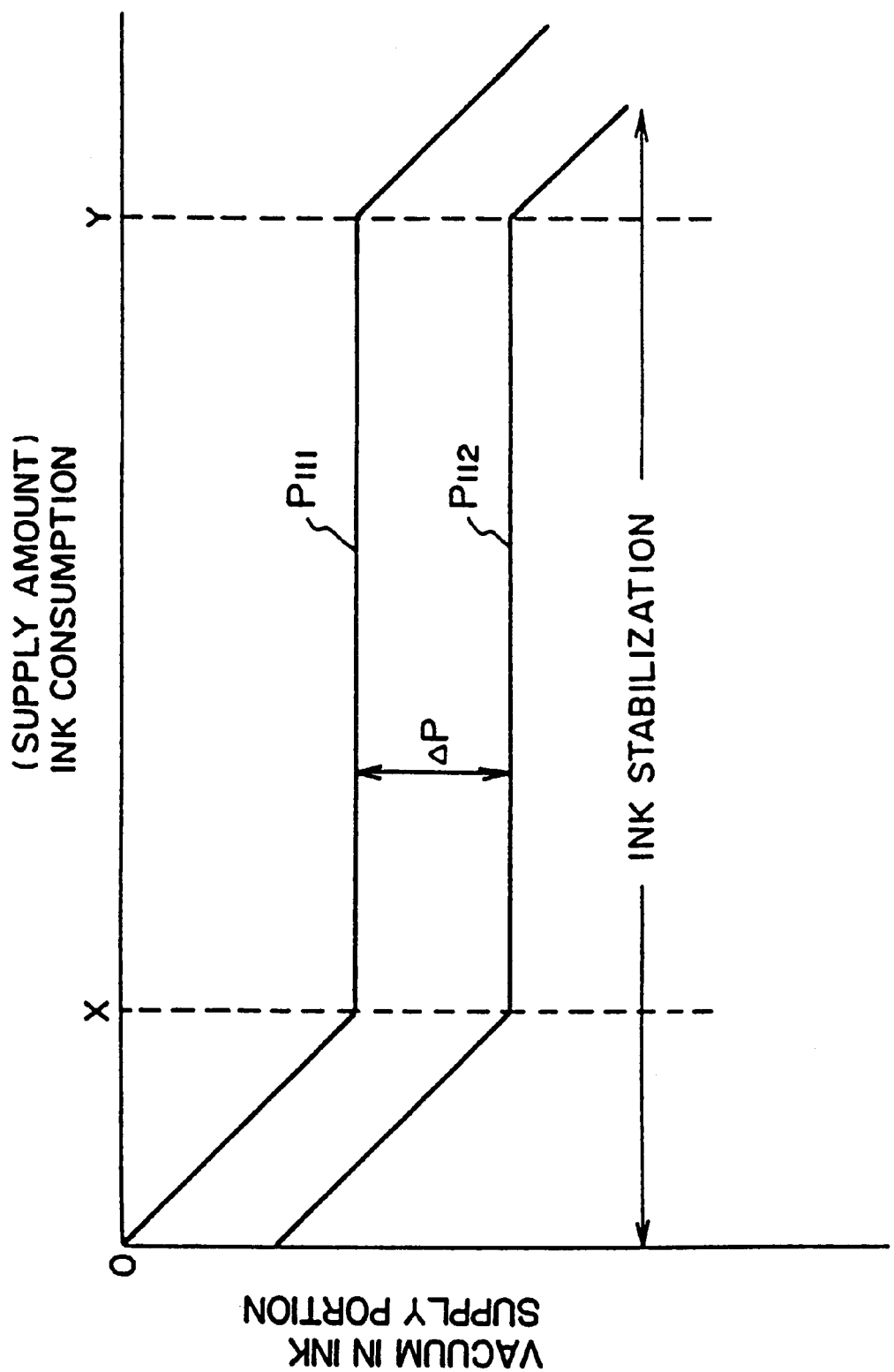
FIG. 11 is a graph showing internal pressure change at the ink supply portion in an ink container according to an embodiment of the present invention.
Figure 16:
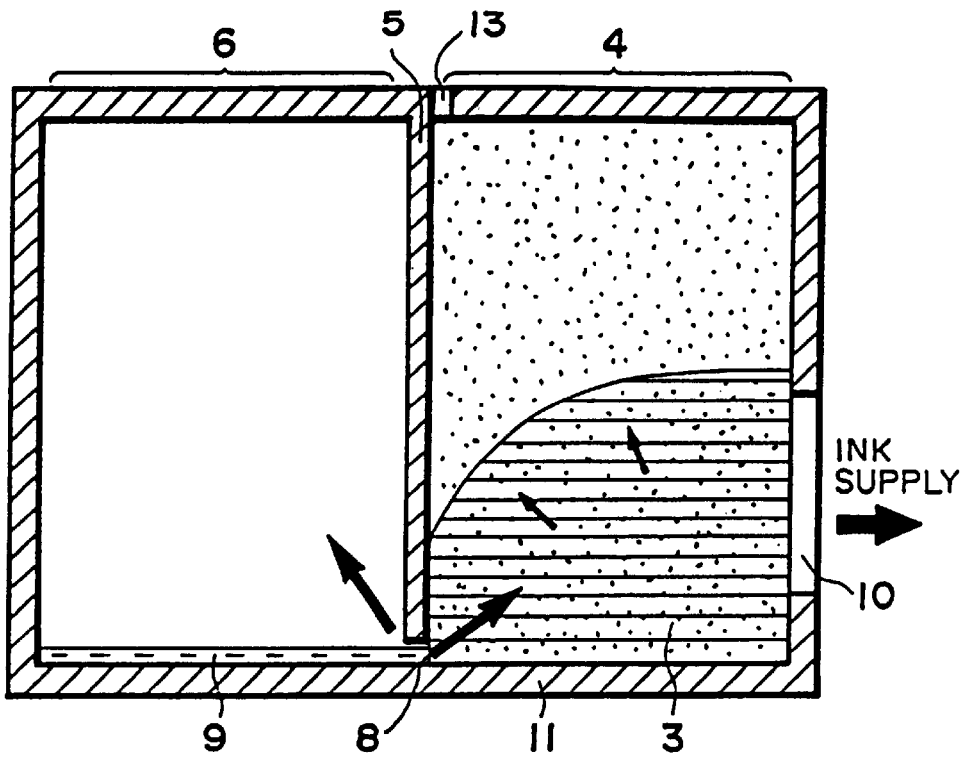
FIG. 16 shows the state about an end of the ink supply.
Figure 17:
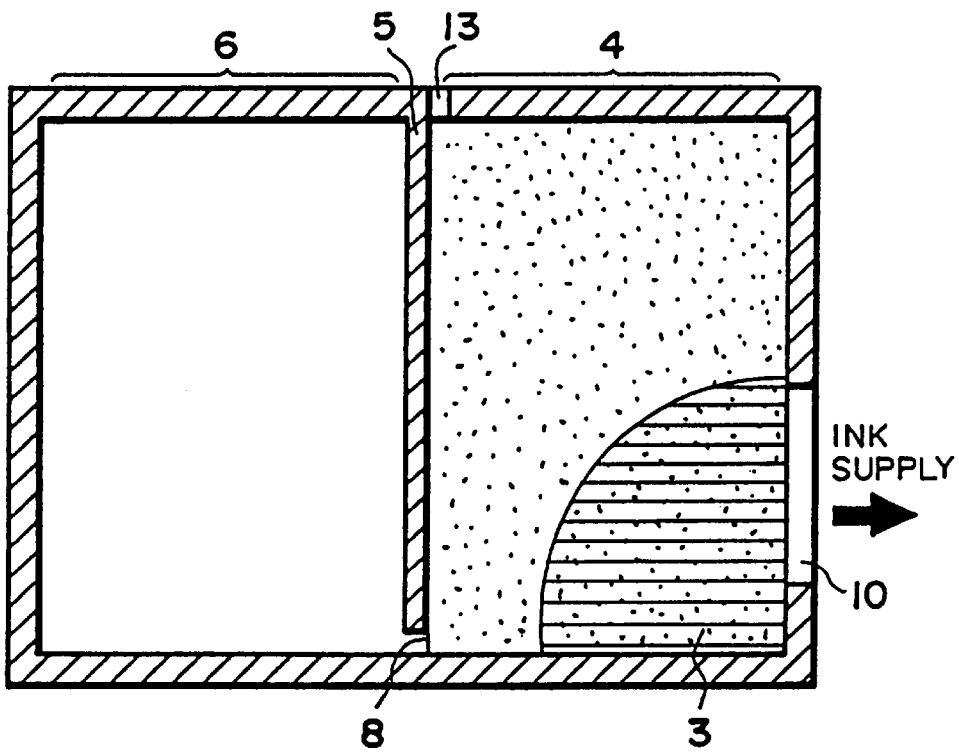
FIG. 17 shows the state in which the ink has been supplied out.
Figure 18:
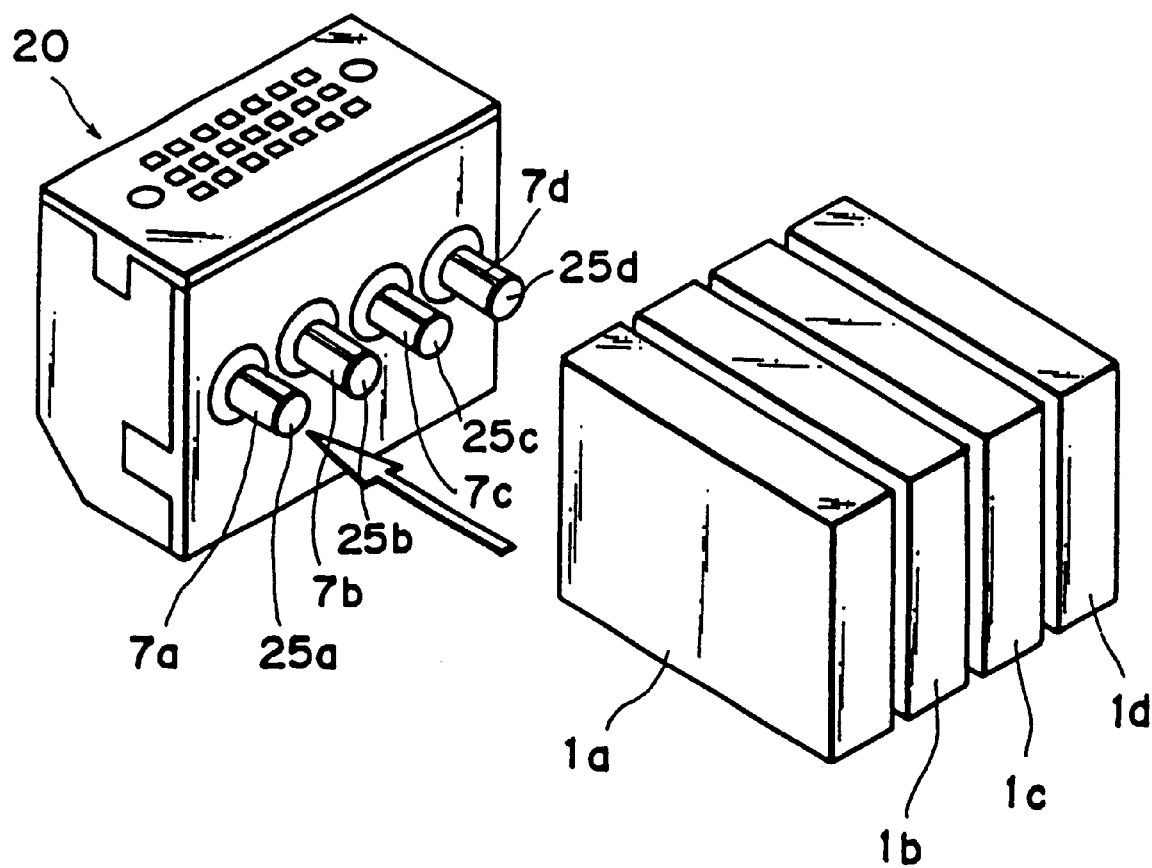
FIG. 18 is a perspective view of a device having four heads integrally, and respective ink containers therefor are mountable.

FIG. 11 shows the change of the internal pressure at the ink supply portion of the ink container according to this embodiment of the present invention in accordance with the amount of the ink supply (consumption amount). At the initial state (FIG. 14), the ink supply starts from the vacuum producing material container, as described hereinbefore. More particularly, the ink contained in the vacuum producing material container until the meniscus is formed in the clearance 8 at the bottom portion of the ink container. Therefore, similarly to the ink container according to the first prior art in which the ink container is filled with the absorbing material, the internal pressure in the ink supply portion is produced due to the balance between the capillary force at the ink top surface (air-liquid interface) of the compressed ink absorbing material in the vacuum producing material container and the static head of the ink itself. When the state is reached in which the air-liquid interface is formed at the bottom portion of the ink container as described in the foregoing due to the reduction of the ink in the vacuum producing material container in accordance with the consumption of the ink (ink supply) (FIG. 15, and FIG. 11, point X), the ink supply from the ink container starts. By the capillary force of the compressed ink absorbing material adjacent the bottom portion of the ink chamber, the internal pressure of the ink supply portion is maintained. As long as the ink is supplied from the ink container, the substantially constant internal pressure is maintained. When the further ink consumption results in the decrease of the ink level in the ink container beyond the ink chamber wall bottom, substantially all of the ink container is consumed (FIG. 16 and FIG. 11, point Y), the air is introduced at once into the ink container with the result of complete communication established between the ink container and the outside air, so that a small amount of the ink remaining in the ink container is absorbed by the compressed ink absorbing material in the vacuum producing material container, and therefore, the amount of the ink contained in the vacuum producing material container increases. This changes the internal pressure of the ink supply portion slightly toward the positive direction by the amount corresponding to the slight rise of the ink top surface (air-liquid interface). When the ink is further consumed, the ink in the vacuum producing material container is consumed. If, however, the air-liquid interface lowers beyond. the ink supply portion, the recording head starts to receive the air, and therefore, the ink supply system reaches the limit (FIG. 17). At this state, the exchange of the ink container is required. The-following has been found by the investigations of the inventors. By carrying out sucking recovery operation by sucking means of the main assembly of the recording apparatus upon the connection with the recording head to remove the air bubbles in the ink passage produced at the time of the connecting operation and to flows a slight amount of ink out of the ink container, it is possible to maintain the stabilized ink internal pressure from the initial stage. In addition, even if the ink is supplied out from the vacuum producing material container at the initial stage and at the stage immediately before the exchange of the ink container, the recording property is not adversely influenced in the ink stabilized supply period shown in FIG. 11, and therefore, the proper recording operation has been carried out. In order to establish ink supply through the above-described mechanism, the following points are considered.

It is desirable that the meniscus is formed stably between the ink and the ambient air at a position very close to the clearance 8. Otherwise, in order to displace the meniscus to the ink container, the ink has to be consumed to such a large extent that a quite high vacuum is produced in the ink supply portion. Then, a high frequency drive of the recording apparatus becomes difficult, and therefore, it is disadvantageous from the standpoint of high speed recording operation.

FIG. 11 shows the change of the internal pressure at the ink supply portion of the ink container in accordance with the ink supply amount (consumption amount). It shows a so-called static pressure Pill in the state of no ink supply and a so-called dynamic pressure $P_{112}$ in the state of ink supply being carried out.

The difference between the dynamic pressure $P_{112}$ and the static pressure $P_{111}$, is the pressure loss $\delta P$ when the ink is supplied. The negative pressure produced at the time of the meniscus displacement is influential.

Accordingly, it is desirable that the break down of the meniscus at this portion occurs without delay. For this purpose, there is provided air introduction passage for forcedly permitting the air introduction adjacent the clearance 8. Embodiments in this respect will be described.

Embodiment 1

FIG. 3 illustrates a first embodiment. The vacuum producing material 3 in the ink container is an ink absorbing material such as foamed urethane material or the like. When the absorbing material is accommodated in the vacuum producing material container 4, it provides a clearance functioning as an air introduction passage A32 at a part of the vacuum producing material container. The clearance extends to the neighborhood of the clearance 8 between the ink container bottom 11 and the end 8 of the rib 5. Thus, the communication with the air is established by the air vent. When the ink supply from the ink supplying portion is started, the ink is consumed from the absorbing material 3, so that the internal pressure of the ink supply portion reaches a predetermined level. Then, the ink surface A31 shown in FIG. 3 is stably formed in the absorbing material 3, and the meniscus is formed between the ink and the ambient air adjacent the clearance 8. The dimensions of the clearance 8 is preferably not more than 1.5 mm in the height, and is preferably long in its longitudinal direction. When this state is established, the break down of the meniscus at the clearance 8 occurs without delay by the subsequent ink consumption. Therefore, the ink can be supplied stably without increasing the pressure loss $\delta P$. Accordingly, the ink ejection is stabilized at high speed printing.

When the recording operation is not carried out, the capillary forces of the vacuum producing material itself (or the meniscus force at the interface between the ink and the vacuum producing material), so that the ink leak from the ink jet recording head can be suppressed.

For the purpose of using the ink container of this invention in a color ink jet recording apparatus, different color inks (black, yellow, magenta and cyan, for example) can be accommodated in separate ink containers. The respective ink cartridges may be unified as an ink container. In another form there are provided an exchangeable ink cartridge for black ink which is most frequently used, and an exchangeable ink cartridge unifying other color ink containers. Other combinations are possible in consideration of ink jet apparatus used therewith.

The present invention will be described in more detail.

In order to control the vacuum in the ink jet recording head when the ink container of this invention is used, the following is preferably optimized: material, configuration and dimensions of the vacuum producing material 3, configuration and dimensions of rib end 8, configuration and dimensions of the clearance 8 between the rib end 8 and the ink container bottom 11, volume ratio between the vacuum producing material container 4 and the ink container 6, configuration and dimensions of the joint member 7 and the insertion degree thereof into the ink container, configuration, dimension and mesh of the filter 12, and the surface tension of the ink.

The material of the vacuum producing member may be any known material if it can retain the ink despite the weight thereof, the weight of the liquid (ink) and small vibration. For example, there are sponge like material made of fibers and porous material having continuous pores. It is preferably in the form of a sponge of polyurethane foamed material which is easy to adjust the vacuum and the ink retaining power. Particularly, in the case of the foamed material, the pore density can be adjusted during the manufacturing thereof. When the foamed material is subjected to thermal compression treatment to adjust the pore density, the decomposition is produced by the heat with the result of changing the nature of the ink with the possible result of adverse influence to the record quality, and therefore, cleaning treatment Is desirable. For the purpose meeting various ink cartridges for various ink jet recording apparatuses, corresponding pore density foamed materials are required. It is desirable that a foamed material not treated by the thermal compression and having a predetermined number of cells (number of pores per 1 inch) is cut-into a desired dimension, and it is squeezed into the vacuum producing material container so as to provide the desired pore density and the capillary force.

Ambient Condition Change in the Ink Jet Recording Apparatus

In the ink cartridge having a closed ink container, the ink can leak out. That is, when the ambient condition (temperature rise or pressure decrease) occurs with the ink cartridge contained in the ink jet recording apparatus, the air in the ink container expands (the ink expands too), to push out the ink contained in the ink container, with the result of ink leakage. In the ink cartridge of this embodiment, the volume of air expansion (including expansion of the ink, although the amount thereof is small) in the closed ink container is estimated for the predicted worst ambient condition, and the corresponding amount of the ink movement from the ink container thereby is allotted to the vacuum producing material container. The position of the air vent is not limited unless it is at an upper position than the opening for the joint in the vacuum producing material container. In order to cause the flow of the ink in the vacuum producing material at the position away from the opening for the joint upon the ambient condition change, it is preferably at a position remote from the joint opening. The number, the configuration, the size and the like of the air vent can be properly determined by the ordinary skilled in the art in consideration of the evaporation of the ink.

Transportation of the Ink Cartridge per se

During the transportation of the ink cartridge per se, the joint opening and/or the air vent is preferably sealed with a sealing member or material to suppress the ink evaporation or the expansion of the ink air in the ink cartridge. The sealing member is preferably a single layer barrier used in the packing field, multi-layer member including it and plastic film, compound barrier material having them and aluminum foil or reinforcing material such as paper or cloth. It is preferable that a bonding layer of the same material or similar material as the ink cartridge main body is used, and it is bonded by heat, thus improving the hermetical sealing property.

In order to suppress the introduction of the air and the evaporation of the ink, it is effective that the ink cartridge is packaged, and then, the air is removed therefrom, and then it is sealed. As for the packing material, it is preferably selected from the above mentioned barrier material in consideration of the air transmissivity and the liquid transmissivity.

By the proper selection as described in the foregoing, the ink leakage can be prevented with high reliability during the transportation of the ink cartridge per se.

Manufacturing Method

The material of the main body of the ink cartridge may be any known material. It is desirable that the material does not influence the ink jet recording ink or that it has been treated for avoiding such influence. It is also preferable that the consideration is paid to the productivity of the ink cartridge. For example, the main body of the ink cartridge is separated into the bottom portion 11 and the upper portion, and they are integrally formed respectively from resin material After the vacuum producing material is squeezed, the bottom portion 11 and the upper portion are bonded, thus producing the ink cartridge. If the resin material is transparent or semi-transparent, the ink in the ink container can be observed externally, and therefore, the timing of the ink cartridge exchange can be discriminated easily. In order to facilitate the bonding of the above-described sealing materials or the like, the provision of a projection as shown in the Figure is preferable. From the outer appearance standpoint, the outer surface of the ink cartridge may be grained.

The ink may be filled through pressurization and pressure reduction. It is preferably to provide an ink supply port in either of the containers since the other openings are not contaminated at the time of the ink filling operation. The ink filling port after the ink filling, is preferably plugged with plastic or metal plug.

The structure and configuration of the ink cartridge can be modified within the spirit of the present invention.

Others

The ink container (cartridge) of the above-described embodiments, may be exchangeable type, or may be unified with the recording head.

When it is exchangeable type, it is preferable that the main assembly can detect the exchange of the container and that the recovery operation such as mucking operation is carried out by the operator.

As shown in FIG. 14, the ink container may be used in an ink Jet printer in which four recording heads are unified into a recording head 20 connectable with four color ink containers BK1a, C1b, M1c, Y1d.

Comparison Example 1

A comparison example will be explained with the change of the internal pressure at the ink supply portion of the ink container in accordance with the ink supply.

There is no air introduction passage in the ink container, and in the vacuum pressure producing material container, an absorbing material having substantially uniform pores size distribution is contained.

At the initial stage, as shown in FIG. 14, the ink is substantially fully contained in the ink container 6, and a certain amount of the ink is contained in the vacuum producing material container 4. When the ink supply starts from this state, the ink is supplied out from the vacuum producing material container 4, and therefore, by the balance between the static head of the ink and the capillary force of the ink top surface (air-liquid interface) of the absorbing material 3 in the vacuum producing material container 4, the internal pressure is produced at the ink supply portion. With the continued ink supply, the ink top surface lowers. Therefore, the negative pressure increases substantially linearly in response to the height thereof into the state shown by a in FIG. 13. The negative pressure in the ink supply portion continues to increase until the air-liquid interface (meniscus) is formed at the clearance at the bottom of the ink chamber by the ink supply.

Until the meniscus-formed state is established at the clearance, the ink surface in the absorbing material lowers to a substantial extent, and the liquid surface may lower beyond the joint portion with the recording head, as the case may be.

If this occurs, the air is introduced into the recording head with the result of instable ejection or ejection failure.

Figure 12:
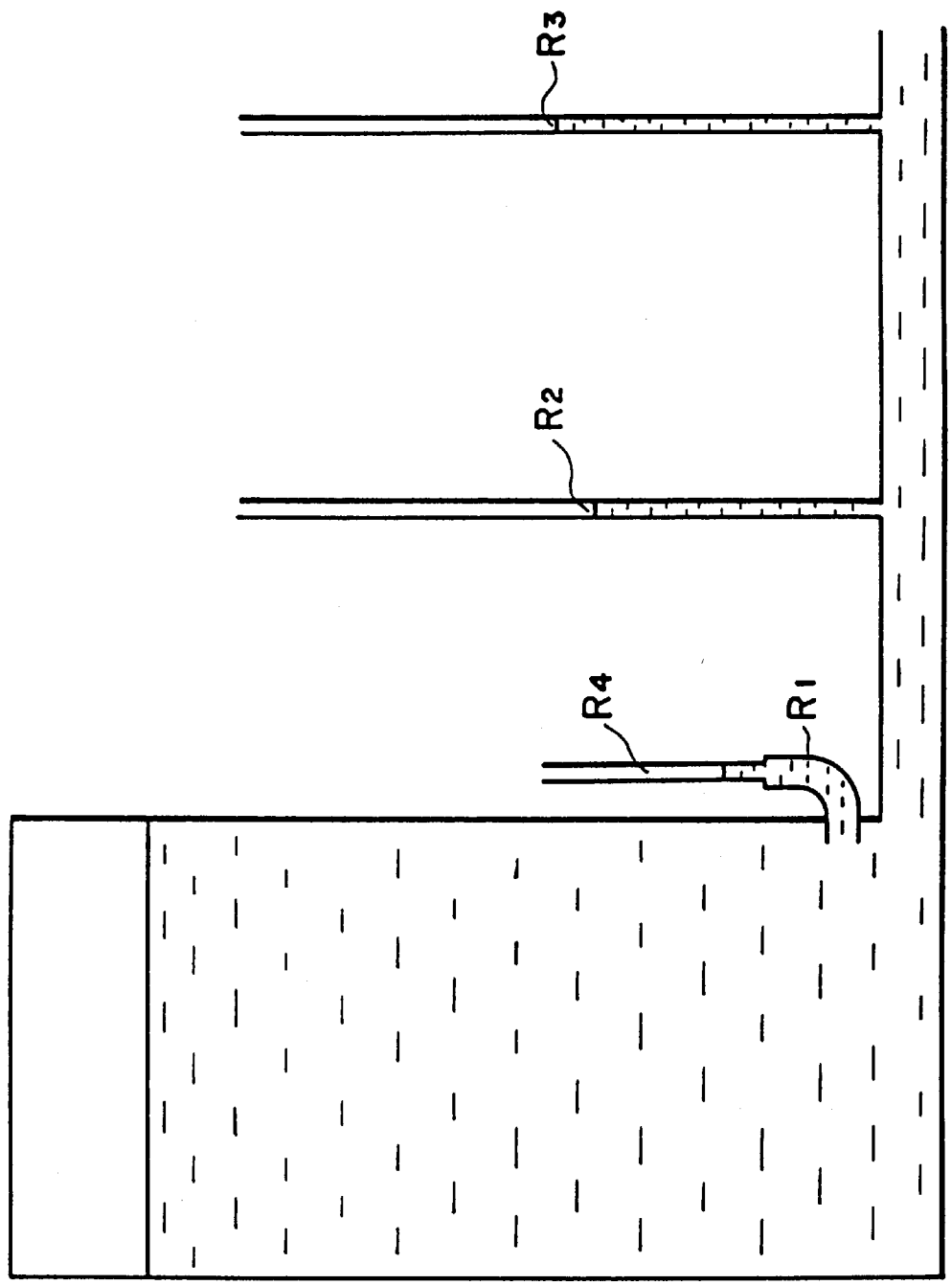
FIG. 12 shows a model of ink supply in a comparison example.
Figure 13:
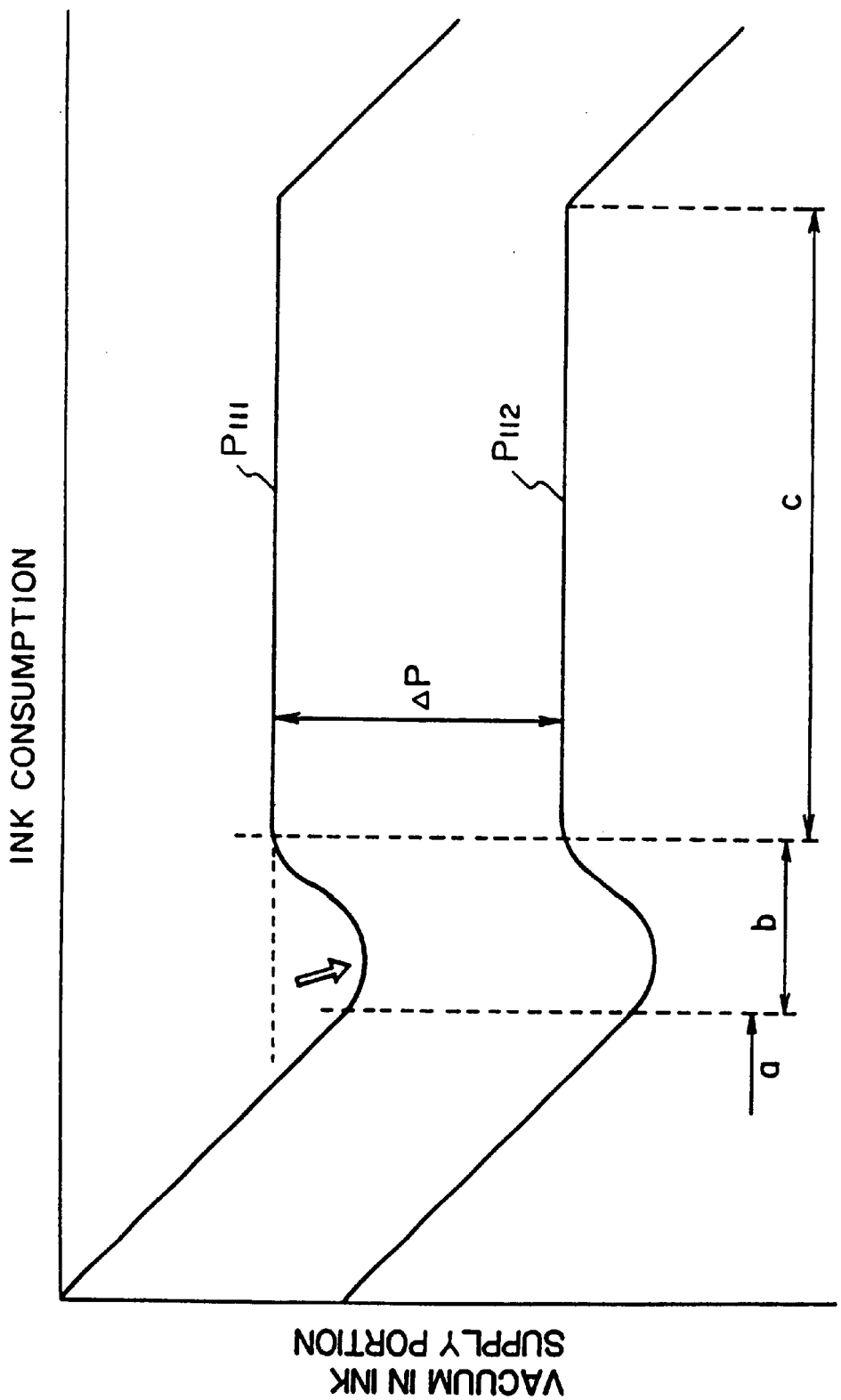
FIG. 13 is a graph showing the internal pressure change at the ink supply portion in the comparison example.

Even if this is not reached, it is possible that the internal pressure at the ink supply portion increases beyond a predetermined negative pressure determined by the pore size of the absorbing material at the clearance, as shown in b in FIG. 13. The reason is considered as follows. The absorbing material is compressed more or less by the internal wall of the vacuum producing material container 4 at the periphery thereof. However, because of the non-existence of the wall at the clearance, it is not compressed with the result that the compression ratio thereat is slightly small as compared with the other portion. Therefore, the situation is as shown in FIG. 12.

In this Figure, the situation is shown in which the ink is consumed from the vacuum producing material container 4 to some extent. If the ink is further supplied from this state, the meniscus R4 which corresponds to the largest pore size among R2, R3 and R4 in the absorbing material 3, is displaced more than the meniscuses at R3 and R4. When the meniscus comes close to the clearance, the meniscus force suddenly decreases with the result that the meniscus moves to the ink container, and the meniscus is broken, by which the air is introduced in the ink container. At this time, a small amount of the ink is consumed from the portions R3 and R4 not only from the portion R2. The pressure loss δP at the time of the meniscus movement is relatively large.

However, the once broken meniscus is reformed by the inertia at the time of the restoring, at the position close to the original position, and therefore, the high pressure loss states continues for a while.

Until the meniscus is stabilized at the portion having the pore size R1, the similar actions are repeated. Once the meniscus is stabilized at the clearance, the air bubbles enter the ink container until the negative pressure determined by the pore size R1 in the clearance is established, so that the stabilization is reached.

The above is shown in FIG. 13, b, in which the ink is consumed both from the ink container and the absorbing material. If the air introduction passage is not particularly provided, the internal pressure at the ink supply portion is not stabilized, and the pressure loss δP at the time of the ink supply is increased, and therefore, the ejection property is deteriorated with the result of difficulty of high speed printing.

Embodiment 2

FIG. 5 shows a device according to another embodiment.

In this embodiment, two ribs 61 is provided on the partition rib 5 of the vacuum producing material container 4. The air introduction passage AS1 is established between the ribs and the absorbing material 3. The bottom end A of the rib 61 is placed above the bottom end B of the rib 5, by which the clearance 8 can be covered by the absorbing material 3 simply by inserting a rectangular parallelopiped absorbing material 3 into the vacuum producing material container 4. Therefore, the air introduction passage A51 can be extended to the position very close to the clearance 8 without difficulty and with stability. Arrow A52 shows the flow of the air.

Using thin ink container, the printing operation is actually carried out, and it has been confirmed that the Ink surface and the meniscus as shown in FIG. 5 can be quickly established by the ink supply due to the recording operation, and the sharp exchange between the air and the ink is carried out by the meniscus break down, and therefore, the ink can be supplied with small pressure loss, and therefore, the high speed printing operation can be carried out with stability.

Embodiment 3

FIG. 6 shows the device of the third embodiment in which the number of ribs 71 is increased, thus increasing the number of air introduction passages. The ribs 71 are provided on the sealing of the vacuum producing material container. According to this embodiment, the plurality of air introduction passages A61 can be provided with stability from the air vent 13 to the neighborhood of the clearance 8, and therefore, the ink supply can be carried out with small pressure loss, as in the first and second embodiments, and therefore, a high speed printing operation can be carried out with stability.

In this embodiment, even if the air vent 13 is disposed at a position remote from the clearance 8, the air can be introduced smoothly.

Embodiment 4

FIG. 7 shows a device according to a fourth embodiment of the present invention.

In this embodiment, similarly to the embodiments 2 and 3, ribs 81 are provided on the partition rib to provide the air introduction passage A71. The ribs 81 are asymmetrical about the rib 5, by which the passage for the ink flow from the ink container 6 through the clearance-8 into the vacuum producing material container 4, and the passage of the air flow A73, corresponding to this ink flow A72, along the air introduction passage A71, through the clearance 8 into the ink container 6, can be made independent relative to the center line A, by which, the pressure loss by the exchange can be reduced.

More particularly, this structure is effective to reduce the pressure loss δP required for the exchange between the ink and the air to approx. one half.

Thus, the ink can be stably ejected from the recording head.

Embodiment 5

Figure 8C:
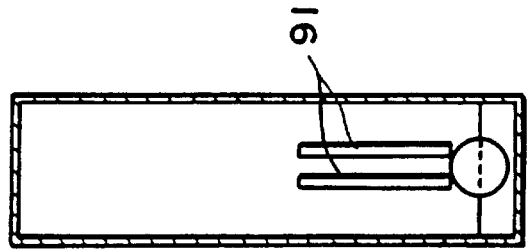
FIGS. 8A to 8C illustrate an ink container according to a further embodiment of the present invention.
Figure 8B:
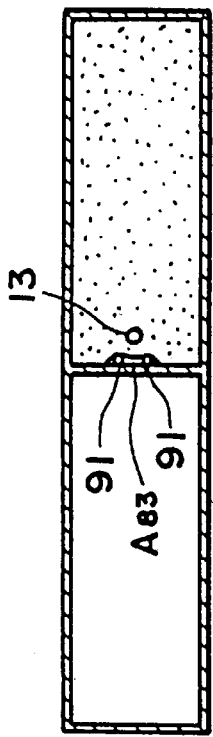
Figure 8A:
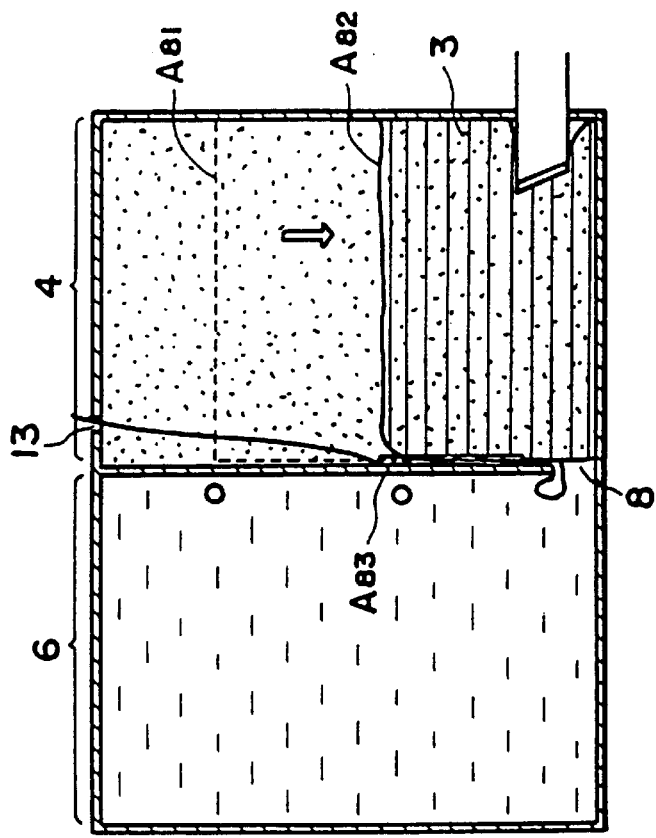

FIG. 8 shows a device according to a further embodiment. The device is provided with ribs 91. In the embodiments 2–4, the top end of the ribs 91 are extended to the upper part of the internal surface of the wall of the vacuum producing material accommodator 4; However, in this embodiment, they are not extended to such extent. By doing so, the top part of the absorbing material is not compressed by the ribs 91, no that the production of the meniscus force at the compressed portion can be avoided, thus further stabilizing the vacuum control.

More particularly, the ink is consumed from the absorbing material 3 until the ink surface A81 in the absorbing material 3 (vacuum producing material (3) moves to the stabilized ink surface A82 in the initial ink container from which the ink is consumed. That is, if the air-liquid exchange through the air introduction passage air 82 is promoted too soon, the consumption of the ink from the absorbing material 3 becomes low as a result that the ink is consumed from the ink container. Therefore, the amount of the ink capable of moving to the vacuum producing material container 4 from the ink container 6 at the time of the ambient condition change such as pressure change, is limited. Therefore, the buffering effect of the absorbing material 3 against the ink leakage can be deteriorated. Therefore, in this embodiment, the air introduction passage A83 is provided so that the air is introduced only after the ink is consumed from the absorbing material 3 to a certain extent, by which the ink surface in the absorbing material 3 is controlled, thus increasing the buffering effect against the ink leakage.

Embodiment 6

Figure 9C:
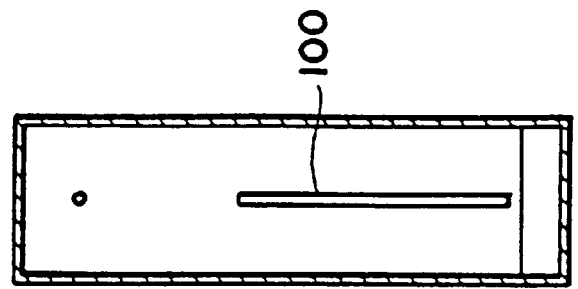
FIGS. 9A to 9C illustrate an ink container according to a further embodiment of the present invention.
Figure 9B:
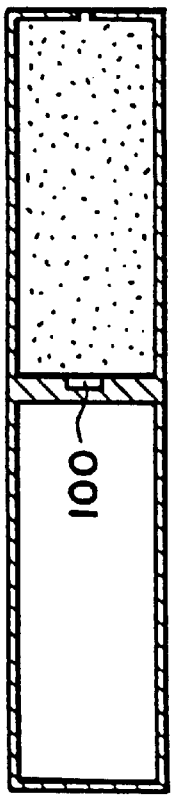
Figure 9A:
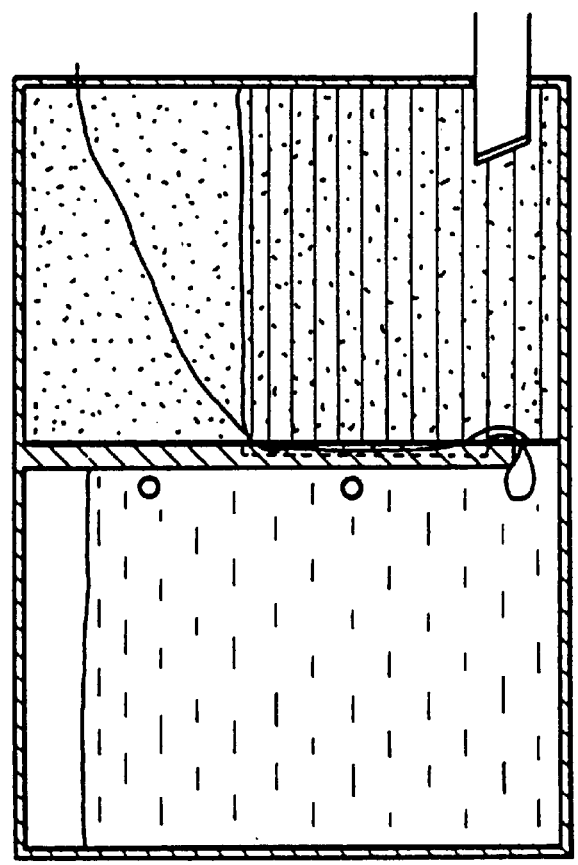

FIG. 9 shows another embodiment.

In this embodiment, the air introduction passage is provided by forming a groove 100 in the partition rib or wall.

According to this embodiment, the irregularity of the compression ratio of the absorbing material contained in the vacuum producing material container is reduced, and therefore, the vacuum control is easy, so that the ink can be supplied stably.

Embodiment 7

FIG. 20 shows a further embodiment.

The structure is similar to that of FIG. 6 embodiment. However, it is different therefrom in that the air introduction passage extends to the bottom end of the rib.

Similarly to Embodiments 5 and 6, the ink is consumed from the absorbing material 3 until the ink surface in the absorbing material 3 in the ink container at the initial stage of the ink consumption displaces to the stabilized ink surface position at an end C of the air introduction passage A201. Thereafter, the ink in the ink container 6 is consumed, while the air-liquid exchange is carried out through the air introduction passage. Since the air introduction passage extends to the bottom end of the ribs, the structure is equivalent to the model shown in FIG. 21. The description will be made as to the model of FIG. 21 in detail.

The absorbing material 3 is considered as capillary tubes shown in FIG. 20. The air introduction passage A201 continues from the portion C to the bottom end of the ribs, and it is considered that the air introduction passage A201 is connected again to the capillary tube at the portion above the portion C.

As described hereinbefore, the ink surface in the absorbing material 3 is at a certain level at the initial stage of the ink consumption. However, in accordance with the consumption of the ink, the surface lowers gradually. In accordance with it, the internal pressure in the ink supply portion (negative pressure) increases gradually.

When the ink is consumed to the level C at the top end of the air introduction passage A201, the meniscus is formed at a position D in the capillary tube. When the ink is further received and consumed, the ink meniscus, that is, the ink surface lowers, again. If the position E is reached, the meniscus force of the ink surface in the air introduction passage suddenly reduces, so that the ink can be consumed at once in the air introduction passage. Thereafter, the ink is consumed from the ink container, with this position maintained. That is, the air-liquid exchange is carried out. In this manner, during the ink consumption, the ink surface is stabilized at a position slightly lower than the height C, and therefore, the internal pressure in the ink supply portion is stabilized. When the ink supply stops, the meniscus in the capillary tube returns from position E to the position D, thus providing the stabilization.

As described in the foregoing, the ink surface in the absorbing material reciprocates between the positions D and E until all of the ink is used up in the ink container. In the Figure, A202 indicates ink supply period, and A203 indicates non-ink-supply period.

Thereafter, the ink is consumed from the ink absorbing material, and therefore, the internal pressure (vacuum) in the supply portion increases, and the ink becomes non-suppliable.

The internal pressure at the ink supply portion is provided as a difference between the capillary force of the absorbing material 3 (the height to which the absorbing material 3 can suck the ink up) and the ink surface level height in the absorbing material 3, and therefore, the height C is set at a predetermined level relative to the ink supply portion 6. From this standpoint, it is desirable that the pore size of the absorbing material 3 is relatively small.

The reason why the height C is set at a predetermined level relative to the ink supply portion 6 is that if the ink surface is lower than the supplying portion 6, the air is introduced with the result of improper ink ejection.

However, it is not desirable that the height is larger than the predetermined, because the buffering effect at the time when the ink is overflowed from the ink container to the absorbing material due to the internal pressure change in the ink container attributable to the ambient condition change, is reduced. In consideration of the above, the volume of the absorbing material above the height C is selected to the substantially one half the volume of the ink container.

The above-described mechanism will be explained in further detail.

It is assumed that the absorbing material has a uniform density. The internal pressure in the ink supply portion (vacuum or negative pressure) is determined as a difference $H1-H2$ between a height $H1$ to which the capillary force of the absorbing material can suck the ink up from the ink supply portion level and the height $H2$ to which the ink has already been sucked up from the height of the ink supply portion.

For example, the ink sucking force of the absorbing material is 60 mm ($H1$), and that the height of the air introduction passage A from the ink containing portion is 15 mm ($H2$), the internal pressure of the ink supply portion is 45 mmaq=60 mm−15 mm=$H1-H2$.

At the initial stage, in accordance with the consumption of the ink from the absorbing material, the height of the liquid surface lowers correspondingly, and the internal pressure lowers 5 substantially linearly.

When the ink container of the above-described structure is used, the ink can be supplied stably by the vacuum.

The structure itself of the ink container is so simple that it can be easily manufactured using mold or the like, and therefore, a large number of ink containers can be formed stably.

When the ink is consumed to such an extent that the surface level of the liquid in the absorbing material is at the air introduction passage A201, that is, C position, in other words, the ink surface is at E, the meniscus in the air introduction passage A201 can not be maintained, and therefore, the ink is absorbed into the absorbing material, and the air introduction passage is formed. Then, the air-liquid exchange occurs at once. On the other hand, the liquid surface in the absorbing material increases because of the ink absorbed from the ink container, by which the liquid surface D is established, and the air-liquid exchange stops. With this state, there is no ink in the air introduction passage A201, and the absorbing material above the air introduction passage in the model, functions simply as a valve.

If the ink is consumed again with this state, the liquid surface in the absorbing material lowers slightly, which corresponds to opening of the valve, so that the air-liquid exchange occurs at once to permit the consumption of the ink from the ink container 6. Upon completion of the ink consumption, the liquid surface of the absorbing material increases by the capillary force of the absorbing material. When it reaches to the position D, the air-liquid exchange stops, so that the liquid surface is stabilized at the position.

In this manner, the ink liquid surface can be stably controlled by the height of the air introduction passage A201, that is, the height of the portion C, and the capillary force of the absorbing material, that is, the ink sucking height, is adjusted beforehand, by which the internal pressure of the ink supply portion can be controlled easily.

In order to retain the ink overflowed from the ink container 6 to the absorbing material 4 due to the internal pressure change in the ink container due to the ambient condition change, the capillary force of the absorbing material, that is, the ink sucking height is increased, by which the overflow of the ink from the ink container can be prevented, and the occurrence of positive pressure at the ink supply portion can be prevented.

Embodiment 8

Figure 21:
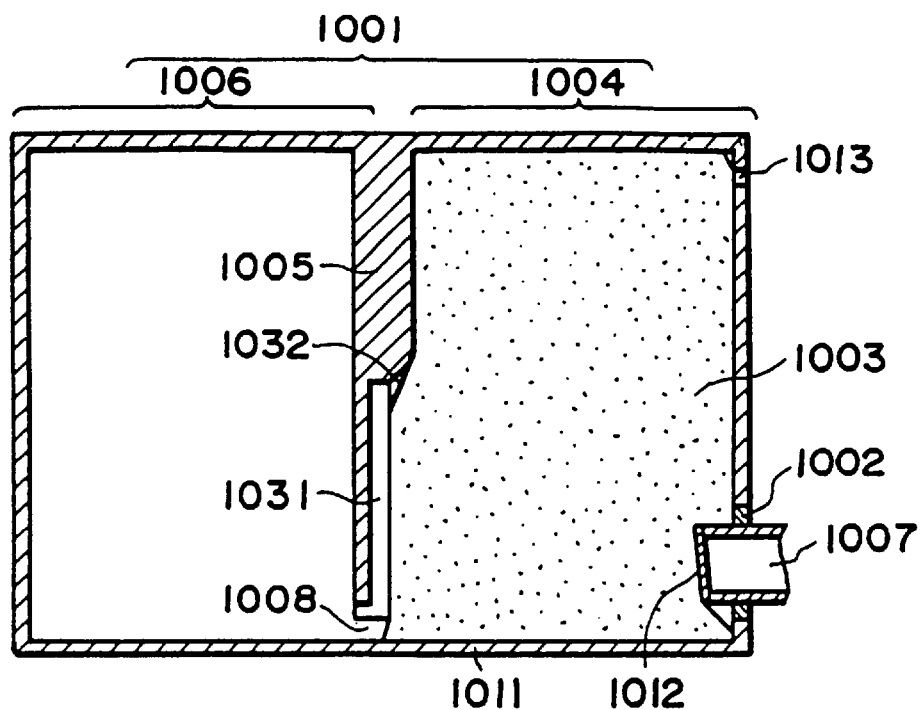
FIG. 21 is a longitudinal sectional view of an ink cartridge main body for an ink jet recording, according to a further embodiment of the present invention.
Figure 22:
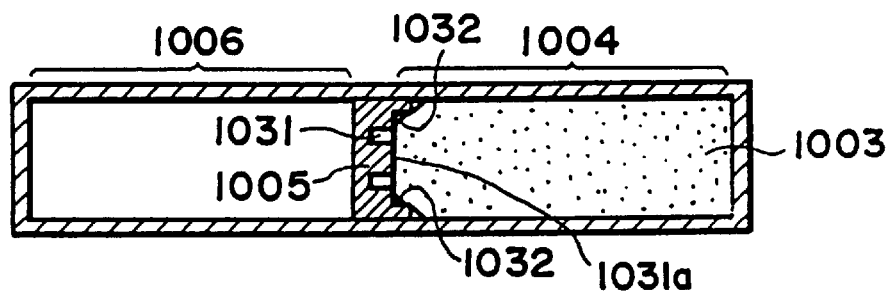
FIG. 22 is a cross-sectional view of an ink cartridge main body for the ink jet recording apparatus of FIG. 21.
Figure 23:
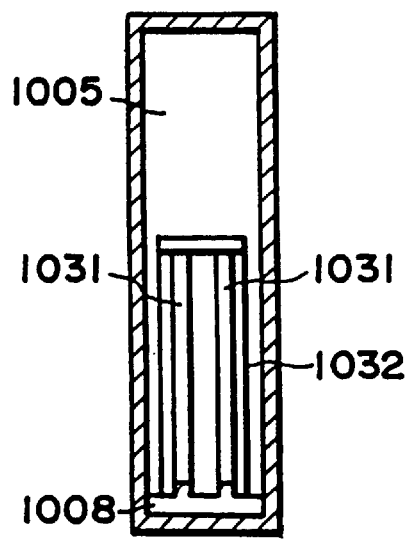
FIG. 23 is a sectional view of an ink cartridge main body, particularly showing the surface of the rib of FIG. 21.
Figure 26:
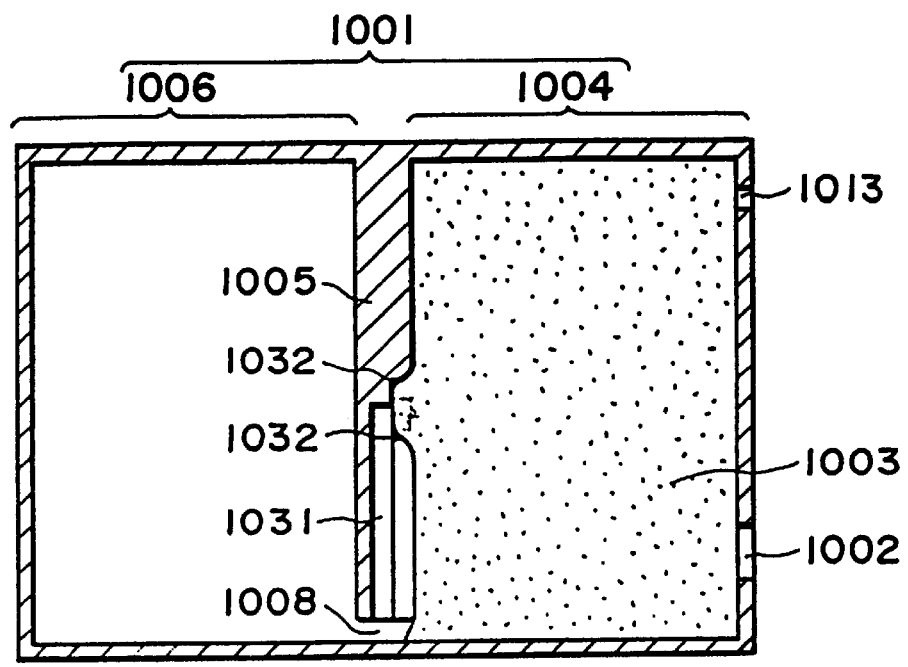
FIG. 26 is a longitudinal sectional view of an ink cartridge main body of an exchangeable ink jet recording according to a further embodiment of the present invention.
Figure 27:
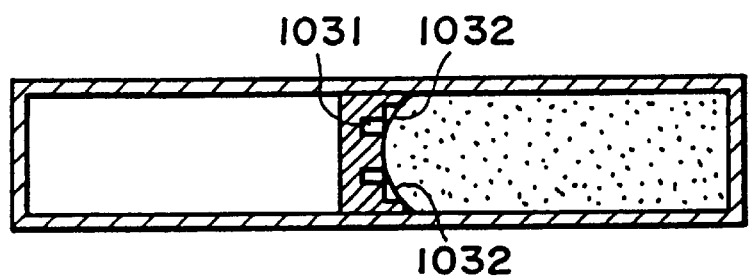
FIG. 27 is a cross-sectional view of an ink cartridge main body for the exchangeable ink jet recording, according to a further embodiment of the present invention.
Figure 28:
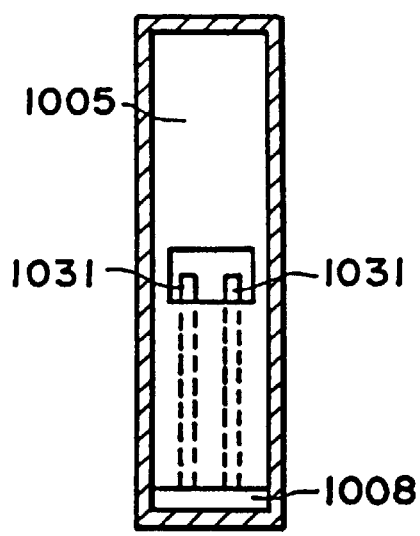
FIG. 28 is a sectional view of an ink cartridge main body, showing the surface of the rib according to a further embodiment of the present invention.

FIG. 21 is a longitudinal sectional view of an ink cartridge for an ink jet recording apparatus 5 according to an eighth embodiment of the present invention. FIG. 22 is a cross-sectional view of the same, and FIG. 23 is a sectional view showing a surface of the rib.

An air introduction groove 1031 and a vacuum producing material adjusting chamber 1032 are formed on a rib 1005 which is a partition wall between the ink container 1006 and the vacuum producing material container 1004. The air introduction groove 1031 is formed at the vacuum producing material container 1004$i$ and is extended from the central portion of the rib 1005 to an end of the rib 1005, that is, to the clearance 1008 formed with the bottom 1011 of the ink cartridge. Between the vacuum producing material 1003 contacted to the neighborhood of the air introduction passage 1031 of the rib 1005, the vacuum producing material adjusting chambers 1032 are formed, and are in an excavated form.

Since the vacuum producing material 1003 is contacted to the inside surface of the material container 1004, and therefore, even if the vacuum producing material 1003 is non-uniformly squeezed into the material container 1004, the contact pressure (compression) to the vacuum producing material 1003 is partially eased, as shown in FIGS. 21 and 22. Therefore, when the ink consumption from the head is started, the ink contained in the vacuum producing material 1003 is consumed, and reaches to the adjusting chamber 1032. If the ink is continued to the consumed, the air can easily break the ink meniscus at the portion where the contact pressure of the vacuum producing material 1003 is eased by the adjusting chambers 1032, and therefore, the air is quickly introduced into the air introduction passage 1031, thus making the vacuum control easier.

In this embodiment, it is desirable to use an elastic porous material as the vacuum producing material 1003.

When the recording operation is not carried out, the capillary force of the vacuum producing material 1003 itself (the meniscus force at the interface between the ink and the vacuum producing material), can be used to prevent the leakage of the ink from the ink jet recording head.

Figure 29:
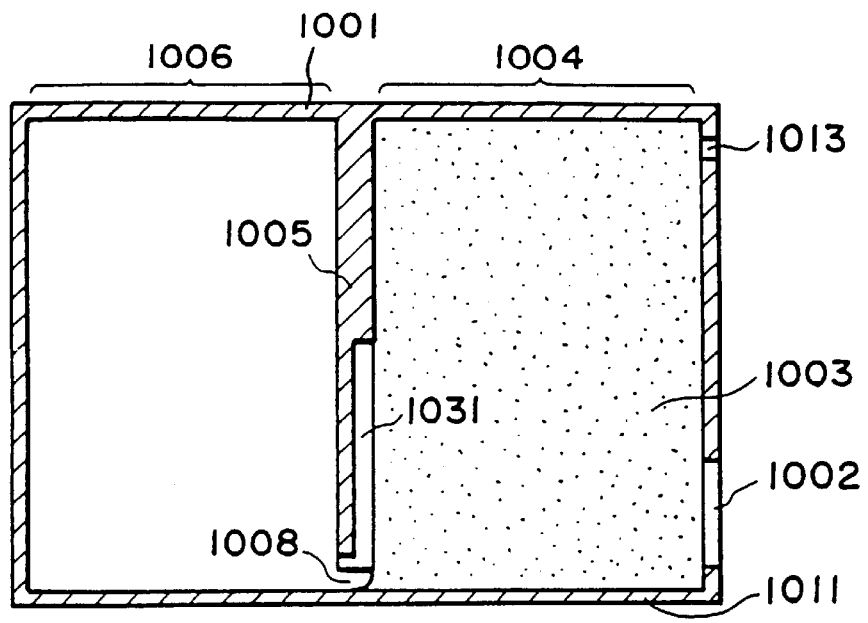
FIG. 29 is a longitudinal sectional view of an ink cartridge main body for the ink jet recording in a comparison example.
Figure 30:
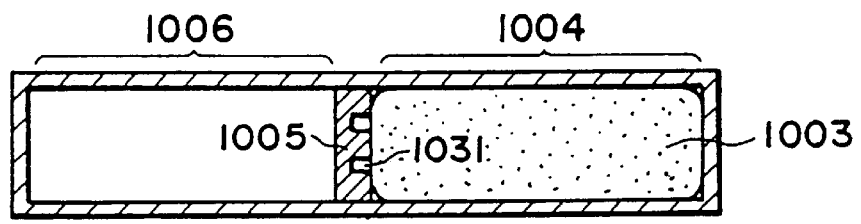
FIG. 30 is a sectional view of an ink cartridge main body for the ink jet recording in the comparison example.
Figures 31, 32:
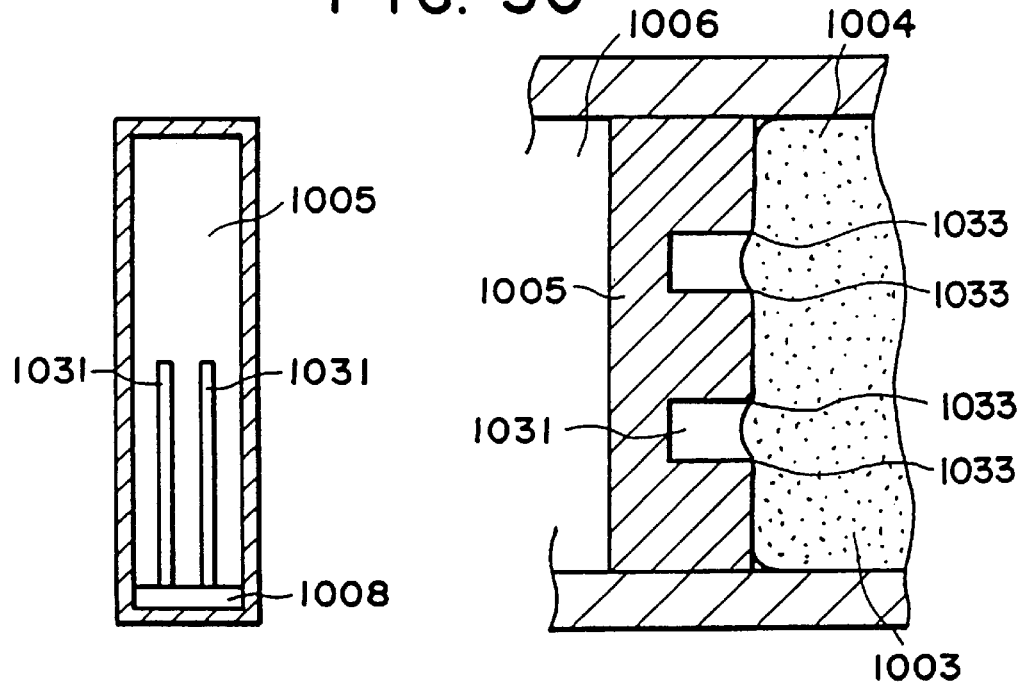
FIG. 31 is a sectional view of the ink cartridge main body showing the surface of the rib in a comparison example.
FIG. 32 is an enlarged sectional view, showing the cross-section of the rib in the comparison example.

FIGS. 29–31 show an example of an ink cartridge without the vacuum producing material adjusting chamber, as a Comparison Example.

Even in the ink cartridge of the Comparison Example, the proper operation can be carried out without problem through the mechanism described in the foregoing, in the usual state. The stabilized operation is accomplished because of the provision of the air introduction passage.

However, in order to even further stabilize the operation, or in order to permit use of porous resin material having continuous pores as the negative pressure producing material, the further stabilization control is desirable.

As shown in FIG. 32 which is an enlarged sectional view, the vacuum or negative pressure producing material 1003 contacts the rib 1005, and partly enters the air introduction groove 1031. If this occurs, the contact pressure (compression force) to the material 1003 is not eased at the contact portions A. This makes it more difficult that the air breaks the ink meniscus and enters the air introduction passage 1031. If this occurs, the air-liquid exchange does not occur even if the ink continues to be consumed, and the effect of the air introduction passage 1031 in not accomplished. There is a liability that the ink becomes non-suppliable from the ink absorbing material 1006.

As contrasted to the Comparison Example 2, as described in the foregoing, this embodiment is advantageous against thin problem.

Embodiment 9

FIG. 24 is a longitudinal sectional view of two ribs 1005 having different cross-sectional section. FIG. 25 is an enlarged cross-sectional view of a rib.

As shown in the Figure, the configuration of the vacuum producing material adjusting chamber 1032 and the air introduction groove 1031, are different from that in Embodiment 8.

More particularly, the stepped portion of the rib 1005 contacted to the vacuum producing material 1003 is rounded to further enhance the effect of easing the press-contact and compression.

In the neighborhood of the rib 1005 adjacent the material container 1004 having the rounded surface R, the air is introduced into the ink in the material 1003, the thus introduced air moves into the ink container 1006. With the movement of the air, the ink in the ink container 1006 is supplied into the material container 1004. In an air-liquid exchanging region, the air is introduced into the ink contained in the material 1003.

In order to carry out the air-liquid exchange more smoothly, it is desirable that the contact pressure between the material 1003 and the material container at a lower portion of the air-liquid exchanging region than in the upper part of the air-liquid exchanging region.

This is because the air can move more smoothly from the gas phase to an ink phase through the capillary tube of the vacuum pressure producing material 1003 whose contacting force is eased.

For example, the desired effect can be provided by formation of a partial vacuum producing material adjusting chamber at the central portion of the rib 1005 at the end portion of the air introduction group.

In order to provide the equivalent function to the vacuum producing material adjusting chamber 1032 of this embodiment, the configuration of the vacuum producing material 1003 may be changed. The configuration and the dimensions are not limited if the above-described requirements are satisfied.

As described in the foregoing, according to this embodiment, the air and the ink in the ink container are stably and smoothly exchanged upon the ink supply operation, and as a result, the internal pressure in the ink supply portion can be stably controlled. This enables the recording head to effect stabilized ink ejection at high speed.

In addition, the ink container is substantially free from the ink leakage even if the internal pressure of the ink container changes due to ambient condition change or the like.

Embodiment 10

The ink container 2001 of this embodiment is a hybrid type in which the inside thereof is partitioned into two ink chambers a and b, which communicate with each other at a bottom portion, and wherein an ink absorbing material 2002 having adjusted capillary force is packed in the ink container a substantially without clearance, and there is provided an air vent 2003.

In the state shown in FIG. 15, the suppliable ink has been supplied from the ink chamber 4 and one half of the ink in the ink chamber 6 have been consumed from the initial state where the ink chambers 4 and 6 are sufficiently filled. In FIG. 15, the ink in the compressed ink absorbing material 3 is maintained at a height with which the static head from the ink ejection part of the recording head, the vacuum in the ink chamber 6 and the capillary force of the compressed ink absorbing material. When the ink is supplied from the ink supplying portion, the amount of the ink in the ink chamber 4 does not reduce, but the ink is consumed from the ink chamber b. That is, the ink distribution in the ink chamber 4 does not change, and the ink is supplied from the ink chamber 6 into the ink chamber 4 corresponding to the ink consumption with the balanced internal pressure maintained. Correspondingly, the air is introduced through the ink chanter 4 and through the air vent.

At this time, as shown in FIG. 15, the ink and the air are exchanged at the bottom of the ink chamber, and the meniscus formed in the compressed ink absorbing material in the ink chamber 4, is partly blocked from the portion close to the ink chamber 6, and the pressure of the ink chamber 6 is balanced with the meniscus retaining force of the compressed ink absorbing material, by the introduction of the air into the ink chamber 6. Referring to FIG. 2, the ink supply and the production of the ink internal pressure in the hybrid type, will be described in more detail. The compressed ink absorbing material adjacent the ink chamber wall is in communication with the air venting portion when the ink in the ink chamber 4 has been consumed to a predetermined extent, and therefore, a meniscus is formed against the atmospheric pressure. The ink internal pressure at the ink supply portion is maintained by the compressed ink absorbing material adjacent to the ink chamber wall which is adjusted to the predetermined capillary force by proper compression. A closed space at the top of the ink chamber 6 before the flow out of the ink, is balanced with the capillary force of the compressed ink absorbing material adjacent to the ink chamber wall and the static head of the ink remaining in the ink chamber b, and the meniscus of the compressed ink absorbing material is maintained by the reduced pressure. When the ink is supplied to the recording head through the ink supply portion in this state, the ink flows out of the ink chamber 6, and the pressure of the ink chamber 6 is further reduced corresponding to the consumption of the ink. At this time, the meniscus formed in the compressed ink absorbing material at the bottom of the ink chamber wall is partly broken, by which the air is introduced into the ink chamber from which the ink is being consumed, so that the pressure of the excessively pressure-reduced ink chamber 6 is balanced with the meniscus retaining force of the compressed ink absorbing material and the static head of the ink itself in the ink chamber b. In this manner, the internal pressure of the ink supply portion is maintained at a predetermined level by the capillary force of the compressed ink absorbing material at the position adjacent to the bottom end of the ink chamber wall.

Figure 34:
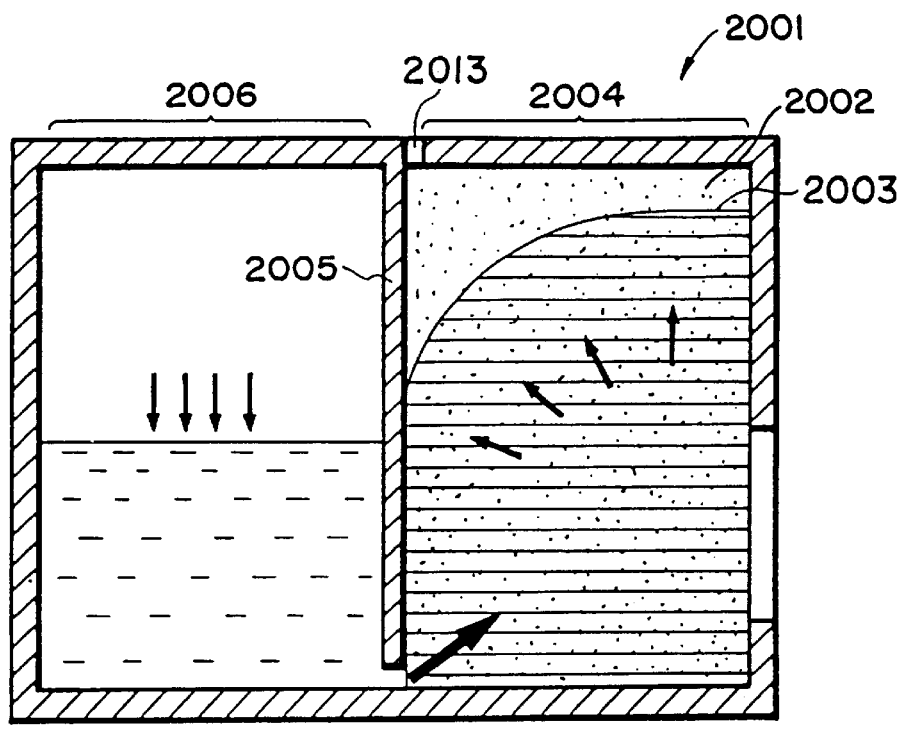
FIG. 34 illustrates leakage ink buffer function of the compressed ink absorbing material in an ink chamber.
Figure 65:
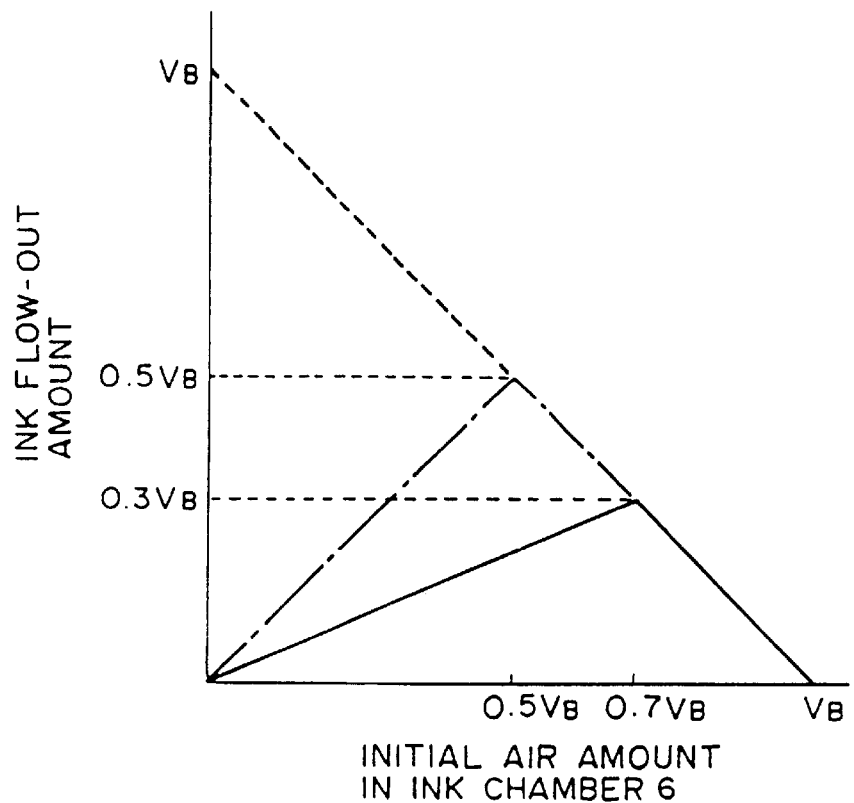
FIG. 65 shows the ink flowing amount upon the pressure decrease.

FIG. 34 illustrates function of the compressed absorbing material as the buffering material. It shows the state in which the ink in the ink chamber 2006 has been flowed out into the ink chamber 2004 due to the expansion of the air in the ink chamber 2006 due to the temperature rise or the atmospheric pressure reduction or the like, from the state shown in FIG. 15. In this embodiment, the ink flowed into the ink chamber 2004 is retained in the compressed absorbing material 2003. The relationship between the ink absorbing quantity of the compressed ink absorbing material and the ink chamber is determined from the standpoint of preventing the ink leakage when the ambient pressure or the temperature changes. The maximum ink absorbing quantity of the ink chamber 2004 is determined in consideration of the quantity of the ink flowed out from the ink chamber 2006 in the predictable worst condition, and the ink quantity retained in the ink chamber 2004 at the time of ink supply from the ink chamber 2006. The ink chamber 2004 has the volume capable of accommodating at least such an ink quantity by the compressed absorbing material. FIG. 65 shows a graph in which a solid line shows a relationship between the initial space volume of the ink chamber 2006 before the pressure reduction and the quantity of flowed ink when the pressure is reduced to 0.7 atm. In the graph, the chain line shows the case in which the maximum pressure reduction is 0.5 atm. As for the estimation of the quantity of the ink flowed out of the ink chamber 2006 under the worst condition, the quantity of the ink flow from the ink chamber 206 is maximum with the condition of the maximum reduced pressure is 0.7 atm, when 30% of the volume VB of the ink chamber 2006 remains in the ink chamber 2006. If the ink below the bottom end of the ink chamber wall in also absorbed by the compressed absorbing material in the ink chamber 2004, it is considered that all of the ink remaining in the ink chamber 2006 (30% of VB) is leaked out. When the worst condition is 0.5 atm, 50% of the volume of the ink chamber 2006 is flowed out. The air in the ink chamber 2006 expanding by the pressure reduction is larger if the remaining amount of the ink is smaller. Therefore, a larger ink is pushed out. However, the maximum amount of the flowed ink is lower than the quantity of the ink contained in the ink chamber 2006. Therefore, when 0.7 atm is assumed, when the amount of the remaining ink becomes not more than 30%, the remaining amount of the ink becomes lower than the expanded volume of the air, so that the amount of ink flowed into the ink chamber 2004 reduces. Therefore, 30% of the volume of the ink chamber 2006 is the maximum leaked ink quantity (50% at 0.5 atm). The same applies to the case of the temperature change. However, even if the temperature increases by 50° C., the amount of the flowed out ink is smaller than the above-described pressure reduction case.

If, on the contrary, the atmospheric pressure increases, the difference between the air of the low pressure because of the ink static head in the upper portion of the ink chamber 2006 and the increased ambient pressure, in too large, and therefore, there is a tendency of returning to the predetermined pressure difference by introduction of ink or air into the ink chamber 2006. In such a case, similarly to the case of ink supply from the ink chamber 2006, the meniscus of the compressed ink absorbing material 2003 adjacent the bottom end portion of the ink chamber wall 2005, is broken, and therefore, the air is mainly introduced into the ink chamber 2006 into the pressure balance state, and therefore, the internal pressure of the ink supply portion hardly changes without substantial influence to the recording property. In the foregoing example, when the ambient pressure returns to the original state, the amount of the ink corresponding to the introduced air into the ink chamber 2006 flows from the ink chamber 2006 into the ink chamber 2004, and therefore, similarly to the foregoing embodiment, the amount of the ink in the ink chamber 2004 temporarily increases with the result of rise of the air-liquid interface. Therefore, similarly to the initial state, the ink internal pressure is temporarily slightly positive than that at the stabilized state, however, the influence to the ink ejection property of the recording head is so small that there is no practical problem. The above-described problem arises when, for example, the recording apparatus used under the low pressure condition such as a high attitude location is moved to a low attitude location of the normal atmospheric pressure. Even in that case, what occurs is only the introduction of the air into the ink chamber 2006. When it is used after moved to the high attitude location again, what occurs is only the slight increase of the ink internal pressure in the ink supplying portion. Since the use of the apparatus under the condition of extremely high pressure over the normal atmospheric pressure is not feasible, and therefore, there is no practical problem.

The ink is assuredly retained in the ink chamber 2004 by the compressed ink absorbing material 2003 in the ink chamber 2004 from the start of the use of the ink container to immediately before the exchange thereof. Since the ink chamber 2006 is closed, there is no ink leakage from the opening (air vent and the ink supply portion) and it permits the easy handling.

The description will be made as to the desirable conditions about the compressed ink absorbing material and the ink chamber structure in the hybrid type ink container.

The relationship between the ink absorbing quantity of the compressed ink absorbing material 2003 and the ink chamber is determined from the standpoint of preventing the ink leakage when the ambient pressure or the temperature changes. The maximum ink absorbing quantity of the ink chamber 2004 is determined in consideration of the quantity of the ink flowed out from the ink chamber 2006 in the predictable worst condition, and the ink quantity retained in the ink chamber 2004 at the time of ink supply from the ink chamber 2006. The ink chamber 2004 has the volume capable of accommodating at least such an ink quantity by the compressed absorbing material. As for the estimation of the quantity of the ink flowed out of the ink chamber under the worst condition, the quantity of the ink flow from the ink chamber 206 is maximum with the condition of the maximum reduced pressure is 0.7 ate, when 30% of the volume VB of the ink chamber 2006 remains in the ink chamber 2006. If the ink below the bottom end of the ink chamber wall is also absorbed by the compressed absorbing material in the ink chamber 2004, it is considered that all of the ink remaining in the ink chamber 2006 (30% of VB) is leaked out. When the worst condition is 0.5 atm, 50% of the volume of the ink chamber 2006 is flowed out. The air in the ink chamber 2006 expanding by the pressure reduction is larger if the remaining amount of the ink is smaller. Therefore, a larger ink is pushed out. However, the maximum amount of the flowed ink is lower than the quantity of the ink contained in the ink chamber 2006. Therefore, when 0.7 atm is assumed, when the amount of the remaining ink becomes not more than 30%, the remaining amount of the ink becomes lower than the expanded volume of the air, so that the amount of ink flowed into the ink chamber 2004 reduces. Therefore, 10% of the volume of the ink chamber 2006 is the maximum leaked ink quantity (50% at 0.5 atm). As for the size of the communicating part between the ink chambers formed at the bottom portion of the ink chamber wall 2005 is not less than a size incapable of formation, at the communication part, of the ink in the ink chamber 2006 which is closed at the top, as the first condition. The size is selected such that in response to the maximum ink supply speed from the ink supplying portion (ink supply speed at the time of solid black printing or the sucking operation by the main assembly of the recording apparatus), smooth air-liquid exchange is carried out through the communication opening in consideration of the nature of the ink such as viscosity. However, the consideration should be paid to the fact that when the top surface of the ink remaining in the ink chamber 2006 becomes lower than the bottom portion of the ink chamber wall 2005, as described hereinbefore, the internal pressure at the ink supply portion changes temporarily to the positive direction, and therefore, the size is selected to avoid the influence of this event to the ink ejection property of the recording head.

As described in the description of the operation of the ink container, in the hybrid type ink container, the ink internal pressure at the ink supply portion is retained by the compressed ink absorbing material 2003 adjacent the ink chamber wall, and therefore, in order to maintain the desired internal pressure at the time of the ink supply from the ink chamber 2006, the capillary force of the compressed ink absorbing material 2003 adjacent the bottom end portion of the ink chamber 2005 is desirably adjusted. More particularly, the compression ratio or the initial pore size is selected such that the capillary force of the compressed ink absorbing material 2003 adjacent the bottom end of the ink chamber wall 2005 is capable of producing the ink internal pressure required for the recording operation. For example, when the internal ink pressure at the ink supply portion is −h (mmaq), the compressed ink absorbing material 2003 adjacent the bottom end of the ink chamber wall 2005 is satisfactory if it has the capillary force capable of sucking the ink to h mm. If the structure of the compressed ink absorbing material 2003 is simplified, the fine pore radium PI of the compressed ink absorbing material 2003 preferably satisfies:

$$P1 = 2\gamma \cos \theta / \rho g h$$

where $\rho$ is the density of the ink, $\gamma$ is the surface tension of the ink, $\theta$ is a contact angle between the ink absorbing material and the ink, and g is the force of gravity.

During the ink is being supplied from the ink chamber 2006, when the air-liquid interface of the ink in the ink chamber 2004 becomes lower than the top end of the ink supply portion, the air is supplied to the recording head, and therefore, the air-liquid interface adjacent the ink supply portion should be maintained at a position higher than the top end of the ink supply portion. Thus, the compressed ink absorbing material 2003 above the ink supply portion is given the capillary force capable of sucking the ink up to the height (h+i), wherein i is the height of the air-liquid interface set position (i mm) above the top of the ink supply portion. Similarly to the above, if the structure of the compressed ink absorbing material is simplified, the radius P2 of the fine pores of the compressed ink absorbing material at the top of the ink supply portion is:

$$P2 = 2\gamma \cos \theta / \rho g (h+i)$$

In the above equation, the height (i mm) of the air-liquid interface right above the ink supply portion is satisfactory if it is at a position higher than the top end of the ink supply portion. The ink sucking force (capillary force) is gradually decreased (if the material of the absorbing material is the same, the radius P3 of the fine pores is gradually increased) (FIG. 35), or the capillary force of the compressed ink absorbing material is reduced only adjacent the ink chamber wall 2005 (FIG. 36), so that the air-liquid interface gradually decreases toward the ink chamber wall in the further inside portion of the compressed ink absorbing material 2003 in the ink chamber 2004. The capillary force change is connected to the capillary force at the bottom end of the ink chamber wall 2005 (if the material is the same, it is P1).

Figure 37:
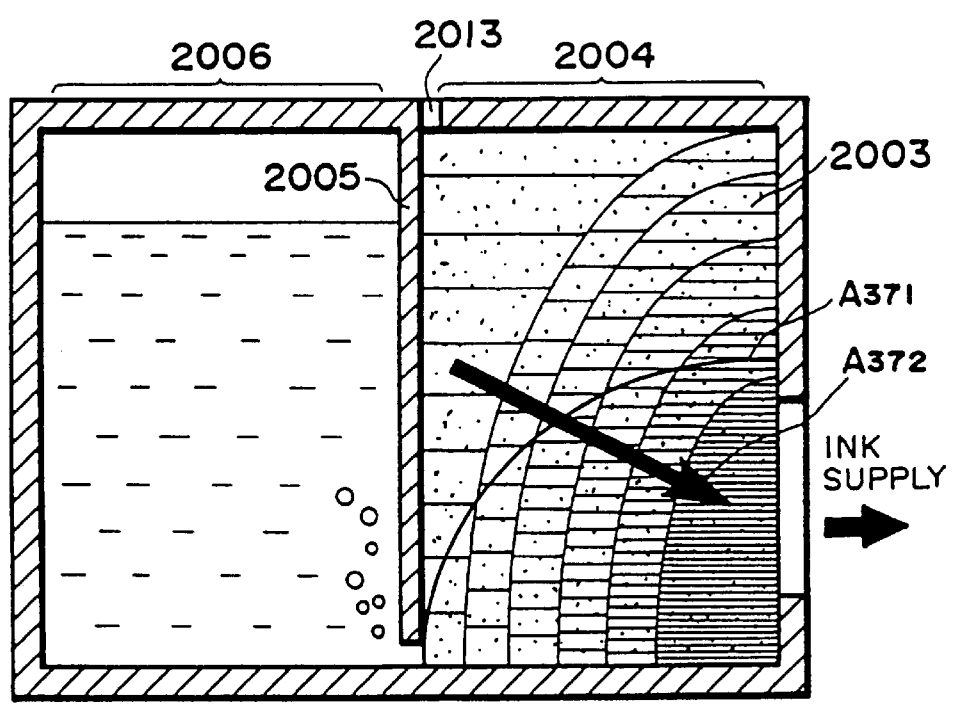
FIG. 37 shows a further example of the compression ratio distribution of the compressed ink absorbing material in the embodiment of FIG. 35.

The capillary force of the portion of the compressed ink absorbing material 2003 which is below the air-liquid interface in the compressed ink absorbing material 2003 may be any if the ink container is not subjected to shock, inclination, rapid temperature change or another special external force. However, in order to permit supply of the ink remaining in the ink chamber 2004 even if such external force is imparted or if the ink in the ink chamber 2006 is all consumed, the capillary force is increased (radius P4 of the fine pores) gradually toward the ink supply portion than the capillary force (radius P1 of fine pores) at the bottom end portion of the ink chamber wall 2005, and the capillary force at the ink supply portion is made larger (radius P5 of the fine pores) (FIG. 37). That is, the adjustment of the capillary force distribution satisfies:

> (the capillary force at the end portion of the ink chamber wall)<(the capillary force right above the ink supply portion)

Preferably,

> (the capillary force at the bottom end portion of the ink chamber wall)<(the capillary force at the bottom portion in the middle of the ink chamber)<(upper position in the middle of the ink chamber)<(right above the ink supply portion)<(ink supply portion)

If the structure of the compressed ink absorbing material 2003 is simplified, the radii of the bores satisfy:

$$P1 > P2$$

Preferably, $$P1 > (P3, P4) < (P2, P5)$$

As regards the relation between P3 and P4, and the relation between P2 and P5, may be in accordance with the distribution of the compression ratio such that P3<P4, and P2<P5, or P3=P4, or P2=P5.

Figure 35:
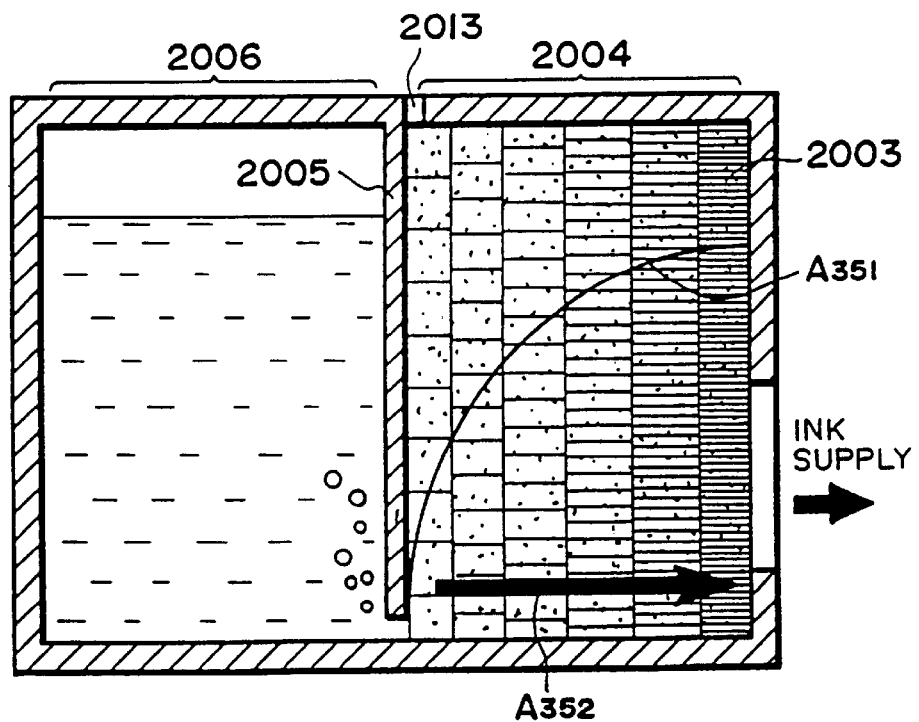
FIG. 35 shows an example of compression ratio distribution of the compressed ink absorbing material, according to a further embodiment of the present invention.
Figure 36:
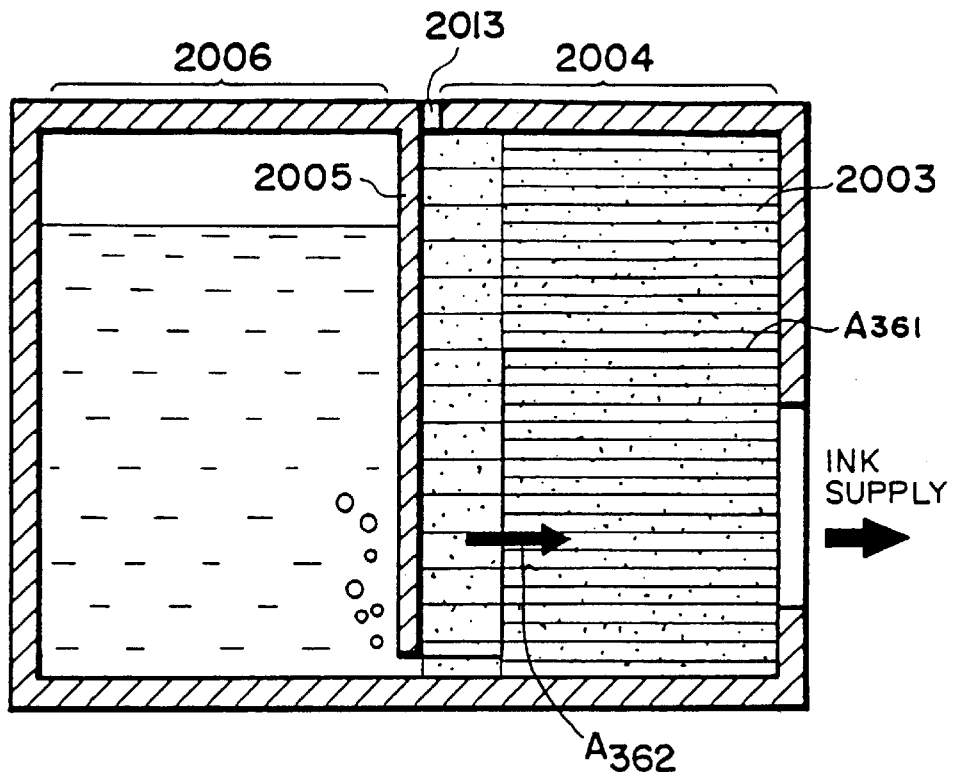
FIG. 36 shows another example of the compression ratio distribution of the compressed ink absorbing material in the embodiment of FIG. 35.

Referring to FIGS. 35, 36 and 37, there is shown preferable compression ratio distribution as an example in which the above-described relations are satisfied by adjusting the compression ratio, using the same material as the ink absorbing material 2003. In these Figures, A351, A361 and A371 indicate the air-liquid interface, and arrows A352, A362 and A372 indicate the compression ratio of the compressed ink absorbing material which is increasing.

Figure 38:
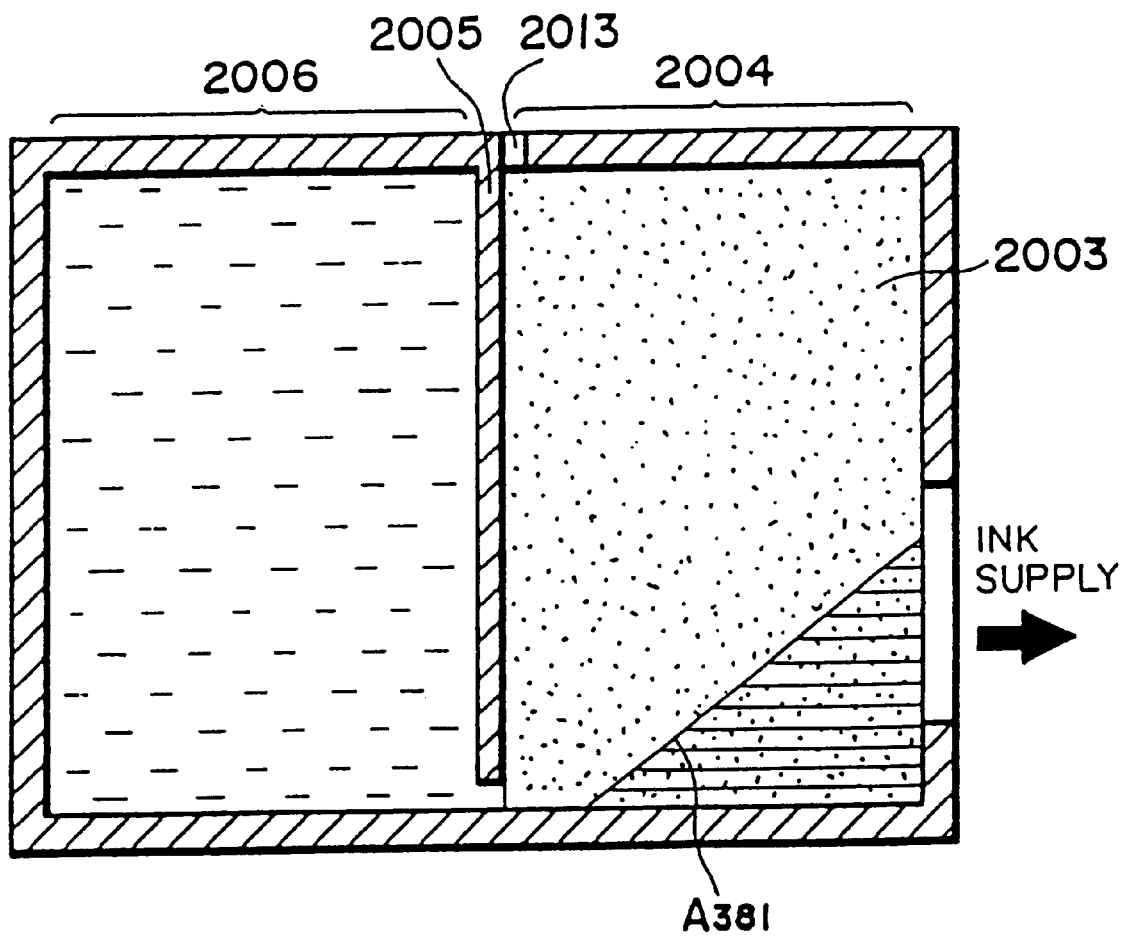
FIG. 38 shows an example of the compression ratio distribution of the compressed ink absorbing material in a comparison example.

FIG. 38 shows a comparison example 3, in which the capillary force of the compressed ink absorbing material 2003 at the ink supply portion is not larger than that in the neighborhood of the ink chamber wall. The figure shows the state in which the ink has been supplied out to a certain extent from the ink chamber 2004. In this comparison example, an air-liquid interface A381 is formed adjacent the bottom end portion of the ink chamber wall 2005, and the communication part between the ink chamber 2004 and the ink chamber 2006 is positioned at the air phase side. In this case, the ink can not be supplied out from the ink chamber 2006, and the air introduced through the air vent portion 2013 is directly supplied into the recording head from the ink supply portion, and the ink container becomes non-operable at that time.

Figure 39A:
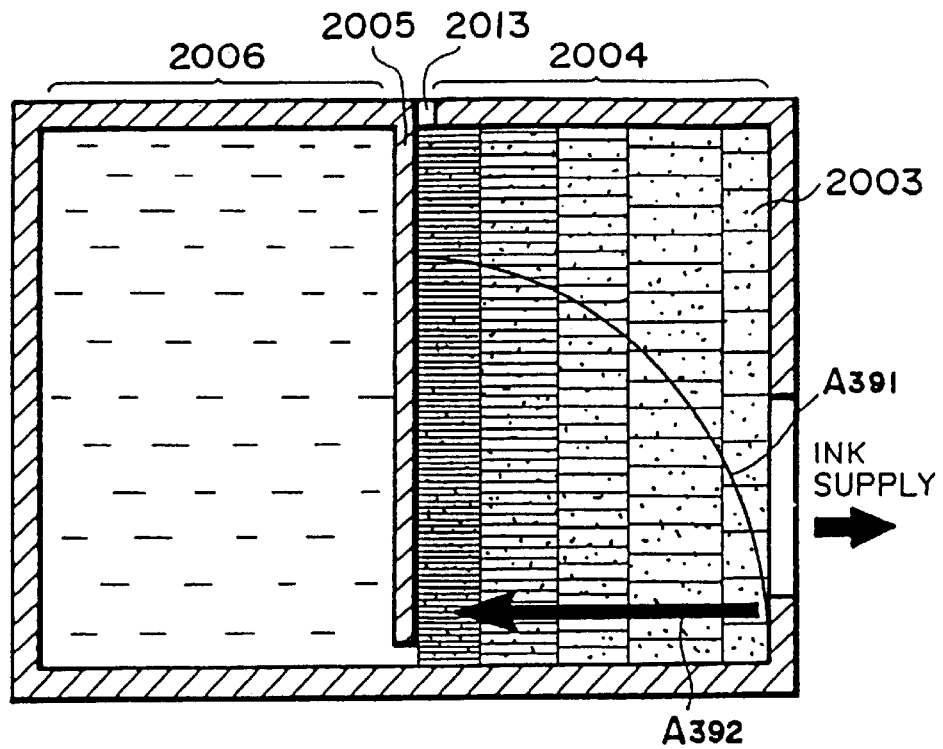
FIGS. 39A and 39B show a further example of the compression ratio distribution of the compressed ink absorbing material in a comparison example.
Figure 39B:
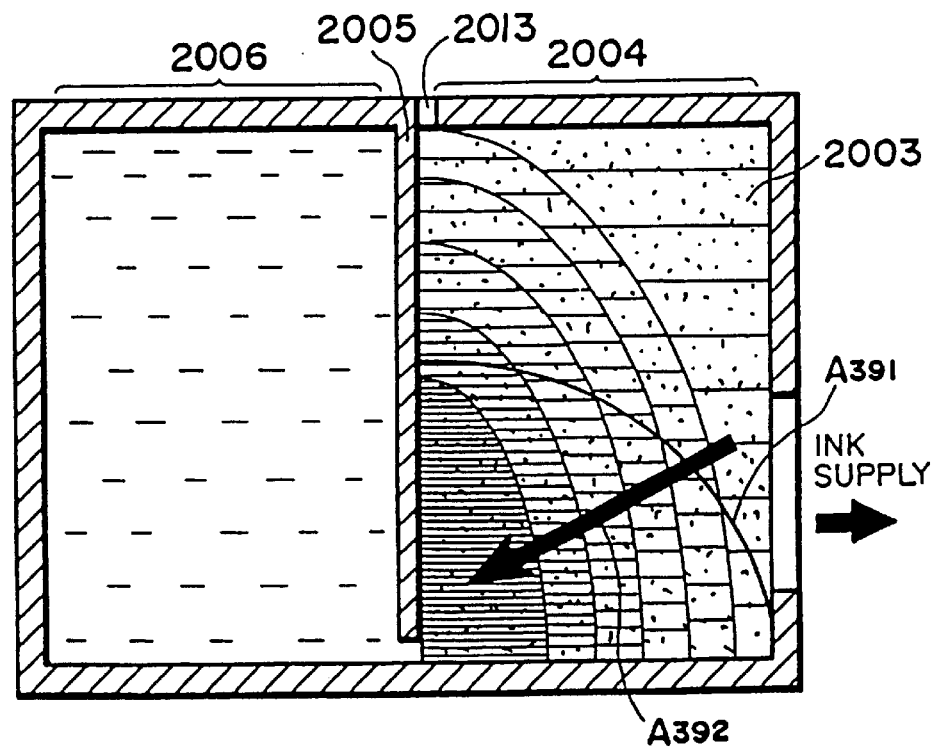

FIG. 39 shows a Comparison Example 4, in which, contrary to the embodiment of this invention, the capillary force of the compressed ink absorbing material 2003 adjacent the bottom end portion (FIG. 39(B)) or the ink chamber wall side (FIG. 39(A)) than that in the ink supply portion. Similarly to the Comparison Example 3, before the formation of the air-liquid interface A391 is formed adjacent the bottom end portion of the ink chamber wall 2005, the air-liquid interface decreases beyond the top end of the ink supply portion, and therefore, the ink can not be supplied from the ink chamber 2006, and therefore, the air introduced through the air vent portion 2013 is directly supplied to the recording head from the ink supply portion. At that event, the ink container is no longer usable.

In the foregoing the description has been made as to a monochromatic recording apparatus having one recording head. However the embodiments are applicable to a color ink jet recording apparatus having four recording heads (OK, C, M and Y, for example) capable of ejecting different color inks or to a single recording head capable of ejecting different color inks. In that case, means are added to limit the connecting position and direction of the exchangeable ink container.

In the foregoing embodiments, the ink container is exchangeable, but these embodiments are applicable to a recording head cartridge having a unified recording head and ink container.

Embodiment 11

Figure 40:
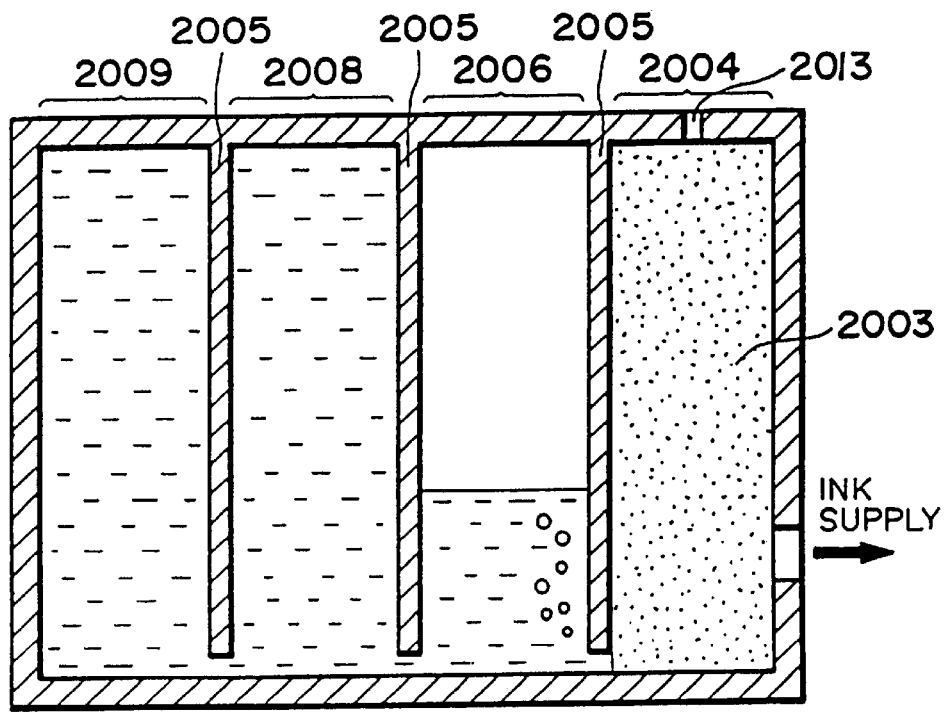
FIG. 40 shows an example of additional ink chamber, according to a further embodiment of the present invention.
Figure 41:
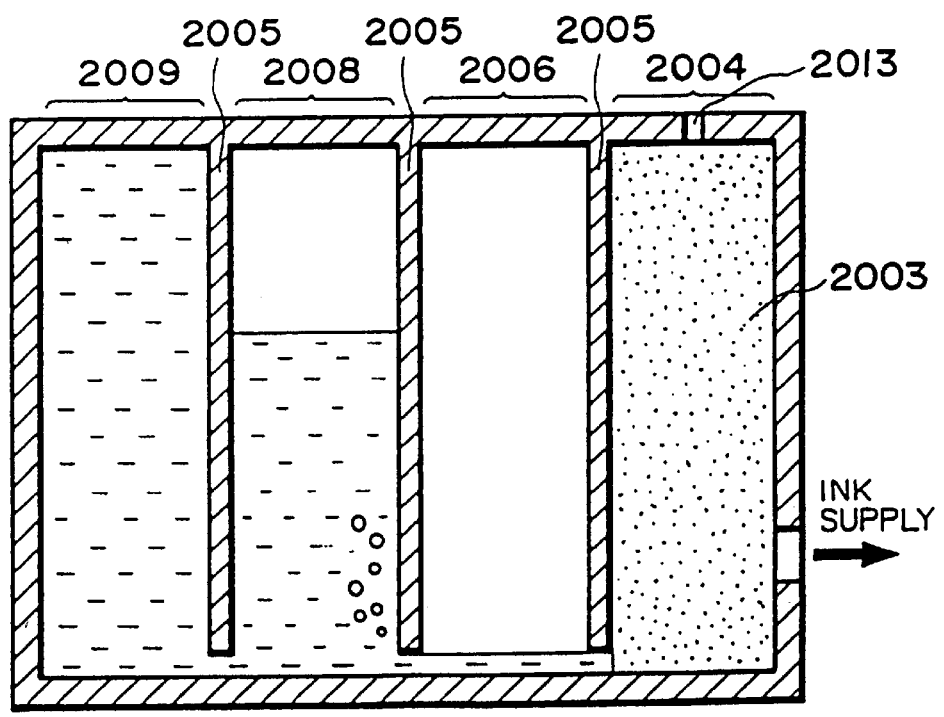
FIG. 41 shows an example of an additional ink chamber in the embodiment of FIG. 40.

FIGS. 40 and 41 shows a device according to an eleventh embodiment. Additional two ink chambers 2008 and 2009 are provided in communication with the ink chamber 2006. In this modified example, the ink is consumed in the order of the ink chamber 2006, the ink chamber 2008 and the ink chamber 2009. In this modified example, the ink chamber is separated into four chambers, for the purpose of further better prevention of the ink leakage upon the ambient pressure reduction and the temperature change which have been described with respect to the foregoing embodiments. If the air is expanded in the ink chamber 2006 and the ink chamber 2008 in the state of FIG. 41, the expanded part of the air in the ink chamber 2006 is released through the ink chamber 2004 and through the air vent portion 2013, and the expanded portion of the ink chamber 2008 is released by the flow of the ink into the ink chamber 2006 and to the ink chamber 2004. Thus, the ink chamber 2004 is given the function of buffering chamber. Therefore, the ink retention capacity of the compressed ink absorbing material 2003 in the ink chamber 2004 may be determined in consideration of the leakage quantity from one ink chamber. Therefore, the volume of the compressed ink absorbing material 2003 can be reduced as compared with that in Embodiment 10, and therefore, the ink retention ratio can be increased.

Embodiment 12

Figure 42:
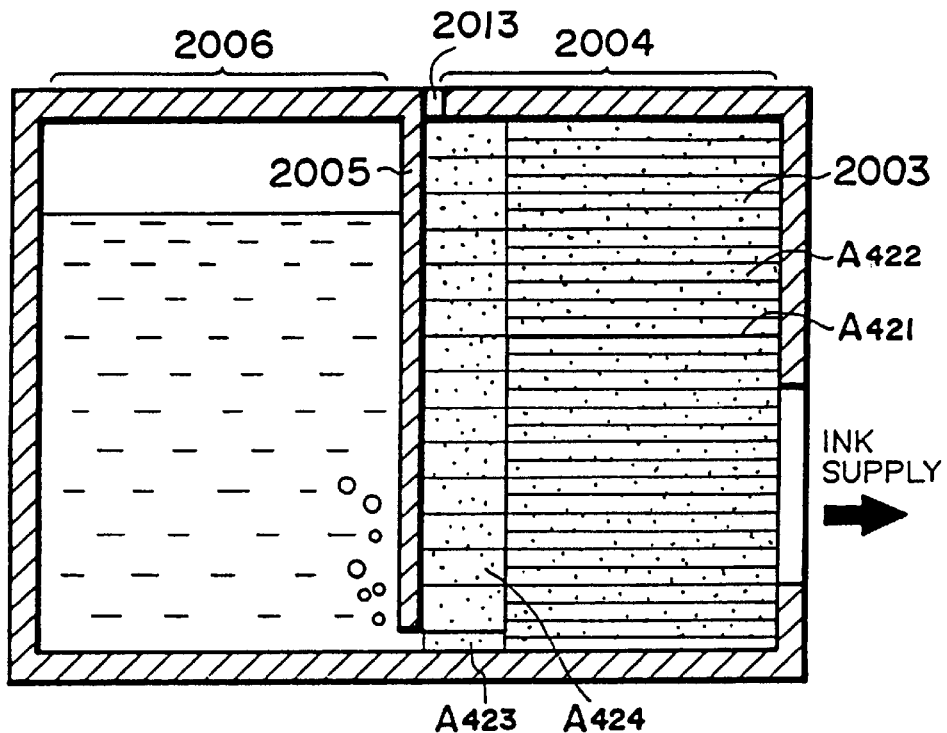
FIG. 42 shows an example of the divided compressed ink absorbing material, according to a further embodiment of the present invention.

FIG. 42 shows a twelfth embodiment, in which the compressed ink absorbing material contained in the ink chamber 2004 is separated into three parts, each of which is given particular functions. In FIG. 42, the compressed ink absorbing material adjacent the ink supply portion which occupies a major part of the ink chamber 2004 has been compressed beforehand with relatively high compression ratio in order to increase the capillary force. The compressed ink absorbing material adjacent the end portion of the ink chamber is smaller than that, but it is sufficient to supply sufficient capillary force to produce the internal pressure of the ink required for the supply thereof (it is relatively low compression ratio (A423)). In addition, along the wall of the ink chamber, even smaller compression ratio material A424 is disposed to promote the formation of the air-liquid interface A421 adjacent the bottom end portion of the ink chamber. In thin embodiment, the compressed ink absorbing material 2003 is separated into three parts, and is compressed beforehand, and thereafter, it is accommodated therein. This results in a little bit complicated manufacturing process of the ink container, but the compression ratio (and therefore capillary force) can be adjusted to be proper degrees at respective positions. In addition, the low capillary force absorbing material is disposed at the lateral ink chamber wall, and therefore, the internal pressure of the ink supply portion reaches more quickly to the predetermined level.

Embodiment 13

Figure 43:
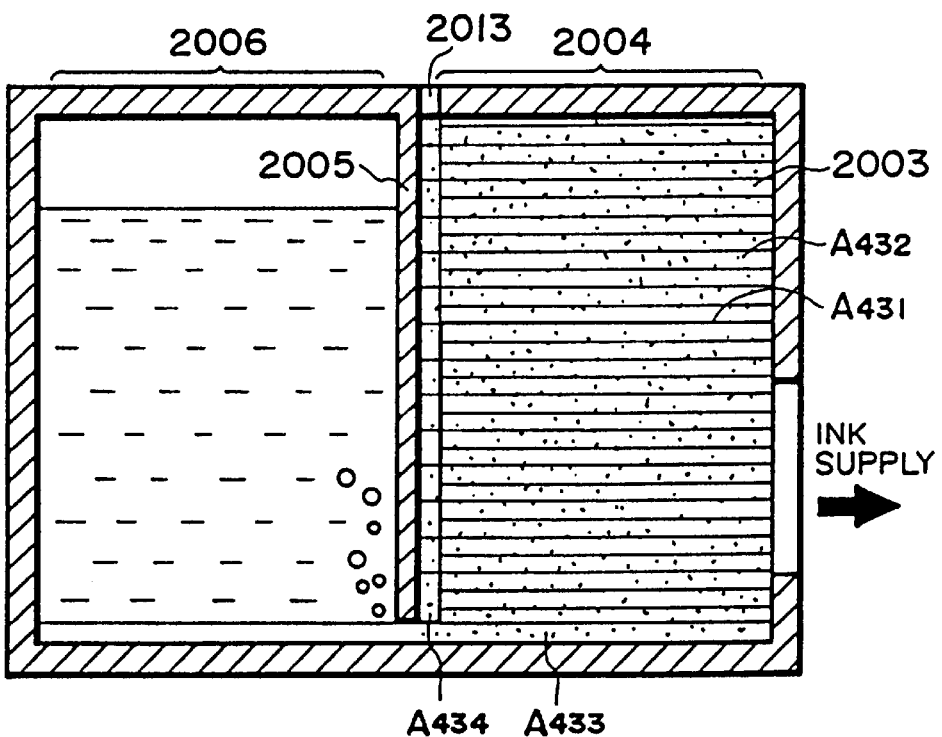
FIG. 43 shows an example of the ink absorbing material arrangement in the ink chamber, according to a further embodiment of the present invention.
Figure 44:
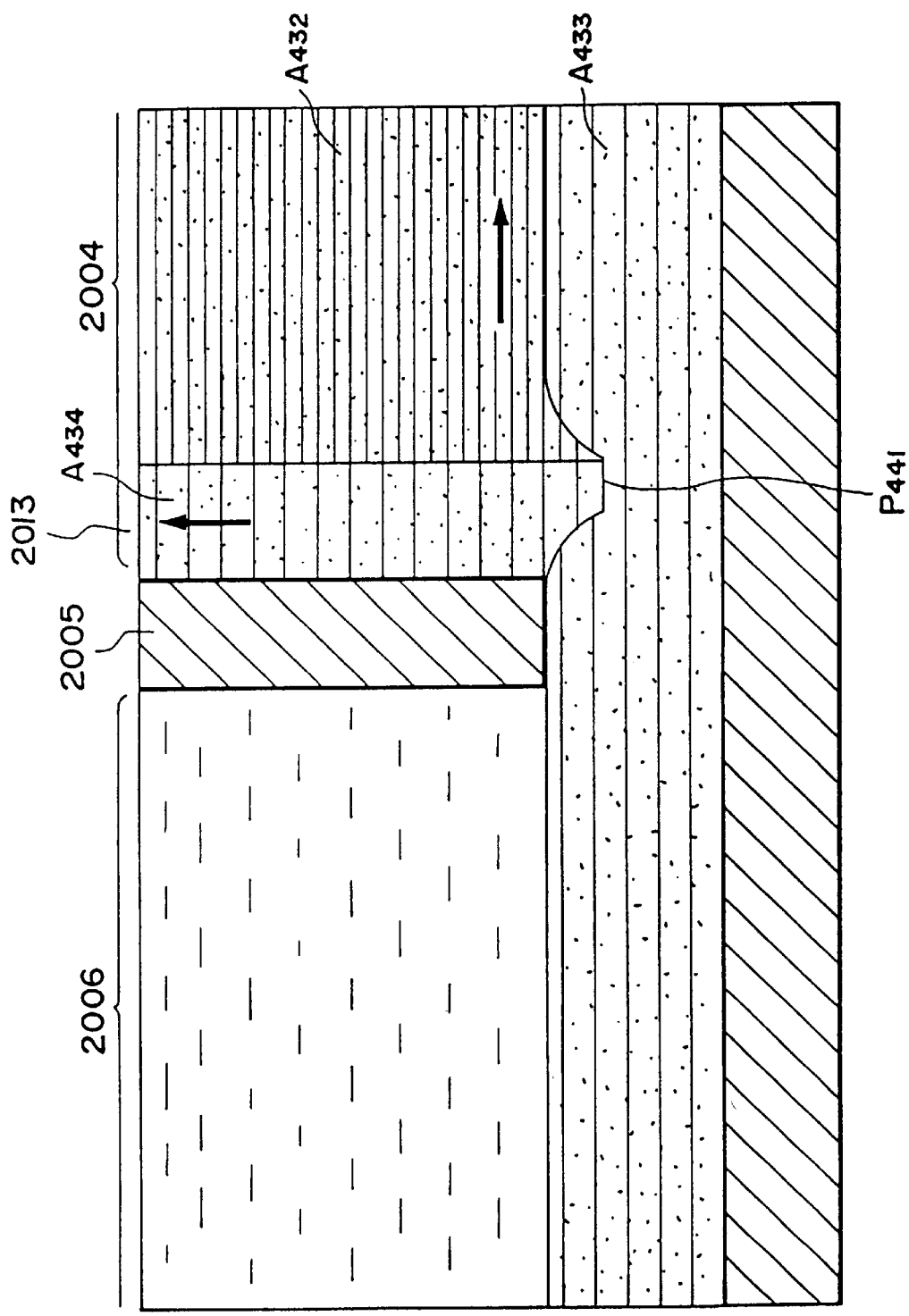
FIG. 44 illustrates problems with the assembling of the apparatus for the FIG. 43 embodiment.

FIG. 43 shows a 13th embodiment, in which similarly to the 12th embodiment, the compressed ink absorbing material 2003 is separated into three parts, and there are high compression ratio portion A432, minimum compression ratio portion A434, and there is small compression ratio portion (intermediate capillary force) A433 at the bottom portion of the ink chamber 2006. In this embodiment, even if the ink level in the ink chamber 2006 becomes lower than the bottom end of the ink chamber wall 2006, the ink discharge into the ink chamber 2004 can be suppressed, and therefore, the ink internal pressure variation in the ink supplying portion can be reduced. Therefore, the opening for the communication between the ink chambers at the bottom thereof can be increased, so that the limitation in the design of the ink container can be slightly reduced. In this Figure, A431 shows air-liquid interface. However, in this embodiment, as shown in FIG. 44, if the ink absorbing material is further compressed partly (P441) at the time of assembling the compressed ink absorbing material 2003 at the bottom end portion of the ink chamber wall, the compression ratio adjacent the ink chamber 2006 becomes locally high with the result of the local increase of the capillary force. Then, there is a possibility that the air is blocked between the portion adjacent the ink chamber 2004 having the normal compression ratio, and therefore, the smaller capillary force, with the result of formation of meniscus preventing the ink supply from the ink chamber 2006. Therefore, this should be avoided.

As described in the foregoing, according to Embodiments 10, 11, 12 and 13, the hybrid type ink container is improved, and there are provided the supply portion to the recording head and the air vent, and there are further provided a supply ink chamber containing ink absorbing material having adjusted capillary force, and one or more ink chamber in communication therewith. The capillary force of the ink absorbing material at least the upper part of the ink supply portion to the recording head is made larger than the capillary force of the ink absorbing material at the communicating part with the ink chamber, by which the stabilized ejection is maintained, and the leakage of the ink can be prevented. Therefore, the ink container in easy to handle, and the ink retention rate is high.

Embodiment 14

During pressure reduction tests for the ink containers described in the foregoing, a problem has been found that the ink is leaked out in some of the ink container when the ink having the composition which will be stated in the comparison ink 3 which i will be described hereinafter, therefore, the leakage prevention performance is varied for individual ink containers. Various investigations and test of the inventors have revealed that the ink buffering effect is influenced by affinity between the ink and the ink container.

Figure 45:
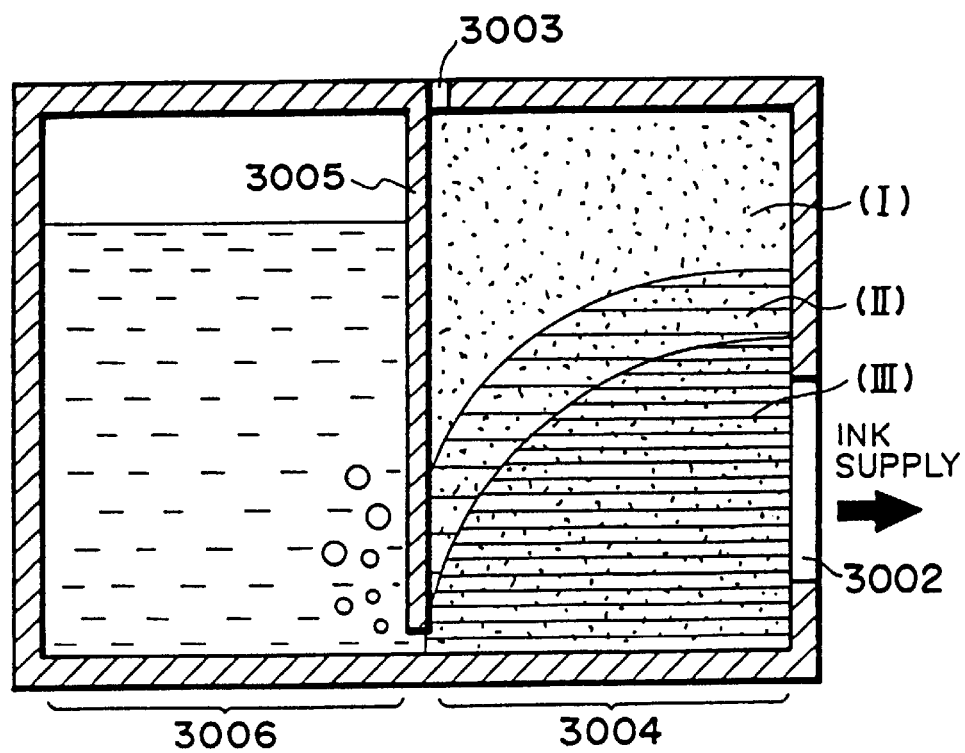
FIG. 45 illustrates ink consumption in a comparison example.
Figure 46:
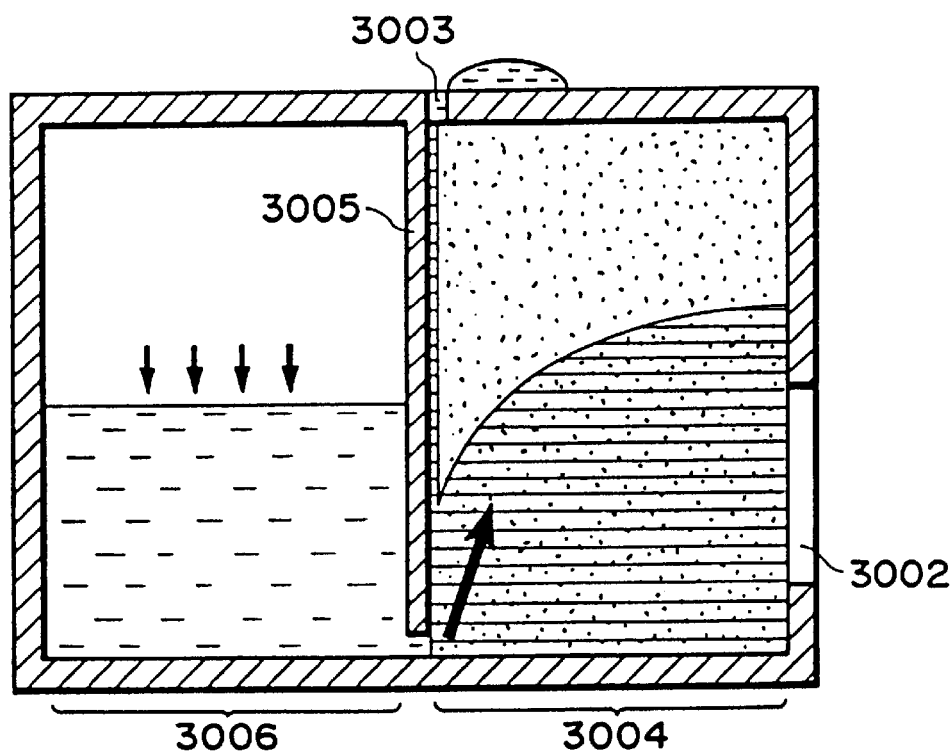
FIG. 46 shows the ink leakage upon pressure reduction in the comparison example of FIG. 45.

FIGS. 14, 45 and 46 show comparison of the ink container resulting in the ink leakage. In FIG. 45, (I) indicates a region in which the ink absorbing material has never been contacted by the ink; (II) is the region which has once been absorbed the ink; and (III) is a region containing the ink. FIG. 14 shows the initial state of the ink container, FIG. 45 shows the state in which the ink has been consumed from the suppliable ink in the ink chamber 3004 and one fifth the ink in the ink chamber 3006, from the initial state. FIGS. 46 shows the time when the ink in the ink chamber 3006 is pushed out into the ink chamber 3004 by expansion of the air in the ink chamber 3006 due to the ambient pressure decrease or temperature increase from the state of FIG. 45. A part of the ink is absorbed into the portion which has once absorbed the ink. However, the other ink is not absorbed by the absorbing material but leaks out from the air vent 3003 along the ink container wall or the clearance between the ink container wall and the absorbing material.

The reason for this is considered as follows. The ink absorbing material never contacted by the ink exhibits poor ink absorbing property. The ink absorbing material having the experience of ink absorption, has different surface state to permit better ink absorption. This has been confirmed in the following manner. A unused compressed absorbing material (polyurethane foamed material) and a compressed absorbing material having the experience of ink absorption once, are immersed in the ink, and the height of ink absorptions are measured. It has been found that the unused ink absorbing material hardly absorbs the ink (several mm), whereas the absorbing material having the experience of ink absorption exhibited not less than several cm, and therefore, the remarkable difference in the ink absorbing nature has been confirmed. In the ink cartridge of this embodiment, the ink can be filled in the ink chamber 3006 to the limit of its volume at the initial state. In addition, the ink can be filled into the ink chamber 3004 to the ink retaining limit. Therefore, in consideration of the above-described points, the ink is filled into the ink chamber 3006 to the limit of its volume, and the ink is filled into the ink chamber 3004 to establish the once wet state of the absorbing material is established before the use thereof. Further thereafter, in order to maintain the predetermined vacuum immediately after the ink cartridge is unpacked, a proper amount of the ink can be removed so that the ink contained in the ink chamber 3004 is less than the ink retaining limit thereof.

After the unpacking of the ink container, the ink is consumed from the ink chamber 3004, and thereafter, the ink in the ink chamber 3006 is used. When the ink is consumed from the ink chamber 3006 requiring the buffering function, the ink absorbing material in the ink chamber 3004 has once been wet, and therefore, the ink can be easily absorbed thereby, and therefore, the buffering function can be sufficiently accomplished. Therefore, the ink is effectively prevented from leaking out through the air vent. An ink container thus produced is mounted on an ink jet recording apparatus, and the pressure reduction tents are carried out. It has been found that the ink did not leak out from any of the ink containers, and in addition, the resultant record has high print quality.

In order to manufacture the ink container provided with such functions, it would be considered that the absorbing material is treated with the ink or another agent providing good resetting nature before the absorbing material is set in the container. However, this may require the drying step or the like. Or, if the agent other than the ink is used, the consideration should be paid to the possibility of the damage to the heater by the agent solved into the ink. It would be also considered that the ink having good affinity with the absorbing material is used. However, such an ink generally exhibits better seeping property in the paper, and therefore, the printed ink smears along the fibers of the paper in the random directions, thus decreasing the print quality.

Figure 47:
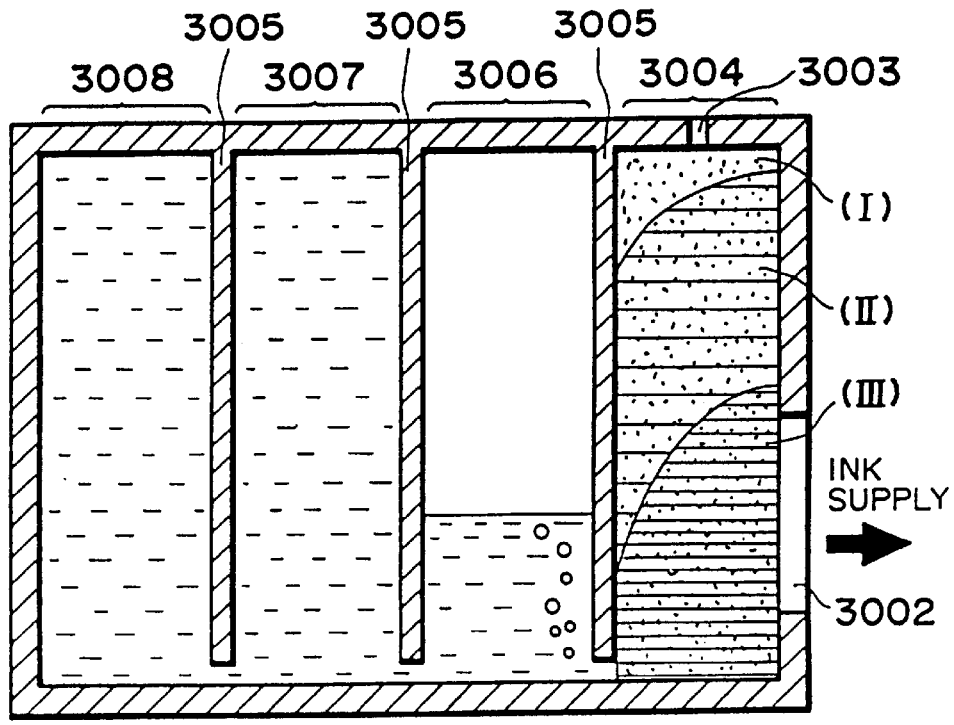
FIG. 47 is a modified example according to a further embodiment of the present invention.
Figure 48:
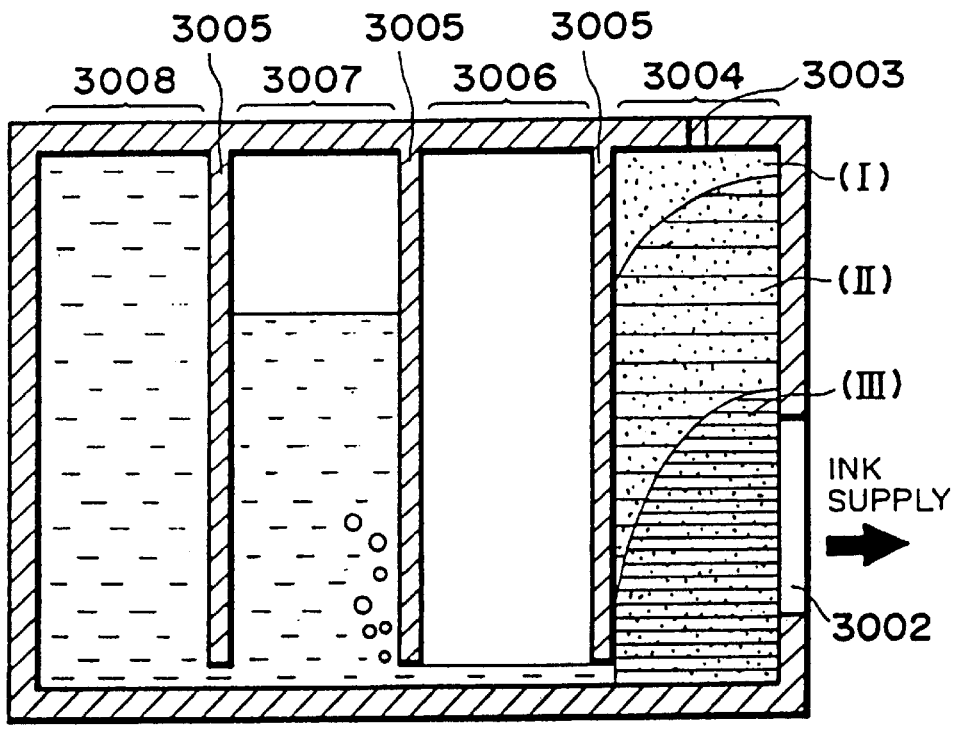
FIG. 48 is a modified example of FIG. 47 embodiment.

FIGS. 47 and 48 show a modified embodiment of thin invention. In these Figures, (I), (II) and (III) show the similar things as with (I), (II) and (III) of FIG. 45. In this example, two ink chambers 3007 and 3008 are provided which are in communication with the ink chamber 3006. In this embodiment, the ink is consumed in the order of the ink chamber 3006, the ink chamber 3007 and the ink chamber 3008. In this modified example, the ink chamber is separated into four chambers, for the purpose of preventing the leakage of the ink at the time of the pressure reduction and the temperature change, an described with the foregoing embodiments. When the airs in the ink chamber 3006, and in the ink chambers 3007 are expanded in the state of FIG. 48, for example, the expanded volume of the air in the ink chamber 3006 is released through the air vent through the ink chamber 3004. The expanded volume in the ink chamber 3007 is released by the ink flowing out from the ink chamber 3006 and the ink chamber 3004. In this manner, the ink chamber 3004 is given the buffering chamber. The ink retention capacity of the compressed ink absorbing material in the ink chamber 3004 may be determined in consideration of the leaking amount from one ink chamber. In this cane, too, the entirety of the compressed absorbing material of the ink chamber 3004 is once subjected to the ink absorption, so that the above-described advantageous effects can be provided. Since the buffering chamber (ink chamber 3004) can be reduced in the size, and therefore, the residual ink amount when the ink is removed after filled in the manufacturing process, can be reduced.

Embodiment 15

Figure 49:
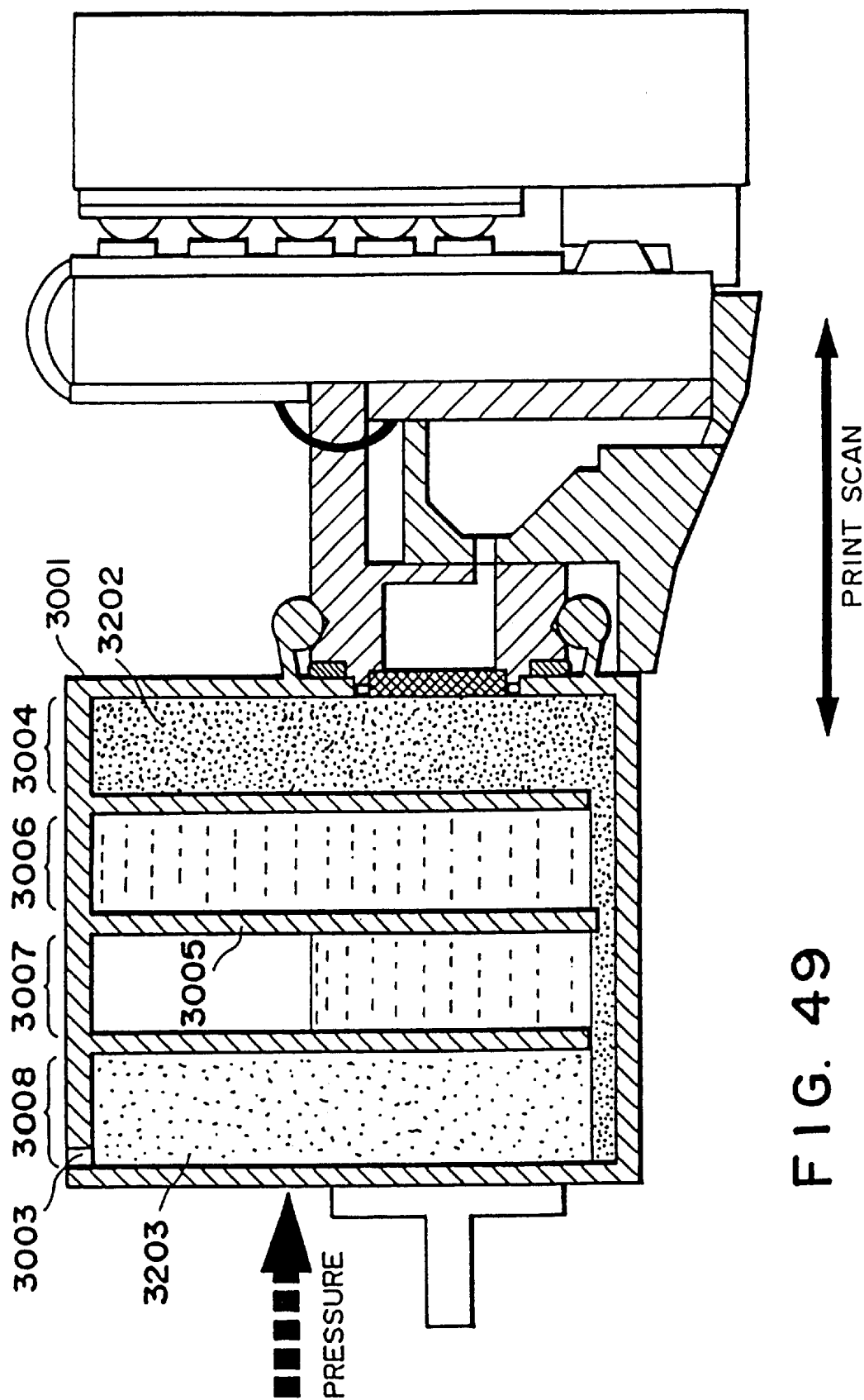
FIG. 49 is a sectional view showing the mounting of the exchangeable ink container and the recording head onto the carriage, according to an embodiment of the present invention.

Referring to FIG. 49, Embodiment 15 will be described. The fundamental structure of the recording head is the same as with FIG. 1. The inside of the exchangeable ink container 3001 is separated into four ink chambers A, b, c and d, which communicate at the bottom. An ink absorbing material 3002 having an adjusted capillary force is packed into the communication part between the ink chamber a and the ink chambers functioning as the ink supply portion without substantial clearance. The ink chamber d having an air vent 3003 is packed with a buffering absorbing material to prevent the leakage of the ink. This is such a hybrid type ink cartridge.

Figure 50:
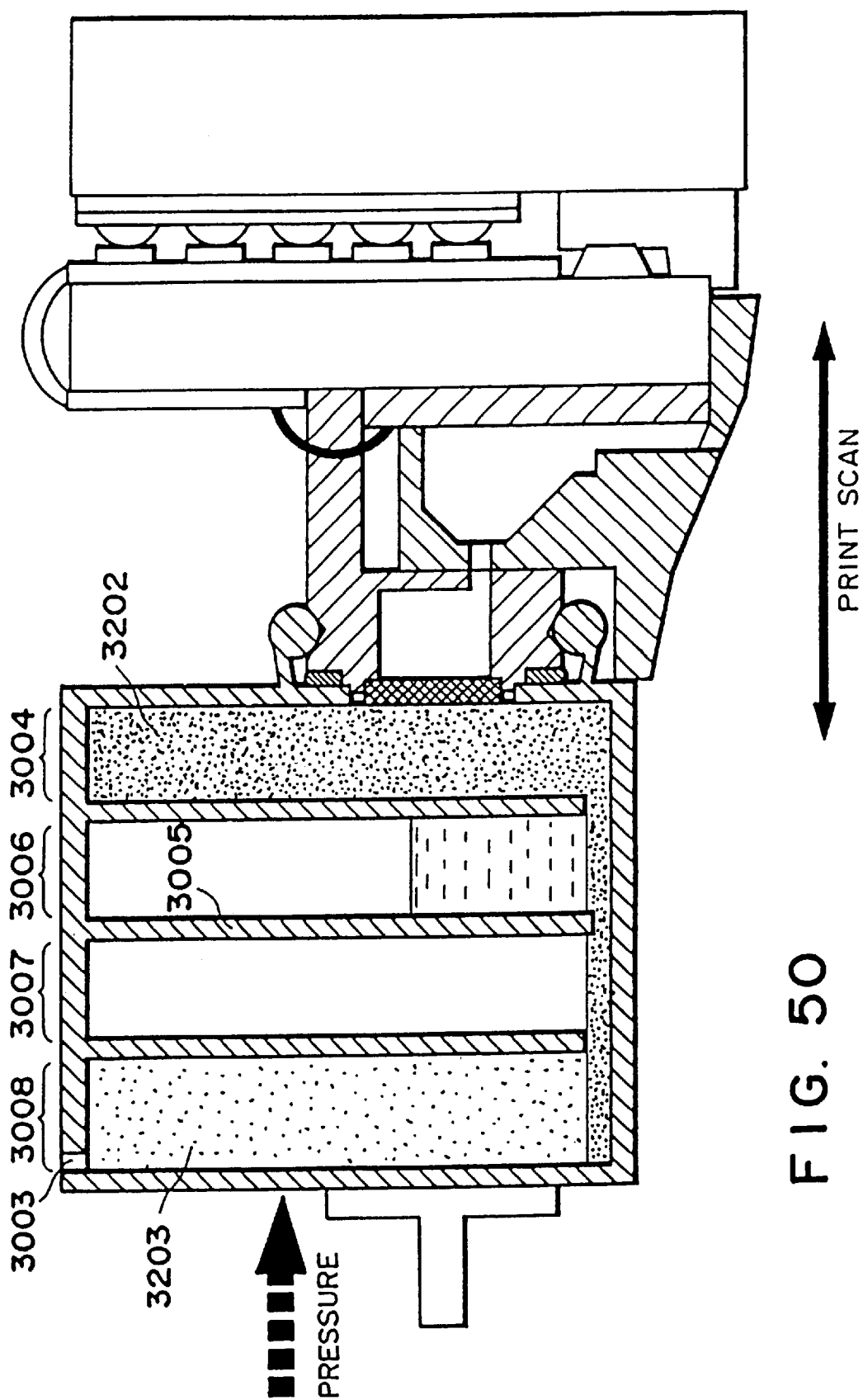
FIG. 50 illustrates ink consumption in the apparatus according to the embodiment of FIG. 49.

In the state of FIG. 49, about one half of the ink in the ink chamber 3007 has been consumed from the initial state having sufficiently filled ink chambers 3004, 3006 and 3007. When the ink is further consumed, the ink is supplied from the ink chamber 3006, as shown in FIG. 50, from the time at which the ink is used up from the ink chamber 3007. The ink is further consumed from the state shown in FIG. 50, and at the time when the ink is used up from the ink chamber 3006, the ink starts to be supplied from the ink absorbing material in the ink chamber 3004. When the ink is substantially used up from the ink chamber 3004, the exchangeable ink container is exchanged.

Figure 51:
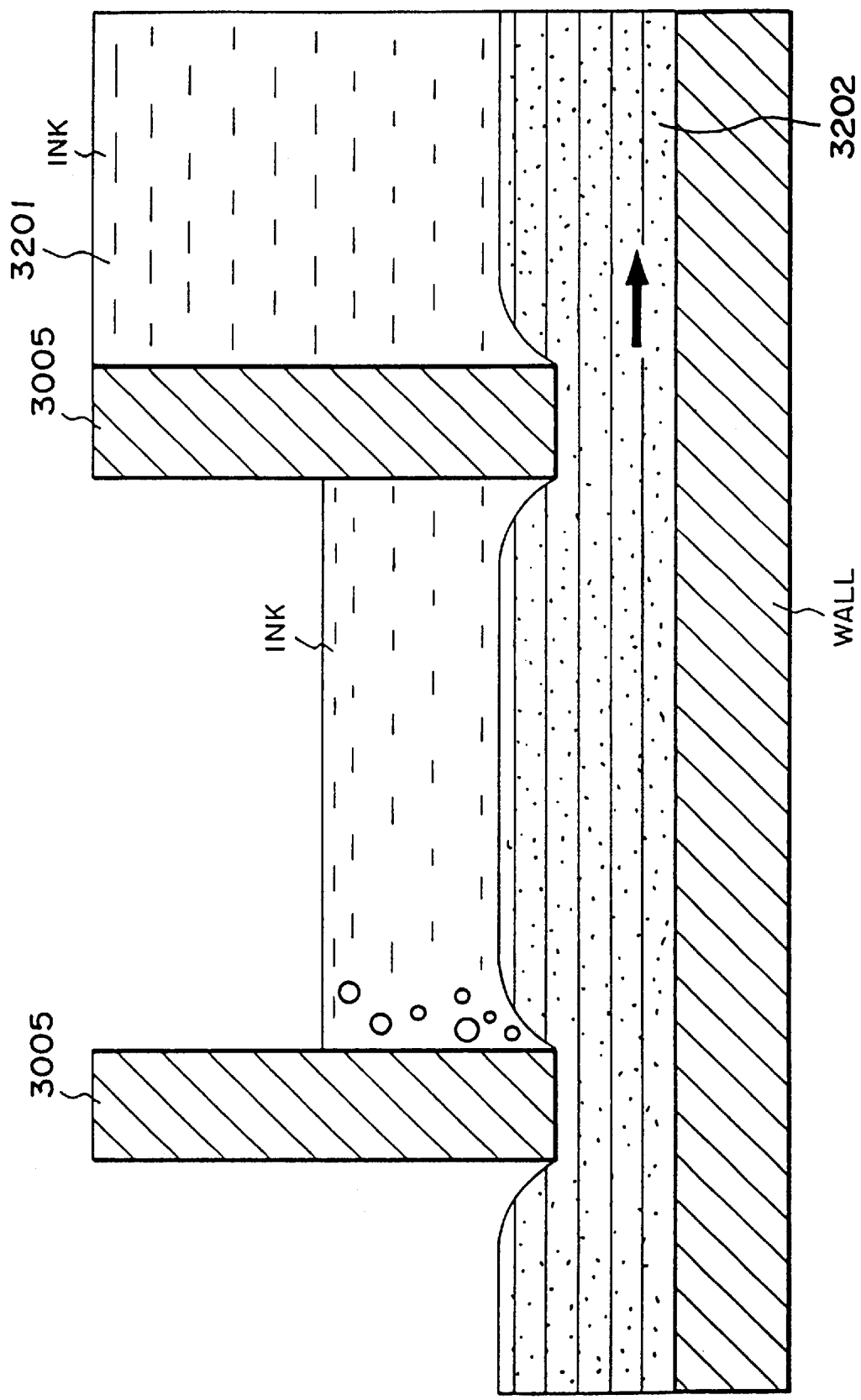
FIG. 51 illustrates fundamentals of the exchange between the air and the ink.

FIG. 51 shows the principle of the internal pressure production of the ink and the ink supply in embodiment 15. From the left ink chamber in FIG. 51, the ink 3201 has been substantially used up, and because of the communication with the ambience through the air vent and the communicating portion between the ink chambers, it is in the atmospheric pressure. The ink is supplied to the recording head from the ink supply portion through the communication parts between ink chambers, in response to which the ink 3201 is supplied out from the ink chamber in communication with the ink chamber which has the atmospheric pressure through the ink absorbing material 3201 having an enhanced capillary force by compression, between the ink chambers. The pressure of the ink chamber is reduced corresponding to the consumption of the ink. Then, the air is introduced into the ink chamber from which the ink is consumed so that the pressure of the ink chamber whose pressure is reduced by partial break down of the meniscus in the compressed ink absorbing material 3202 between the ink chambers. The internal pressure of the ink supply portion is maintained at a predetermined level by the capillary force of the compressed ink absorbing material in the ink communicating part between ink chambers.

Figure 52:
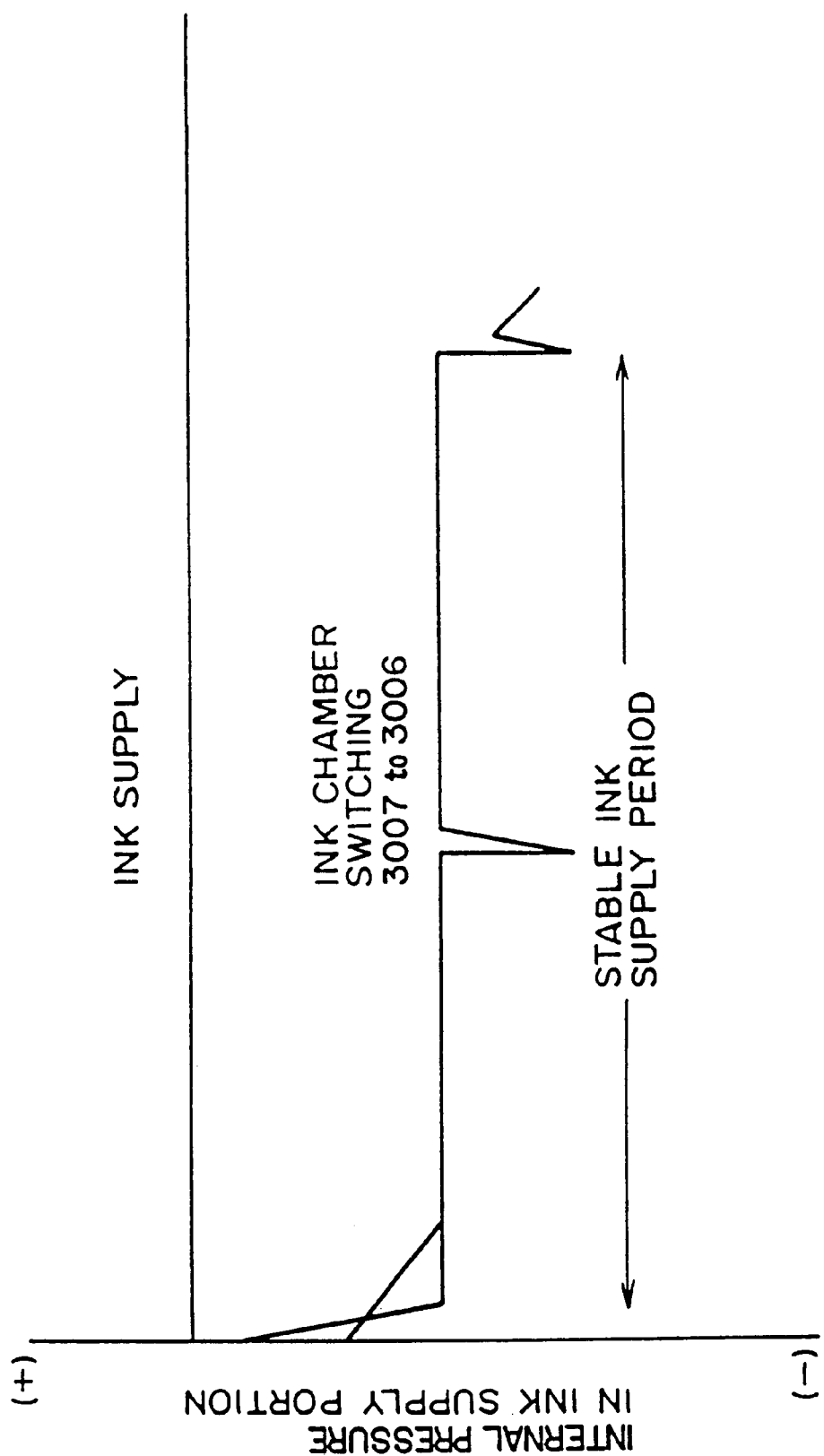
FIG. 52 illustrates the internal pressure of the ink supply portion, according to a further embodiment of the present invention.

FIG. 52 shows the change of the internal pressure at the ink supply portion of the exchangeable ink container of Embodiment 15 in response to the ink supply (consumption). The internal pressure is produced by the capillary force of the buffering absorbing material or ink absorbing material, but the internal pressure is produced by the capillary force of the compressed ink absorbing material (compressed portion) in the communicating part between the ink chamber 3008 and the ink chamber 3007 in accordance with the supply of the ink, so that during the ink supply from the ink chamber 3007, the substantially constant ink pressure is maintained as described in the foregoing. When the ink is further consumed, the ink supply from the ink chamber 3006 is started. Upon the switching of the ink chamber, the internal pressure at the ink supply portion slightly varies. It is considered that this phenomenon is related with the measurement of the internal pressure with the continuous ink supply and the temporary occurrence of the pressure reduction state both in the ink chambers 3007 and 3006. However, it has been confirmed that the variation is not a significant problem with respect to the function such as the recording performance of the recording head.

When the ink becomes stably consumed from the ink chamber 3006, the internal pressure is stabilized again. When the ink is consumed up from the ink chamber 3006, the ink is supplied (consumed) from the ink chamber 3004. It has been found that the recording operation is not adversely affected by the ink supply stabilization period shown in FIG. 52.

Figure 53:
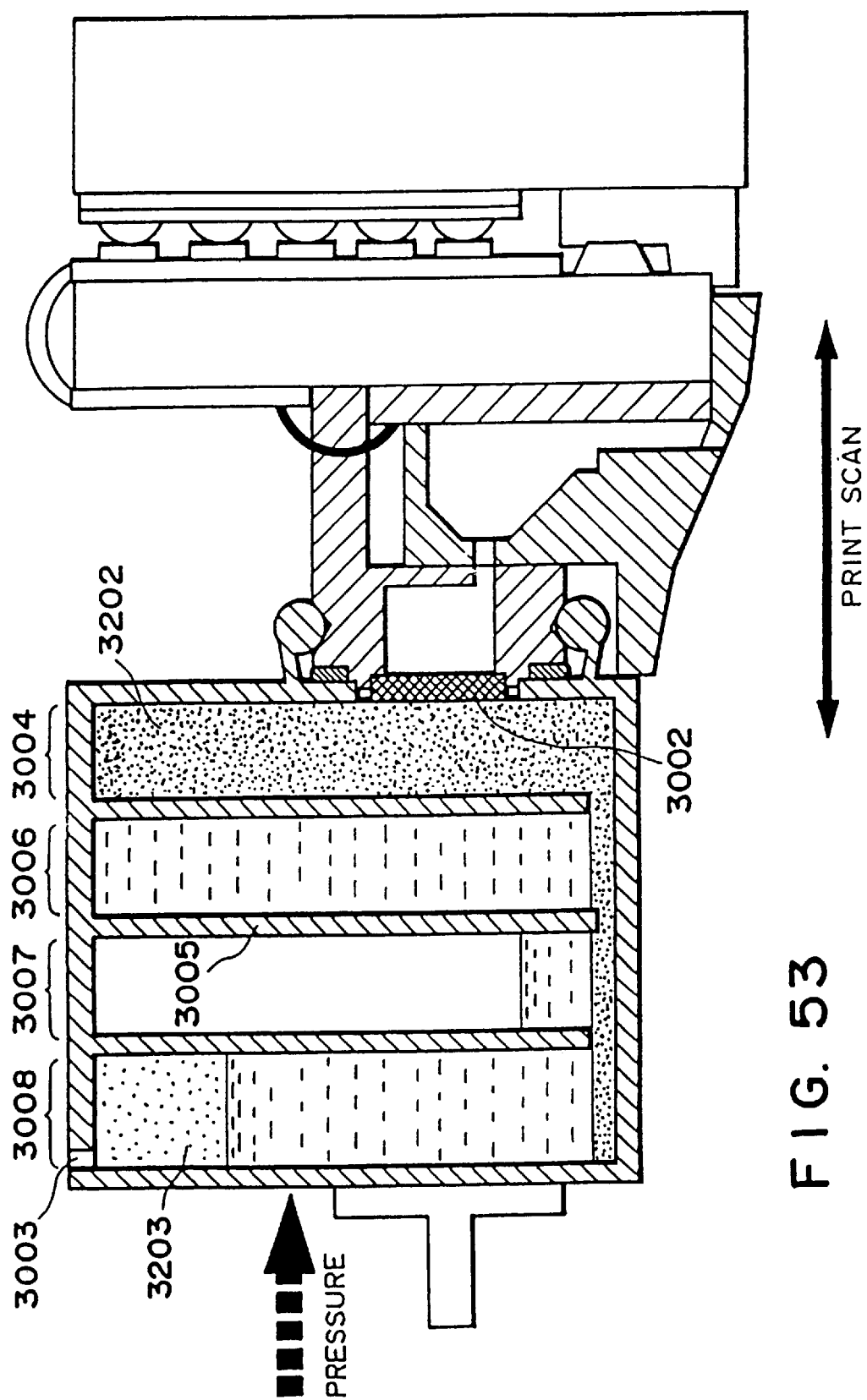
FIG. 53 illustrates the ink buffering function in the apparatus of FIG. 52 embodiment.

FIG. 53 illustrates the function of the buffering absorption material 3203, and the ink has been overflowed from the ink chamber 3007 due to the air expansion in the ink chamber 3007 attributable to the reduction of the atmospheric pressure and the temperature rise. In this embodiment, the overflowed ink into the ink chamber 3008 is retained by the buffering absorbing material. In the case of 0.7 atoms, the ink retaining capacity of the buffering absorbing material 3300 is determined 30% ink leakage from the ink chamber 3007 at the maximum. When the atmospheric pressure restores to the level before pressure reduction (1 atm), the ink leaked into the ink chamber 3008 and retained in the buffering absorbing material 3203 returns to the ink chamber 3007. This phenomenon occurs in the similar manner in the case of the temperature change of the ink container, but the amount of leakage is smaller than that at the time of pressure reduction even if the temperature increases by 50° C. approximately.

In this case, the ink buffering material is designed in consideration of the maximum leakage. However, during the pressure reduction test, a problem has been found that the ink leaks out in some of the ink containers, and therefore, the leakage prevention property is dependent on the individual containers. It has been found that this is because of the affinity between the ink and the buffering absorbing material 3203 in the ink chamber 3008.

In Embodiment 15, therefore, the buffering absorbing material 3203 is subjected to the experience of ink absorption therein before use thereof. It has been confirmed that when the ink is pushed out into the ink chamber 3008 due to the expansion of the air in the ink chamber 3007 due to the temperature rise or the pressure reduction, the ink is absorbed in the buffering absorbing material 3203 in the ink chamber 3008, and therefore, the ink does not leak out.

As described hereinbefore, the ink chamber 3008 is an ink buffering chamber, and therefore, at the initial stage of the use, it is preferable that it is not filled with the ink. Therefore, in this embodiment, the ink chambers 3004, 3006 and 3007 are filled with the ink up to the limit, and the ink chamber 3008 is filled with the ink substantially to the limit, and thereafter, the ink is removed from the ink chamber 3008, thus assuring the buffering effect.

The ink container produced in this manner is loaded in an ink Jet recording apparatus, and the pressure reduction tests are carried out. As a result, it has been confirmed that there occurs no leakage, and the resultant record is of high quality and reliability.

As described in the foregoing with respect to Embodiments 14 and 15, there is provided an ink container cartridge having an ink supply chamber containing ink absorbing material having adjusted capillary force and one or more ink chambers for containing ink and in communication with the supply ink chamber, in which the absorbing material has been wetted with the ink, by which the ink does not leak out even if the ambient condition of the ink jet recording apparatus changes, when the recording material is carried out or not carried out. The ink used efficiency is high and the print quality is also high.

Embodiment 16

In the ink cartridge of the foregoing embodiments, when the supply ink chamber containing the ink absorbing material becomes empty, it is difficult to refill the container in some cases.

Figure 61:
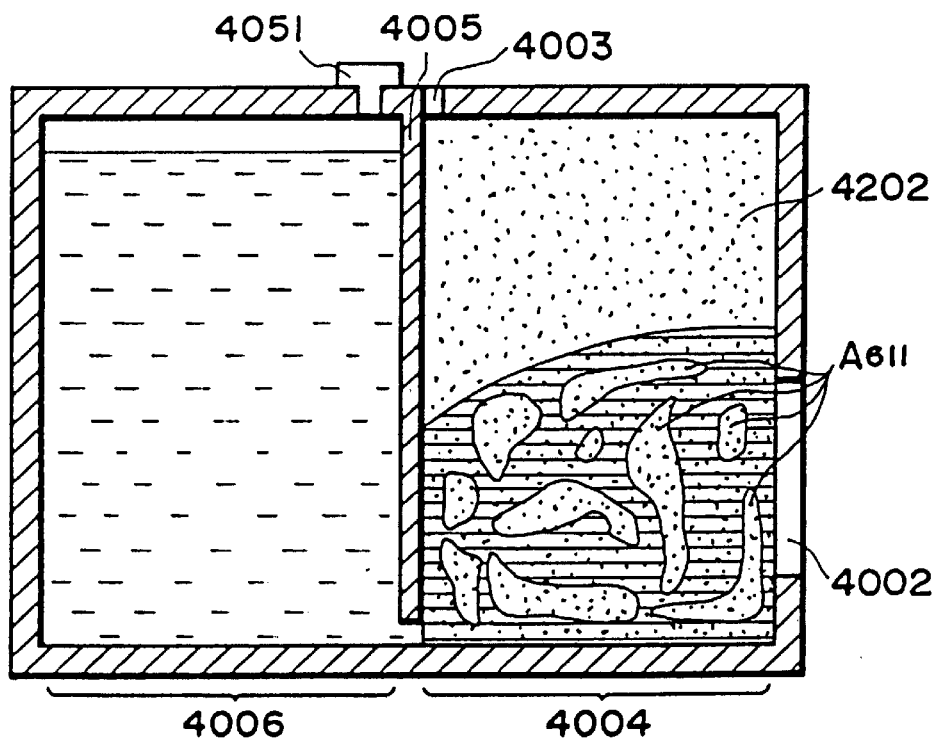
FIG. 61 illustrates the state in which the ink is reinfected after the ink in the ink chamber is used out.

FIG. 61 shows the situation in which the ink is going to be supplied (refill) into the ink container with which the ink in the supply ink chamber has been used up. Even if the ink is used up in the supply ink chamber (ink chamber 4004) after the ink in the ink chamber 4006 has been used up, a slight amount of ink remains in the absorbing material. The ink forms meniscuses in various portions of the absorbing material. When the ink is going to be supplied into the ink chamber 4006 not containing the absorbing material 4202, the meniscuses in the absorbing material in the ink chamber 4004 prevent dense filling of the ink therein. Rather, big bubbles remain, as indicated by A611. When such an ink container is Joined with the recording head, the ink flow is not sufficient because of the existence of the air bubbles in the absorbing material 4202 in the ink chamber 4004, and therefore, the ink flow easily stops.

In this case, the operator does not notice the emptiness of the ink chamber 4006 because the ink is contained in the absorbing material 4202 in the ink chamber 4004, and therefore, the recording operation is possible even after the ink is used up in the ink chamber 4006. The operator will become aware first that the ink has been used up from the ink chamber 4004 and the ink chamber 4006 only after the recording operation becomes not possible as a result of the complete consumption of the ink in the absorbing material 4202 in the ink chamber 4004. Even if the ink is refilled in the ink chamber 4006 of this state, the ink in the ink chamber 4006 does not in contact with the ink contained in the absorbing material in the ink chamber 4004, and therefore, it is not possible to supply the ink so that no bubble remains in the absorbing material 4202 in the ink chamber 4004. In order to solve this problem, the ink container comprises an ink supply chamber provided with an ink supply portion for the recording head, an air vent and ink absorbing material contained therein, at least one ink chamber in communication with the ink supply chamber and containing ink, and ink detecting means for detecting reduction of the remaining amount of the ink while a predetermined amount of the ink remains in the ink chamber.

The description will be made as to the means for detecting the remaining amount of the ink.

Figure 54:
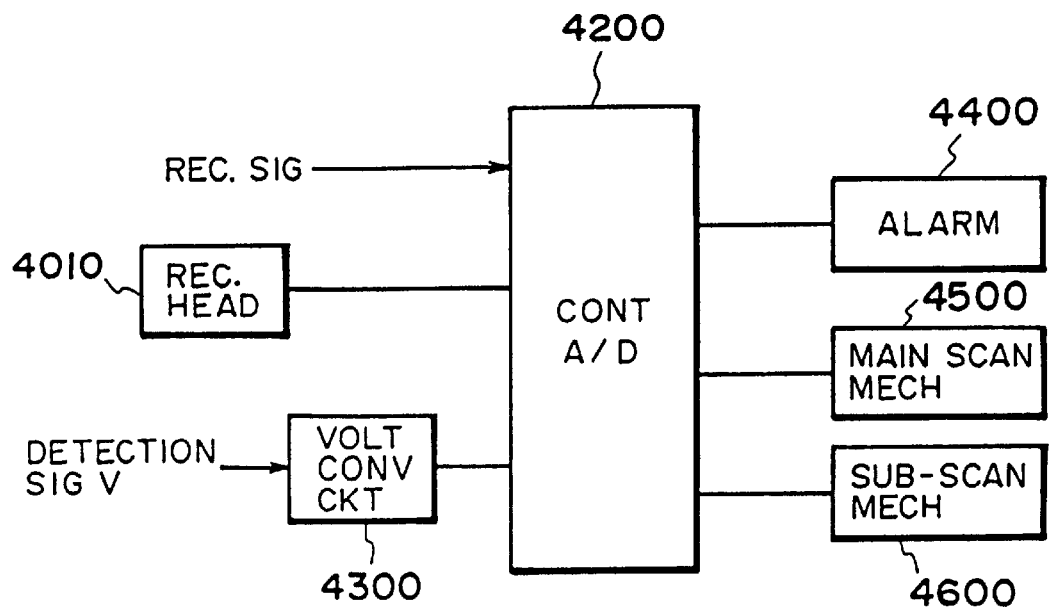
FIG. 54 is a block diagram showing an example of the control system for the apparatus.
Figure 66:
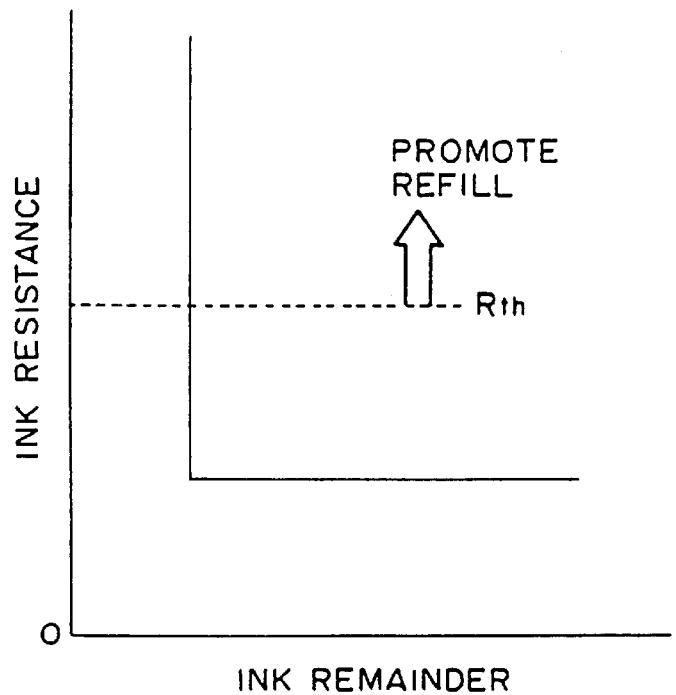
FIG. 66 shows a relationship between the remaining amount of the ink and the electric resistance between electrodes.

FIG. 54 shows an example of a control system according to this invention. It comprises a controller in the form of a microcomputer having a built-in A/D converter, a voltage converter 4300, an alarming device 4400. Designated by a reference numeral 4010 is a recording head. The alarming device may be in the form of an LED display or the like or tone producing means such as buzzer or the like, or in the form of combination thereof. A main scan mechanism 4500 for scanningly moving the carriage HC includes a motor or the like. A sub-scan mechanism 4600 includes a motor or the like for feeding the recording medium. Designated by a reference V is a remaining amount detection signal from the ink container. In this embodiment, the constant current flows between the two electrodes in the ink chamber 4006, and the remaining amount of the ink in the ink chamber 4006 is determined on the basis of the resistance between the two electrodes. In this case, there is a relationship a. shown in FIG. 66 between the remaining amount of the ink and the resistance between electrodes.

Figure 55:
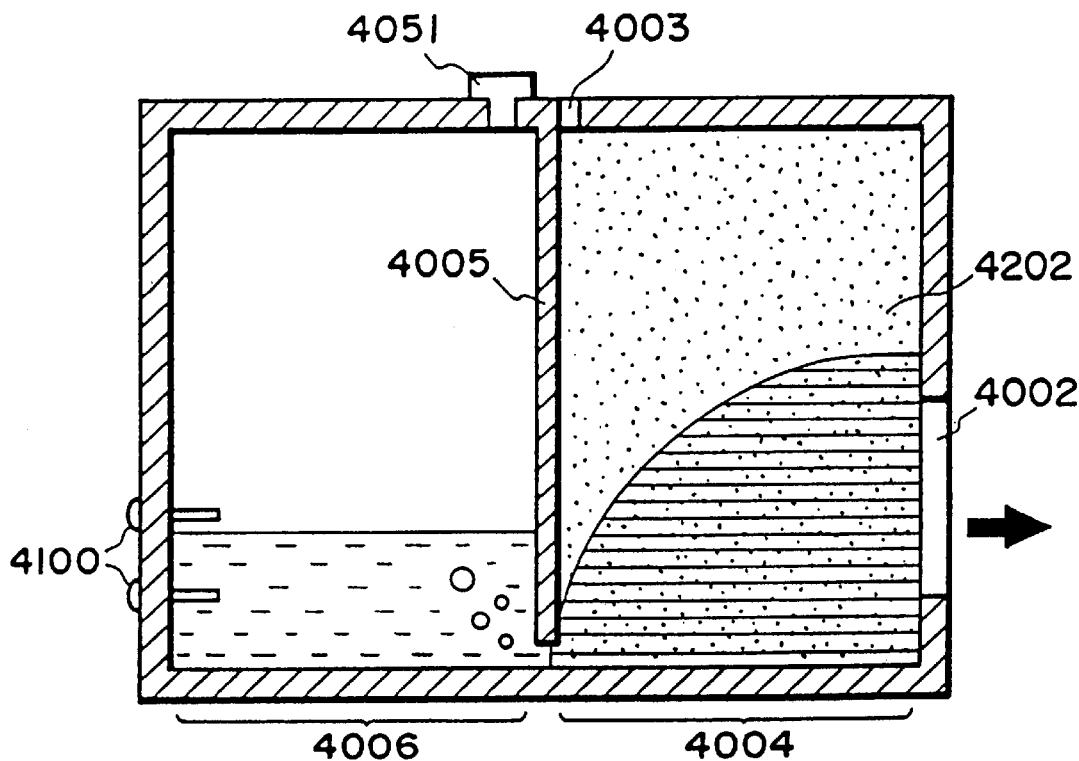
FIG. 55 shows the state when the remaining amount of the ink is detected, according to a further embodiment of the present invention.

As shown in FIG. 55, when the ink level in the ink chamber 4006 lowers to below the upper electrode of the two electrode 4100, the resistance between the two electrodes abruptly increases, and a corresponding voltage is produced between the electrodes. The voltage is supplied directly or through a voltage converter circuit 4300 to the A/D converter in the controller, and is A/D-converted thereby. When the measured value exceeds a predetermined level Rth, the necessity of the ink injection is informed of to the operator by actuating the warning device 4400. At this time, the operation of the main apparatus may be stopped, or the apparatus may be stopped after the current operation is completed.

Thus, the ink consumption is stopped while a small amount of the ink remains in the ink chamber 4006, and therefore, the ink can be refilled continuously in the absorbing material in the ink chamber 4004, and therefore, the ink container can be reused.

Figure 56:
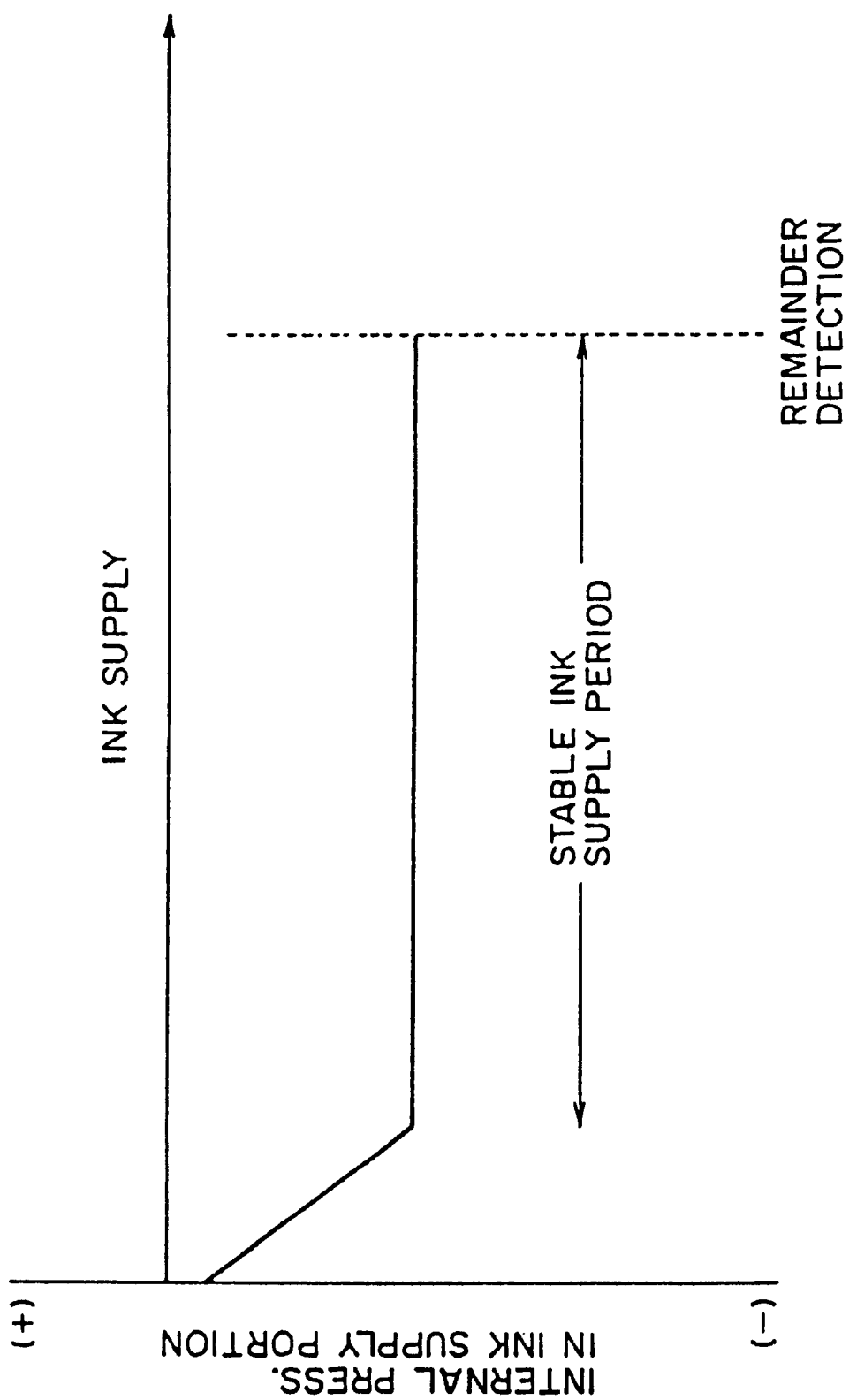
FIG. 56 illustrates the internal pressure of the ink supply portion in the container according to FIG. 55 embodiment.

FIG. 56 shows the change of the internal pressure at the ink supply portion of the exchangeable ink container according to this embodiment in accordance with the ink supply (consumption). At the initial stage, the internal pressure (negative pressure) is produced by the capillary force of the compressed ink absorbing material 4202 in the ink chamber 4004. However, with the reduction of the ink in the ink chamber 4004 by the consumption of the ink, the internal pressure by the capillary force gradually increases in accordance with the compression ratio distribution (pore distribution) in the compressed ink absorbing material 4202. When the ink is further consumed, the ink distribution in the ink chamber 4004 is stabilized, and the ink in the ink chamber 4006 starts to be consumed, and the air is introduced into the ink chamber 4006 in the manner described in the foregoing. Thus, substantially constant internal pressure is maintained. When the ink is further consumed to such an extent that a predetermined amount of the ink is consumed from the ink chamber 4006, the remaining amount detector operates, and the action of promoting ink refilling and stoppage of the printing operation, is carried out. By doing so, the refilling is possible before the ink is consumed from the ink chamber 4004 beyond a predetermined degree, and therefore, the ink can be refilled in the refillable state.

Figure 57:
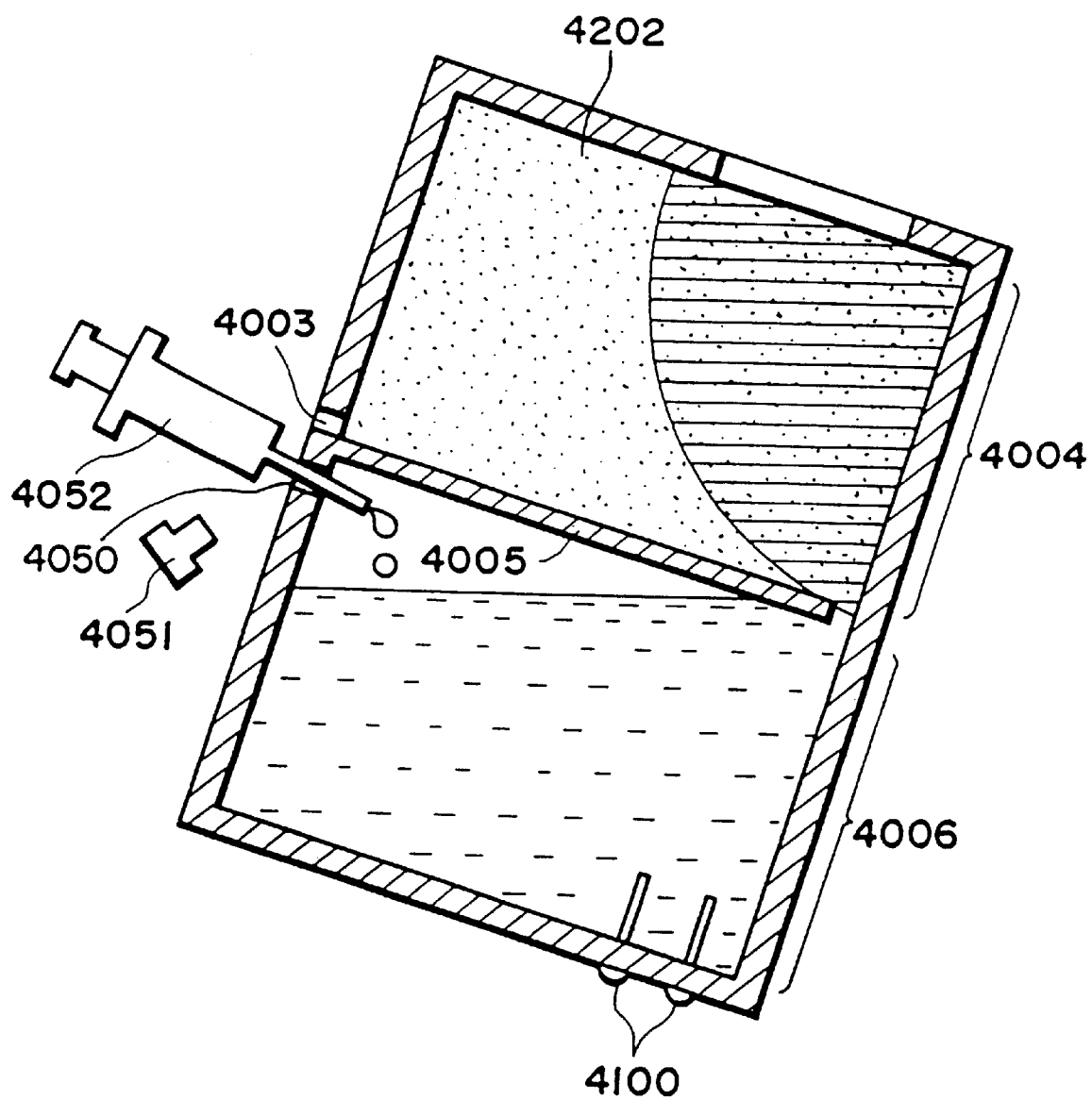
FIG. 57 shows an example of an ink refilling method.

As for the refilling method, as shown in FIG. 57, for example, an ink supply port 4005 of the ink chamber 4006 is unplugged, and the ink is injected into the ink chamber 4006 with a pipe 4052 or the like. After the injection, the supply port 4005 is plugged by a plug 4051. The refilling method is not limited to this, but another method is usable. The position of the ink supply port 4005 is not limited to that described above. Thus, the ink cartridge can be reused.

In the foregoing, the remaining amount of the ink is detected on the basis of the resistance between electrodes in the container. However, the method of detection is not limited to this type. Mechanical or optical detection method is usable.

In this embodiment, the ink container is an exchangeable type, but it may be an ink jet recording head cartridge having a recording head and an ink container as a unit.

Embodiment 17

Figure 58:
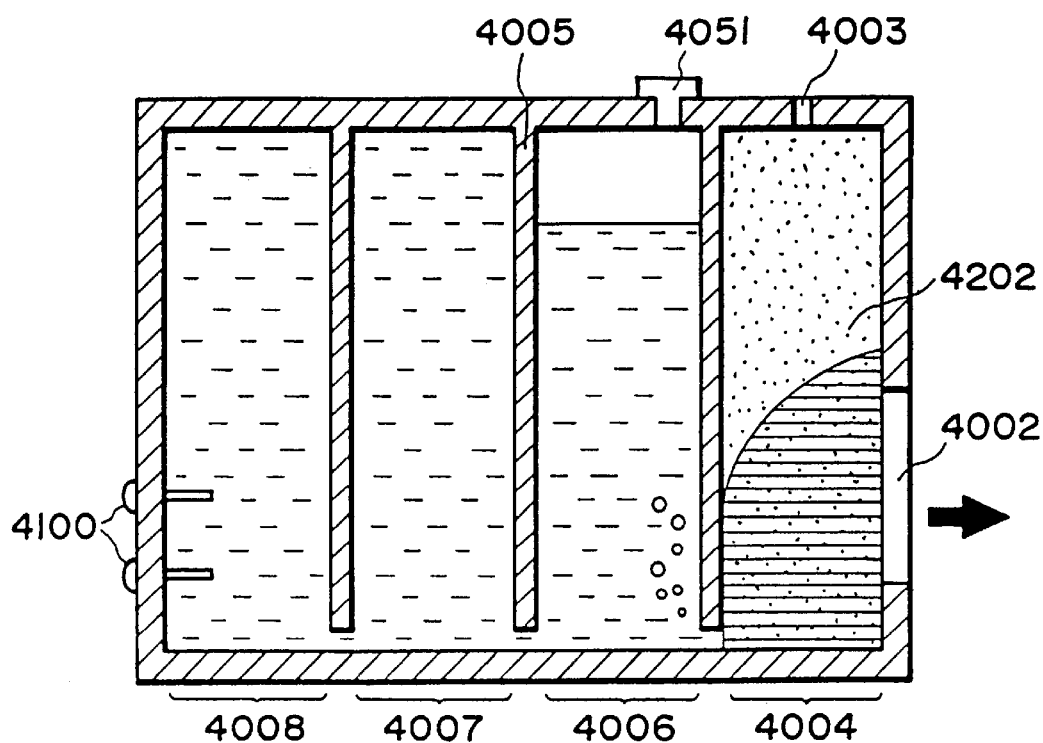
FIG. 58 illustrates ink consumption, according to a further embodiment of the present invention.
Figure 59:
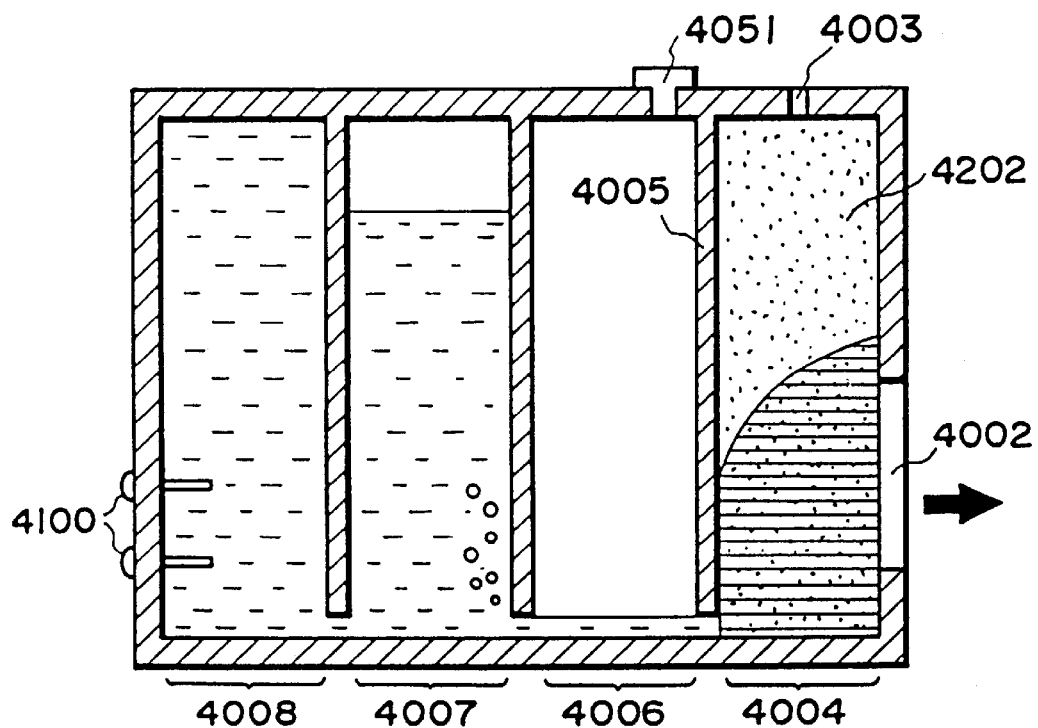
FIG. 59 illustrates a further ink consumption according to the embodiment of FIG. 58.
Figure 60:
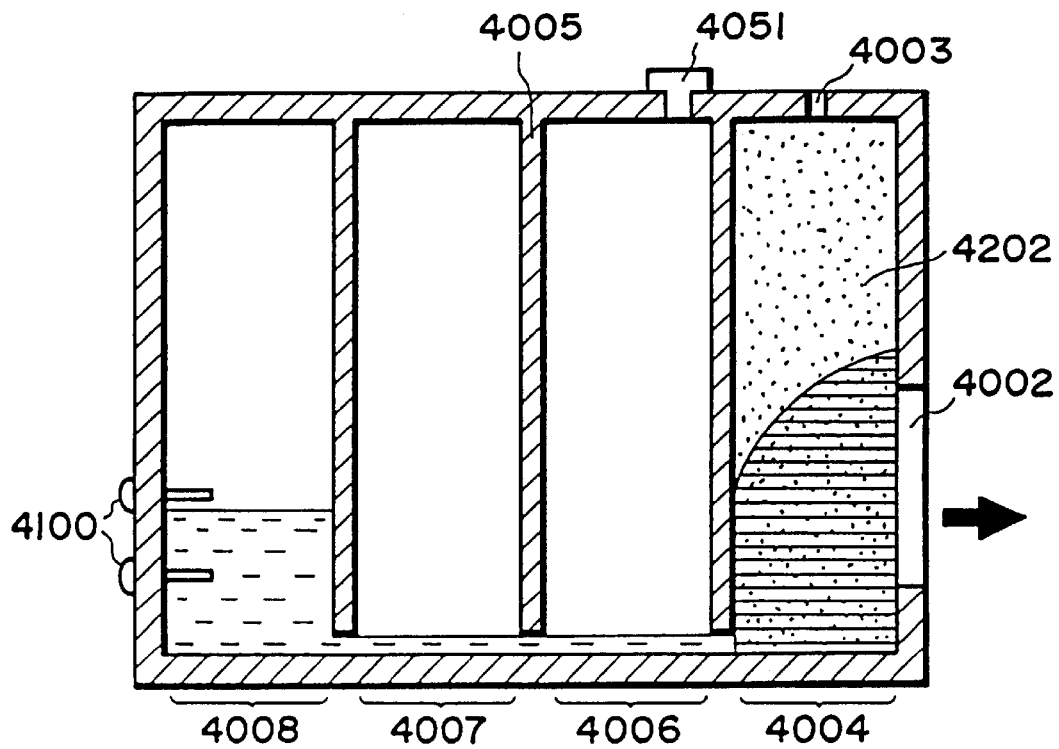
FIG. 60 shows the state in which the remaining amount of the ink is detected, in the device of the embodiment of FIG. 58.

Referring to FIGS. 58, 59 and 60, Embodiment 16 will be described. In fluid communication with the ink chamber 4006, two ink chambers 4007 and 4008 are provided. In this embodiment, the ink is consumed in the order of ink chamber 4006, ink chamber 4007 and the ink chamber 4008. In this embodiment, the ink chamber is divided into four parts, for the purpose of preventing the ink leakage when the ambient pressure reduces or the ambient temperature increases, as described with respect to embodiment 16. For example, when the airs in the ink chamber 4005 and the ink chamber 4007 expand in the state of FIG. 58, the expanded amount of the ink chamber 4006 is released through the air vent and through the ink chamber 4004. As shown in FIG. 59, the expanded amount in the ink chamber 4007 is released by the flow of the ink into the ink chamber 4006 and the ink chamber 4004. Thus, the ink chamber 4004 is provided with the buffering chamber function. Therefore, the ink retaining capacity of the compressed ink absorbing material 4202 in the ink chamber 4004 is determined in consideration of the leakage of the ink from one ink chamber.

In this case, the ink is consumed sequentially from the ink chamber 4006 and the ink chamber 4007. When the ink is consumed from the last ink chamber 4008, then the ink is consumed from the ink chamber 4004 containing the absorbing material up to the ink supply stops. In order to detect the remaining amount of the ink in the ink chamber 4008, there are provided electrode 4100 in the ink chamber 4008, as shown in FIG. 60. An ink injection port is formed in the ink chamber 4006. In this embodiment, the remaining amount of the ink is detected only in the ink chamber 4008, and therefore, the ink chamber 4006 and the ink chamber 4007 are capable of containing the ink to the all volume thereof except for the communicating part. If the electrodes are located at the same level as in Embodiment 16, the amount of the ink remaining in the ink chamber not containing the absorbing material at the time when the electrodes detect the limit, can be reduced, to permit efficient use of the space.

In this embodiment, similarly to Embodiment 16, the refilling is possible before the ink becomes insufficient in the ink chamber 4004 containing the absorbing material.

Embodiment 18

Figure 62A:
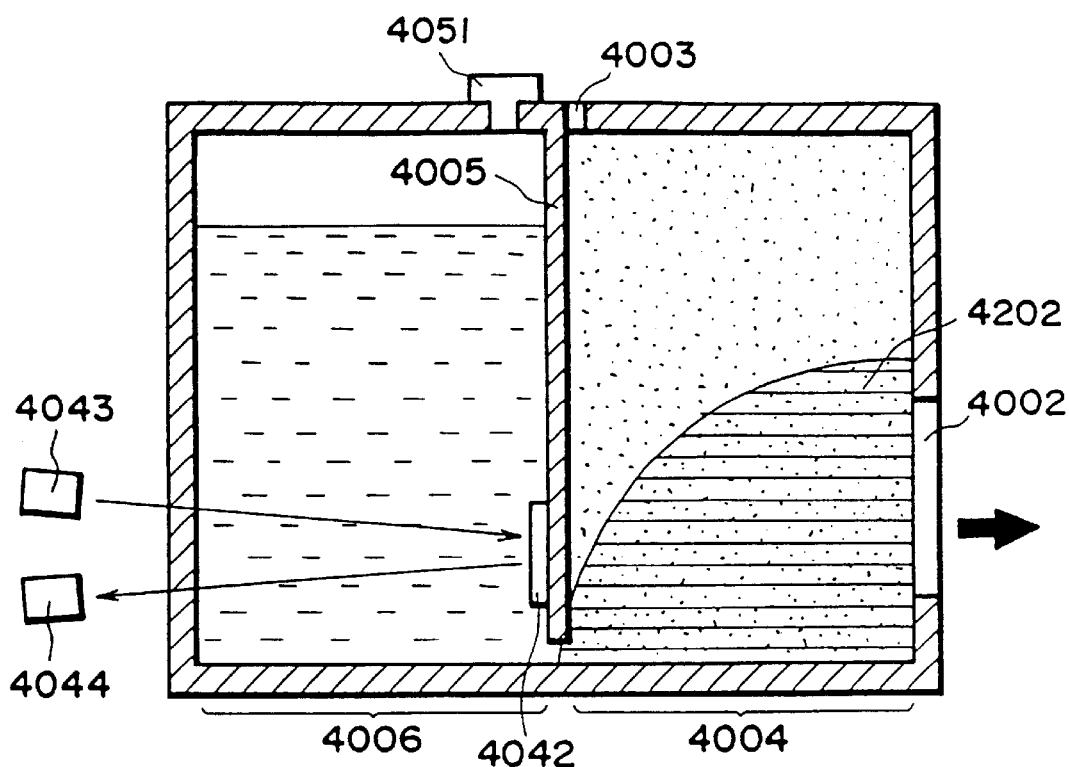
FIGS. 62A and 62B illustrate remaining ink amount detection, according to a further embodiment of the present invention.
Figure 62B:
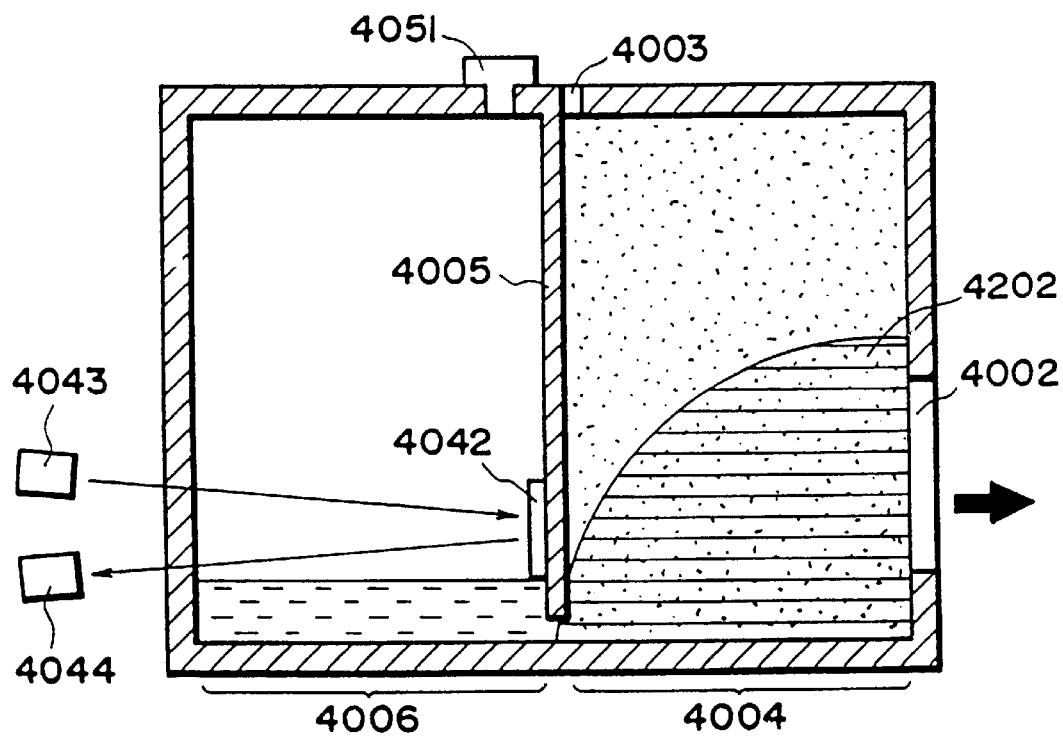

FIG. 62 shows embodiments 18, in which the wall of the ink container is of transparent or semi-transparent material, so that the remaining amount of he ink can be detected optically. In this case, a light reflecting plate 4002 such as mirror for reflecting the light is provided on the ink chamber wall in the ink chamber 4006 to reflect the light, and a photosensor comprising a light emitting element 4043 and a light receiving element 4044 is disposed outside the container. The light emitting element 4043 and the light receiving element 4044 may be provided on the carriage, or at the home position having the recovery system.

In FIG. 62, the light is emitted from the light emitting element 4043 at a predetermined angle, and the light is received by the light receiving element 4044 after it is reflected by the reflection plate. For example, the light emitting element 4043 is of LED element, and the light receiving element 4044 is a phototransistor or the like. In FIG. 62, (a), the ink is full substantially. In such a situation, the light emitted from the light emitting element 4043 is blocked by the ink in the ink chamber 4006, and therefore, the light receiving element 4044 does not receive the light, and therefore the output of the detector is small. However, the ink is consumed to the state shown in FIG. 62, (b), the light from the light emitting element 4043 is not blocked, and therefore, the output of the light receiving element becomes high. When the light energy (output of the detector) of the light receiving element 4044 exceeds a predetermined threshold, a warning signal for promoting the injection of the ink is produced.

Figure 63A:
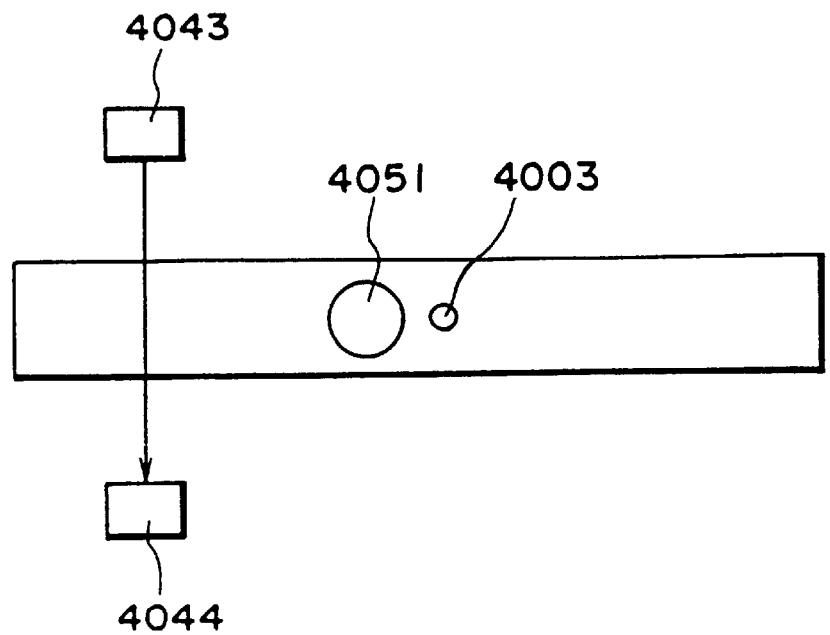
FIGS. 63A and B illustrate a modified ink remaining amount detection, in the embodiment of FIG. 62.
Figure 63B:
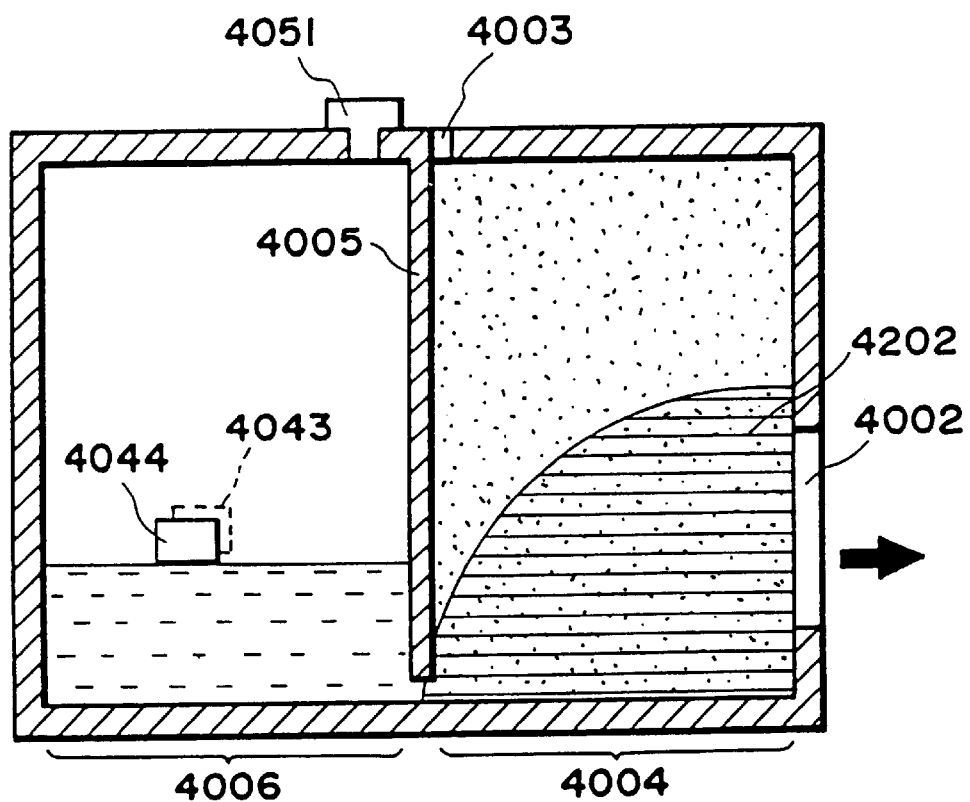

FIG. 63 shows a modified example in which the light emitting element and the light receiving element is opposed with the ink container therebetween. FIG. 63(a) is a top plan view, and FIG. 63(b) is a cross-sectional view. In this case, the material of the ink chamber 4006 is also transparent or semi-transparent. In this example, there is no need of using the reflection plate, and the detection sensitivity is better since the light is directly received.

In the foregoing, the description has been made with respect to a single ink container, but the present invention is applicable to ink containers for a color ink jet recording apparatus operable with a plurality of recording head for black, cyan, magenta and yellow color. Also, the present invention is usable with a single recording head capable of ejecting different color inks.

The threshold may be changed for the respective colors. A filter or the like may be used in accordance with the color of the ink to select a predetermined wavelength light, and the ink remaining amount may be detected on the basis of the transmissivity of the ink.

In the foregoing, the ink container is exchangeable. However, it is in the form of an ink jet head cartridge having integral recording head and the ink container.

Embodiment 19

Figure 64A:
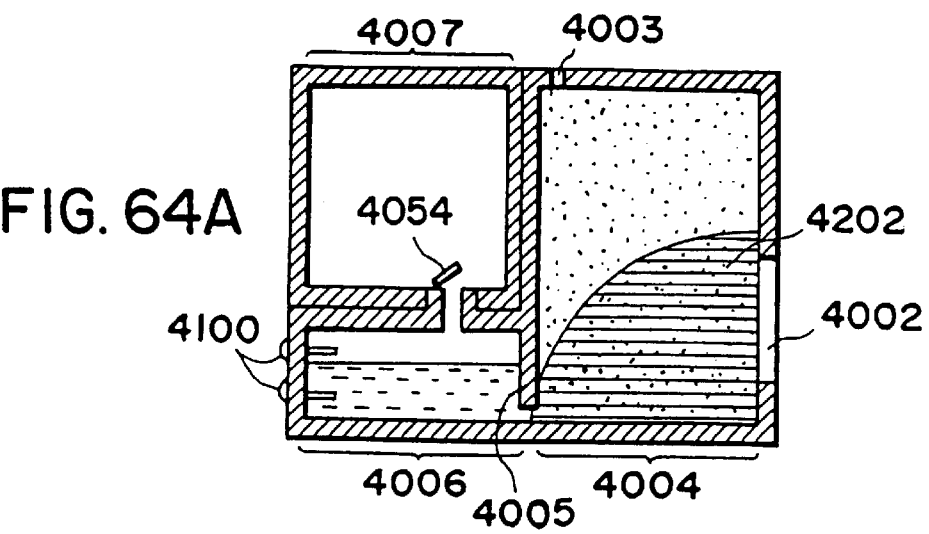
FIGS. 64A to 64C illustrate a method of ink refilling, according to a further embodiment of the present invention.
Figure 64B:
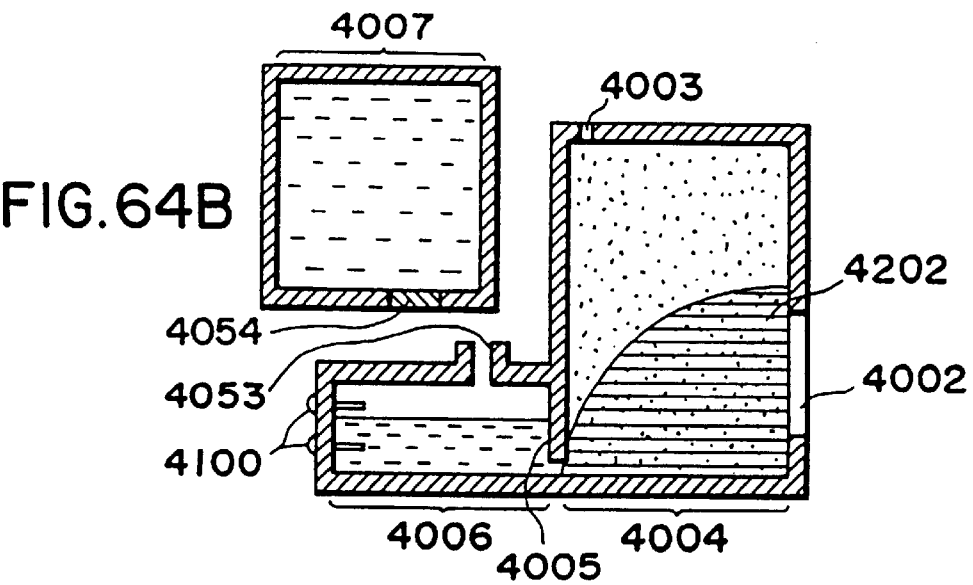
Figure 64C:
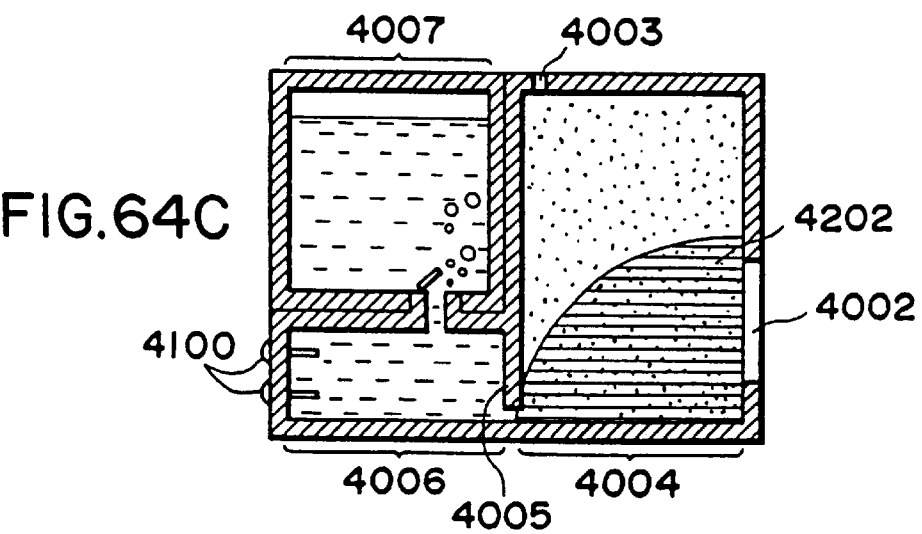

FIG. 64 shown Embodiment 19, in which the ink chamber 4006 in Embodiment 16 is divided into two parts, and one of them (ink chamber 4007) is exchangeable. FIG. 64, (a) shows the state in which the remaining amount detector is actuated as a result of the ink consumption. In this came, a fresh ink chamber 4007 is prepared, and replaces the ink chamber 4007. FIG. 64, (b) shows the state in which the used-up ink chamber 4007 in removed, and a full fresh ink container is going to be mounted. In FIG. 64, (c), the exchange has been completed. At this time, a plug 4052 at the bottom of the ink chamber C is tone by the injection port 4005 located at an upper position of the ink chamber 4006, so that the ink is supplied. By doing so, there is no need of using pipette or injector, and therefore, the operators fingers are not contaminated. It is possible that the ink chamber 4004 and the ink chamber 4006 remain connected, and therefore, the minimum part exchange is sufficient, and therefore, it is advantageous from the economical standpoint.

In Embodiment 19, the remaining amount detector is not limited to the type using the resistance between the electrodes. It may be an optical type as in Embodiment 18, or another type is usable. A further preferable ink remaining amount detecting method is to detect whether or not there is the ink liquid continuing through the communicating part between the ink chamber 4004 and the ink chamber 4006. As a structure for doing this, the electrodes 4100 may be disposed at the opposite sides of the communicating part between the ink chamber 4004 and the ink chamber 4006, respectively.

In this embodiment, the recording head and the ink container are separable. However, the recording head may be integral with the ink container including the ink chambers 4004 and 4006.

As described in the foregoing, according to Embodiments 16–19, there is provided an ink container provided with ink supply portion for the recording head and an air vent, which comprises an ink supply chamber containing the ink absorbing material, at least one ink chamber for containing the ink and communicating with the ink supply chamber, in which the insufficiency of the ink is detected while a predetermined amount of the ink remains in the ink chamber, and the result of the detection is notified to the operator. Then, the recording operation can be stopped so as to permit the ink chamber to be refilled with the ink, so that the ink container can be reused.

The inventors have investigated the property of the ink suitably usable with the ink containers of the foregoing embodiments. The preferable ink shows the stability of the air-liquid exchange portion against the vibration of the ink, and it is stabilized against the ambient condition change.

The description will be made such inks suitably usable with the ink containers of the foregoing embodiments.

The fundamental structure of the ink includes at least water, coloring material and water-soluble organic solvent. The organic solvent is low volatile and low viscosity material having high compatibility with water. The following is examples: amides such as dimethylformamide and dimethyl-acetoamide, ketones such as acetone, ethers such as tetrahydrofuran and dioxane, polyalkylene glycols such as polyethylene glycol and polypropylene glycol, alkylene glycols such as ethylene glycol, propylene glycol, butylene glycol, triethylene glycol, thiodiglycol, hexylene glycol and diethylene glycol, lower alkyl ethers of polyhydric alcohols such as ethylene glycol methyl ether, diethylene glycol monomethyl ether and triethylene glycol monomethyl ether, monohydric alcohols such as ethanol and isopropyl alcohol, and besides, glycerol, 1,2,6-hexanetriol, N-methyl-2-pycrolidone, 1,3-dimethyl-2-imidazolidinone, triethanolamine, sulfolane and dimethyl sulfoside. No particular limitation is imposed on the content of the water-soluble organic solvent. However, it may preferably be within a range of from 1 to 80% by weight. The coloring material usable with this invention may be a dye or a pigment. The dye may preferably be water-soluble acid dye, direct color, basic dye, reactive dye or the like. The content of the dye is not particularly limited, but 0.1–20% by weight on the basis of the ink total weight is preferable.

Use of surfactant is desirable to adjust the surface tension. Examples of such a surfactant used include anionic surfactants such as fatty acid salts, higher alcohol sulfuric ester salts, alkylbenzene-sulfonates and higher alcohol phosphoric ester salts, cationic surfactants such as aliphatic amine salts and quaternary ammonium salts, nonionic surfactants such as ethylene oxide adducts of higher alcohols, ethylene oxide adducts of alkylphenols, aliphatic ethylene oxide adducts, ethylene oxide adducts of higher alcohol fatty acid esters, ethylene oxide adducts of higher alkyl amines, ethylene oxide adducts of fatty acid amides, ethylene oxide adducts of polypropylene glycol, higher alcohol fatty acid esters of polyhydric alcohols and alkanolamine fatty acid amides, and amino acid- and betaine-type amphoteric surfactants. No particular limitation is imposed on such a surfactant. However, nonionic surfactants such as ethylene oxide adducts of higher alcohols, ethylene oxide adducts of alkylphenols, ethylene oxide-propylene oxide copolymers, ethylene oxide adducts of acetylene glycol are preferably used. Further, it is particularly preferred that the number of moles of added ethylene oxide in the ethylene oxide abducts should be within a range of from 4 to 20. No particular limitation is imposed on the amount of the surfactant to be added. However, it may preferably be within a range of from 0.01 to 10% by weight. The surface tension may be controlled by the above-described water-solubleorganic solvent.

In addition to the above components, the first liquid may contain additives such as viscosity modifiers, pH adjusters, mildewproofing agents or antioxidants, as needed.

The viscosity of the ink is 1–20 cp. The surface tension should be 20 dyne/cm-55 dyne/cm. Further preferably, it is 25–50 dyne/cm. If the surface tension of the ink is within this range, it does not occur that the meniscus of the recording head orifice is broken and but the ink is leaked out from the head orifice when the printing operation is not carried out.

The quantity of the ink contained in the ink cartridge may be properly determined up to the limit of its inside volume. In order to maintain the vacuum immediately after the ink cartridge is unpacked, the ink may be filled to its limits. However, the quantity of the ink in the vacuum producing material may be lower than the ink retaining capacity of the vacuum producing material. Here, the ink retaining capacity is the amount of the ink capable of being retained in the individual material.

The inks according to the embodiments of the present invention and the comparison example will be described.

A mixture of water and water-soluble organic solvent is stirred with a dye for four hours, and thereafter, a surfactant is added thereto. Then, it is passed through a filter to remove foreign matters. The ink has been supplied in the ink cartridge of FIG. 11, and the recording operation is carried out in the recording apparatus of FIG. 12.

The following is composition, nature of the ink and the result of record.

|  | Ex. 1 | Ex. 2 | Ex. 3 | Ex. 4 |
|---|---|---|---|---|
| diethylene glycol | 15% | 10% | 10% | 10% |
| cyclohexanol |  |  |  | 2% |
| glycerol |  | 5% |  |  |
| thiodiglycol |  |  | 5% | 5% |
| SURFRON S-145 (fluorinated surfactant) |  | 0.1% |  |  |
| ACETYLENOL EH (acethylene glycol-ethylene oxide adducts) | 2% |  |  |  |
| dyestuff | 2.5% | 2.5% | 0.2% | 2.5% |
| water | rest | rest | rest | rest |
| [surface tension] | [31 dyne/com] | [25 dyne/com] | [40 dyne/com] | [40 dyne/com] |

Clear color images have been recorded, and the ink in the cartridge has been used up without trouble, for all of Examples 1–4.

|  | Comp. Ex. 1 | Comp. Ex. 2 |
|---|---|---|
| diethylene glycol | 15% |  |
| glycerol |  | 5% |
| thiodiglycol |  | 5% |
| SURFRON S-145 (fluorinated surfactant) | 0.1% |  |
| ACETYLENOL EH |  |  |

-continued

|  | Comp. Ex. 1 | Comp. Ex. 2 |
|---|---|---|
| (acethylene glycol-ethylene oxide adducts) |  |  |
| dyestuff | 2.5% | 2.5% |
| water | rest | rest |
| [surface tension] | 17.6 dyne/com | 57.4 dyne/com |
|  | Clear color images has been formed. The ink from the head by small input. | Bleeding has occurred between colors. The ink has dropped out from the head by small impact. |

The yellow dye was Acid Yellow 23, the cyan dye was Acid Blue 9, the magenta dye was Acid Red 289, and the black dye was Direct Black 168.

The surface tension was measured at 25° C. through Wilhelmy method.

The following is the surface potential at 20–25° C. of typical water-soluble organic solvents: Ethanol (22 dyne/cm), isopropanol (22 dyne/cm), cyclohexanol (34 dyne/cm), glycerin (63 dyne/cm), diethyleneglycol (49 dyne/cm), diethyleneglycol monomethylether (35 dyne/cm), triethyleneglycol (35 dyne/cm), 2-pyrrolidone (47 dyne/cm), N-methylpyrrolidone (41 dyne/cm).

The desirable surface tension can be provided by mixture with water.

The method of controlling the ink surface tension using surfactant will be described.

For example, 28 dyne/cm of the surface tension can be provided by addition of 1% of sorbitan monolaurate ester on the basis of water; 35 dyne/cm can be provided by addition of 1% of polyoxyethylene-sorbitan monolaurate ester; 28 dyne/cm can be provided by addition of not less than 1% of ACETYLENOL EH (acetylene glycol-ethylene oxide adducts). If a lower surface tension is desired, 17 dyne/cm is provided by addition of 0.1% of SURFLONS-145 (perfluoroalkyl-ethylene oxide adducts) (available from Asahi Glass Kabushiki Kaisha, Japan). The surface tension lightly varies by another additive, and therefore, proper adjustment can be done by skilled in the art.

As described in the foregoing, the ink buffer is designed in consideration of the maximum leaking ink quantity. It has been found that the ink buffering effect is significantly influenced by the composition of the ink.

The following is a comparison example.

| Comp. Ex. 3 | |
|---|---|
| dye | 4 parts |
| glycerol | 7.5 parts |
| thiodiglycol | 7.5 parts |
| urea | 7.5 parts |
| pure water | 73.5 parts |

When the ink is pushed from the ink chamber 3006 into the ink chamber 3004 due to the expansion of the air in the ink chamber 3006 due to the pressure reduction or temperature rise, as shown in FIG. 46, the problem occurs that the ink is not absorbed by the absorbing material and is leaked through the air vent 3003 or the like through the clearance between the container wall and the absorbing material.

The ink for the ink jet recording containing surfactant has been proposed. The ink is advantageous in that the fixing property is very good for a copy sheet, bond sheet or another plain paper, that in proper color mixing (bleed or the like) does not occur even when different color ink recording regions are close in the color recording, and therefore, uniform coloring is possible. The following is an example of the composition:

| Ex. 5 | |
|---|---|
| dye | 4 parts |
| glycerol | 7.5 parts |
| thiodiglycol | 7.5 parts |
| acetylene glycol-ethyl oxide adducts (M + N = 10) | 5 parts |
| urea | 7.5 parts |
| pure water | 68.5 parts |

When such an ink used, the ink does not leak out of the ink cartridge because the ink is absorbed by the absorbing material 2003 in the ink chamber 2004 when the ink is pushed out of the ink chamber 2006 into the ink chamber 2004 due to the expansion of the air in the ink chamber 2006 due to the temperature rise or the pressure reduction in the atmosphere, as shown in FIG. 34.

As described hereinbefore, the air-liquid interface of the ink in the ink chamber 2004 when the ink is supplied from the ink chamber 2006, is maintained at a height where the static head from the ejection part of the recording head, the vacuum in the ink chamber 2006 and the capillary force of the compressed ink absorbing material. It is assumed that the average ink height of the air-liquid interface in the ink chamber 2004 at this time is H. When the ink is flowed out from the ink chamber 2006 due to the atmospheric pressure reduction or temperature rise, the height of the air-liquid interface of the ink chamber 2004 is desirably maintained further higher by h. In an example of this embodiment, the total height in the ink chamber is 3 cm, the ink chamber 2004 and the ink chamber 2006 have the volume of 6 cc, respectively. At the time of the initial stage, the ink chamber 2006 is completely filled (6 cc), and the ink chamber 2004 containing the compressed absorbing material 2003 (polyurethane foamed material) contains 4 cc ink (ink total: 10 cc). The porosity of the absorbing material is not less than 95%, and if it is assumed that the ink is completely contained in the all of the pores of the absorbing material, the ink chamber 2004 is capable of containing approx. 6 cc. The ink is first consumed from the ink chamber 2004, and a while after, the ink starts to be consumed from the ink chamber 2006. The air-liquid interface of the ink chamber 2004 is maintained at the level where the static head of the ejection part of the recording head, the vacuum in the ink chamber 2006 and the capillary force of the compressed ink absorbing material are balanced. On the average, the level of the air-liquid interface at this time is approx. 1.5 cm. If it is assumed that all of the pores of the absorbing material contain the ink, the quantity of the ink in the ink chamber 2004 is approx. 3 cc. Here, the maximum pressure reduction of the atmosphere is 0.7 atom, 1.8 cc of the ink which is approx. 30% of the volume of the ink chamber 2006, can be overflowed. Therefore, the ink chamber 2004 preferably absorbs and retains approx. 3 cc+1.8 cc (ink level of approx. 2.4 cm). When the maximum reduced pressure 0.5 atom, 3 cc of the ink which is approx. 50% of the volume of the ink chamber 2006 can be overflowed, and therefore, the ink chamber 2004 can absorb and retain approx. 3 cc+3 cc (ink liquid surface height of approx. 3 cm). Therefore, the ink chamber 2004 has a enough volume to contain the volume of the absorbing material, the volume of the ink retained in the ink chamber 2004 and the volume of the ink overflowed from the ink chamber 2006. Therefore, the volume of the ink chamber 2004 is influenced by the estimation of the ink overflow volume from the ink chamber 2006.

The retaining ink height H of the porous absorbing material is generally expressed by capillary force equation, as follows:

$$H = 2\gamma \cos\theta / \rho g r$$

where ρ is the surface tension of the ink, θ is the contact angle between the ink and the ink absorbing material, ρ is the density of the ink, g is the force of gravity, and r is an average pore radius of the ink absorbing material.

It will be understood that in order to increase the ink retention capacity by increasing the height H, it is considered that the surface tension of the ink is increased, or the contact angle between the ink and the ink absorbing material is decreased (cos θ is increased).

As regards the increase of the ink surface tension, the ink of comparison example 3 as a relatively high surface tension (50 dyne/cm). However, as described hereinbefore, the ink has not been absorbed properly by the ink absorbing material. As regards the reduction of the contact angle 6 between the ink and the ink absorbing material, it means to increase the wettability of the ink to the absorbing material. In order to accomplish this, surfactant is used.

In the case of Example 5 ink, the surface tension is small (30 dyne/cm$_2$) because of the addition of the surfactant, but the wettability between the absorbing material and the ink is improved. By doing so, it is more effective to improve the wettability of the ink latter than increasing the surface tension in order to improve the permeability.

For the purpose of comparison in the ink permeability, the compressed absorbing material (polyurethane foam material) is immersed in the Comparison Example 3 ink and the Example 5 ink, and the height of ink absorption was measured. The Comparison Example 3 ink hardly absorbed the ink (several mm), whereas the Example 5 ink was absorbed to the height of not less than 2 cm. It will be understood that the ink having the improved permeability by containing the surfactant, as in the case of Example 5, the ink can be sufficiently absorbed even when the ink is overflowed from the ink chamber due to the pressure reduction or temperature rise.

The preferable penetrating agents include anion surfactant such as OT type aerosol, sodium dodecylbenzenesulfonate, sodium laurylsulfate, higher alcohol-ethylene oxide adducts represented by general Formula [1], alkylphenol-ethylene oxide adducts represented by general Formula [2], ethylene oxide-propylene oxide copolymer represented by general Formula [3] and acetylene glycol-ethylene oxide adducts represented by general Formula [4].

The anion surfactant has stronger foam producing tendency, and is poorer in the bleeding, color uniformity and feathering or the like than the nonionic surfactant, the following nonionic surfactant represented by the following formula is used.

Here, n is preferably 6–14, and R preferably has 5–26 carbon atoms, in Formula [1] and [2]; m+n is preferably 6–14 in Formulas [3] and [4].

  [2]

where R is alkyl,

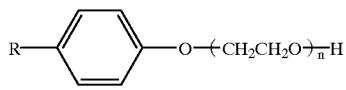  [2]

where R is alkyl,

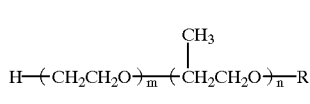  [3]

where R is hydrogen or alkyl,

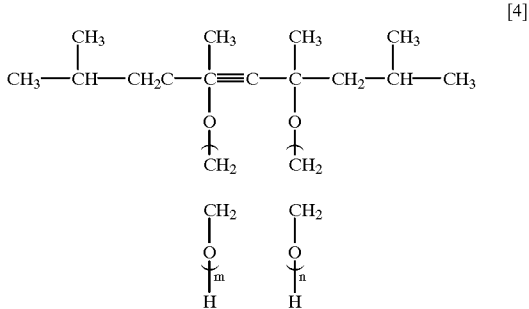  [4]

where m and n are respectively an integer.

Among the ethylene oxide nonionic surfactants, acetylene glycol-ethylene oxide adducts are preferable from the standpoint of absorption in the ink absorbing material, image quality on the recording material and ejection performance in total. The hydrophilic property and penetrating property can be controlled by changing number m+n of ethylene oxides to be added. If it is smaller than 6, the penetrating property is good, water solution nature is not good, and therefore, the Volubility in water is not good. If it is too large, the hydrophilic property is too strong, and the penetrating property is too small. If it is larger than 14, the penetrating property is insufficient, and the ejection property is deteriorated. Therefore it is preferably 6–14.

The amount of the nonionic surfactant is preferably 0.1–20% by weight. If it is lower than 0.1%, the image quality and the penetrating property is not sufficient. If it is larger than 20%, no improvement is expected, and the cost increases, and the reliability decreases.

One or more of the above described surfactant are usable in combination.

The ink may contain dye, low volatile organic solvent such as polyhydric alcohols to prevent clogging, or organic-solvent such as alcohols to improve bubble creation stability and fixing property on the recording material.

The water-soluble organic solvents constituting the ink of the embodiment may include polyalkylene glycols such as polyethylene glycol, and polypropylene glycol; alkylene glycols having 2 to 6 carbon atoms such as ethylene glycol, propylene glycol, butylene glycol, triethylene glycol, 1,2,6-hexanetriol, hexylene glycol, and diethylene glycol; glycerin; lower alkyl ether of polyhydric alcohols such as ethylene glycol methyl ether, diethylene glycol methyl (or ethyl) ether, and triethylene glycol monomethyl (or ethyl) ether; alcohols such as methyl alcohol, ethyl alcohol, n-propyl alcohol, isopropyl alcohol, n-butyl alcohol, secbutyl alcohol, t-butyl alcohol, isobutyl alcohol, benzyl alcohol, and cyclohexanol; amides such as dimethylformamide, and dimethylacetamide; ketones and ketone alcohols such as acetone, and diacetone alcohol; ethers such as tetrahydrofuran, and diosane; and nitrogen-containing cyclics such as N-methyl-2-pyrrolidone, 2-pyrrolidone, 1,3-dimethyl-2-imidazolidinone.

The water soluble organic solvent can be added without deteriorating the image quality or the ejection reliability. Preferably, it is polyhydric alcohols or alkyl ether of polyhydric alcohols. The content thereof is preferably 1–3% by weight. And, the pure water content is 50–90% by weight.

The dyes usable with the present invention include direct dyes, acid dyes, reactive dyes, dispersive dyes, vat dyes or the like. The content of the dye is determined depending on the kinds of the liquid components and the required properties of the ink, the ejection volume of the recording head or the like. Generally, however, it is 0.5–15% by weight, preferably 1–7% by weight.

By addition of the thioglycol or urea (or derivatives thereof) in the ink, the ejection property and the clog (solidification) preventing property is remarkably improved. This is considered to be because the solubility of the dye in the ink is improved. The content of the thioglycol or urea (or the derivatives thereof) is preferably 1–3%, and may be added as desired.

The main constituents of the ink of the present first invention are described above. Other additives may be incorporated provided that the objects of the invention are achievable. The additive includes viscosity-adjusting agents such as polyvinyl alcohol, celluloses, and water-soluble resins; pH-controlling agents such as diethanolamine, triethanolamine, and buffer solutions; fungicides and so forth. To the ink of electrically chargeable type used for ink-jet recording in which the ink droplets are charged, a resistivity-adjusting agent is added such as lithium chloride, ammonium chloride, and sodium chloride.

A comparison example will be explained.

| Comp. Ex. 4 | |
|---|---|
| dye | 3 parts |
| diethyleneglycol | 5 parts |
| thiodiglycol | 5 parts |
| ethyl alcohol | 3 parts |
| pure water | 84 parts |

In this case, when the ink is overflowed from the ink container to the absorbing material container chamber due to the expansion of the Air in the ink container due to the atmospheric pressure reduction or the temperature rise, the problem arises that the ink leaks out through the air vent or the ink supply portion by way of the clearance between the container wall and the absorbing material.

An ink for an ink jet recording apparatus containing a surfactant has been proposed. Such an ink is advantageous in that the fixing speed is very high for a copy sheet, bond sheet or another plain sheet paper, and that improper color mixture (bleed or the like), even if different color record region are contacted, and therefore, uniform coloring can be accomplished. Following is an examples of such an ink.

| Comp. Ex. 6 | |
|---|---|
| dye | 3 parts |
| glycerol | 5 parts |
| Thioglycol | 5 parts |
| ethylene oxide-propylene oxide copolymer | 3 parts |
| urea | 5 parts |
| pure water | 79 parts |

When this ink is used, the is absorbed by the absorbing material in the absorbing material container and does not leak out even when the ink is overflowed from the ink chamber into the absorbing material container due to the expansion of the air in the ink chamber due to the atmospheric pressure reduction or temperature increase.

As described in the foregoing, there is provided an ink cartridge comprising supply ink chamber containing an ink absorbing material having an adjusted capillary force and one or more ink chambers, wherein the ink contains non-ionic surfactant, by which the ink does not leak out even if the ambient condition change occurs, during recording operation or when the recording operation is not carried out, and therefore, the ink use efficiency is high.

The above-described Embodiments 1–13, are advantageous respectively, however the combination thereof is further advantageous. Further in addition, the combination of the process in the Embodiments 14 and 15, and the structure with Embodiments 16–19 and the above-described ink, is further preferable.

The present invention is usable with any ink jet apparatus, such as those using electromechanical converter such as piezoelectric element, but is particularly suitably usable in an ink Jet recording head and recording apparatus wherein thermal energy by an electrothermal transducer, laser beam or the like is used to cause a change of state of the ink to eject or discharge the ink. This is because the high density of the picture elements and the high resolution of the recording are possible.

The typical structure and the operational principle are preferably the ones disclosed in U.S. Pat. Nos. 4,723,129 and 4,740,796. The principle and structure are applicable to a so-called on-demand type recording system and a continuous type recording system.

Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals.

By the production, development and contraction of the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 123670/1984 wherein a common slit is used as the ejection outlet for plural electrothermal transducers, and to the structure disclosed in Japanese Laid-Open Patent Application No. 138461/1984 wherein an opening for absorbing pressure wave of the thermal energy in formed corresponding to the ejecting portion. This is because the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head and plural recording head combined to cover the maximum width.

In addition, the present invention is applicable to a serial type recording head wherein the recording head is f iced on the main assembly, to a replaceable chip type recording head which is connected electrically with the main apparatus and can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. As for such means, there are capping means for the recording head, cleaning means therefor, pressing or sucking means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a mingle corresponding to a single color ink, or may be plural corresponding to the plurality of ink materials having different recording color or density. The present invention is effectively applicable to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiments, the ink has been liquid. It may be, however, an ink material which is solidified below the room temperature but liquefied at the room temperature. Since the ink is controlled within the temperature not lower than 30° C. and not higher than 70° C. to stabilize the viscosity of the ink to provide the stabilized ejection in usual recording apparatus of this type, the ink may be such that it is liquid within the temperature range when the recording signal is the present invention is applicable to other types of ink. In one of them, the temperature rise due to the thermal energy is positively prevented by consuming it for the state change of the ink from the solid state to the liquid state. Another ink material is solidified when it is left, to prevent the evaporation of the ink. In either of the cases, the application of the recording signal producing thermal energy, the ink is liquefied, and the liquefied ink may be ejected. Another ink material may start to be solidified at the time when it reaches the recording material. The present invention is also applicable to such an ink material as is liquefied by the application of the thermal energy. Such an ink material may be retained as a liquid or solid material in through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective one for the ink materials described above is the film boiling system.

The ink jet recording apparatus may be used as an output terminal of an information processing apparatus such as computer or the like, as a copying apparatus combined with an image reader or the like, or as a facsimile machine having information sending and receiving functions.

Embodiment 20

A further embodiment of the present invention will be described. Note that the "negative pressure" as referred to in the present invention is a back pressure applied to an ink jet head unit (hereinafter also referred to as a recording head unit) in a direction of the ink supply, by which the water head at an ink discharge portion provided on the ink jet head unit is made lower than the atmospheric pressure.

Figure 67A:
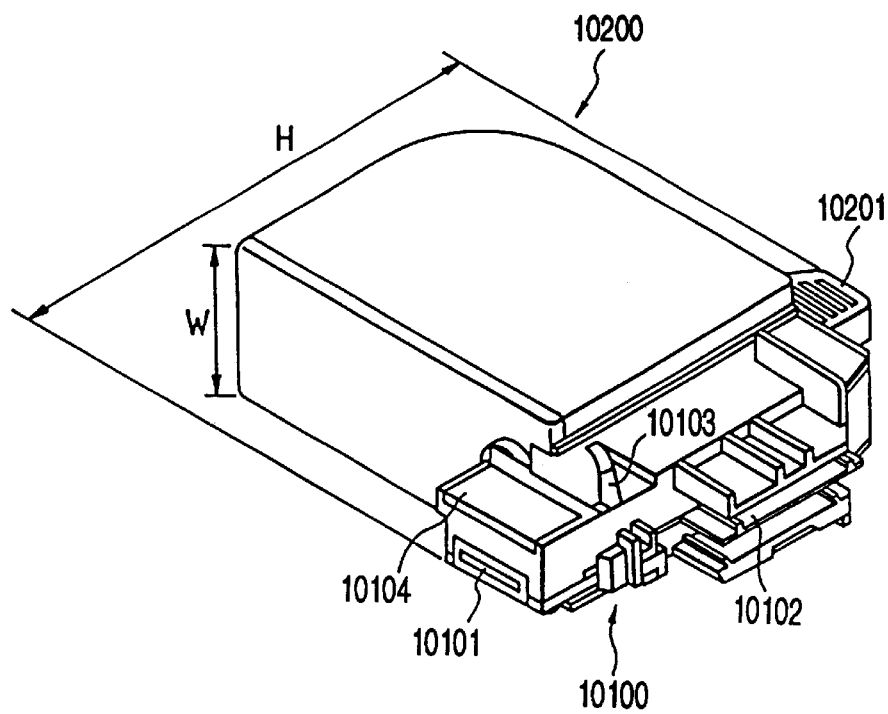
Figure 67B:
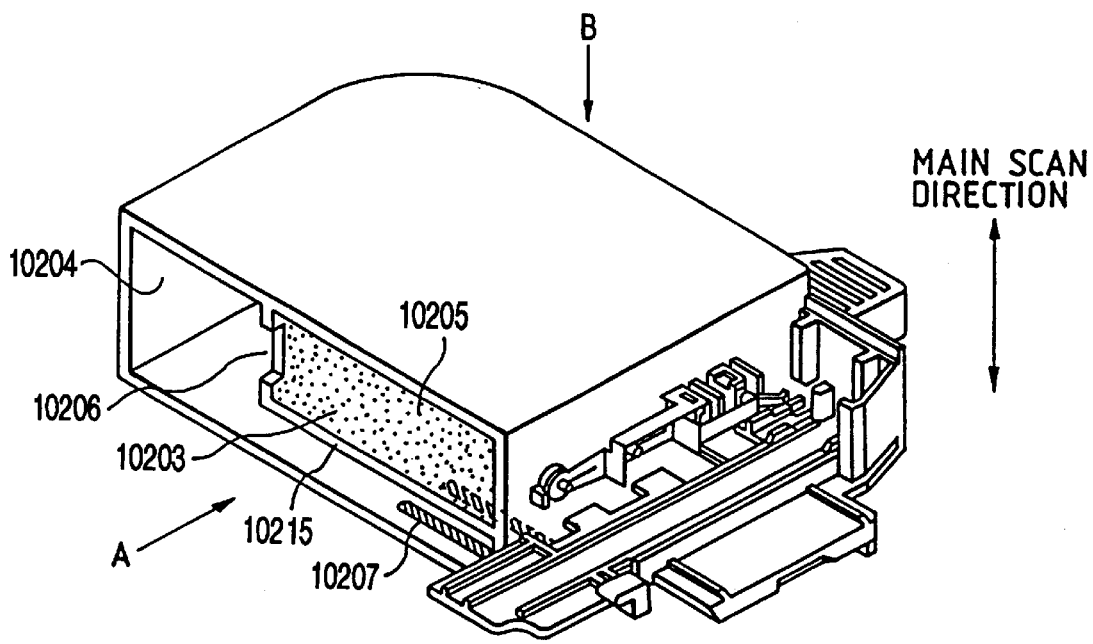

FIGS. 67A and 67B show embodiment 20 of an ink jet cartridge which is mountable on a carriage of an ink jet recording apparatus. FIG. 67A is an external perspective view of the ink jet cartridge of the present invention, and FIG. 67B is a perspective projection view of an ink tank unit, with the recording head unit removed from the ink jet cartridge as shown in FIG. 67A, as seen through one lateral side (which corresponds to the bottom face of the ink tank unit which is an ink reservoir in this embodiment).

Herein, 10200 is an ink tank unit (ink cartridge) which is an ink reservoir for storing the ink, and 10100 is a head unit for performing the recording by discharging the ink through the discharge ports 10101.

Note that in the present invention, an ink tank unit and a head cartridge connected together is referred to as an ink jet cartridge.

The ink jet cartridge in this embodiment has an ordinary ink tank unit 10200 and a head unit 10100 connected, as shown in FIG. 67A, and is detachably mounted on a carriage (not shown) of the ink jet recording apparatus, with a discharge port portion 10101 faced downward. Note that in the ink jet cartridge of this embodiment, the head unit 10100 as shown in FIG. 67B can be detached from the ink tank unit 10200.

10102 is a wiring connector for accepting the signal for driving the ink discharge portion 10101 of the head unit 10100, as well as outputting an ink remaining amount sensing signal, this wiring connector being connected to a wiring connector (not shown) on the ink jet recording apparatus side. This wiring connector 10102 is provided along the lateral side of the head unit 10100 and the ink tank unit 10200, that is, along the vertical direction in mounting the carriage as will be described later.

10103 is a pin engagement portion provided on the head unit 10100 to engage a pin provided on the carriage side when mounting the ink jet cartridge on the ink jet recording apparatus. With this pin engagement portion 10103, the ink jet head unit 10100 can be positioned.

When mounting the ink jet cartridge on the carriage, a knob 10201 provided on the ink tank unit 10200 is grasped, with the discharge portion 10101 directed downward, to mount the ink jet cartridge at a predetermined position on the carriage. Accordingly, splashing or sticking of the ink to the apparatus or the undischarge will not occur even if the user touches the ink discharge portion by mistake, when removing or replacing the ink jet cartridge.

10104 is a head side absorbing member provided for the recovery of recovery member for the ink discharge port portion 10101 provided on the ink jet head unit 10100, the details of which will be described later.

The ink tank unit 10200 is comprised of a negative pressure generating member receiving portion 10203 which is a negative pressure generating chamber and an ink storing portion 10204, the negative pressure generating chamber having inserted thereinto a porous ink absorbing member 10205 which is a negative pressure generating member. Between the negative pressure generating member receiving portion 10203 and the ink storing portion 10204 is provided an ink communicating portion 10206.

The ink storing portion 10204 has a pair of electrode pins installed therein for use in sensing the remaining amount of the ink. The ink storing portion 10204 is configured such that the ink storing portion and the negative pressure generating member receiving portion are disposed contiguously along a vertical direction to the main scan direction as a whole by providing a partition portion 10215 (partition wall) of an L-character shape as seen from the A direction of FIG. 67B.

Since the ink storing portion 10204 is partitioned by the partition portion with the longitudinal direction of the ink storing portion 10204 being perpendicular to the main scan direction along which the ink jet cartridge moves as a whole in discharging the ink, the ink tank unit is reduced in size while the ink capacity is increased simultaneously, with the vibration of the ink inside suppressed in making the main scan for the recording.

Note that in this embodiment, the ink storing portion has one and half or more the volume of the negative pressure generating member receiving portion, wherein the greater ink capacity is achieved by increasing the ratio of the ink storage to the volume of the ink storing portion of the ink vessel, as compared with the conventional constitution of the ink storing portion for storing the ink using only an ink absorbing member.

Figure 68A:
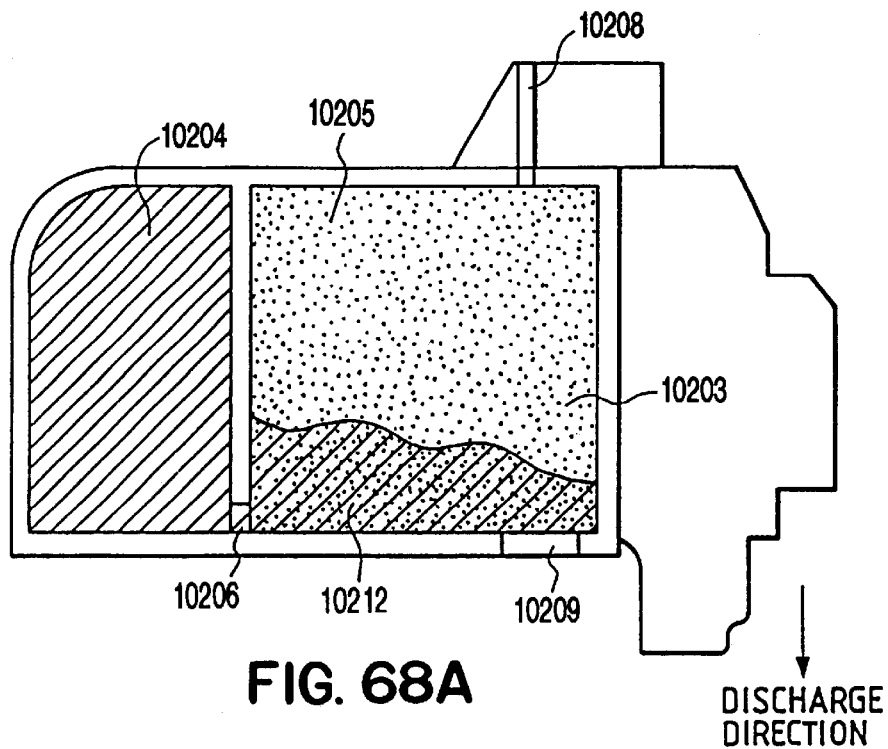
FIG. 68A is a cross-sectional view of a unit of FIG. 67B as looked from the B direction in FIG. 67B.
Figure 68B:
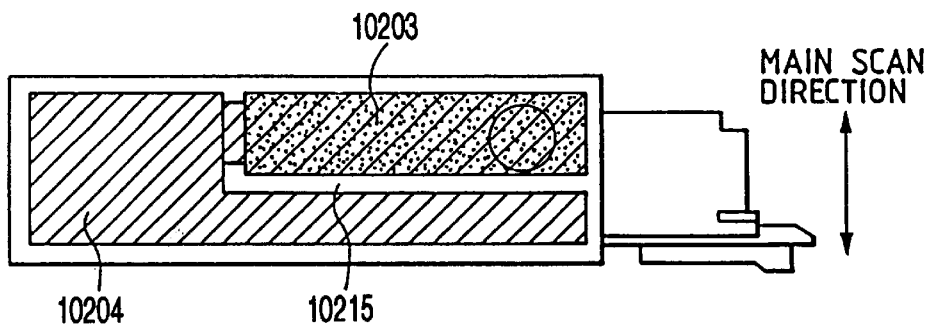
FIG. 68B is a perspective cross-sectional view of the unit of FIG. 68A as looked from the discharge port side.

Referring now to FIGS. 68A and 68B the state where the ink is stored within the ink jet cartridge will be described below. FIG. 68A is a cross-sectional view of a unit of FIG. 67B as looked from the B direction in FIG. 67B. FIG. 68B is a perspective cross-sectional view of the unit of FIG. 68A as looked from the discharge port side.

In FIG. 68A, the ink discharge from the head unit is performed in a downward direction in the figure, wherein an ink supply port 10209 is located on the bottom side when the ink jet cartridge is mounted on the ink jet recording apparatus. An atmosphere communicating port 10208 and the ink supply port 10209 are disposed on the opposite upper and lower surfaces, respectively, within the negative pressure generating member receiving portion, with the ink absorbing member 10205 which is a negative pressure generating member interposed therebetween.

The ink supply from the ink storing portion 10204 to the negative pressure generating member receiving portion 10203 is carried out in response to pressure changes upon the ink consumption of the head unit (not shown).

Normally, since there is the ink within the negative pressure generating member receiving portion, the ink storing portion 10204 is in the closed state, so that the internal pressure will decrease with the ink supply.

And the pressure within the ink storing portion 10204 decreases with the ink consumption, but because the negative pressure generating member receiving portion is opened to the atmosphere, the gas-liquid interface within the receiving portion will drop, finally allowing the air to enter the ink storing portion 10204 via the ink communicating portion 10206, bringing about the gas-liquid exchange.

Herein, with too small spacing of the ink communicating portion 10206, the meniscus force is so great that the ink supply from the ink storing portion to the negative pressure generating chamber is not allowed, this spacing being preferably about 3 mm, considering from the pore diameter (substantially 0.1 mm) of a porous member as the ink absorbing member receivable within the negative pressure generating chamber. In this embodiment, this spacing was 2 mm.

As shown in FIGS. 68A and 68B, since the ink supply port 10209 is located on the bottom side in making the ink discharge, the positional relation between the ink communicating portion 10206 and the ink supply port 10209 at the time of ink discharge is such that the ink supply port 10209 is lower in level than the ink communicating portion 10206 with respect to the gravitational direction.

Accordingly, before the ink level within the negative pressure generating chamber falling with the ink consumption within the negative pressure generating portion reaches a point provided on the ink supply port 10209, the ink within the ink storing portion 10204 is supplied via the ink communicating portion 10206 to the negative pressure generating member receiving portion 10203, so that the ink within the ink storing portion can be completely used, causing no ink interruption, with the enhanced use efficiency of the ink attained.

Considering from the aspect of the ink interruption, the ink communicating portion may be provided anywhere as far as the previously-described positional relation is met with respect to the ink supply port. However, taking into consideration the fluctuation of the ink within the ink storing portion, it is preferable to supply the ink from the ink storing portion to the negative pressure generating member receiving portion in a direction orthogonal to the main scan direction.

In this embodiment, as shown in FIGS. 68A and 68B, owing to the provision of the ink communicating portion on wall of the partition portion parallel to the main scan direction, a more preferable form of stable ink supply can be attained without influence from the fluctuation of the ink within the ink storing portion.

Embodiment 21

Figure 69:
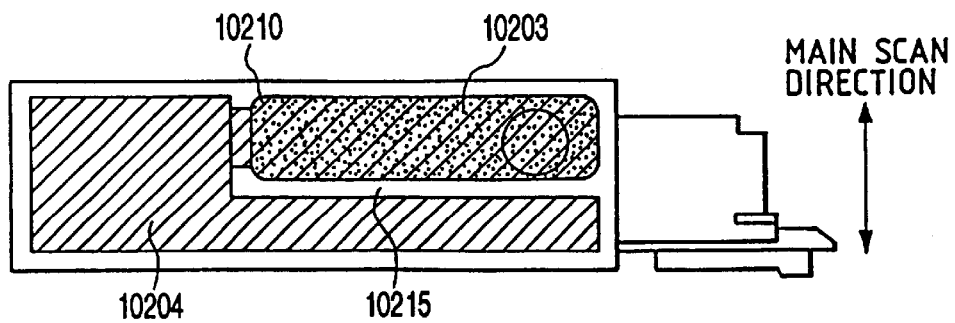
FIG. 69 is a view showing an ink tank unit according to an embodiment 21 of the present invention.

FIG. 69 shows one example of an ink tank unit according to an embodiment 21. This embodiment offers a constitution for further stabilizing the ink storing state within the negative pressure generating member receiving portion 10203 as shown in the embodiment 20.

In this embodiment, as shown in FIG. 69, the negative pressure generating member receiving portion is rounded at the four corners 10210 within the negative pressure generating member receiving portion 10203. With this curved profile, the absorbing member can press evenly at the four corners so that no exfoliation or distortion occurs at the edge corners of the ink absorbing member 10205 due to the friction, avoiding the ink concentration on the locally deformed portion.

Accordingly, the possibility of the ink flow passage formed in the ink concentrated portion can be further reduced, resulting in stabler ink distribution to collect the ink only near the ink supply port 10209 more securely.

Further, the ink absorbing member near the atmosphere communicating port is not wet by the ink, and lower in wettability (less likely to be wet) than when it is wet by the ink.

Thereby, the ink within the ink absorbing member is difficult to migrate toward the atmosphere communicating port, creating a very strong structure against the ink wetness. Hence, the absorbing member 10205 near the atmosphere communicating port can be utilized as the buffer.

While in this embodiment, curvature is provided at the four corners, it is noted that multi-angle may be made to eliminate the angle at the four corners to prevent exfoliation. However, the depicted profile of the corners 10210 is most preferable from the aspect of the insertion precision or even insertion.

Embodiment 22

Figure 70A:
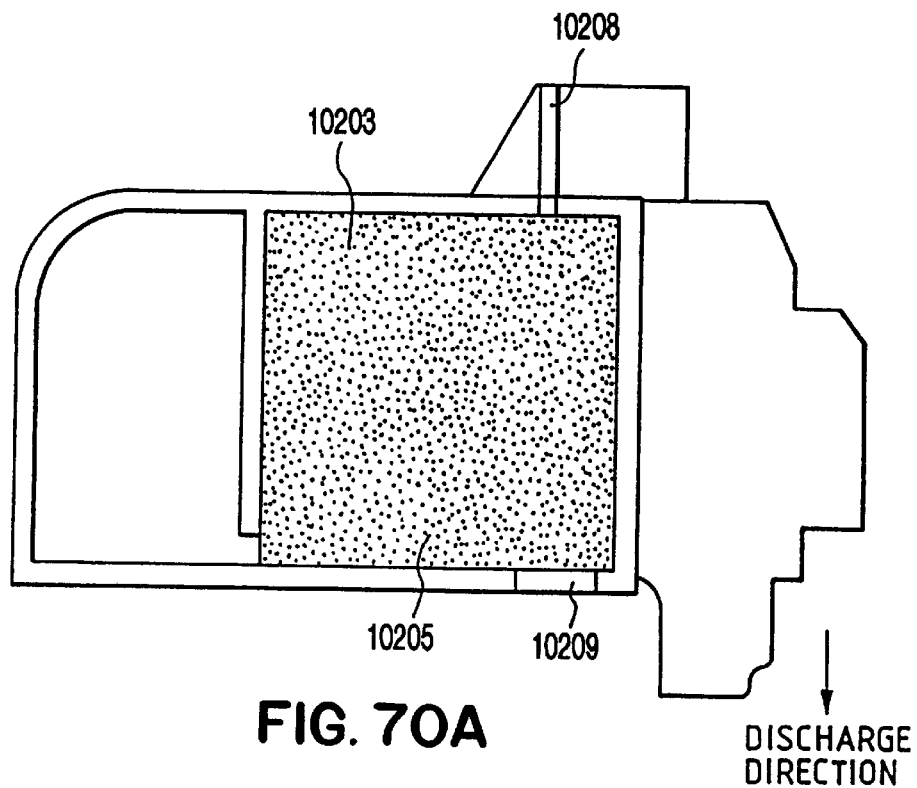
Figure 70B:
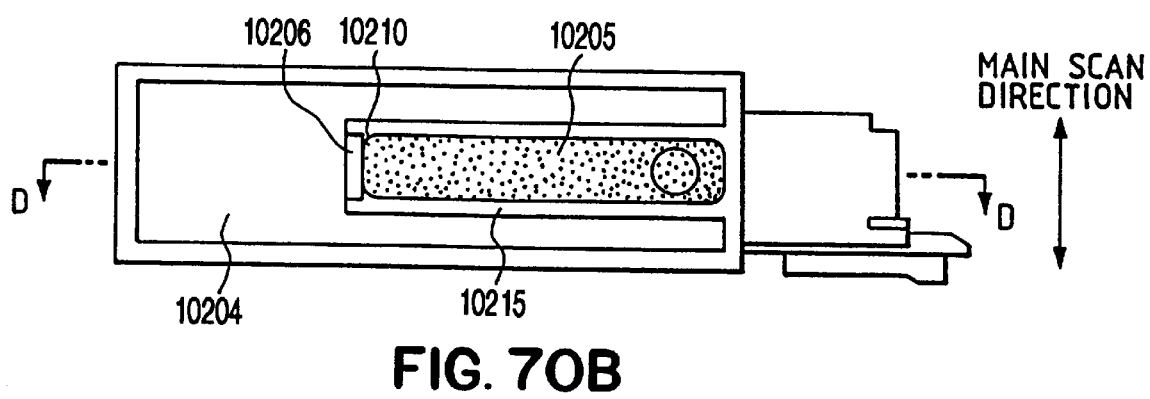

FIGS. 70A and 70B show internal structures of another ink tank unit for use in the ink jet cartridge of the present invention which is mounted on the ink jet recording apparatus according to an embodiment 22. In the figure, like symbols are attached to the parts having the same functions as in the previous embodiment 20.

FIG. 70A is a cross-sectional view of the inside along the ink discharge direction, and FIG. 70B is a cross-sectional view of the inside along the main scan direction of the ink jet cartridge. Herein, FIG. 70A corresponds to the D—D cross-sectional view in FIG. 70B.

As seen from FIG. 70B, an ink storing portion is extended on both sides of negative pressure generating member receiving portion along a direction crosswise to the main scan direction when mounting the ink cartridge by a partition portion 10215 in this cartridge, with the ink storing portion like a U-character. In this embodiment, like the previous embodiment 20, the direction of supplying the ink via the ink communicating portion 10206 from the ink storing portion to the negative pressure generating member receiving chamber is made a longitudinal direction of the ink storing portion, so that the ink storing amount is increased.

As above described, with such U-character structure where the longitudinal direction of the ink storing portion is orthogonal to the main scan direction, the fluctuation of the ink due to the movement of the cartridge in the main scan direction can be suppressed, like the previous embodiment 20. In this embodiment, the ink communicating portion 10206 is provided in the central portion of the partition portion 10215 of U-character shape, i.e., on the wall along the main scan direction of the partition portion 10215, whereby the effects of the ink fluctuation can be further avoided.

Embodiment 23

Figure 71A:
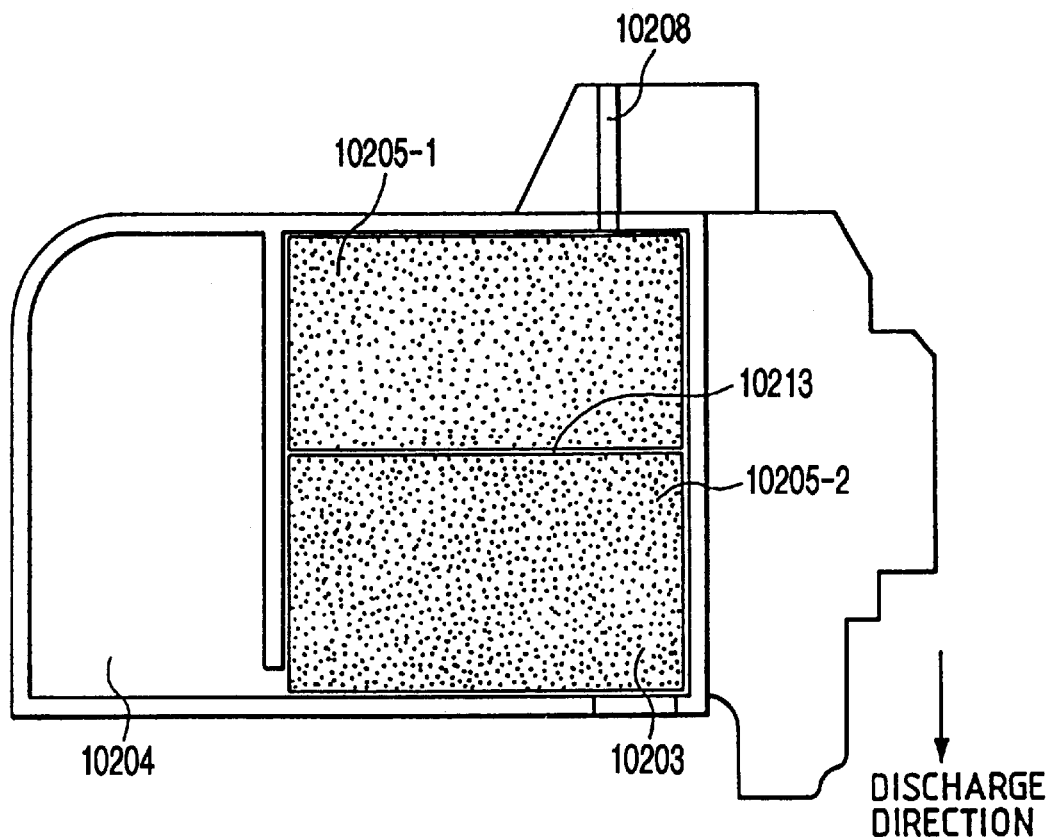
Figure 71B:
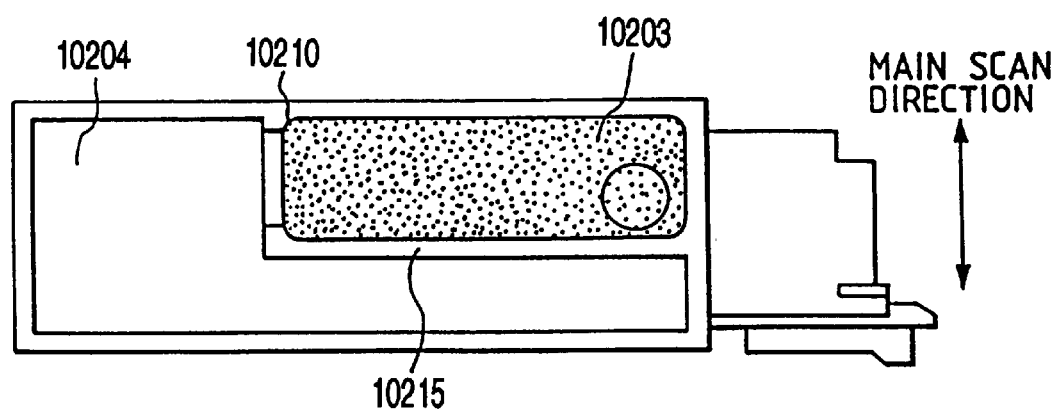

FIGS. 71A and 71B show the internal structures of another ink tank unit for use in the ink jet cartridge of the present invention as an embodiment 23. In this figure, like symbols are attached to the parts having the same functions as in the previous embodiment.

FIG. 71A is a cross-sectional view of the inside along the ink discharge direction and FIG. 71B is a cross-sectional view of the inside along the main scan direction of the ink jet cartridge.

In this embodiment, as shown in FIG. 71A, an absorbing member 10205 within the negative pressure generating member receiving portion 10203 is divided into two portions 10205-1 and 10205-2, and a gap 10213 serving as a meniscus generating portion is provided so that a meniscus may be formed between these portions 10205-1 and 10205-2.

Upon the ink reaching this gap portion, a meniscus is formed therein so that the movement of the ink from an ink absorbing member 10205-2 to an ink absorbing member 10205-1 is made difficult.

Accordingly, by adopting the constitution of this embodiment, the wetting with the ink from the atmosphere communicating port 10218 can be prevented at higher reliability.

Figure 72:
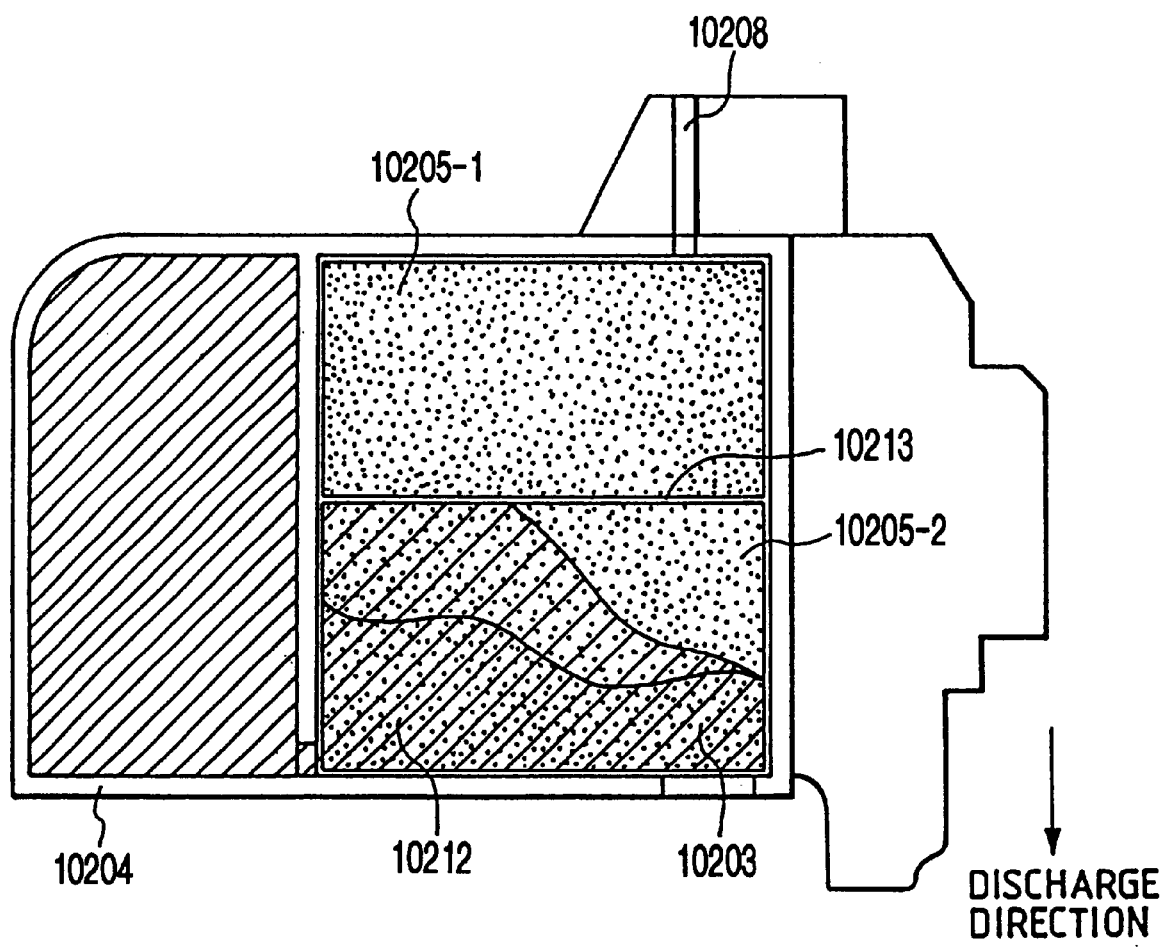
FIG. 72 is a view showing the state of holding the ink in the ink cartridge of FIGS. 71A and 71B.

FIG. 72 shows an instance where the ink is filled in the ink jet cartridge of this embodiment. In this case, even if the expanded ink wets the whole portion of 10205-2 in reducing the pressure or maintaining high temperature, the ink is held by the meniscus generating portion 10213, and the ink is difficult to flow to the portion 10205-1, so that the ink leakage from the atmosphere communicating port 10208 is less likely to occur.

Embodiment 24

Figure 73A:
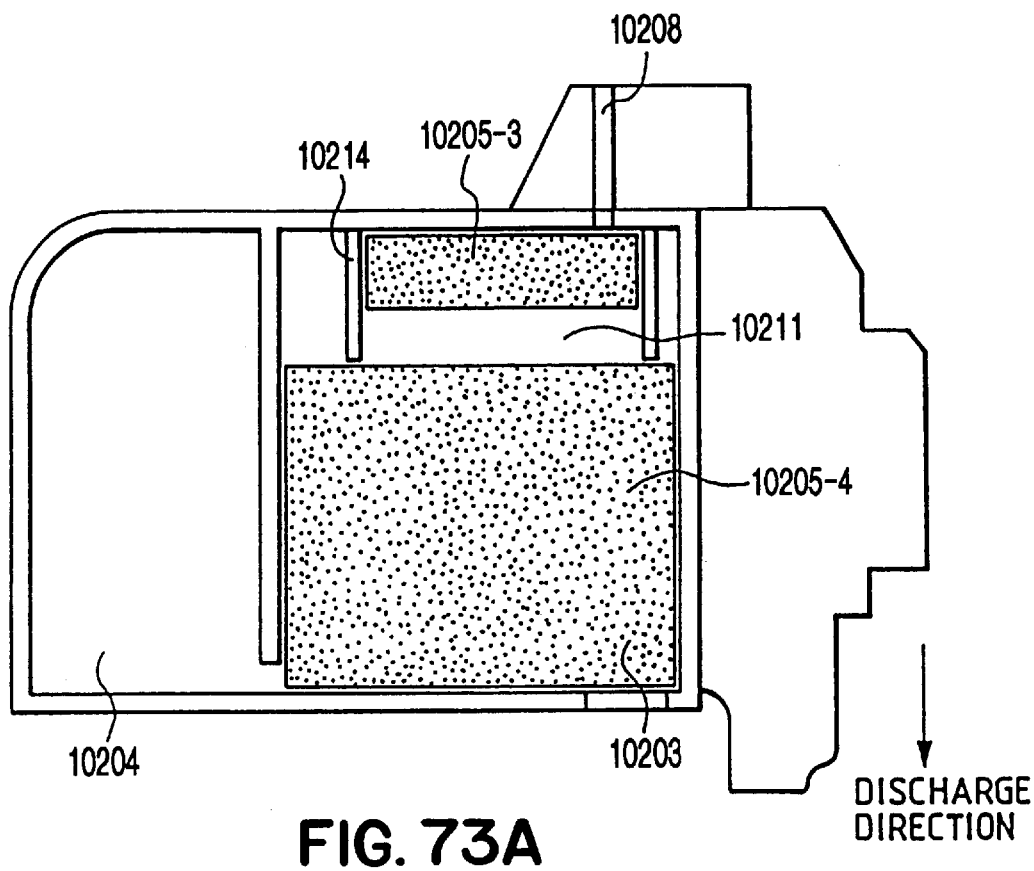
Figure 73B:
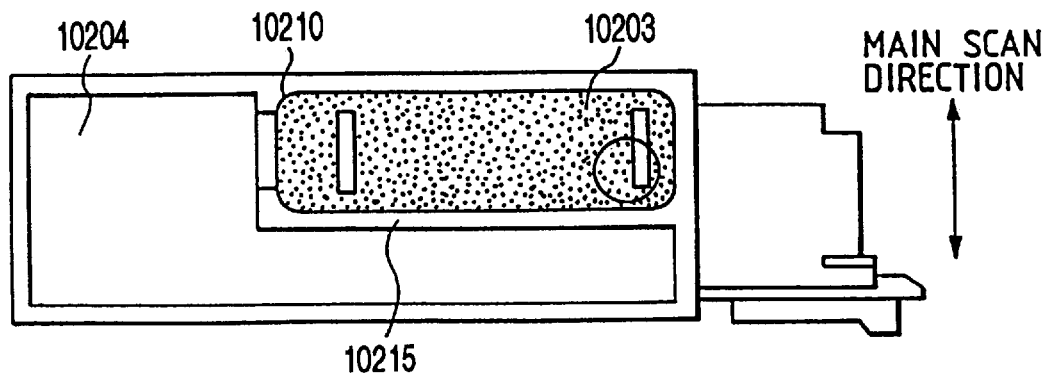

FIGS. 73A and 73B show the internal structures of another ink tank unit for use in the ink jet cartridge of the present invention which is mounted on the ink jet recording apparatus, as an embodiment 24. In this figure, like symbols are attached to the parts having the same functions as in the previous embodiment.

FIG. 73A is a cross-sectional view of the inside along the ink discharge direction and FIG. 73B is a cross-sectional view of the inside along the main scan direction of the ink jet cartridge.

In this embodiment, as shown in FIG. 73A, like the embodiment 23, two divided portions 10205-3 and 10205-4 are provided within the negative pressure generating member receiving portion 10203. A different point from the previous embodiment 23 is that a buffer chamber 10211 communicating to the atmosphere communicating port 10208 within the negative pressure generating member receiving portion is provided adjacent the ink absorbing member 10205-4 as negative pressure generating means.

This buffer chamber is secured within the negative pressure generating member receiving portion by a rib 10214 to store the ink overflowing from the ink absorbing member due to environmental changes as previously described, preventing the ink from reaching the atmosphere communicating port portion.

Further, in this embodiment, by disposing an ink absorbing member 10205-3 between two absorbing member stop ribs 10214, the ink overflowing into the buffer chamber is prevented from directly reaching the atmosphere communicating port 10208.

In this embodiment, the reliability in preventing the ink leakage is enhanced by virtue of this buffer chamber.

Embodiment 25

A constitution other than preventing the ink leakage through the atmosphere communicating port portion by changing the form of receiving the negative pressure generating member within the negative pressure generating member receiving portion as previously described is shown below.

Figure 74A:
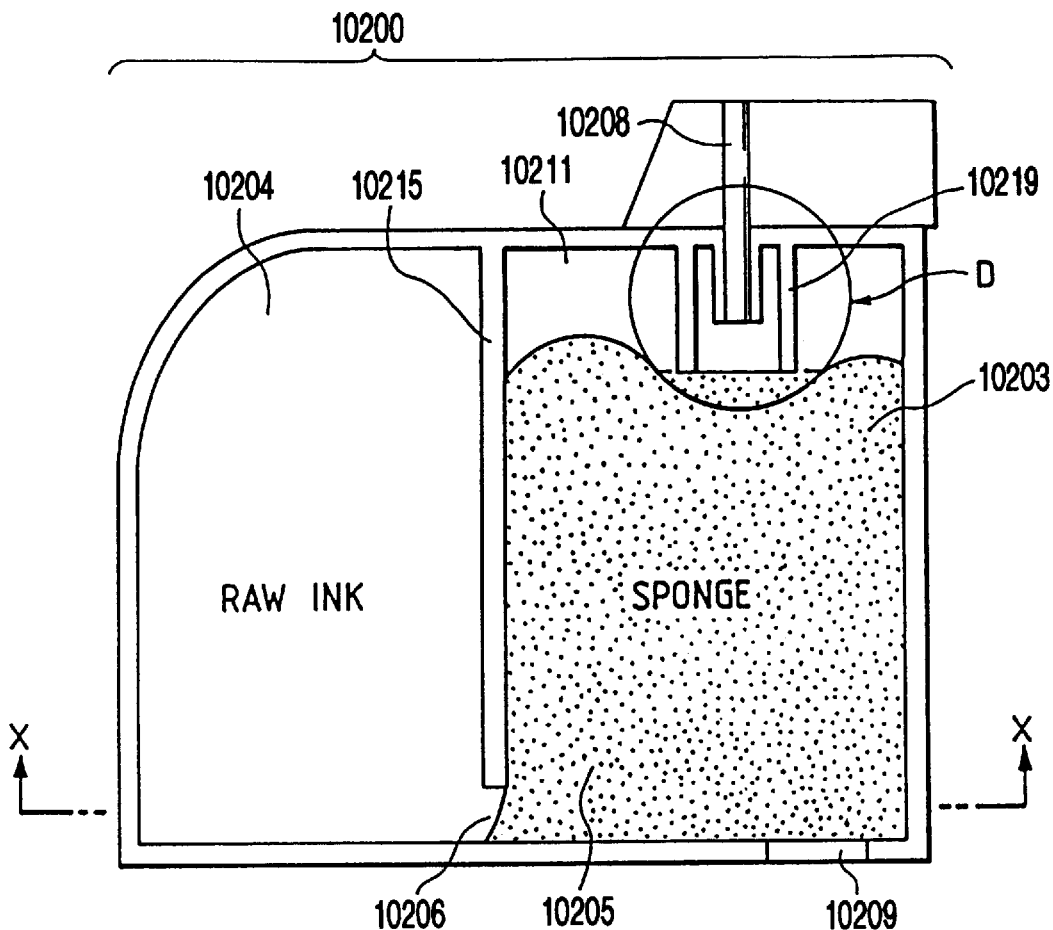
Figure 74B:
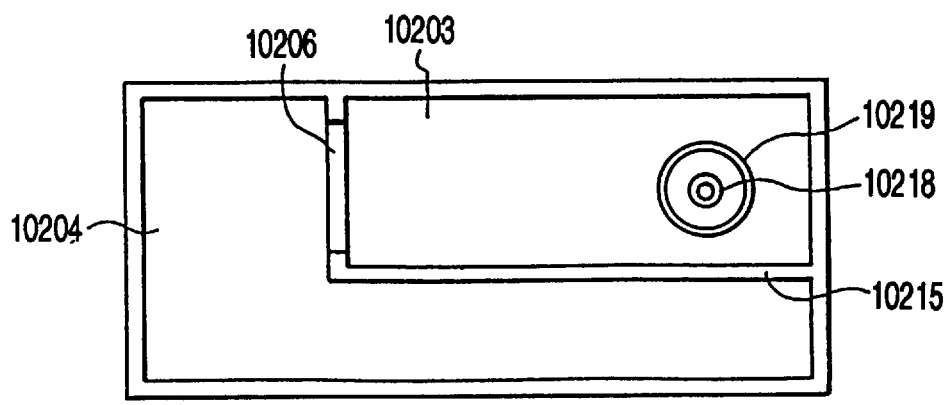

FIGS. 74A and 74B are views showing an ink tank unit according to an embodiment 25, in which FIG. 74A is a cross-sectional view of the ink tank unit, and FIG. 74B is a schematic cross-sectional view of the tank taken along the line X—X, with the negative pressure generating member 10205 removed to better represent the features of this embodiment.

Figure 75A:
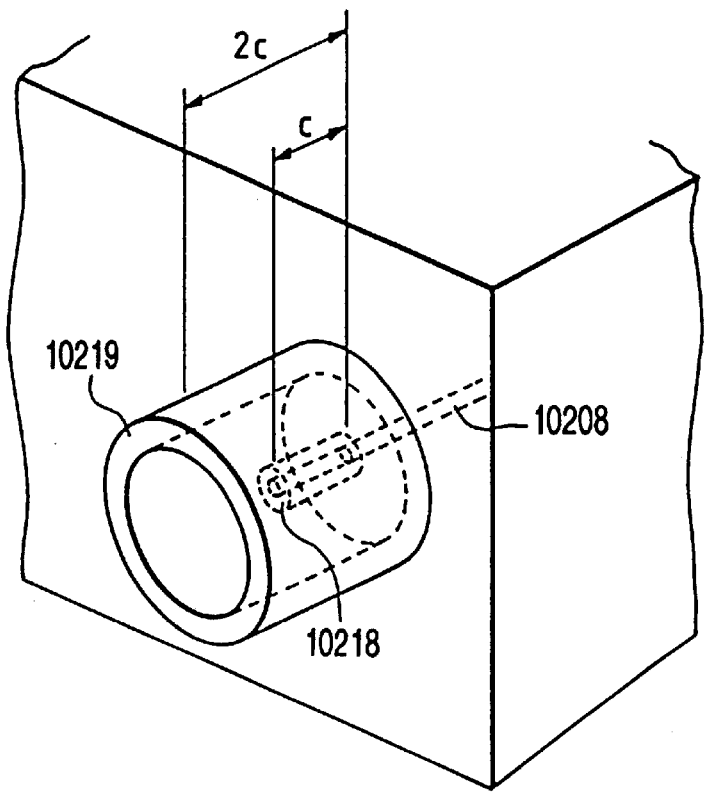
FIG. 75A is a detail view of a portion D of FIG. 74A.

FIG. 75A is a detail view showing a portion D of FIG. 74A. In this embodiment, an atmosphere communicating passage of which the end portion is projected into negative pressure generating member receiving portion 10203 is used, and further, a partition wall 10219 is provided around the periphery of atmosphere communicating passage, as shown in FIGS. 74A to 75A.

Herein, when the height of a projected atmosphere communicating port portion 10218 is assumed to be c, the height of the partition wall 10219 which is an annular projection provided circumferentially thereof is made 2 c or greater, with a gap 10211 formed as a buffer chamber between negative pressure generating member (ink absorbing member) 10205 and a projection 10218 of atmosphere communicating port, thereby preventing the ink leakage through the atmosphere communicating port portion.

Further, the outside annular partition wall 10219 is spaced away from a projected tubular end portion 10218 of the atmosphere communicating port not to be in contact therewith, and even if the ink leakage occurs from the negative pressure generating member 10205, no leaked ink passes along the partition wall 10219 into the atmosphere communicating port portion 10218.

However, in this case, it is desired that the interval provided between both projections is set to be large enough to cause no capillary phenomenon, thereby reducing the possibility that the ink sticking to the partition wall reaches an opening portion at the end of the atmosphere communicating port portion.

Figure 75B:
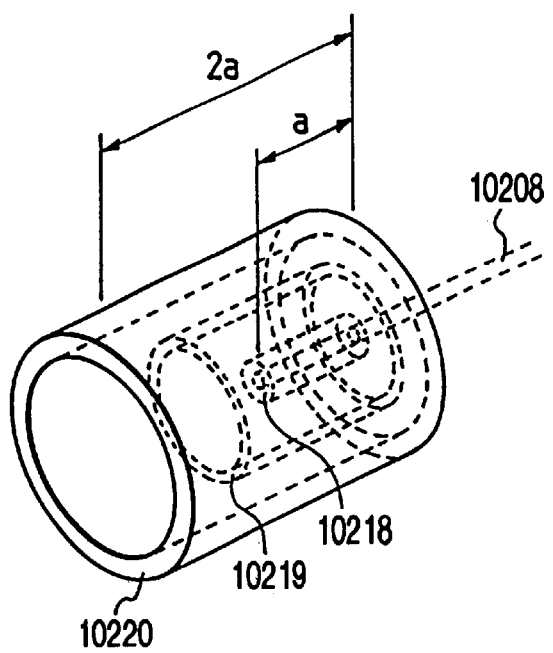
FIG. 75B is a variation of the portion D of FIG. 74A.

It will be appreciated that the atmosphere communicating port portion within the negative pressure generating member receiving portion is of a triple structure, with increasing height of the partition wall in more outside, as shown in FIG. 75B.

Where the length of an innermost projection or a projection portion 10218 of the atmosphere communicating port portion is assumed to be c, the length of the outermost annular projection 10220 is made 2 c or greater (e.g., 3 c). Thereby, the reliability in preventing the ink leakage through the atmosphere communicating port is further increased.

Besides the above embodiments, modifications such as a quadruple or more multi-structure may be made within the scope of the present invention to enhance the reliability in presenting the ink leakage.

In this embodiment, the atmosphere communicating port portion within the negative pressure member receiving portion of the ink tank unit is made the above structure, forming a clearance as the buffer chamber between the ink absorbing member and the surface provided with the atmosphere communicating port, and further preventing the ink from the partition wall constituting the buffer chamber reaching the opening portion at the end of the atmosphere communicating port portion to increase the reliability in preventing the ink leakage through the atmosphere communicating port portion.

Further, even if the ink enters inside the annular projection, the ink is trapped prior to reaching the innermost projection of the atmosphere communicating port, whatever attitude the ink jet cartridge is placed in, because the annular projections are spaced part, thereby enhancing the reliability of ink leakage prevention.

In embodiments as previously described, an ink tank unit has been proposed which is comprised of a negative pressure generating member receiving portion (ink absorbing member receiving portion) having an ink supply port in communication with the recording head and receiving a negative pressure generating member (ink absorbing member) and an ink storing portion contiguous to and in communication with the absorbing member receiving portion via an ink communicating portion on its bottom side in order to accomplish simultaneously the enhanced use efficiency of the ink and the proper generation of negative pressure force.

In the above constitution, the ink supply from the ink storing portion to the negative pressure generating member receiving portion is made in such a process that the ink within the ink storing portion 10204 is supplied via the ink communicating portion 10206 to the negative pressure generating member receiving portion 10203 when the ink level near the partition portion 10215 decreases at least to the ink communicating portion 10206 of the partition portion 10215 by the ink consumption within the negative pressure generating portion.

The ink level in the negative pressure generating member receiving portion necessarily decreases because the ink communicating portion communicating to the ink storing portion lies on the bottom of the partition portion 10215. However, the compression of the absorbing member received within the negative pressure generating member receiving portion is difficult to become even in practice, and the decreasing ink level is not necessarily uniform.

On the other hand, because the negative pressure generating member has a function of holding the ink, the ink level within the negative pressure generating member receiving portion will rise again, if the ink is supplied from the ink storing portion. Accordingly, there is the possibility that the amount of ink held above the ink supply port 10209 within the negative pressure generating member receiving portion is not always constant.

The negative pressure generated by the ink absorbing member is possibly affected by the weight of the ink itself within the negative pressure generating member receiving portion. In particular, when the ink supply port portion 10209 for communicating to the recording head is provided on the bottom portion of the negative pressure generating member receiving portion, as in the previous embodiment, the variation in the ink amount will cause a variation in the negative pressure.

In this case, by increasing the gap of the ink communicating portion between both receiving portions, the ink level can not be adjusted. Because the increased gap prevents the formation of ink meniscus in the ink communicating portion, the ink is supplied excessively to the absorbing member receiving portion, causing the negative pressure within the absorbing member to decrease extremely, resulting in a risk that ink leakage may occur.

Embodiment 26

In the following embodiment, one constitution to enhance the stability of this negative pressure will be proposed.

Figure 76A:
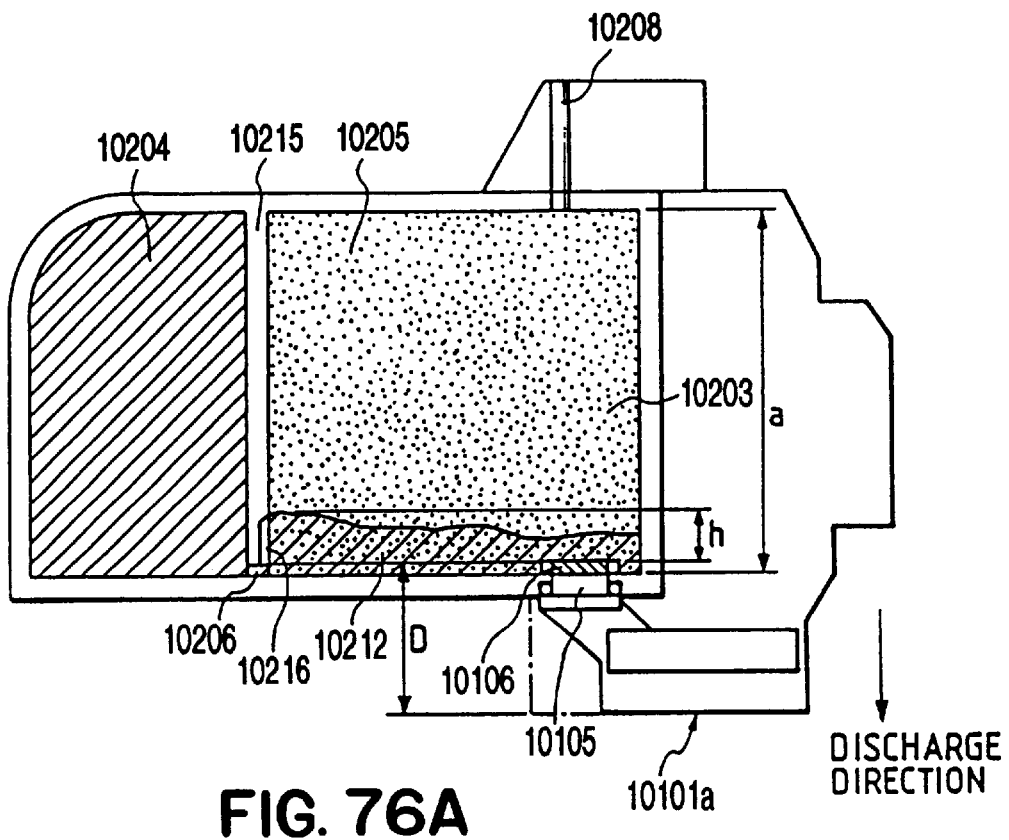
Figure 76B:
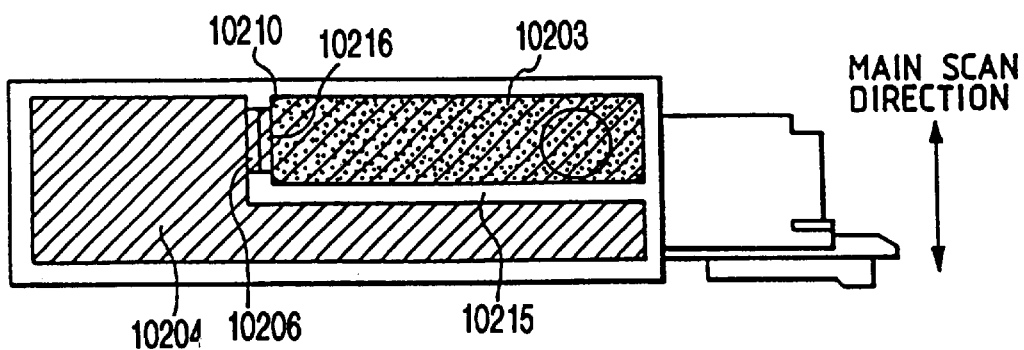

FIGS. 76A and 76B are views best representing the features of an ink jet cartridge according to an embodiment 26. In the figure, like symbols are attached to the elements having the same functions as in the previous embodiment.

FIG. 76A is a cross-sectional view of the inside of an ink tank unit connected to an ink jet head unit, taken along the ink discharge direction. FIG. 76B is a cross-sectional view of the inside of the ink jet cartridge along the main scan direction.

Herein, 10105 is an ink communicating member for introducing the ink within the ink jet head unit, and 10106 is a filter provided at the end portion of the ink communicating member 10105 for preventing the flow of fine dirt particles the ink jet head.

Figure 77:
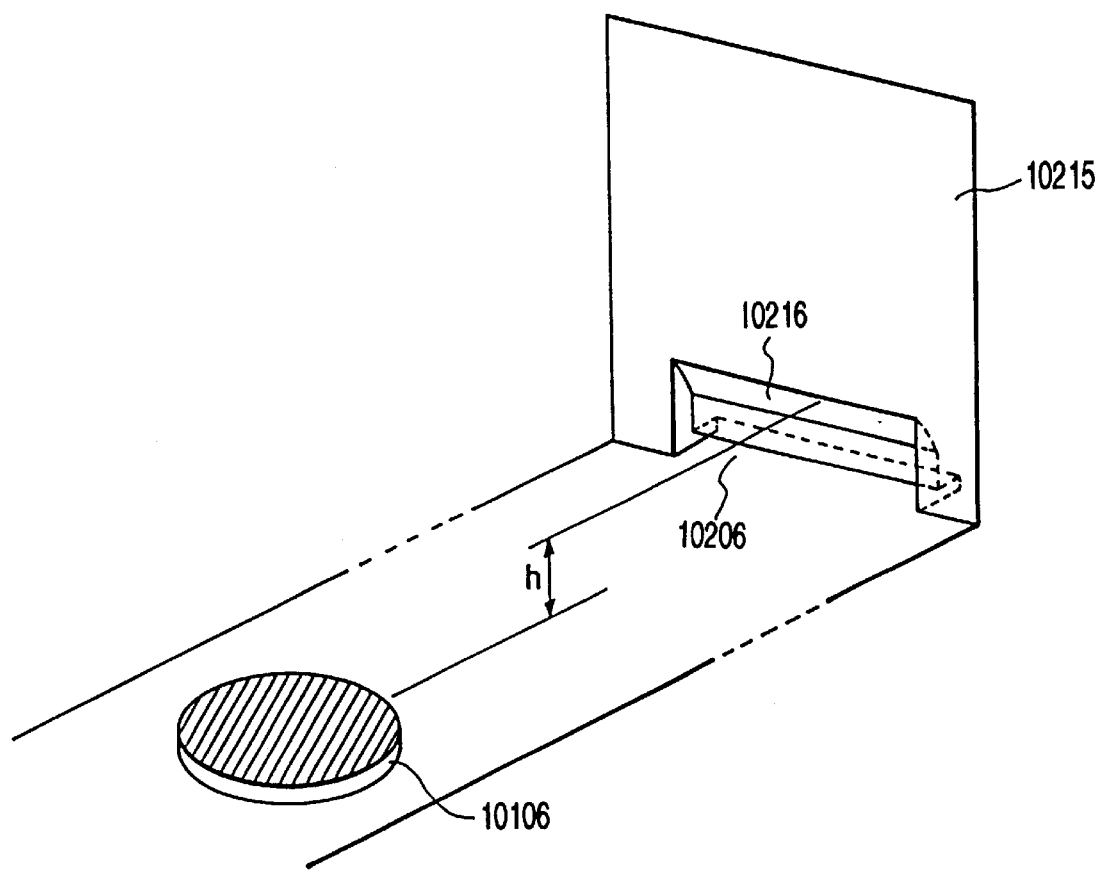
FIG. 77 is a schematic perspective view of a portion of FIGS. 76A and 76B in an enlarged scale.

In FIGS. 76A to 77, a is the height of ink absorbing member receiving portion, and h represents the height of the top of a groove portion with reference to the filter surface disposed at the end portion of the ink communicating member.

This embodiment is different from the embodiment 20 as previously described in that the wide groove portion 10216 (concavity) is provided at the upper portion of the ink communicating portion so that the lower portion or one end of the negative pressure generating member receiving portion on a partition wall 10215 in the partition portion may be in communication with the ink communicating portion 10206. By providing this groove portion 10216, the admission passage of the air into the ink storing portion can be easily secured upon the gas-liquid replacement which is made with the ink consumption.

Herein, through the end portion opposite that leading to the ink communicating portion of the groove portion, the gas-liquid replacement is effected. In this embodiment, the groove portion at the end of the gas-liquid replacement side is shallower in depth when leaving father away from the ink communicating portion. Thereby, the introduction of the air into the groove portion is facilitated.

In this embodiment, the negative pressure condition within the negative pressure generating member receiving portion can be determined by the negative pressure generating force (capillary force) of the ink absorbing member 10205 which is the negative pressure generating member and the amount of holding the ink within the ink absorbing member 10205 residing above the ink supply port portion 10209, as shown in FIGS. 74A and 74B.

In this case, the negative pressure generating force within the negative pressure generating member receiving portion is set with a back pressure of Dmmaq or greater in a reverse direction to the ink supply direction in the ink supply port, assuming the distance between the ink supply port face and the discharge port face 10101 of the recording head to be Dm, in order to prevent the ink leakage through the discharge ports of the recording head.

On the other hand, the upper limit value of negative pressure generating force must be determined in consideration of the ink exhaustion in the ink supply or reduced print density due to insufficient ink supply. In this embodiment, D is equal to 200 mm, and the negative pressure generating force within the negative pressure generating member receiving portion is set in the range from 20 mmAq to 40 mmaq.

As means for controlling the negative pressure within the negative pressure generating member receiving portion, a method of adjusting the height h of the gas-liquid replacement groove portion 10216 as previously described is adopted in this embodiment. By changing the height of this groove portion, the position of the gas-liquid boundary face within the negative pressure generating member receiving portion can be adjusted to realize the stability of the negative pressure.

The positional relation between the groove portion and the filter face in this embodiment is such that the distances from the negative pressure generation chamber bottom portion to the filter face of the ink supply port and to the partition wall end portion at the upper portion of the ink communicating portion are identical, as shown in FIGS. 76A and 76B.

The distance h up to the top of the groove portion with reference to the filter face is set at 5 mm, and the gas-liquid interface (ink level) from the ink storing portion to the remaining ink in the absorbing member receiving portion is maintained at a position of about 5 mm or less with reference to the filter face within the absorbing member receiving portion. And by setting the position of the gas-liquid interface to be less than about 5 mm, the negative pressure is generated within the condition range as previously described. Note that the height a of the negative pressure generating member receiving portion is 48 mm in this embodiment.

Accordingly, by adopting the constitution of having a groove portion provided as proposed in this embodiment, the ink supply from the ink storing portion in the ink communicating portion to the negative pressure generating member receiving portion can be stably maintained, and the ink level (gas-liquid interface) within the negative pressure generating member receiving portion can be retained substantially constant. Thereby, the amount of ink received within the negative pressure generating member receiving portion is substantially constant, and the variation in the ink supply or the negative pressure which may have effects on the recording quality can be suppressed.

In this embodiment, as above described, because the filter face of the ink communicating member end portion is projected from the bottom face of the negative pressure generation chamber, the ink absorbing member in the neighborhood of the ink supply port is compressed to concentrate the ink, in order to enhance the ink supply performance to the ink jet head unit.

Note that the height of the groove portion is set above the filter face at minimum, preferably, 1 mm above the filter face, and more preferably 2 mm above.

This is because the uneven distribution of compressing the ink absorbing member may be caused by the condition of insertion of the ink absorbing member, resulting in the possibility that the ink level varies locally within the negative pressure generating member receiving portion, thereby giving rise to ink interruption.

Accordingly, by providing a groove portion as proposed in this embodiment at the upper portion of the ink communicating portion, the ink level within the absorbing member receiving portion in supplying the ink from the ink storing portion to the absorbing member receiving portion is held at an appropriate position, until the ink is used up, so that the static negative pressure within the absorbing member can be generated more stably.

Embodiment 27

In the embodiment 20 as previously described, there is the possibility that the ink level varies with the ink consumption, as already pointed out. The bottom face of the ink storing portion and that of the absorbing member receiving portion are coplanar, whereby the changes in the ink level will not only give rise to the changes in the negative pressure as previously described, but also possibly disrupt the ink flow passage within the absorbing member, when supplying the ink from the ink storing portion to the absorbing member receiving portion, as with the embodiment 20 in which the ink supply port is provided on the bottom face of the negative pressure generating member receiving portion.

In this case, because such a problem can not be resolved by increasing the gap of the ink communicating portion between both receiving portions as previously described, the following constitution is adopted in the embodiment 27 to realize a further stabilization of the ink supply.

Figure 78A:
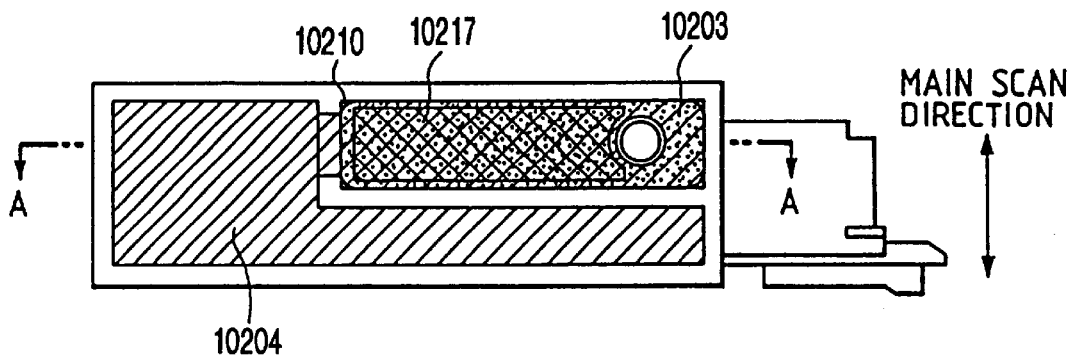
Figure 78B:
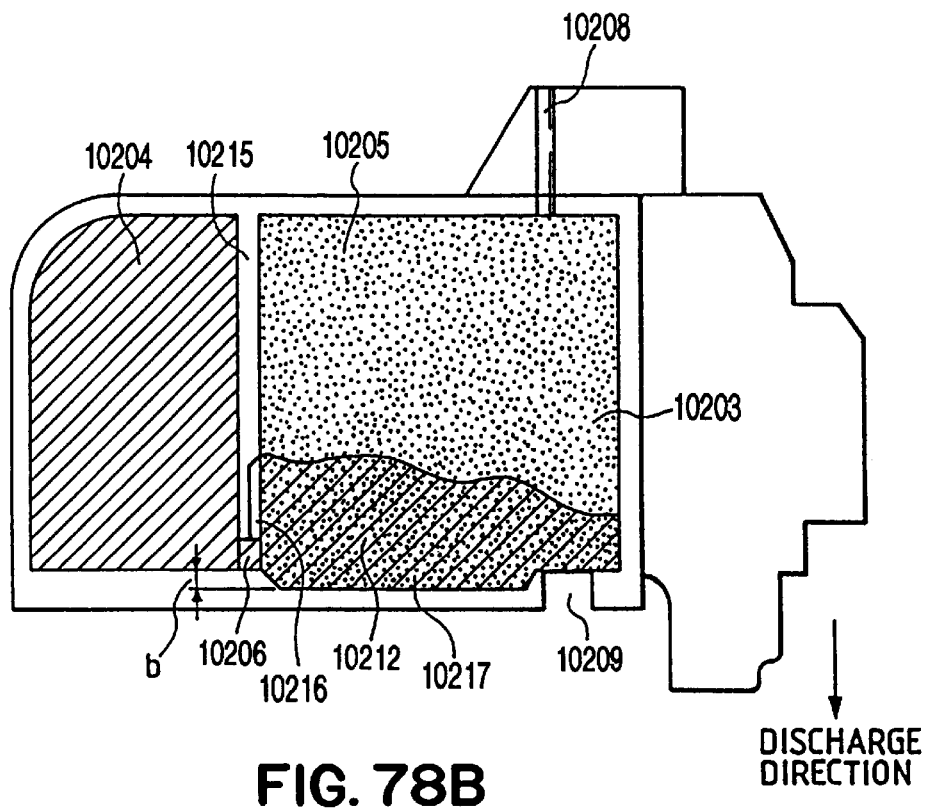

The constitution of embodiment 27 is shown in FIGS. 78A and 78B. In the figure, like symbols are attached to the elements having the same functions as in the previous embodiment.

FIG. 78A is a cross-sectional view of the inside taken along the ink discharge direction, and FIG. 78B is a cross-sectional view of the inside of an ink jet cartridge taken along the main scan direction.

As shown in FIG. 78B, a recess portion 10217 (concave) is provided in the bottom portion of the negative pressure generating member receiving portion, so that the bottom portion of the negative pressure generating member receiving portion is lower than the bottom portion of the negative pressure generating member receiving portion when mounting the ink jet cartridge. This recess portion 10217 is provided to have the depth b in the area from the neighborhood of the ink communicating portion 10206 to the neighborhood of the ink supply port 10209, as shown in FIG. 78A.

By providing this recess portion, the ink flow passage within the negative pressure generating member receiving portion can be secured in the height direction without preventing the formation of meniscus upon the gas-liquid replacement in the ink communicating portion.

Note that the depth b of the recess portion determines the formation width of ink flow passage, greater value of b resulting in more effect, and higher reliability of preventing ink interruption.

The constitution of this embodiment in addition to the constitution of having a groove portion provided on the partition wall as previously described in the embodiment 25 allows more positively the stable generation of the negative pressure, or the securement of ink flow passage, resulting in the stabler ink supply.

Embodiment 28

Other embodiments which are able to enhance the ink supply performance and the reliability of preventing ink leakage will be described below with reference to the drawings.

Figure 79:
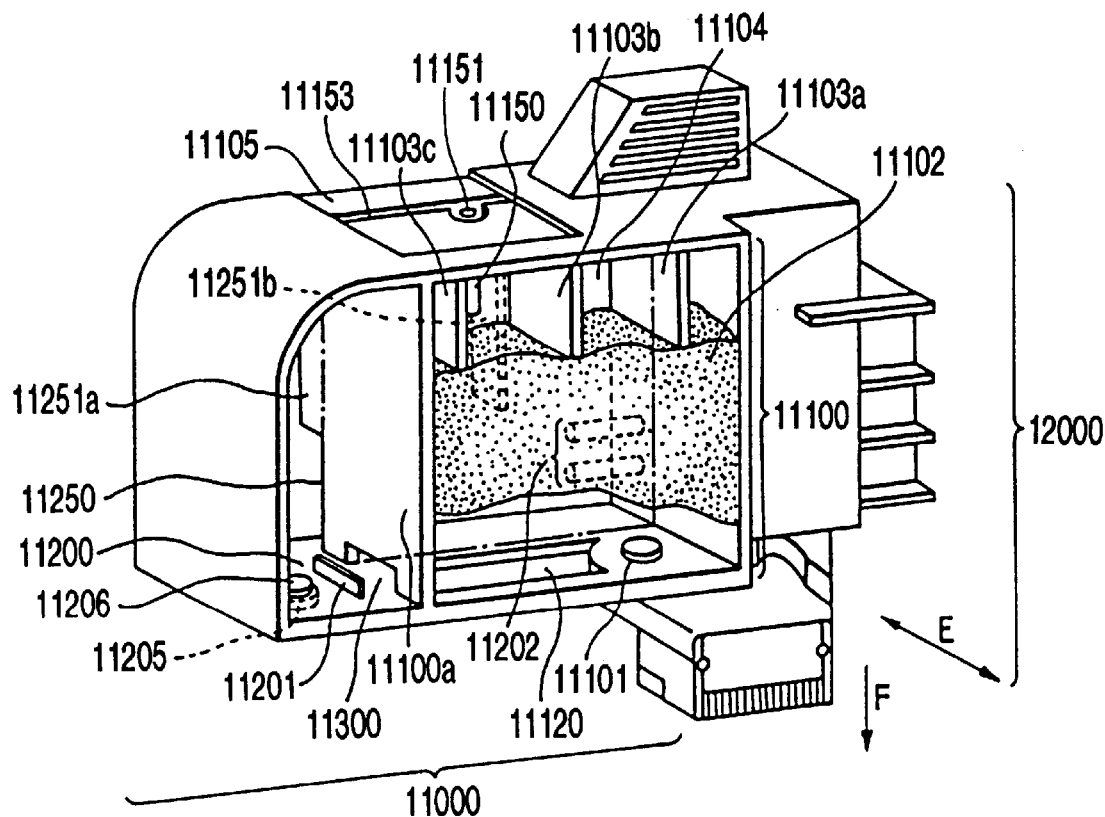
FIG. 79 is a typical perspective view showing another constitution of an ink jet cartridge, with a portion in cross section.
Figure 80:
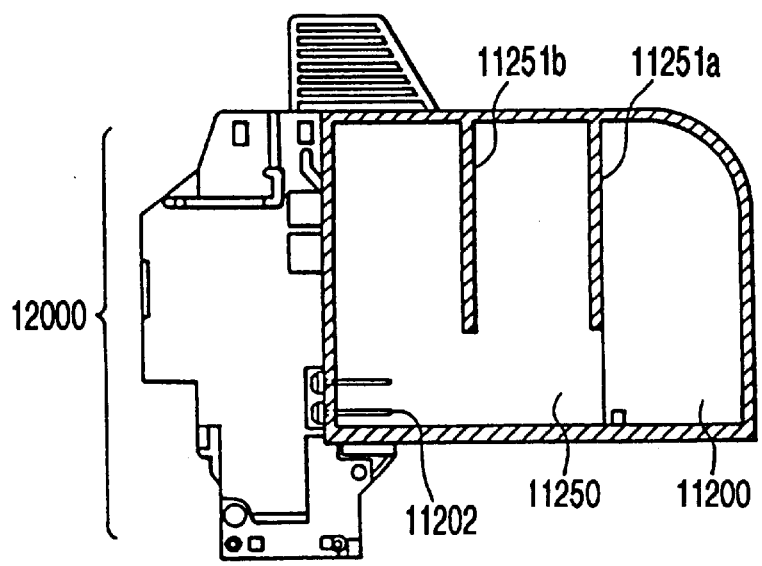
FIG. 80 is a schematic cross-sectional view of the ink jet cartridge as shown in FIG. 79 as looked from the back side.

FIGS. 79 and 80 show an embodiment 28 of the present invention of an ink jet cartridge having a head unit and an ink tank unit connected, wherein FIG. 79 is a typical perspective view showing the constitution of the ink jet cartridge of this embodiment, partly in cross section, and FIG. 80 is a schematic cross-sectional view of the head as shown in FIG. 79 as looked from the back side thereof.

As shown in FIG. 79, an ink tank unit 11000 in this embodiment has a connecting opening portion 11101 as the ink supply port for supplying the ink to an ink jet head unit 12000 as the head portion on the bottom face of the ink tank unit 11000. And the ink tank unit is comprised substantially of a first accommodating chamber 11100 which is a negative pressure generating member receiving portion having an atmosphere communicating portion 11150 for receiving a negative pressure generating member 11102, a posterior second accommodating chamber 11200 for communicating to the bottom face of the first accommodating chamber 11100 through a minute communicating portion 11300 as the ink communicating portion and for storing the ink to be supplied to the first accommodating chamber 11100, and a lateral second accommodating chamber 11250 for communicating at partition walls 11251a and 11251b having a communicating portion larger than the minute communicating portion 11300 to the posterior second accommodating chamber 11200. In this embodiment, an L-character shaped ink storing portion as in the previously described embodiment is formed by the posterior second accommodating chamber 11200 and the lateral second accommodating chamber 11250.

Herein, the negative pressure generating member 11102 is accommodated in the first accommodating chamber 11100 in two-thirds region from the bottom face of the first accommodating chamber.

The negative pressure generating member stopper ribs 11103a, 11103b and 11103c are disposed at three sites on a ceiling of the first accommodating chamber 11100 so that the volume of not accommodating the negative pressure generating member 11102 can be positively reserved, thereby suppressing excessive insertion of the negative pressure generating member 11102.

With the three stopper ribs as above, the region of the first accommodating chamber formed therebetween consists of an air layer 11104, with the atmosphere communicating portion 11150 disposed in this air layer. Herein, it is important that an opening portion 11152 on the first accommodating chamber side of the atmosphere communicating portion is located at a position spaced a fixed interval apart from the negative pressure generating member 11102 at any time. As a result of examinations, the present inventors have found that in consideration of the fluctuation in inserting the negative pressure generating member 11102, the compressive strain of the stopper ribs 11103, or the softening deformation of the stopper ribs 11103 due to rise in temperature, it is preferred that the above interval is within a range from 3 mm to 5 mm. Herein, the reason for regulating the upper limit is that securing the sufficient distance from the ceiling of the first accommodating chamber to the opening portion 11152 of the first accommodating chamber is important in obtaining safety factor against the ink leakage in the inverted attitude (as will be detailed later). Note that the direction of the arrow E in FIG. 79 points to the scanning direction of the head according to this embodiment, and the direction of the arrow F points to the ink discharge direction from the head.

Figure 81:
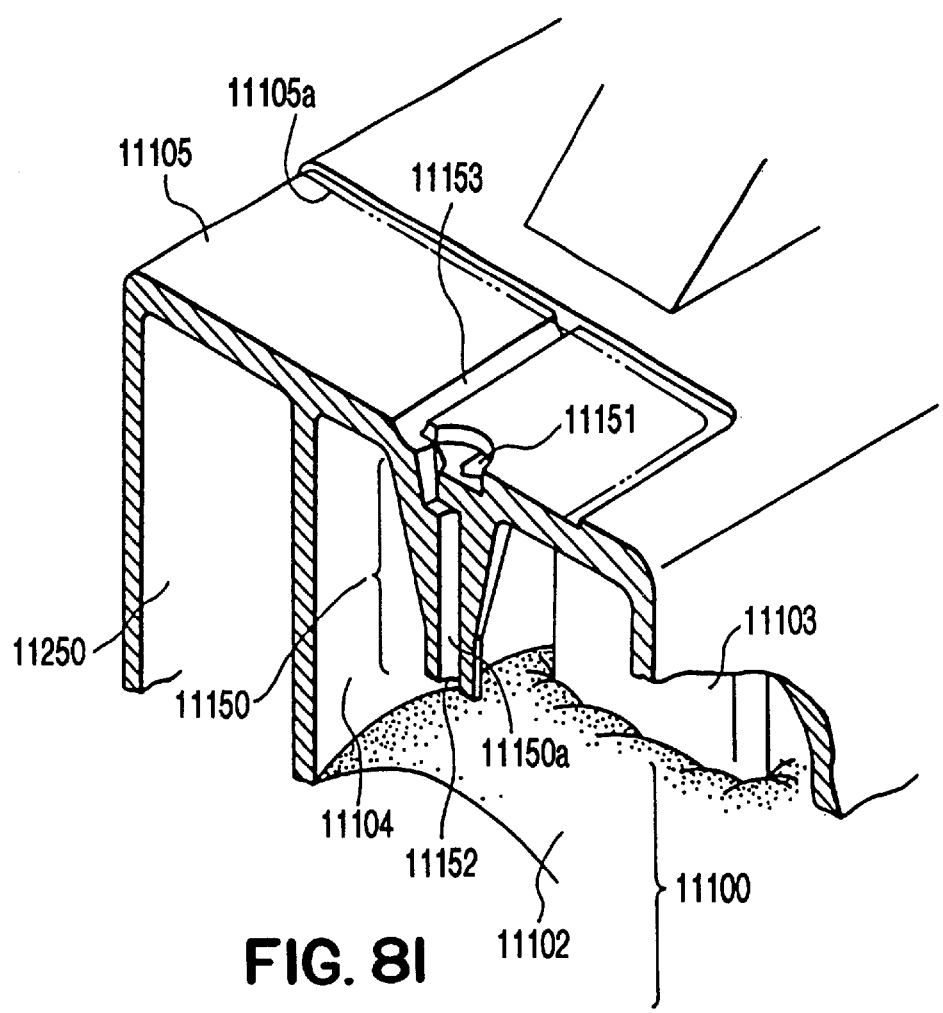
FIG. 81 is an enlarged perspective view showing the constitution around the periphery of an atmosphere communicating portion in an ink tank unit of the ink jet cartridge as shown in FIGS. 79 and 80, with a portion in cross section.
Figure 82:
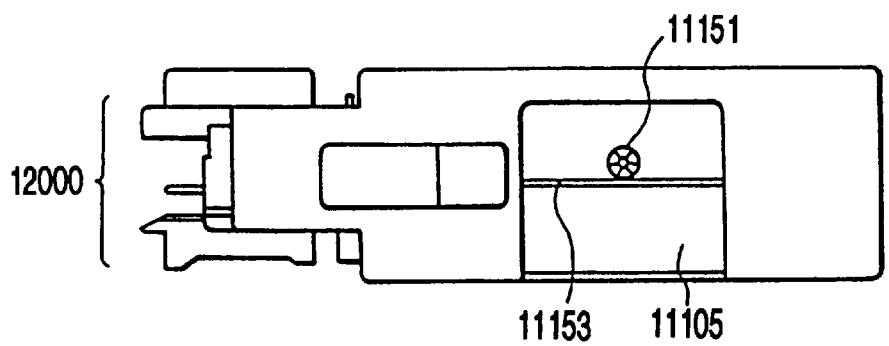
FIG. 82 is a plan view showing the constitution of an opening face of the atmosphere communicating portion as shown in FIG. 81.

FIG. 81 is an enlarged cross-sectional perspective view of the atmosphere communicating portion and its surrounding in this embodiment. FIG. 81 is a view of an opening portion 11151 of the atmosphere communicating port as shown in FIG. 79, as looked from the above. The atmosphere communicating portion 11150 is substantially comprised of a barrel portion 11150a extending from the inside of the first accommodating chamber 11100 to its wall portion and deadlocked near the outer face of the wall portion, as shown in FIG. 81, and an opening portion (opening portion 11151 of the atmosphere communicating port) divided into plural (three in this embodiment) branches from the deadlock portion of the barrel portion 11150a. This opening portion is provided on the outer surface of a housing for the ink tank unit 11000. Note that the opposite end to the opening portion 11151 of the atmosphere communicating port of the barrel portion 11150a corresponds to the opening portion 11152 of the first accommodating chamber. And this atmosphere communicating portion 11150 is a hole for introducing the outside air into the ink tank unit 11000 to obtain a pressure equivalent to the external pressure during the printing, but considering the vaporization of the ink, it is preferred to be slender and long. However, such a shape was contrary to its function from the respects of the process maintenance of the mold and the molding cycle in injection molding the vessel in plastic in the manufacturing process of the ink tank unit 11000. As a result, the evaporation of the ink may be permitted to some extent, or the part around the atmosphere communicating portion constituted of a plurality of members to attain its goal. The former has a problem, particularly in the color recording head, that the color tint may change between the initial time of the use and its terminal time, while the latter brings about the increased number of processes because of the complex manufacturing process with the increased number of parts, resulting in expensive recording head.

For the above problem, the present inventors have proposed a construction of holding a slender pin of the mold not to be swung in injection molding a slender and long atmosphere communicating port, as well as effecting the integration (integral molding) of complex shaped parts and preventing the foreign matter from directly entering the inside of the tank vessel through the opening portion of the atmosphere communicating portion disposed on the surface of the product.

Figure 83A:
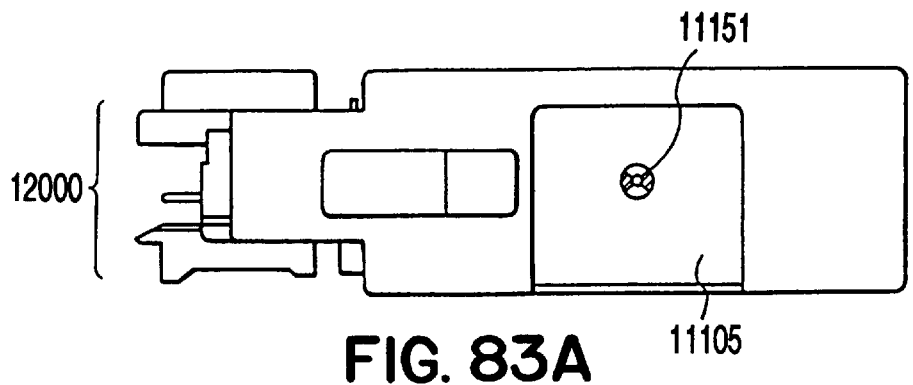
FIGS. 83A to 83C are plan views showing the opening profile of another atmosphere communicating portion according to the present invention.
Figure 83B:
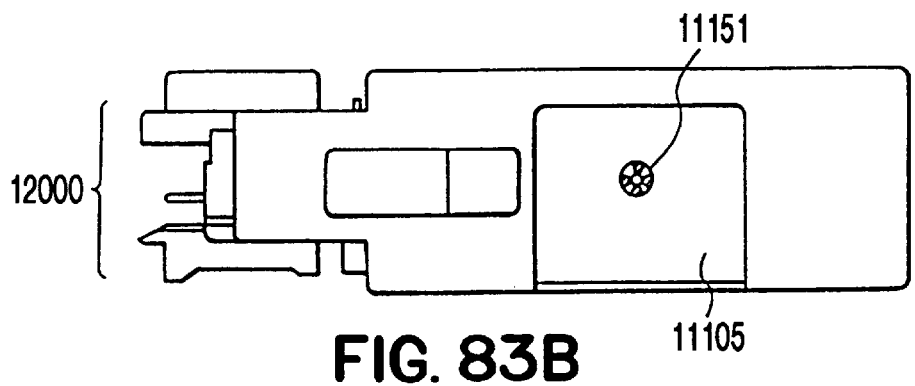
Figure 83C:
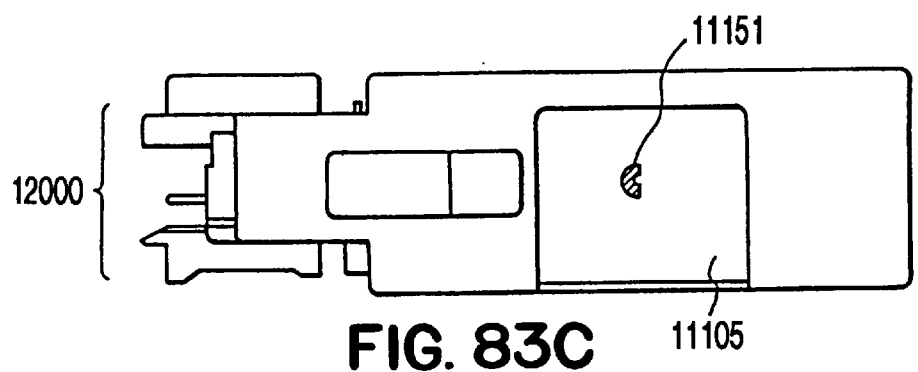
Figure 83D:
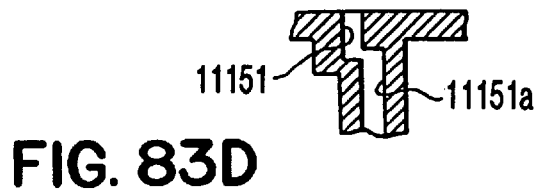
FIG. 83D is a cross-sectional view showing the internal structure of the atmosphere communicating portion of FIG. 83C.

In FIG. 81, the opening portion 11151 of the atmosphere communicating port is configured to accept the pin on the slide side with three claws provided on the fixed side CAV (cavity) of the mold, whereby the slender pin can be positioned and molded at high precision. In this embodiment, the atmosphere communicating port having an inner diameter φ of 1.0 mm and a length of 10 mm can be fabricated in about 20 seconds in the typical molding cycle. In this embodiment, the opening portion 11151 of the atmosphere communicating port is divided into three sections, but not limited to three, the opening portion may be divided into two or four sections with two or four claws (see FIGS. 83A and 83B). From the positional relation between the gate position and the atmosphere communicating portion, a through hole like a crank may be molded by providing a claw at one site on the side of keeping the slide pin from inclination due to the pressure of flowing resin (see FIG. 83C). It goes without saying that the ink jet cartridge in the previous embodiment may be used, but not limited to the tank unit in this embodiment, and is also effective in an integral or replacement-type tank vessel in which the negative pressure generating member is received substantially entirely within the ink storing portion.

Then, the surface of the opening portion 11151 of the atmosphere communicating port opens into a groove 11153 depressed 1 mm below a label pasting flank 11105 constituting a part of the outer surface of the ink tank unit 10000 which is 0.2 mm or more below the surface of the tank vessel, this groove 11153 being covered with a plastic film 11105*a* (e.g., a label) shown in dot-dash lines, having a adhesive layer, and the port communicating to the atmosphere through the groove extended beyond the film.

The groove 11153 is formed in greater length than the film width on both sides of the film. When the film is pasted at the normal position, two opening portions to the atmosphere are provided on the both sides of the film. And even if the film is deviated to either one side, one opening portion to the atmosphere can be secured at any time. One aim of covering the opening portion 11151 of the atmosphere communicating portion with the film is mostly the appearance, but the other aim is to secure the total extension of the atmosphere communicating port and suppress the evaporation. The plastic film may be a laminate of synthetic paper UPO and polypropylene film, or a film having a print layer inserted between former two layers and an adhesive layer applied.

Figure 84:
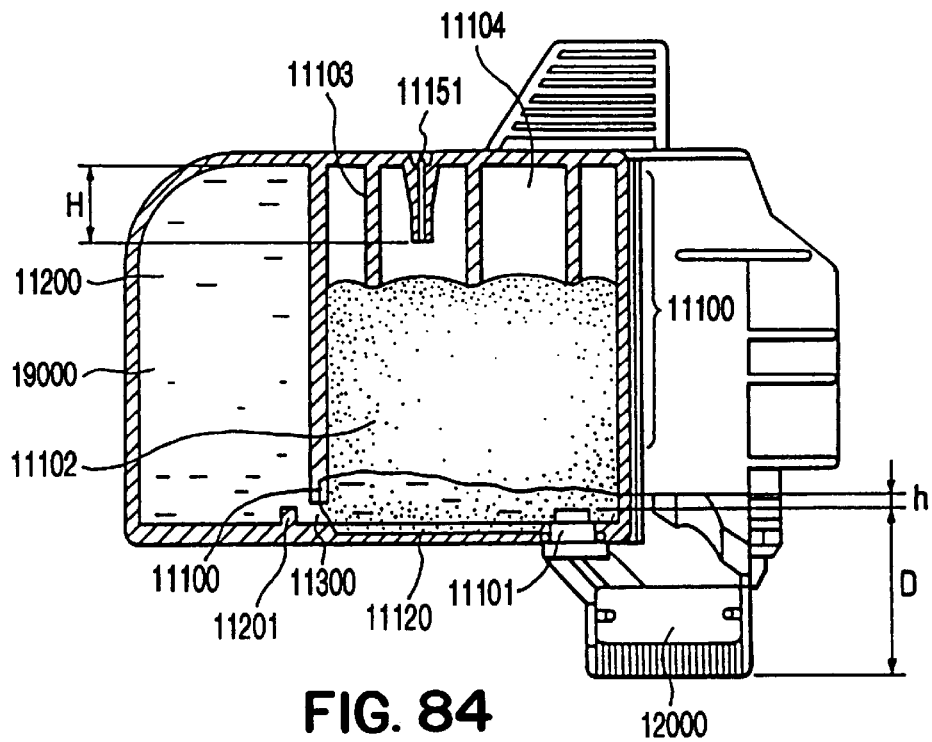
FIG. 84 is a cross-sectional view showing the internal structure of a first accommodating chamber of the ink tank unit in the ink jet cartridge as shown in FIGS. 79 to 82.
Figure 85:
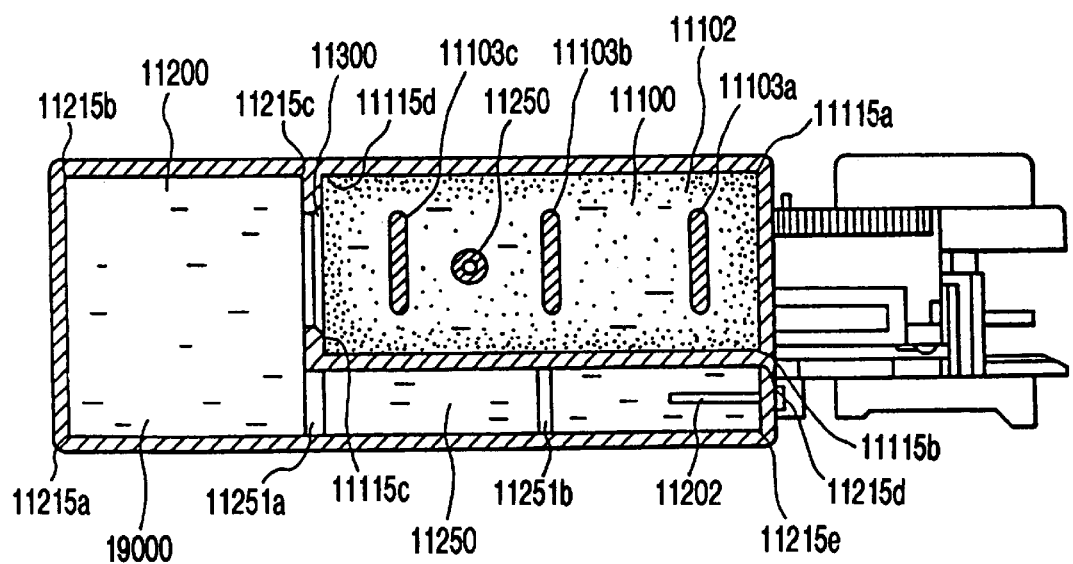
FIG. 85 is a cross-sectional view of the ink tank portion as shown in FIG. 84 as looked from the bottom side.

Referring now to FIG. 84, the generation of negative pressure in the ink tank unit of this embodiment will be described.

The condition of the negative pressure in the first accommodating chamber 11100 is determined by the negative pressure generating force of the negative pressure generating member 11102 and the holding amount of the ink within the negative pressure generating member 11102 provided above the connecting face of the ink discharge portion, as previously described. Also, the negative pressure within the first accommodating chamber 11100 must be −D mmaq or greater, assuming the distance between the connecting face of the ink discharge portion and the head discharge port face to be D mm, taking into consideration the ink leakage through the head discharge ports.

Also, the upper limit of the negative pressure must be determined by taking into consideration the ink exhaustion in the ink supply, the reduced print density in the insufficient supply, and the disorder in the image. In this embodiment, D is equal to 20 mm, and the negative pressure of the negative pressure generating member 11102 is set within the range from −20 mmAq to −40 mmaq.

As one means for controlling the negative pressure of the first accommodating chamber 11100, there is a way of adjusting the height h of a gas-liquid replacement promoting structure 11110 having a construction in which on the wall surface on the first accommodating chamber 11100 of the partition wall 11100*a* for partitioning between the first accommodating chamber 11100 and the second accommodating chamber 11200, the upper portion of the minute communicating portion 11300 is formed thin, or a construction containing a groove provided on the wall surface of the partition wall 11100*a* as previously described. By using this structure, the air moves from the first accommodating chamber 11100 to the posterior second accommodating chamber 11200 in the closed state, while at the same time the ink is supplied from the second accommodating chamber to the negative pressure generating member 11102 within the first accommodating chamber 11100 so that the ink liquid level can be maintained below the top of the gas-liquid replacement promoting structure 11110. Accordingly, by changing the top portion of this gas-liquid replacement promoting structure 11110, the gas-liquid boundary surface within the first accommodating chamber 11100 can be set at any level.

In this embodiment, assuming the height h from the connecting surface of the ink discharge portion to the top portion of the gas-liquid replacement promoting structure to be 5 mm, the ink liquid level in the gas-liquid replacement during the recording and non-recording (including standby) is always maintained in the range from 2 mm to 5 mm above the connecting surface of the ink discharge portion, whereby the stable state can be established until all the ink within the posterior second accommodating chamber 11200 and the lateral second accommodating chamber 11250 is used up.

In this embodiment, on the bottom face of the first accommodating chamber 11100 is provided an ink supply promoting structure 11120 having a portion slightly lower than its bottom face. The structure of this ink supply promoting structure 11120 will be detailed later. This structure is disposed for the purpose of eliminating the interruption of the ink from the minute communicating portion 11300 to the connecting surface of the-ink discharge portion, but becomes extremely effective means when the proper negative pressure can not be obtained only by the adjustment of the height of the gas-liquid replacement promoting structure 11110. For example, this is effective when the connecting opening portion 11101 with the ink jet head unit 12000 is on the bottom face of the ink tank portion 11100, or when the distance from the minute communicating portion 11300 to the connecting opening portion 11101 is large, or both as in this embodiment shown in FIGS. 68A and 68B.

In this embodiment, the depth of the ink supply promoting structure 11120 is 1.5 mm lower than the bottom surface of the posterior second accommodating chamber 11200 and the lateral second accommodating chamber 11250, or the bottom surface of the minute communicating portion 11300, thereby resolving all the previous problems.

The ink supply promoting structure 11120 in this embodiment has an evenly lower bottom surface, but may have several slits of equivalent depth disposed. Also, in the ink tank unit of a structure wherein the connecting opening portion 11101 is opposed to the partition wall 11100*a* having the minute communicating portion 11300, it has been confirmed that the same effects can be obtained by disposing a projection-like rib.

Referring now to FIGS. 85 to 87C, the ink leakage through the atmosphere communicating port of the ink tank unit will be described below.

The ink jet cartridge of the constitution of this embodiment can prevent evaporation during physical distribution, and is placed in such a packaged state that the head is not damaged and the function is not impaired.

Meanwhile, the discharge port face most governing the head characteristics is covered with a protecting seal tape, but the opening portion of the atmosphere communicating portion leading to the inside of the ink jet cartridge is not sealed. In the case of a replacement-type ink cartridge, there are only provided the connecting opening portion to the head portion and the atmosphere communicating port, wherein these two opening portions may be sealed with a seal tape.

However, in the case of an integral-type head, when all the opening portions are closed to prevent ink leakage, the increased internal pressure caused by environmental changes may produce ink leakage through the opening portion and the connecting portion between the discharge portion and the tank portion.

Also, the ink discharge port can not be completely sealed by a seal tape owing to pits in the structure. For such reasons, in the integral-type ink jet cartridge, the atmosphere communicating port is opened within the physical distribution package.

Therefore, in the ink tank unit having the first and second accommodating chambers, if the head cartridge is physically distributed in the device attitude, the atmosphere communicating port is located upward, without ink leakage, but in other attitude, particularly in the inverted attitude, the ink in the second accommodating chamber may flow into the air layer 11104, sometimes leakage through the atmosphere communicating port and splashing into the package.

In this embodiment, as means of preventing ink leakage within Shrink tank unit through the atmosphere communicating portion in all the attitudes of physical distribution as above described and under the environmental temperature or humidity condition or both complicated condition, four vertical edge line portions 11115a, 11115b, 11115c and 11115d contacted by the negative pressure generating member 11102 of the first accommodating chamber 11100 are curved with a radius of curvature of 2 mm, so that the negative pressure generating member 11102 can evenly press on the absorbing member at four corners not to cause exfoliation or distortion to produce interstice and cause the inflow or concentration of the ink at the corner portion.

On the other hand, five vertical edge line portions 11215a, 11215b, 11215c, 11215d and 11215e of the posterior second accommodating chamber 11200 and the lateral second accommodating chamber 11250 except for the minute communicating portion 11300 are curved with a radius of curvature of 2 mm, and a projection 11201 having a height of 2 mm and a width of 14 mm is disposed in the neighborhood of the minute communicating portion 11300 on the bottom surface of the posterior second accommodating chamber 11200. The necessity for providing curvature for each of the edge line portions of two second accommodating chambers and the projection on the bottom surface as above described is based on the following experimental results conducted by the present inventors.

Figure 87A:
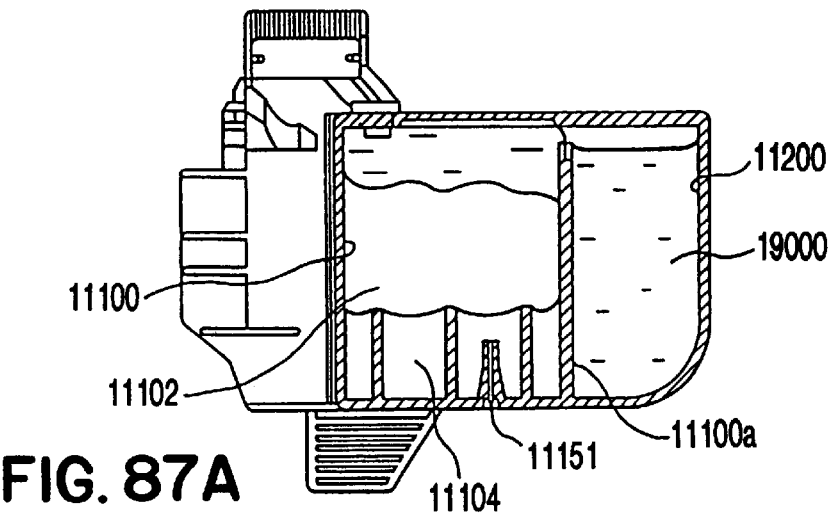
FIGS. 87A to 87C are cross-sectional views for explaining the mechanism of the ink movement within the ink tank unit without a bottom projection 101201.
Figure 87B:
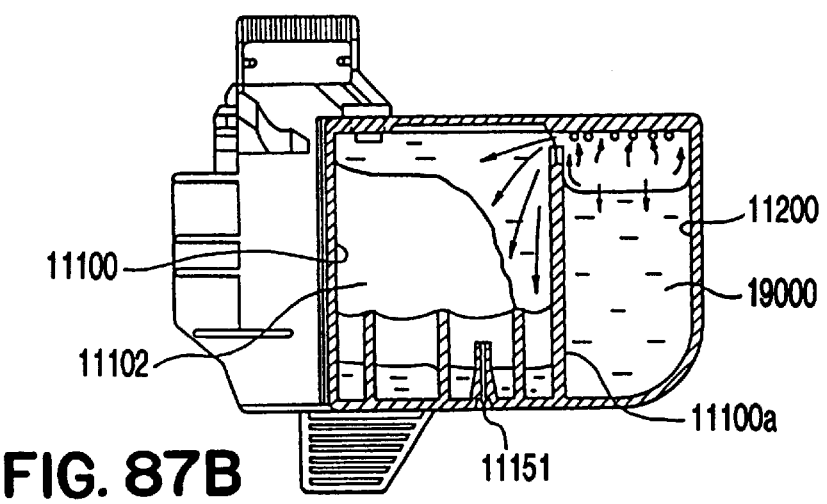
Figure 87C:
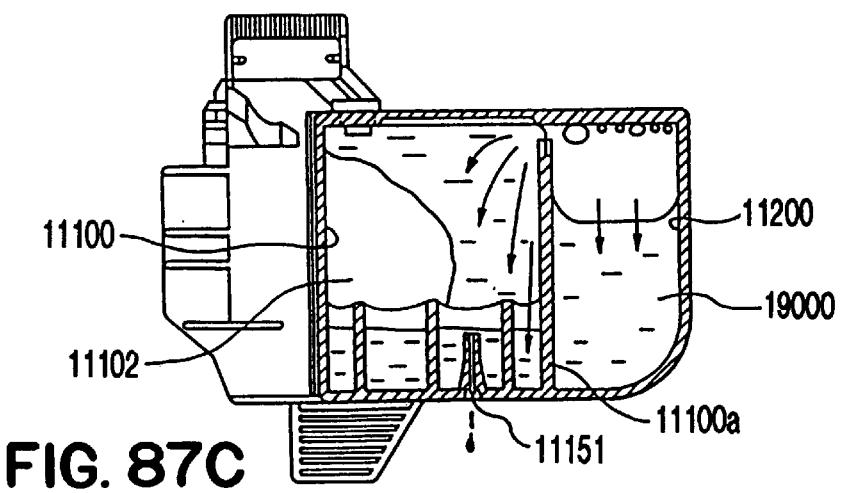

FIGS. 87A to 87C are cross-sectional views of an ink jet cartridge without vertical edge line portion 11215a to 11215e and the bottom projection 11201 in the two second accommodating chambers 11200 and 11250. If the ink jet cartridge is placed in the inverted state with the discharge port face upward, and under the physical distribution environment of high temperatures (60° C. to 80° C.), the ink filled within the second accommodating chamber thermally will expand and permeate through the minute communicating portion 11300 into the negative pressure generating member 11102. At this time, the internal pressure is released through the atmosphere communicating port. Then, the gas-liquid replacement occurs through the atmosphere communicating port and the minute communicating portion 11300, so that the air is filled in the second accommodating chamber 11250 (see FIG. 87A).

Further, the gas-liquid replacement between the ink within the second accommodating chamber and the air within the first accommodating chamber 11200 occurs even if the ink liquid level falls below the height of the minute communicating portion 11300 of the partition wall 11100a.

This is due to the fact that the edge portions of five vertical edge lines orthogonal to the bottom surface (upper surface in this figure) within the second accommodating chamber 11250 pull up the ink owing to capillary force, and the expanded air within the second accommodating chamber 11250 promotes it (see FIG. 87B).

Further, the air layer within the second accommodating chamber 11250 contains the evaporation of the water content in the ink, causing a phenomenon in which the water vapor in the supersaturated state is bedewed on the bottom surface of the second accommodating chamber (upper face in this figure). In particular, if there is a temperature variation, this state will occur more remarkably. As a result, dewed water droplets are gradually accumulated to become larger water droplets, some part of which will drip into the ink, other part being sucked through the minute communicating portion into the negative pressure generating member 11102. Because of this and the pulling up of the ink in the edge line portions as above described due to capillary force, the ink moved into the first accommodating chamber is reserved in the air layer 11104, and begins to leak through the atmosphere communicating port to the outside when the ink liquid level exceeds the height of the atmosphere communicating portion (see FIG. 87C).

Figure 86A:
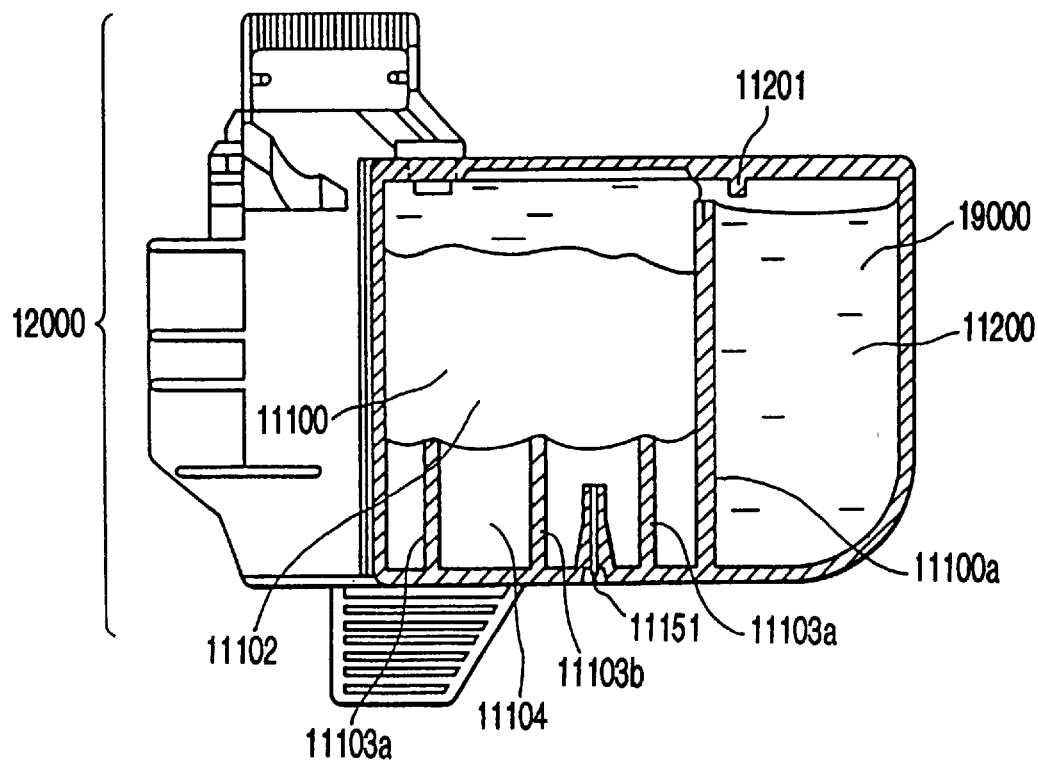
FIGS. 86A and 86B are cross-sectional views for explaining the ink movement within the ink tank portion as shown in FIG. 85, respectively.
Figure 86B:
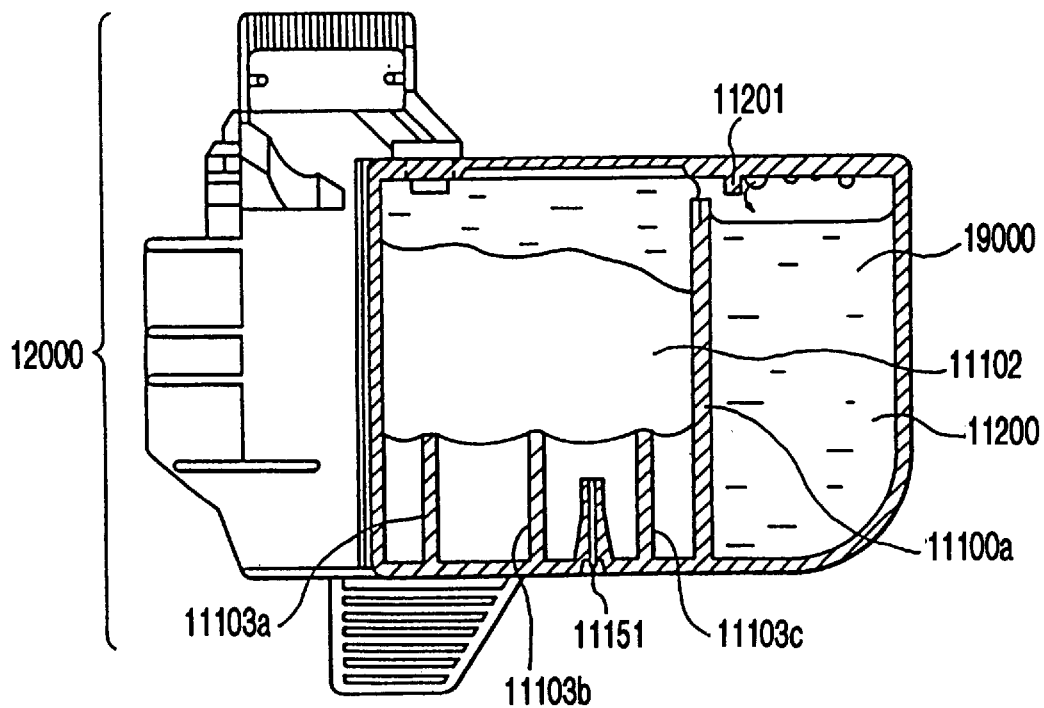

On the contrary, FIGS. 86A and 86B are cross-sectional views of an ink jet cartridge according to this embodiment in which five vertical edge line portions orthogonal to the bottom surface of the second accommodating chamber are curved, and a projection 11201 is disposed in the neighborhood of the minute communicating portion 11300. With the discharge port face upward.

In FIGS. 86A and 86B, if exposed to high temperature, environment at the initial stage, the ink will expand in volume to permeate into the negative pressure generating member 11102. Because of this and the gas-liquid replacement, the ink in the amount corresponding to the height of the minute communicating portion 11300 is moved from the second accommodating chamber 11200 to the first accommodating chamber 11100 (see FIG. 86A). However, because the vertical edge line portions of the second accommodating chamber 11200 are curved, there is no capillary force exerted on the ink, causing no movement of the ink still in the initial state.

Also, water droplets bedewed to the bottom surface (upper surface in this figure) of the second accommodating chamber 11200 are blocked by the projection 11201 provided near the minute communicating portion 11300, but not absorbed by the negative pressure generating member 11102, and will drip into the ink within the second accommodating chamber 11200. Accordingly, the ink is not moved beyond a certain amount, thereby preventing ink leakage through the atmosphere communicating port (see FIG. 86B).

Herein, the height H of the connecting portion in the atmosphere communicating port (see FIG. 84) is necessary to be high enough that when the ink flows into the air layer 11104, the ink may not flow into the opening portion in the first accommodating chamber of the atmosphere communicating port. In this embodiment, H=10 mm was obtained by multiplying the ink liquid level corresponding to the maximum flowable amount of the ink of the second accommodating chamber 11200 in the inverted state, by a safety factor of two.

Referring now to FIG. 88 and FIGS. 89A to 89D, a manufacturing process of the ink tank unit in this embodiment will be described below.

Figure 88:
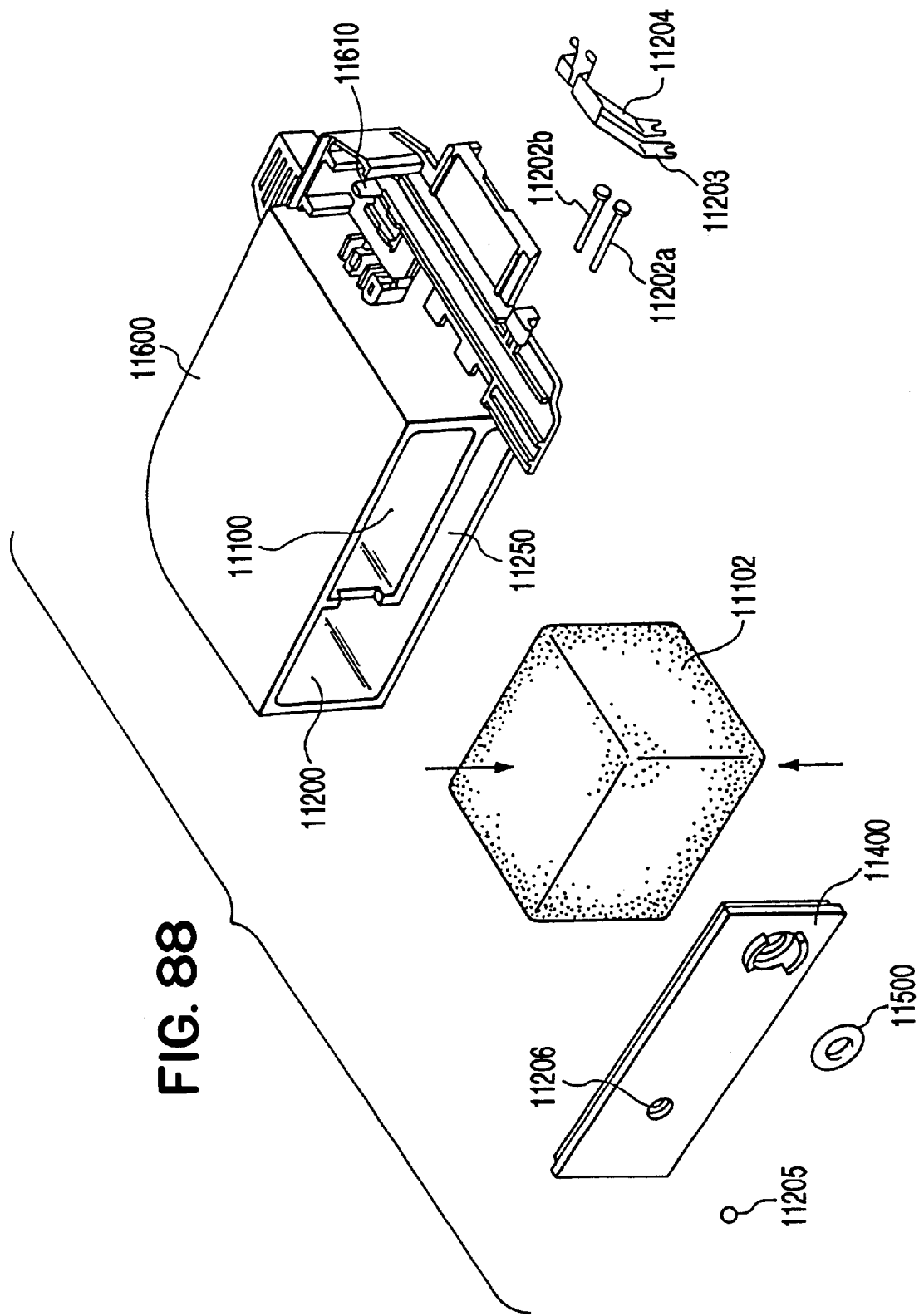
FIG. 88 is an exploded perspective view showing the constitution of the ink jet cartridge, particularly the ink tank unit, as shown in FIGS. 79 to 82.

In FIG. 88, 11600 is an ink tank unit housing, 11102 is a negative pressure generating member, and 11400 is a vessel lid. 11202a and 11202b are electrode pins for sensing the remaining amount of ink, and 11203 and 11204 are contact members extending from each electrode pin to electrode disposed in the ink discharge portion. 11206 is an ink pouring port, and 11205 is an ink pouring port plug. The ink tank unit housing 11600 is formed by integral molding of resin. Within the first accommodating chamber 11100 of the ink tank unit housing 11600 is accommodated a negative pressure generating member 11102, which is inserted after compressed from both sides in the direction of the arrow of FIGS. 87A to 87C. The negative pressure generating member 11102 is compressed to one-third to one-fourth the volume when accommodating it.

Thereafter, the vessel lid 11400 is joined with the ink tank unit housing 11600, but this connection is effected by welding from the respects of the air-tightness in the junction and the productivity. Especially, the ultrasonic welding is preferable means from the aspects of both the reliability and the productivity. Thereafter, the electrode pins 11202a and 11202b are forced via the contact members 11203 and 11204 into the neighborhood of the bottom face of the lateral second accommodating chamber 11250 of the tank housing 11600, and welded thereto.

Figure 89A:
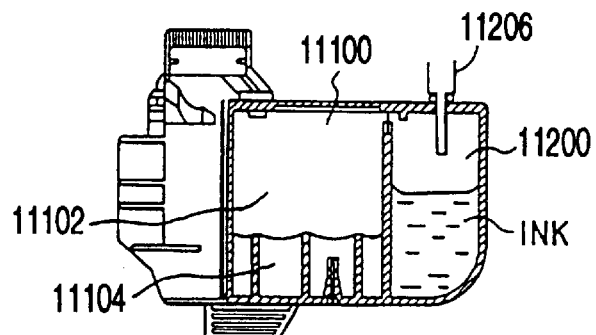
FIGS. 89A to 89D are cross-sectional views for sequentially explaining the ink pouring process into the ink tank unit of the ink jet cartridge as shown in FIGS. 79 to 82.
Figure 89B:
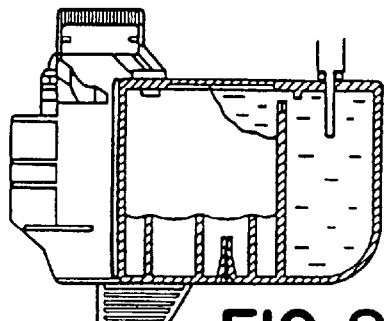
Figure 89C:
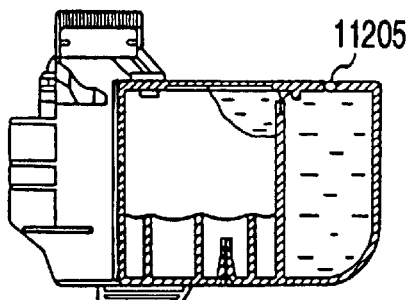
Figure 89D:
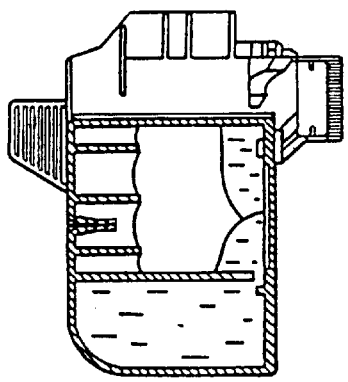

The ink is poured into the ink tank unit 11000 thus assembled through the ink pouring port 11206 opened in the vessel lid 11400. The pouring process is shown in FIGS. 89A to 89D. In pouring the ink, the ink is poured under pressure by a fixed amount in the inverted attitude where the minute communicating portion is placed on the uppermost portion, with an inner diameter of the ink supply port of 1.5 mm and at a pouring speed of about 4 cc/see as shown in FIG. 89A, whereby the excellent pouring conditions without bubbling can be obtained. The pouring of the ink is stopped at the time when the second accommodating chamber is filled with the ink to cause the ink to flow from the minute communicating portion into the negative pressure generating member, and the supply port portion is pulled out at the top end and plugged substantially at the same time (primary pouring) (FIGS. 89B and 89C). Thereafter, by adopting an attitude with the opening of the ink discharge portion placed at the uppermost positions (FIG. 89D), the ink is poured under pressure by a fixed amount, whereby the pouring is completed (secondary pouring).

This secondary pouring is made through a nozzle of ϕ 1.5 mm and at a pouring rate of about 4 cc/see by inserting it to the extent that the supply port touches the negative pressure generating member 11102, like the primary pouring, so that the ink is dispersed evenly.

Finally, a label is pasted on the outer surface of the tank, thereby completing the ink tank unit.

Next, the ink jet unit and its assembling method will be described.

Figure 90:
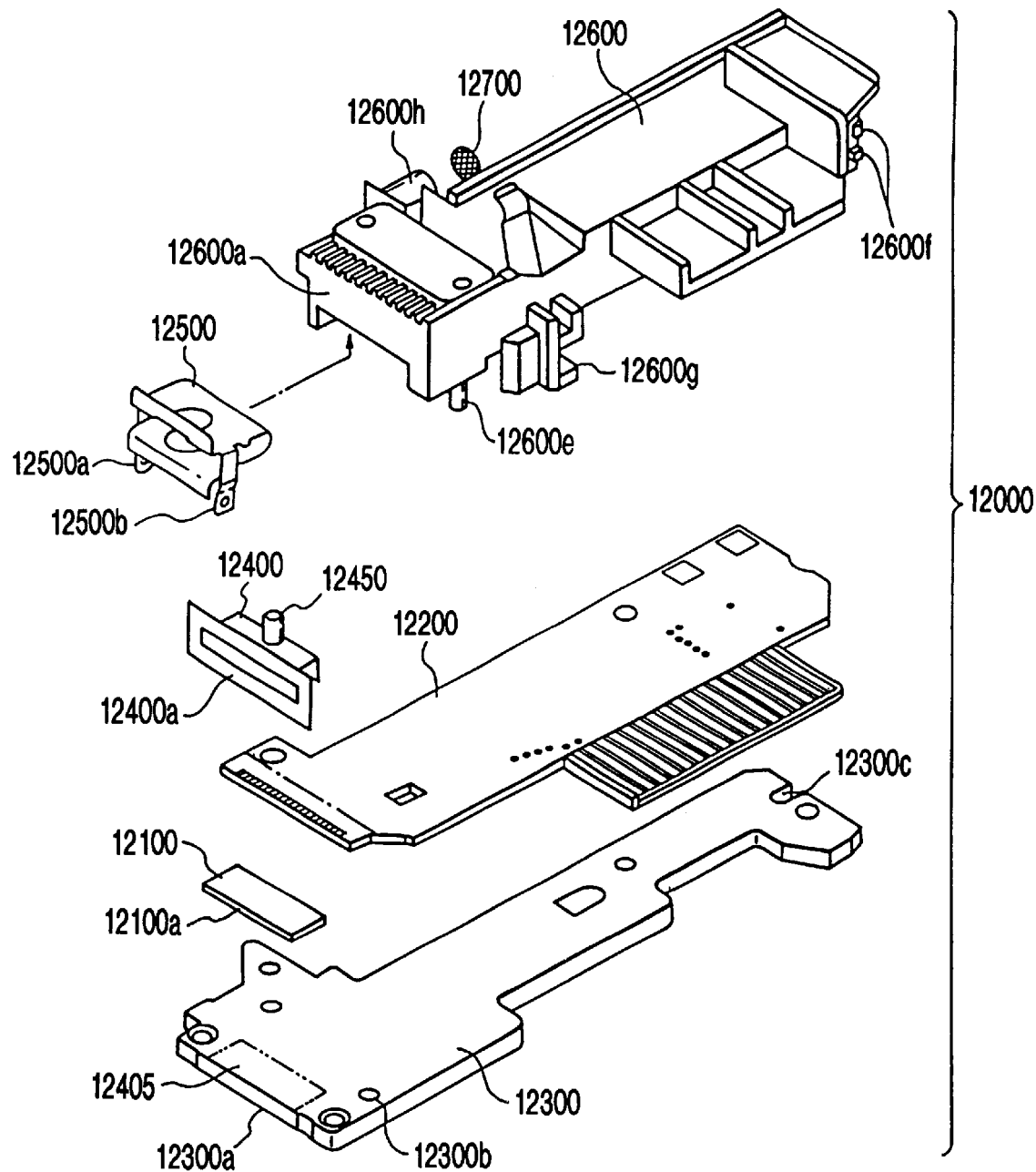
FIG. 90 is an exploded perspective view showing the constitution of the ink jet cartridge as shown in FIGS. 79 to 82, particularly the ink jet head unit as the head portion.

FIG. 90 is an exploded perspective view showing a constitution of an ink jet unit 12000 in this embodiment. Herein, 12100 is a substrate (heater board) with elements (heaters) arranged for generating the heat energy which is ink discharge energy, and 12400 is a ceiling plate (grooved ceiling plate) having grooves for forming liquid flow passages corresponding to elements as well as having a member with the ink discharge ports formed corresponding to liquid flow passages. 12200 is a circuit substrate for supplying electric power to a heater board 12100, 12300 is a base plate serving as the reference in packaging the ink discharge portion, 12500 is a presser spring for applying even pressure (line pressure) near the discharge ports of the discharge portion by forcing the ceiling plate 12400 and the heater board 12100 into intimate contact with each other.

12600 is a holder having inside a flow passage for supplying the ink from the ink tank unit to the ink jet head unit, wherein a filter 12700 for preventing the invasion of foreign matter is welded on the connecting surface with the ink tank of the ink communicating portion 12600 of the holder.

Figure 91:
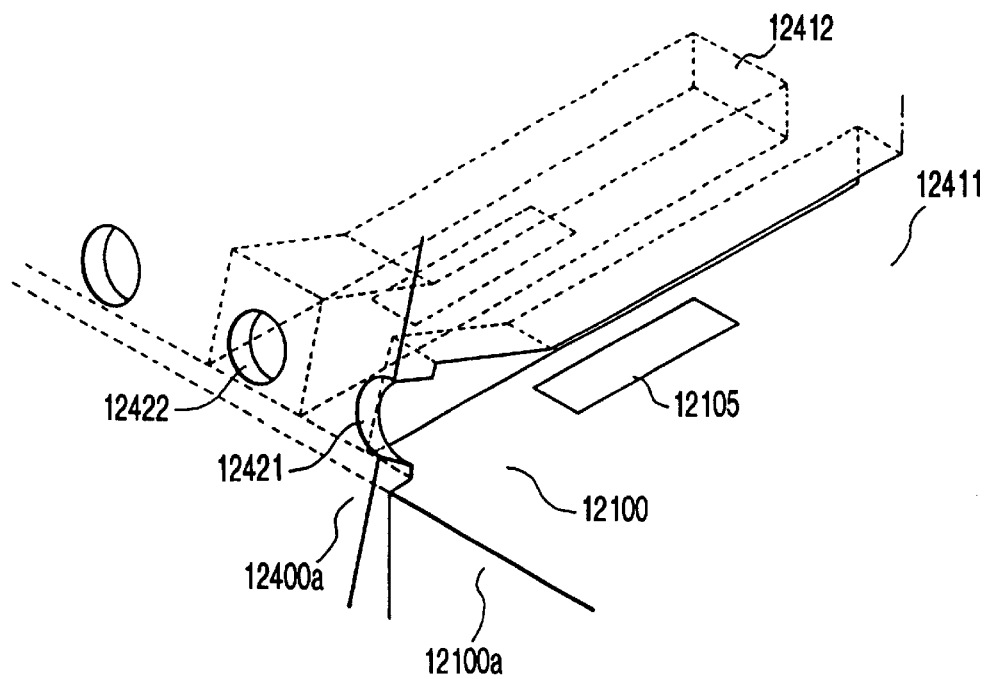
FIG. 91 is a typical perspective view for explaining the periphery of the ink discharge port of the ink jet head unit as shown in FIG. 90 in an enlarged scale.

In FIG. 90, an adhesive is applied a predetermined thickness in a predetermined region 12405 near the front end face 12300a on the surface of a support 12300, on the applied surface of which a heater board 12100 is secured by adhesive so that its front end face 12100a and a front end face 12300a of the support 12300 are flush. The ceiling plate 12400 is disposed on this heater board 12100 by temporarily joining so that an orifice plate 12400a is disposed in front of both front end faces 12100a and 12300a of the heater board 12100 and the support 12300, as shown in FIG. 80. Herein, in FIG. 91, 12105 is a discharge heater as electrothermal converter provided at a predetermined position on the heater board 12100. Also, 12411 and 12412 are ink flow passage grooves formed on the ceiling plate 12400, and 12421 and 12422 are discharge ports bored by excimer laser on the orifice plate 12400a of the ceiling plate 12400.

Figure 92:
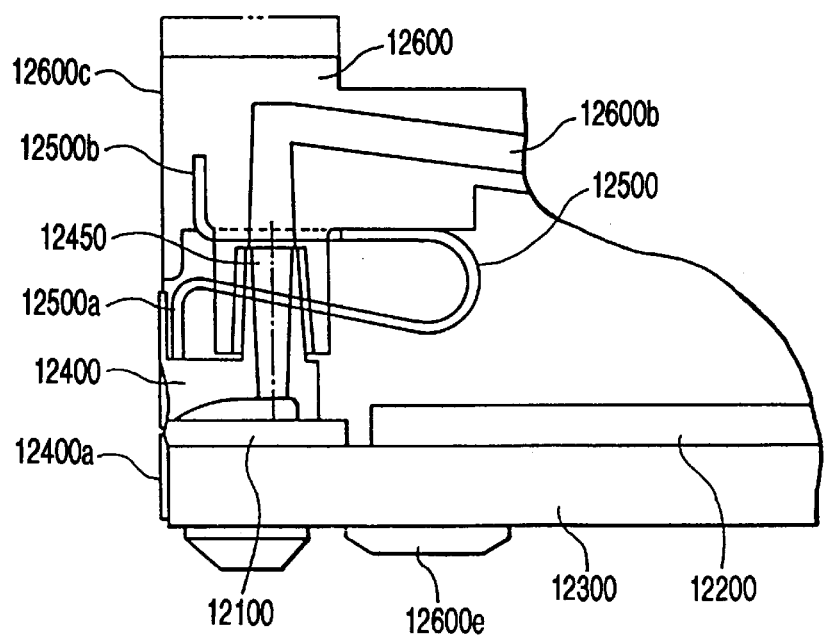
FIG. 92 is a lateral cross-sectional view for explaining the top end of the ink jet head unit as shown in FIG. 90 in an enlarged scale.

In this way, with the ceiling plate 12400 temporarily joined on the heater board 12100, the heater board 12100 and the ceiling plate 12400 are on the support 12300, as shown in FIG. 92, and further a holder 12600 covering and protecting the wiring substrate 12200 is placed thereon.

An assembling method of an ink jet head unit of the present invention will be described below.

After the heater board 12100 is bonded by an adhesive (silicon-type adhesive SE4400: made by Toray) 10 to 30 μm thick on the support 12300, the connection with the wiring substrate 12200 is made by wire bonding with aluminum wire. The ink discharge ports of the ceiling plate 12400 and the discharge heaters 12105 of the heater board are aligned with each other and then temporarily secured by applying a ultraviolet curable adhesive (TB3006B: made of Three Bond) to both end portions of the ceiling plate 12400. Then, for the junction between the ceiling plate 12400 and the heater board 12100, a spring 12500 for concentratively pressing on the discharge ports and the neighborhood of the liquid flow passage is settled. The spring 12500 has spring legs 12500a, 12500b on both sides, and secured by engagement with the heater board 12100. Then, the ceiling plate 12400 is put on the heater boards 12100, 12200, and the support 12300. The holder 12600 has a pair of leg portions 12600e disposed on both sides of the ceiling plate 12400, which are inserted through a pair of holes 12300b in the support 12300 to project the top ends of the leg portions 12400e beyond the back face side of the support 12300.

Finally, a silicon sealing agent (TSE399BC Toshiba Silicon) is poured from the upper portion of the holder to the gap between the holder 12600 and the ceiling plate 12400 or the base plate 12300, the gap between the ceiling plate 12400 and the heater board 12100, the gap between the orifice plate 12400a and the heater board end portion 12100a or the base plate end portion 12300a, for the protection of the wire bonding portion.

Next, the mounting of the ink jet head unit 12000 on to the ink tank unit 11000 will be described below. In FIGS. 88 and 90, 11610 and 12600f are a projection and a latch having spring property attached to the ink tank unit housing 11600 and the holder 12600, whereby the falling of the ink jet head unit can be prevented by engagement of both.

On the other hand, the connecting opening portion 11101 of the ink jet head unit in the ink tank unit 11000 is joined via an O-ring 11500 to the ink tank connecting portion 12600h of the ink head unit to prevent ink leakage.

In the above way, the ink jet cartridge is completed. Then, the packaging of the ink jet cartridge will be described below.

Figure 93:
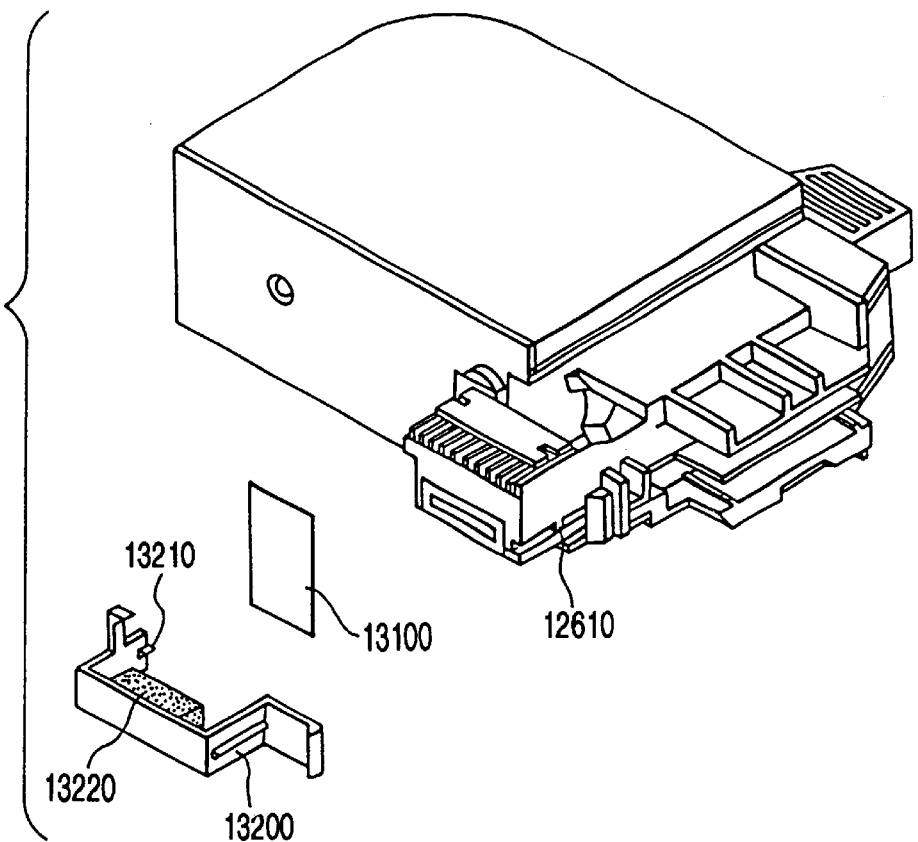
FIG. 93 is a perspective view for explaining the protection of the top end of the discharge port portion of the ink jet head unit in the ink jet cartridge as shown in FIGS. 79 to 82.
Figure 95:
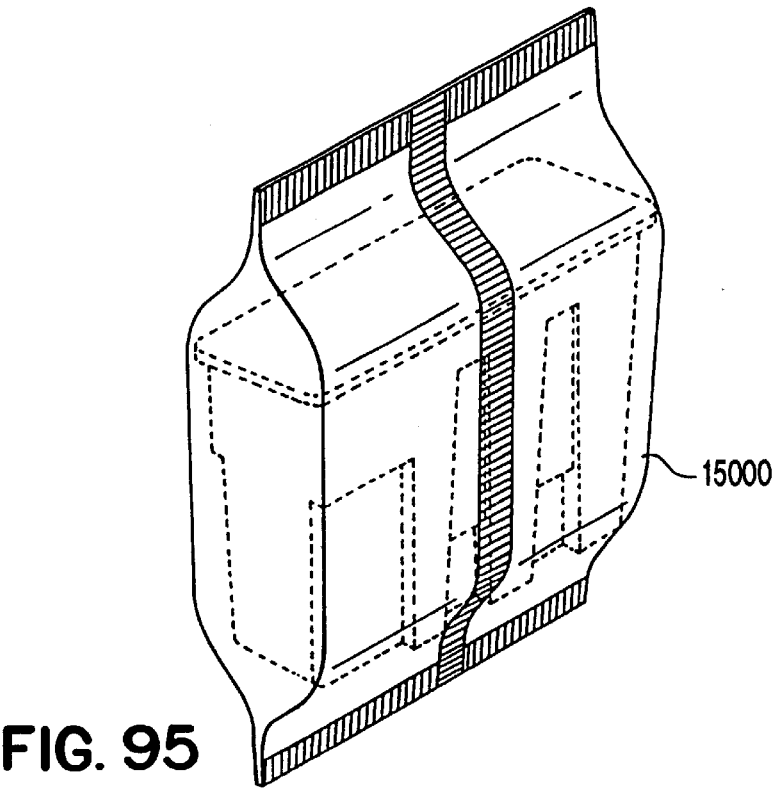
FIG. 95 is a perspective view showing a final package of the ink jet cartridge received within the package as shown in FIG. 94.

FIG. 93 shows the assembling of a protective tape 13100 and a protection cap 13200 for protecting the discharge ports from drying and fixing or damage during physical distribution in packaging. The protection cap 13200 has a sponge 13220 in an area in contact with the discharge port face via the protective tape 13100, the protective tape 13100 being forced into contact with the discharge port face by a pressing force of 500 to 2000 g of this sponge.

The protection cap 13200 has a projection 13210 engaging the holder 12600, while the holder 12600 has a depression caught by the projection on either side to prevent the falling by engagement of both.

Figure 94:
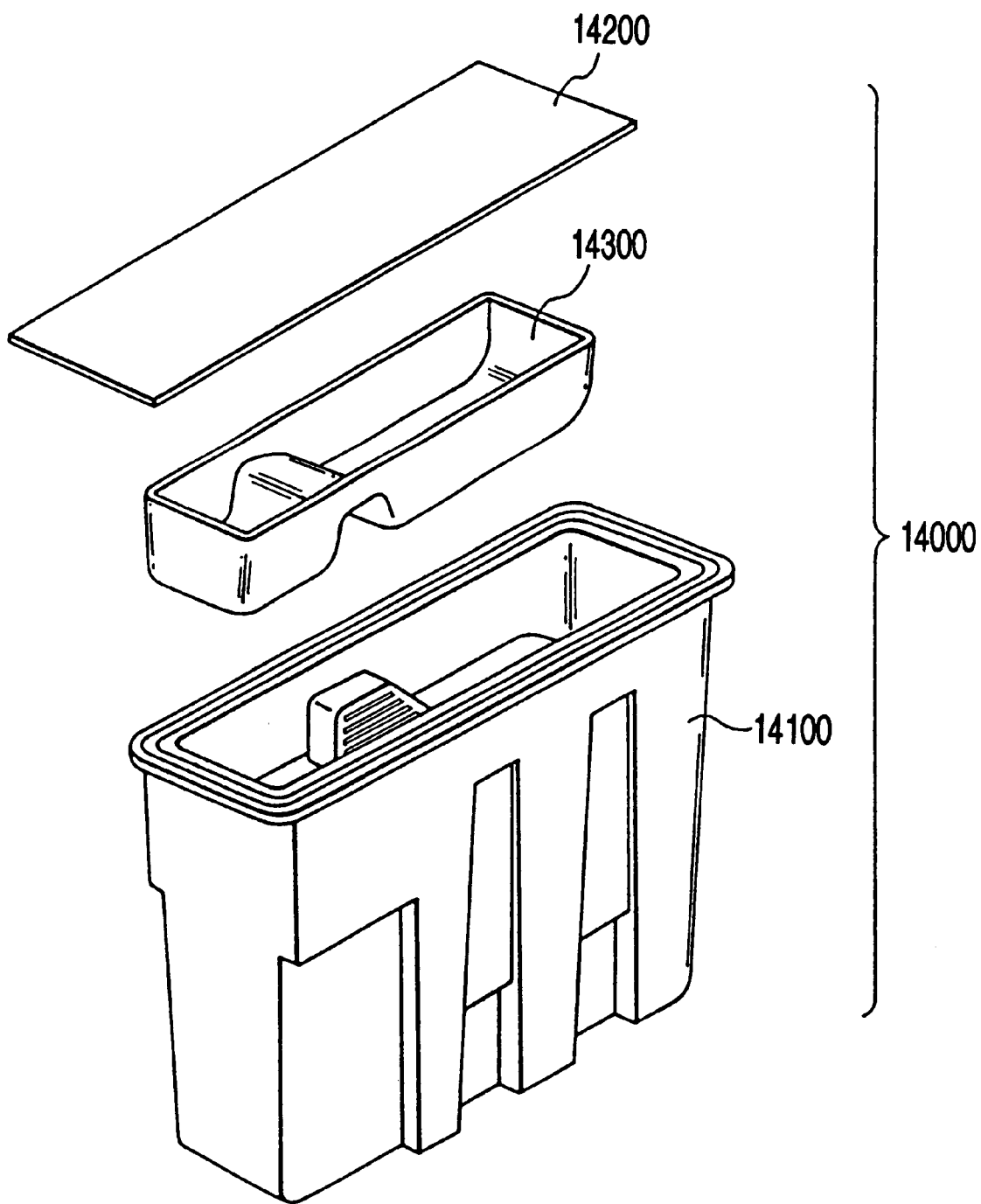
FIG. 94 is an exploded perspective view showing the constitution of a package applicable to the ink jet cartridge as shown in FIGS. 79 to 82.

FIG. 94 shows the constitution of a package 14000 for protecting the ink jet cartridge against the physical distribution environment changes, and preventing the falling. In FIG. 94, 14100 is a case body, 14200 is a case lid, and 14300 is a buffer body for preventing the vibration of the ink jet cartridge within the case.

The case body 14100 is formed of a molding made of polypropylene from the aspects of impact durability, gas barrier property of preventing evaporation of the ink from the ink jet cartridge, as well as the costs. The case lid 14200 is formed of a multi-layer film having excellent gas barrier property, for example, one in which a polyethylene terephthalate layer 12 $\mu$m, an aluminum evaporation layer 0.05 $\mu$m, a nylon layer 15 $\mu$m, a polyethylene layer 25 $\mu$m, an easy peel layer 25 $\mu$m are laminated in sequence from the outermost layer or the outside, or one in which a nylon 15 $\mu$m, an aluminum foil 9 $\mu$m and an easy peel layer 75 $\mu$m are laminated in sequence from the outermost layer.

The packaging procedure is as follows.

After inserting the ink jet cartridge into the case body 14100, the buffer body 14300 is placed therein, a welding rib 14120 disposed in a flange portion 14110 of the case body 14100 and the easy peel layer of the case lid 14200 are welded together by heating to obtain a package.

Further, this package 14000 is accommodated within a pillow bag 15100 fancy printed, and then a package 15000 of the ink jet recording head is completed (see FIG. 68a). In the above example, a head cartridge with an ink tank unit and a head unit integrated was described below, but the head unit and the ink tank unit may be separated as independent parts.

(Other Embodiment)

Figure 96:
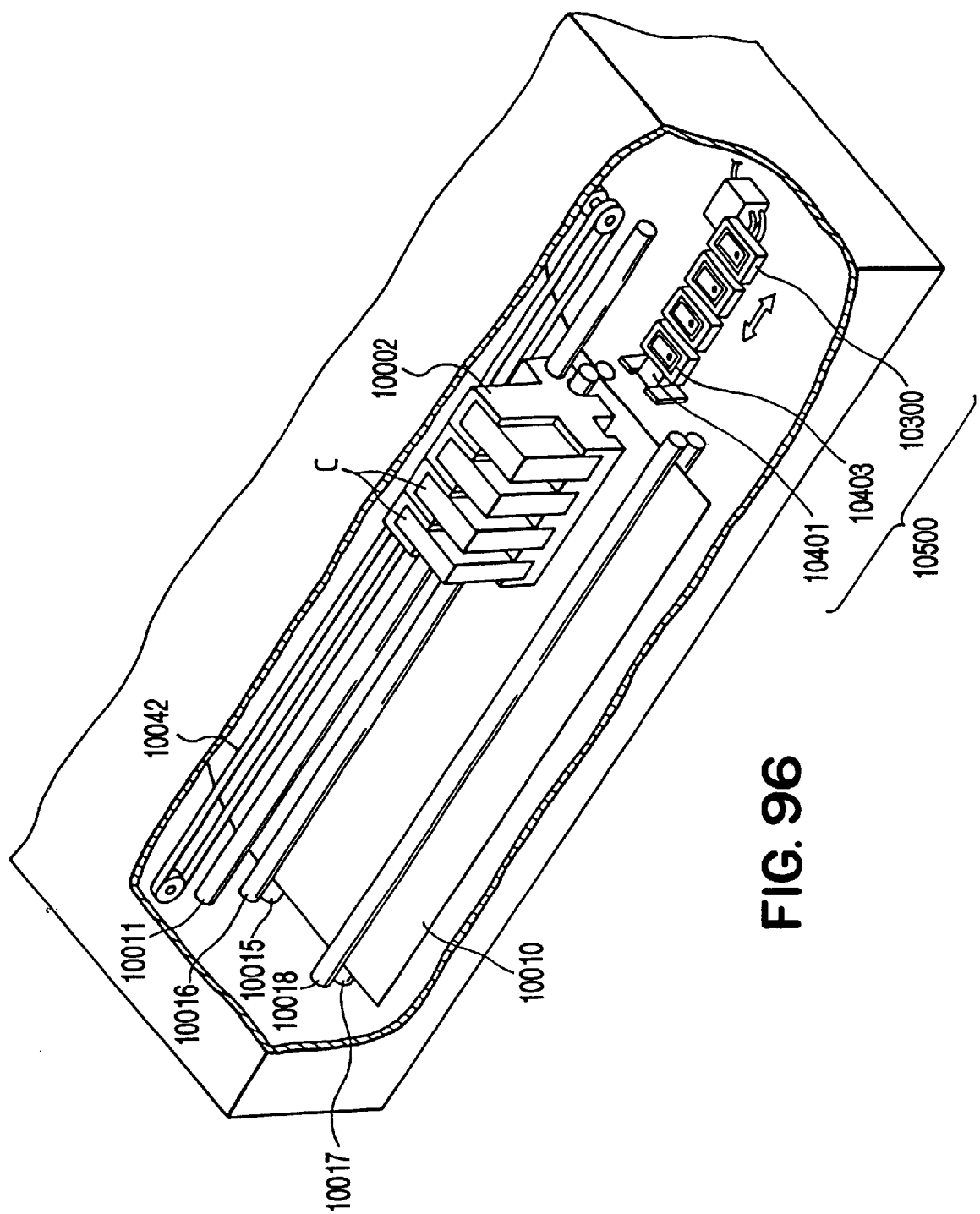
FIG. 96 is a perspective view showing one example of an ink jet apparatus on which an ink jet cartridge of the present invention can be mounted.

FIG. 96 shows one embodiment of an ink jet recording apparatus having an ink jet cartridge mounted thereon according to the present invention.

In the figure, C is an ink jet cartridge of the present invention, as previously described, and 10002 is a carriage for mounting for the movement four ink jet cartridges corresponding to four color inks of yellow, magenta, cyan and black.

Herein, the carriage 10002 is slidably engaged in a guide shaft 10011, a part of the carriage 10002 being connected to a belt 10042 driven by a motor. Thereby, the carriage 10002 is movable along the guide shaft 10011, allowing the ink jet cartridge C to be moved in the recording area and its adjacent area.

10015, 10016 are feed rollers for driving the motor. With such constitution, a recording medium 10010 is supplied to a position opposite the discharge port face of the recording head, and fed via rollers 10017, 10018 into a paper exhaust portion when the recording is progressed.

In this embodiment, the recording medium 10010 is conveyed along a conveying direction (sub-scan direction) by the feed rollers, and after the recording medium 10010 is set at predetermined recording position, the operation of recording (scanning) an image by the ink jet cartridge C mounted on the carriage 10002 which moves along the recording medium 10010, feeding (pitch conveying) the sheet by a predetermined amount after recording one line, and then recording (scanning) the image at the next line is repeated, until the entire image is recorded for the recording medium.

10401 is a blade as the wiping member, one end thereof being held by a blade holding member to become a secured end, and taking a form of cantilever. The blade 10401 is disposed at a position adjacent the recording area with the recording head, and in this embodiment, held in the projected form into the course of movement of the recording head.

10300 is a cap which is disposed at a home position contiguous to the blade 10401 and movable back and forth in the directions perpendicular to the moving direction of the recording head to make direct contact with the discharge port face, thereby effecting the capping. Further, 10403 is an absorbing member provided adjacent the blade 10401, which is held, like the blade 10401, in the projected form into the course of movement of the recording head.

A discharge port recovery portion 10500 is constituted of the blade 10401, the cap 10300 and the absorbing member 10403, wherein the ink and the dirt sticking to the ink discharge port face can be removed by the blade 10401 and the absorbing member 10403.

With the above constitution, when the ink jet cartridge C returns to the home position after completion of the recording, the cap 10300 of the discharge port recovery portion 10500 of the recording head is retreated from the movement passage of the ink jet cartridge C, but the blade 10401 is projected into the movement course. As a result, the discharge port face of the ink jet cartridge C is wiped by the blade 10401 projected therefrom.

Also, when the cap 10300 makes direct contact with the discharge port face of the ink jet cartridge to effect the capping, the cap 10300 is moved to project into the course of movement of the cartridge. When the cartridge C is moved from the home position to the start position of recording, the cap 10300 and the blade 10401 are located at the same position as in the wiping as above described. As a result, upon the movement before starting the recording, the discharge port face of the cartridge C is wiped.

The recovery of the discharge port portion of the recording head with the blade is performed at a predetermined interval not only during the movement of the carriage before and after the recording, but also during the recording.

Note that the ink sticking to this blade 10401 with the recovery is receivable by the ink absorbing member 10104 (see FIG. 67A) on the head side as previously described.

When the ink jet cartridge of the present invention is used for the recording apparatus as above, the height H of the ink jet cartridge will not increase with the increased receivable amount of ink, in the attitude of mounting it on the carriage, because the ink receivable amount of the ink tank unit is increased by raising the ink filling ratio in the present invention.

The present invention makes it possible to reduce the total thickness because of no porous member disposed in the ink storing portion, and reduce the size of the carriage, when a plurality of ink jet cartridges such as for a color recording apparatus are arranged side-by-side as shown in FIG. 77.

The embodiment employs a recording head or a recording device of the ink jet recording system of performing the recording by forming flying liquid droplets by the use of the heat energy among the various ink jet recording systems, but is conveniently usable in other constitution of flying liquid droplets.

Its representative constitution and principle of the ink jet system using the heat energy are disclosed in, for example, U.S. Pat. Nos. 4,723,129 and 4,740,796, and it is preferred that the present invention is practiced using these basic principles. This recording system is applicable to either of the so-called on-demand type and the continuous type.

Briefly stating this recording system, by applying at least one driving signal which gives rapid temperature elevation exceeding nucleate boiling and causing film boiling phenomenon in the ink corresponding to the recording information to electrothermal converters arranged corresponding to the liquid channels holding a liquid (ink), heat energy is generated to effect film boiling at the heat acting surface of the recording head.

Thus, because the bubbles within the liquid (ink) can be formed corresponding one by one to the driving signals which are applied to the electrothermal converters, the recording system of the on demand type is especially effective. By discharging the liquid (ink) through an opening for discharging by growth and shrinkage of the bubble, at least one droplet is formed. By making the driving signals into the pulse shapes, growth and shrinkage of the bubbles can be effected instantly and adequately to accomplish more preferably discharging of the liquid (ink) particularly excellent in response characteristic.

As the driving signals of such pulse shape, those as disclosed in U.S. Pat. Nos. 4,463,359 and 4,345,262 are suitable. Further excellent recording can be performed by employment of the conditions described in U.S. Pat. No. 4,313,124 of the invention concerning the temperature elevation rate of the above-mentioned heat acting surface.

As the constitution of the recording head, in addition to the combination of the discharging port, liquid channel, and electrothermal Converter (linear liquid channel or right-angled liquid channel) as disclosed in the above-mentioned respective specifications, the constitution by use of U.S. Pat. Nos. 4,558,333 and 4,459,600 disclosing the constitution having the heat acting portion arranged in the flexed region is also included in the present invention.

In addition, the present invention can be also effectively made the constitution as disclosed in Japanese Laid-Open Patent Application No. 59-123670 which discloses the constitution using a slit common to a plurality of electrothermal converters as the discharging port of the electrothermal converter or Japanese Laid-Open Patent Application No. 59-138461 which discloses the constitution having the opening for absorbing pressure wave of heat energy correspondent to the discharging portion.

Further, as the recording mode of the recording device, the present invention is extremely effective for not only the recording mode only of a primary color such as black, etc., but also a device equipped with at least one plural different colors or full color by color mixing, whether the recording head may be either integrally constituted or combined in plural number.

In the ink jet head cartridge of the present invention, because the atmosphere communicating port of the negative pressure generating member receiving portion of the ink tank and the ink supply port are disposed on the opposed surfaces, with the atmosphere communicating port located above the ink supply port, the state where no ink resides near the atmosphere communicating port even with the ink accumulated near the ink supply port is easy to hold, and the ink leakage is less likely to occur.

In addition, owing to the action of the negative pressure generating member as the buffer in the state of having ink wetness only near the ink supply port but not in the remaining portion, the ink leakage is less likely to occur, because no ink is reserved in the space portion even if the ink runs along the interstice produce by exfoliation or distortion at the angled portion of the negative pressure generating member (ink absorbing member).

Further, in the cartridge of the present invention, by shaping the ink storing portion like an L-character of ⊐-character, the volume of the ink storing portion can be made greater than that of the negative pressure generating member receiving portion, whereby the reduction in the running cost can be realized without increasing the size of the ink tank.

Still further, in the cartridge of the present invention, by rounding the edge angled portion within the negative pressure generating member receiving portion to make four corners curved, the exfoliation or distortion at the angled portion of the negative pressure generating member can be suppressed in inserting the negative pressure generating member, resulting in no gap between the ink storing portion and the negative pressure generating member, whereby the ink is concentrated in the neighborhood of the ink supply port, without the ink flowing near the atmosphere communicating port located upward, and ink leakage can be prevented beforehand.

And by providing a groove portion having a height of the top of less than 5 mm from the filter face at the end portion of the ink communicating member of the ink jet head unit on the partition wall within the ink cartridge for the ink jet, the ink supply to the recording head can be performed stably and highly reliably.

Also, by providing a recess portion on the bottom portion of the negative pressure generating member (ink absorbing member) receiving portion of the ink cartridge for the ink jet, the ink flow passage can be secured more widely, resulting in no ink interruption.

Further, with the present invention, by dividing one aperture of the atmosphere communicating port into two or more openings, the necessity of providing the multiplicity of parts or the inconformity with the molding as conventionally occurs can be improved, and the structure of atmosphere communicating port with high productivity and reliability can be obtained, which is applicable to the ink storing vessel using the negative pressure generating member, whether the division-type or the integral-type.

With a recording head having integrally an ink tank portion having first and second accommodating chambers and an ink discharge portion, there is the effect that the stabler gas-liquid interface in supplying the ink within the ink chamber in the ink tank portion to the negative pressure generating member, as well as the stabler supply of the ink, can be achieved.

Also, by making the vertical edge lines of the first accommodating chamber and the second accommodating chamber a curved shape, and providing a projection on the bottom surface of the second accommodating chamber near the minute communicating portion, there is the effect that the ink leakage through the atmosphere communicating port due to changes in the attitude during physical distribution or changes in the environmental temperature or humidity can be prevented.

As above described, with the present invention, an ink jet head cartridge with a large ink storage capacity can be provided with high reliability in preventing ink leakage and ink exhaustion, and an ink jet recording apparatus capable of the excellent printing for the long term can be provided.

Embodiment 29

Previously described embodiments, such as embodiments 1 thru 28, show a liquid ink container having first and second chambers communicating with each other through a communication path with a wall extending upwardly from the communication path. The first chamber contained a negative pressure producing material, had an air vent for allowing ambient air to enter the container and also had a liquid outlet disposed in a lower portion of the first chamber. The second chamber was substantially hermetically sealed. Additionally, an air introduction path was disposed between the wall and the negative pressure producing material contained within the first chamber for allowing ambient air to enter the second chamber. In the present embodiment number 29, more details of such construction are given.

Figure 97A:
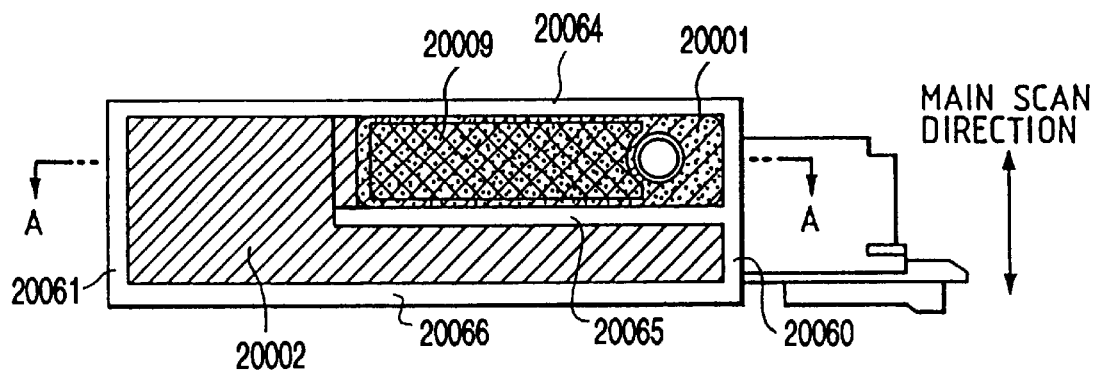
Figure 97B:
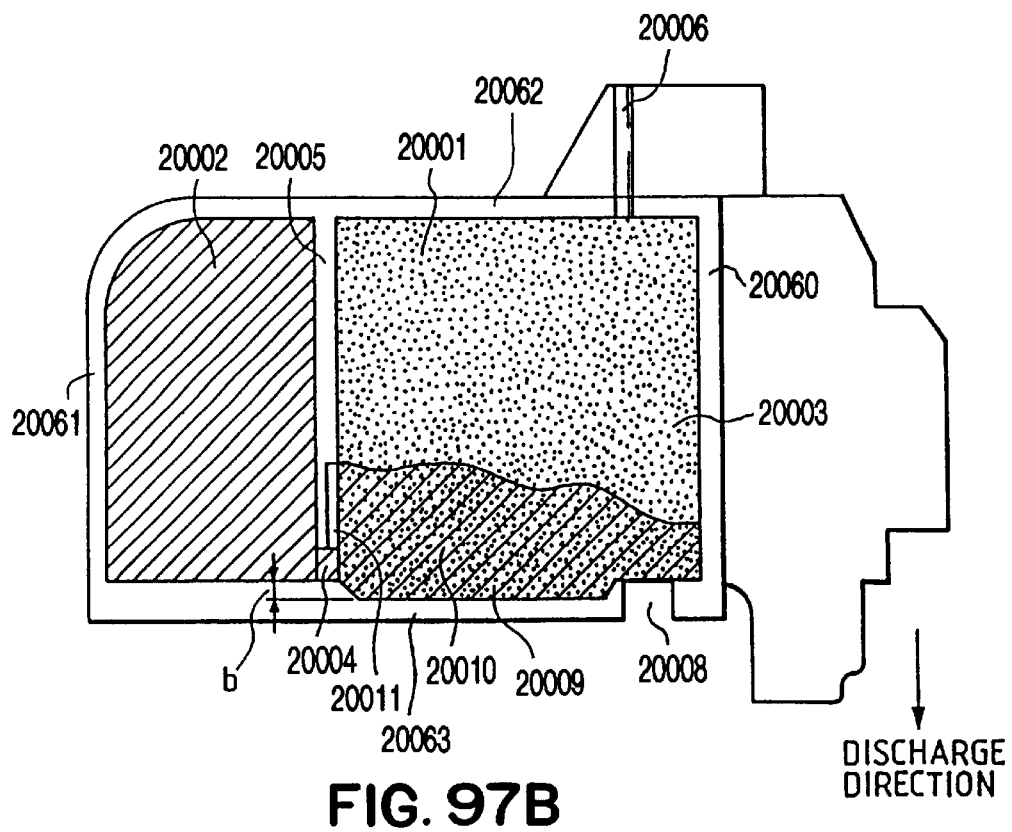

FIGS. 97A, 97B and 98 show a further embodiment of the present invention.

As shown in FIGS. 97A and 97B, an ink container 20000 is formed by a front wall 20060, a back wall 20061, a top wall 20062, a bottom wall 20063, each of which is elongated, and two side walls 20064 providing major surfaces of said container 20000. The container is preferably divided into two chambers by a plurality of partition walls. However, alternate arrangements in which the container is divided into more than one chamber, such as the container 3001 shown in FIG. 49 in which 4 chambers are presented, or in which the container is divided into two chambers by only one partition wall, such as the container 1001 shown in FIGS. 21, 22 and 23, may also be used. As seen in FIG. 97A, a first partition wall 20005 and a second partition wall 20065, which are preferably substantially perpendicularly connected to each other, divide the container into a first chamber 20001 and a second chamber 20002. The first partition wall 20005 is preferably substantially perpendicularly attached to a side wall 20064 extending toward the opposite sidewall 20066. The first partition wall 20005 also extends from the top wall 20062 toward the bottom wall 20063, but terminates above the bottom wall 20063, thereby defining a communication path 20004 between the first and second chambers. The second partition wall 20065 is preferably substantially perpendicularly attached to the front wall 20060 and extends toward the back wall 20061 as well as extending from the top wall 20062 to the bottom wall 20063. Thus, the first chamber 20001 is defined by the front wall 20060, a portion of a side wall 20064, first partition wall 20005, second partition wall 20065, a portion of the top wall 20062 and a portion of the bottom wall 20063. The second chamber 20002 is defined by the back wall 20061, side wall 20066, second partition wall 20065, first partition wall 20005, the remaining portion of the sidewall 20064 not defining the first chamber, remaining portion of the top wall 20062 not defining the first chamber, and the remaining portion of the bottom wall 20063 not defining the first chamber. In the typical case, the container 20000 is preferably installed in a printer such that the bottom wall 20063 is substantially parallel to a printer base, such as the container 2 installed in the printer shown in FIG. 96, thereby causing liquid contained within the first and second chambers to collect along the bottom wall 20063 due to gravitational forces.

The first chamber 20001 contains a negative pressure producing material 20003, has an air vent 20006 for allowing ambient air to enter the container 20000, and a liquid outlet 20008 preferably disposed on the bottom wall 20064 of the first chamber 20001. Although it is preferable that the liquid outlet is disposed on the bottom wall 20063 of the first chamber 20001, such as the liquid outlet 20008 shown in FIG. 97B, a liquid outlet disposed on a lower portion of a sidewall, such as the liquid outlet 7 disposed in the sidewall 4A as seen in FIG. 19A, may also be used. The negative pressure producing material 20003 is preferably a non-heat compressed sponge or the like that is compressed into the first chamber 20001 during assembly of the container. However, a negative pressure producing material 20003 that has been heat-compressed may also be used. The liquid outlet 20008 is connectable to a liquid jet print head, such as liquid jet print head 2000 shown in FIG. 84. The liquid container is preferably removably connected to the liquid jet head, such as the liquid container 1000 and liquid jet head 2000 seen in FIGS. 79, 88 and 90. However, a liquid container which is integral with the liquid jet head may also be used.

Referring again to FIG. 97B, the second chamber 20002 is substantially hermetically sealed and communicates with the first chamber 20001 through a communication path 20004. The communication path 20004 provides for an exchange of air and liquid between the first and second chambers. The operation of this air-liquid exchange is described in more detail in the following discussion concerning an air introduction path 20011.

Figure 98C:
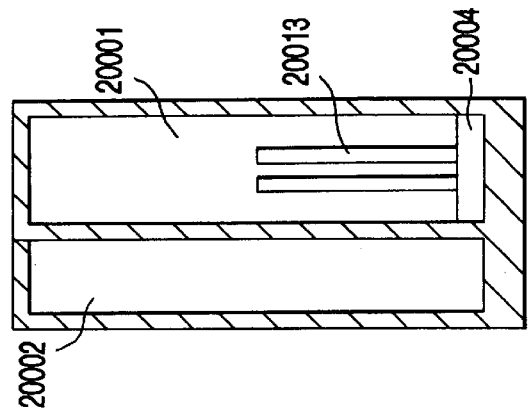
FIGS. 98A, 98B and 98C are views detailing an arrangement of an air introduction path according to an embodiment 29 of the present invention.
Figure 98B:
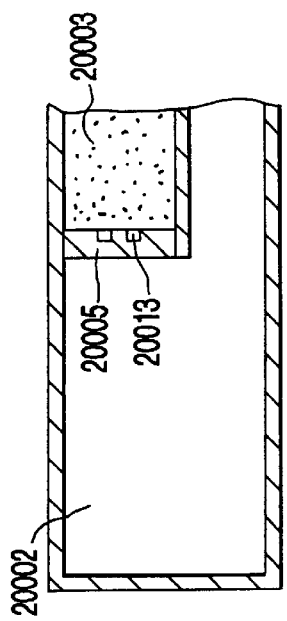
Figure 98A:
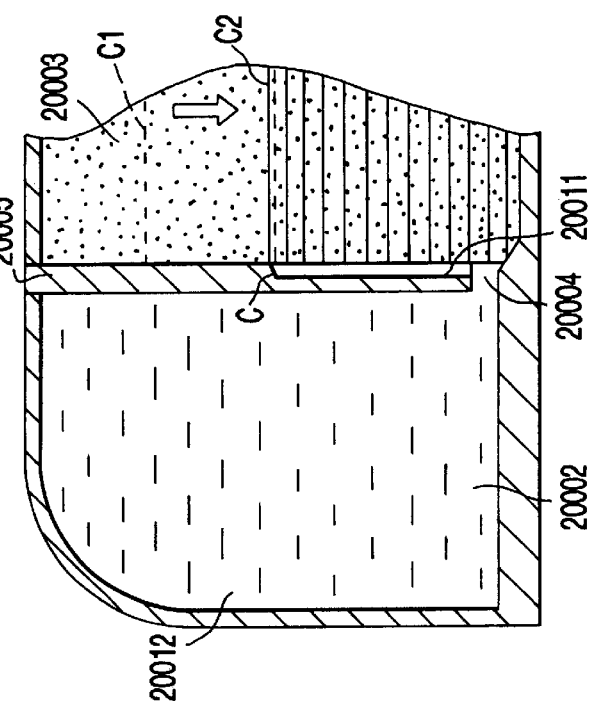

The partition wall portion 20005 extends upwardly from the communication path 20004 between the first chamber 20001 and the second chamber 20002. The negative pressure producing material 20003 compressed in the first chamber 20001 preferably contacts the wall portion 20005 substantially about the entire wall 20005 surface. An air introduction path 20011 is disposed between the wall 20005 and the negative pressure producing material 20003 for introducing air into the second chamber 20002. As shown in FIGS. 98A, 98B and 98C, the air introduction path 20011 arrangement in the present embodiment 29 is preferably a plurality of grooves 20013 in the wall 20005, however alternate air introduction path arrangements will also be described in more detail.

Referring to FIGS. 98A, 98B and 98C, the details of the air introduction path 20011 will be described.

As shown in FIGS. 98A, 98B and 98C, the air introduction path 20011 is defined by grooves 20013 contained within the wall 20005. The grooves 20013 commence at a point C at least partially up the wall 20005, extend toward the communication path 20004, and terminate at the communication path 20004. During a printing operation, liquid is consumed from the negative pressure producing material 20003 through the liquid outlet 20008. The liquid surface in the negative pressure producing material 20003 at the initial stage of the liquid consumption is at a level C1 shown by the dashed line in FIG. 98A. During the liquid consumption, the liquid level in the negative pressure producing material 20003 displaces to the stabilized ink level position C2 shown by the solid line in FIG. 98A, the stabilized level corresponding to an end C of the air introduction path 20011. After the liquid contained in the negative pressure producing material reaches the level at the end C, and the liquid continues to be consumed through the liquid outlet 20008 due to a printing operation or the like, the liquid 20012 contained within the second chamber 20002 is consumed from the second chamber 20002 into the first chamber 20001, and an air-liquid exchange is carried out through the air introduction path 20011. Since the air introduction path 20011 extends to the bottom end of the wall 20005, the structure is equivalent to the model shown in FIG. 99. Therefore, the description of the air-liquid exchange will be made as to the model of FIG. 99 in detail.

Figure 99:
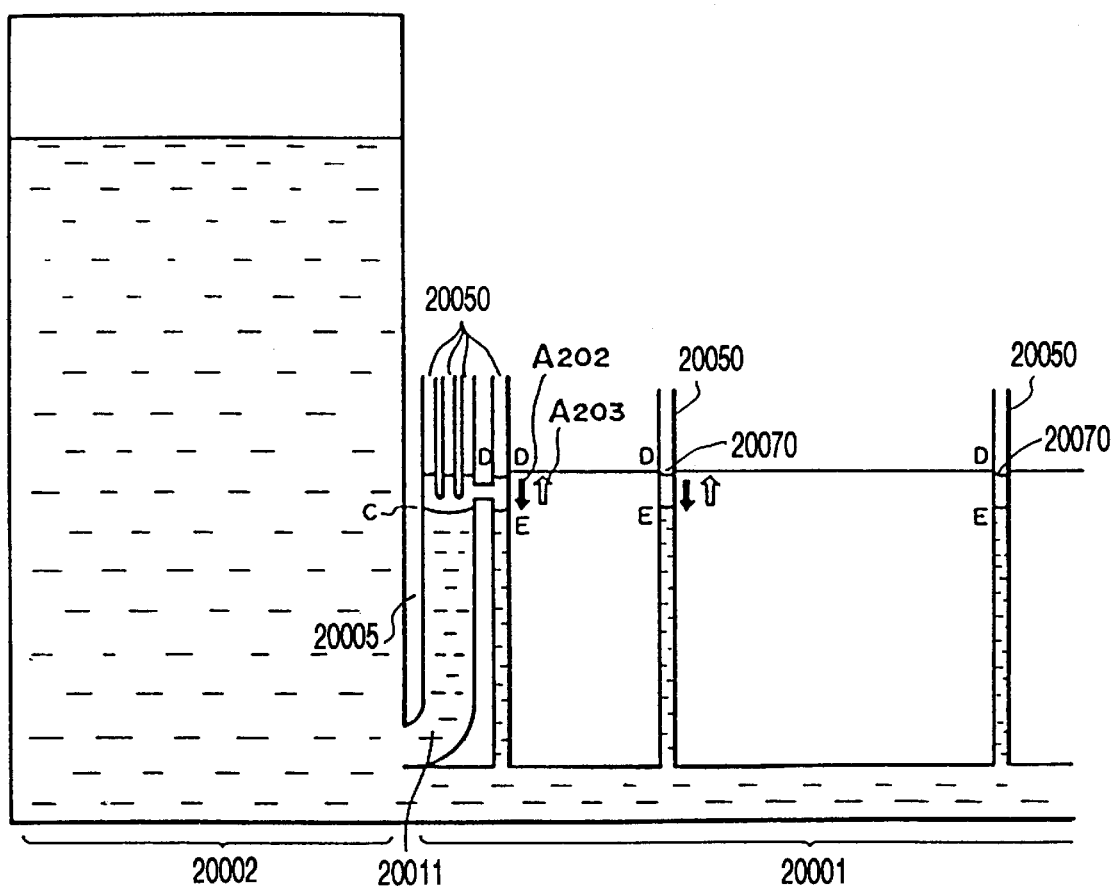
FIG. 99 is a model showing the operation of the ink supply according to an embodiment 29 of the present invention utilizing an air introduction path of FIG. 98A.

The negative pressure producing material 20003 is considered as capillary tubes 20050 shown in FIG. 99. The air introduction path 20011 continues from the portion C to the bottom end of the wall 20005, and it is considered that the air introduction path 20011 is connected again to the capillary tubes 20050 above the portion C.

As previously described, the liquid surface in the negative pressure producing material 20003 at the initial stage of the liquid consumption is at a level C1. However, as the liquid is consumed through the liquid outlet 20008, the liquid surface C1 lowers gradually. In accordance with the liquid surface C1 lowering gradually, the internal pressure in the second chamber 20002 (negative pressure) increases gradually.

When the liquid is consumed to the level C at the top end of the air introduction path 20011, a meniscus 20070 is formed at a position D in the capillary tube. When the liquid is further received and consumed, the liquid meniscus 20070, that is the liquid surface, lowers again. If the position E is reached, the meniscus force of the liquid surface in the air introduction path 20011 suddenly decreases, so that the liquid can be consumed at once in the air introduction path 20011. Thereafter, the liquid is consumed from the container, with this position maintained. That is, the air-liquid exchange is carried out. In this manner, during the liquid consumption, the liquid surface is stabilized at a position slightly lower than the height C, and therefore, the internal pressure in the second chamber 20002 is stabilized. When the liquid supply stops, the meniscus in the capillary tube returns from position E to the position D, thus providing the stabilization.

As described in the foregoing, the liquid surface in the negative pressure producing material 20003 reciprocates between the positions D and E until all of the liquid is used up in the container. In FIG. 99, A202 indicates a liquid supply period, and A203 indicates a non-liquid-supply period.

Thereafter, the liquid is consumed from the negative pressure producing material 20011, and therefore, the internal pressure (vacuum) in the second chamber 20002 increases, and the liquid becomes non-suppliable.

The internal pressure at the second chamber 20002 is provided as a difference between the capillary force of the negative pressure producing material 20003 (the height to which the negative pressure producing material 20003 can suck the liquid up) and the liquid surface level height in the negative pressure producing material 20003, and therefore, the height C is set at a predetermined level relative to the second chamber 20002. From this standpoint, it is desirable that the pore size of the negative pressure producing material 20003 is relatively small.

The reason why the height C is set at a predetermined level relative to liquid outlet 20008 is that if the liquid surface is lower than the liquid outlet 20008, the air is introduced with the result of improper liquid ejection.

However, it is not desirable that the height is larger than the predetermined level, because the buffering effect at the time when the liquid is overflowed from the second chamber 20002 to the negative pressure producing material 20003 due to the internal pressure change in the container attributable to the ambient condition change, is reduced. In consideration of the above, the volume of the negative pressure producing material 20003 above the height C is selected to be substantially one half the volume of the container.

The above-described mechanism will be explained in further detail.

It is assumed that the negative pressure producing material 20003 has a uniform density. The internal pressure in the second chamber 20002 (vacuum or negative pressure) is determined as a difference H1–H2 between a height H1 to which the capillary force of the negative pressure producing material 20003 can suck the liquid up from the second chamber 20002 level and the height H2 to which the liquid has already been sucked up from the height of the second chamber 20002.

For example, if the liquid sucking force of the negative pressure producing material 20003 is 60 mm (H1), and the height of the air introduction path 20011 from the first chamber 20001 is 15 mm (H2), the internal pressure of the second chamber 20002 is 45 mm=60 mm–15 mm=H1–H2.

At the initial stage, in accordance with the consumption of the liquid from the negative pressure producing material 20003, the height of the liquid surface lowers correspondingly, and the internal pressure lowers substantially linearly.

When the liquid container of the above-described structure is used, the liquid can be supplied stably by the vacuum. The structure itself of the liquid container is straight-forward so that it can be easily manufactured using a mold or the like, and therefore, a large number of liquid containers can be produced uniformly.

When the liquid is consumed to such an extent that the surface level of the liquid in the negative pressure producing material 20003 is at the air introduction path 20011 that is C position, or in other words, the liquid surface is at E, the meniscus in the air introduction path 20011 cannot be maintained, and therefore, the liquid is absorbed into the negative pressure producing material 20003, and the air introduction path 20011 is formed. Then, the air-liquid exchange occurs at once. On the other hand, when the liquid surface in the negative pressure producing material 20003 rises because of the liquid absorbed from the second chamber 20002, so that the liquid surface D is established, the air-liquid exchange stops. In this state, there is no liquid in the air introduction path 20011, and the negative pressure producing material 20003 above the air introduction path in the model, functions simply as a valve.

If the liquid is consumed again in this state, the liquid surface in the negative pressure producing material 20003 lowers slightly, which corresponds to opening of the valve, so that the air-liquid exchange occurs at once to permit the consumption of the liquid from the second chamber 20002. Upon completion of the liquid consumption, the liquid surface of the negative pressure producing material 20003 rises due to the capillary force of the negative pressure producing material 20003. When it reaches the position D, the air-liquid exchange stops, so that the liquid surface is stabilized at that position.

In this manner, the liquid surface can be stably controlled according to the height of the air introduction path 20011 (that is, the height C), and the capillary force of the negative pressure producing material 20003 (that is, the liquid sucking height) is adjusted beforehand, so that the internal pressure of the second chamber 20002 can be controlled easily.

In order to retain the liquid overflowed from the second chamber 20002 to the first chamber 20001 due to the internal pressure change in the container due to the ambient condition change, the capillary force of the negative pressure producing material 20003 (that is, the liquid sucking height) is increased, by which the overflow of the liquid from the container can be prevented, and the occurrence of positive pressure at the second chamber 20002 can be prevented.

Although the air introduction path 20011 has been described as a plurality of grooves 20013 contained in the wall 20005, alternate arrangements for the air introduction path 20011 will be described below.

Figure 100C:
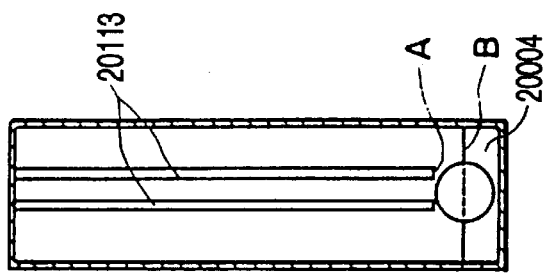
FIGS. 100A, 100B and 100C are views of a alternate arrangement utilizing ribs for the air introduction path in an embodiment 29 of the present invention.
Figure 100B:
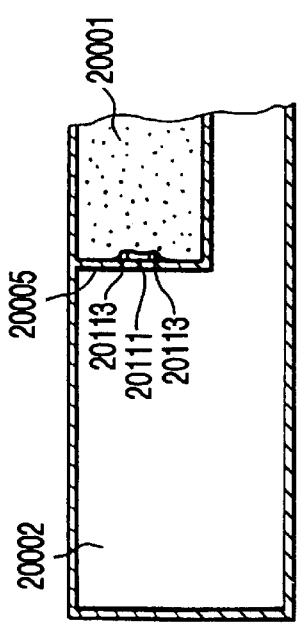
Figure 100A:
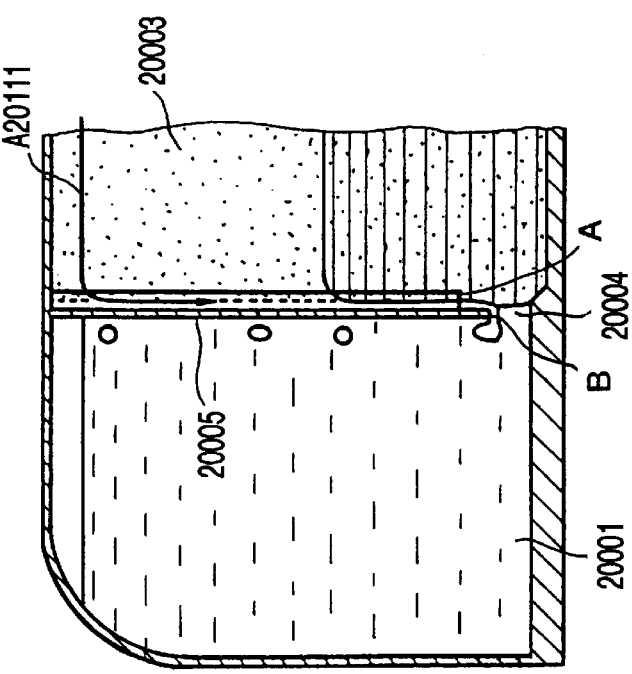

FIGS. 100A, 100B and 100C show an alternate arrangement of the air introduction path 20111 in the present embodiment.

As seen in FIGS. 100A, 100B and 100C, a plurality of ribs 20113 or projections provide a groove on the surface of the wall 20005 of the first chamber 20001. The air introduction path 20111 is established between the ribs 20113 and the negative pressure producing material 20003. The bottom end A of the rib 20113 is placed above the bottom end B of the wall 20005, so that the communication path 20004 can be covered by the negative pressure producing material 20003 simply by inserting a rectangular parallelopiped negative pressure producing material 20003 into the first chamber 20001. Therefore, the air introduction path 20111 can be extended to the position very close to the communication path 20004 without difficulty and with stability. Arrow A20111 shows the flow of the air.

Using a liquid container with this air introduction path arrangement, the printing operation has been actually carried out, and it has been confirmed that the liquid surface and the meniscus as shown in FIG. 100A can be quickly established by the liquid supply due to the recording operation, and the sharp exchange between the air and the liquid is carried out by the meniscus breakdown, and therefore, the liquid can be supplied with small pressure loss, so that the high speed printing operation can be carried out with stability.

FIGS. 101A, 101B and 101C show a further alternate arrangement for the air introduction path of the present embodiment.

As shown in FIGS. 101A, 101B and 101C, the number of ribs 20213 are increased, thus increasing the number of air introduction paths 20211. The ribs 20213 are provided on the ceiling of the first chamber 20001. According to this arrangement, the plurality of air introduction paths 20211 can be provided with stability from the air vent 20006 to the neighborhood of the communication path 20004, and therefore, the liquid supply can be carried out with small pressure loss so that a high speed printing operation can be carried out with stability. In this arrangement, even if the air vent 20006 is disposed at a position remote from the communication path 20004 as shown in FIG. 101A, the air can be introduced smoothly.

FIGS. 102A, 102B and 102C show a further alternate arrangement for the air introduction path of the present embodiment.

As shown in FIGS. 102A, 102B and 102C, ribs 20313 are provided on the wall 20005 to provide the air introduction path 20311. The ribs 20313 are asymmetrical about the wall 20005, so that the passage for the liquid flow from the second chamber 20002 through the communication path 20004 into the first chamber 20001, and the passage of the air flow A20314, corresponding to this liquid flow A20315, along the air introduction path 20311, through the communication path 20004 into the second chamber 20002, can be made independent relative to the center line; therefore, the pressure loss by the exchange can be reduced.

More particularly, this structure is effective to reduce the pressure loss δP required for the exchange between the liquid and the air by approximately one-half. Thus, the liquid can be stably ejected from the recording head.

FIGS. 103A, 103B and 103C, show a further alternate arrangement for the air introduction path of the present embodiment.

As shown in FIGS. 103A, 103B and 103C, ribs 20413 are provided on the wall 20005. In the previous arrangements utilizing ribs as the air introduction device, the top end of the ribs are extended to the upper part of the internal surface of the wall 20005. However, in this arrangement, the ribs are not extended to such extent and terminate at a point at least partially up the wall 20005. By doing so, the top part of the negative pressure producing material, that is the portion of the negative pressure producing material 20003 contacting the wall 20005 between the end A of the rib 20413 and the top wall 20062, is not compressed by the ribs 20413, so that the production of the meniscus force at the compressed portion can be avoided, thus further stabilizing the vacuum control.

More particularly, the liquid is consumed from the negative pressure producing material 20003 until the liquid surface C1 in the negative pressure producing material 20003 moves to the stabilized liquid surface C2 in the first chamber 20001 from which the liquid is consumed. That is, if the air-liquid exchange through the air introduction path 20411 is promoted too soon, the consumption of the liquid from the negative pressure producing material 20003 becomes low; as a result, the liquid is consumed from the second chamber 20002. Therefore, the amount of liquid capable of moving to the negative pressure producing material 20003 in the first chamber 20001 from the second chamber 20002 at the time of the ambient condition change such as pressure change, is limited. Therefore, the buffering effect of the negative pressure producing material 20003 against the liquid leakage can be deteriorated. In this arrangement, the air introduction path 20411 is provided so that the air is introduced only after the liquid is consumed from the negative pressure producing material 20003 to a certain extent, so that the liquid surface in the negative pressure producing material 20003 is controlled, thus increasing the buffering effect against the liquid leakage.

Figure 104C:
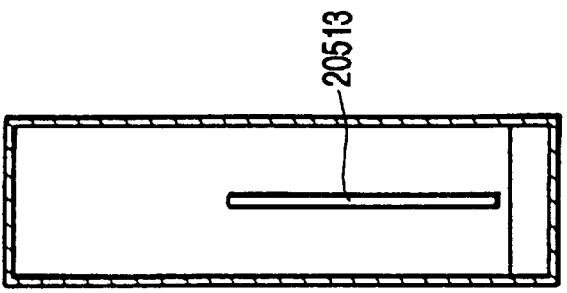
FIGS. 104A, 104B and 104C are views of an alternate arrangement utilizing a groove terminating before the communication path as the air introduction path in an embodiment 29 of the present invention.
Figure 104B:
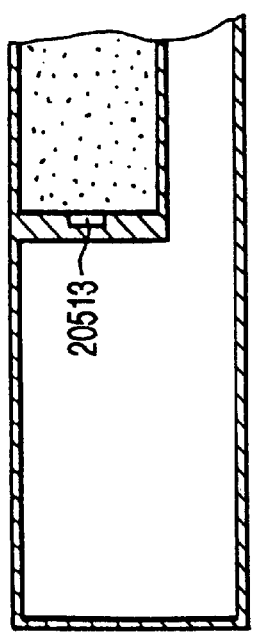
Figure 104A:
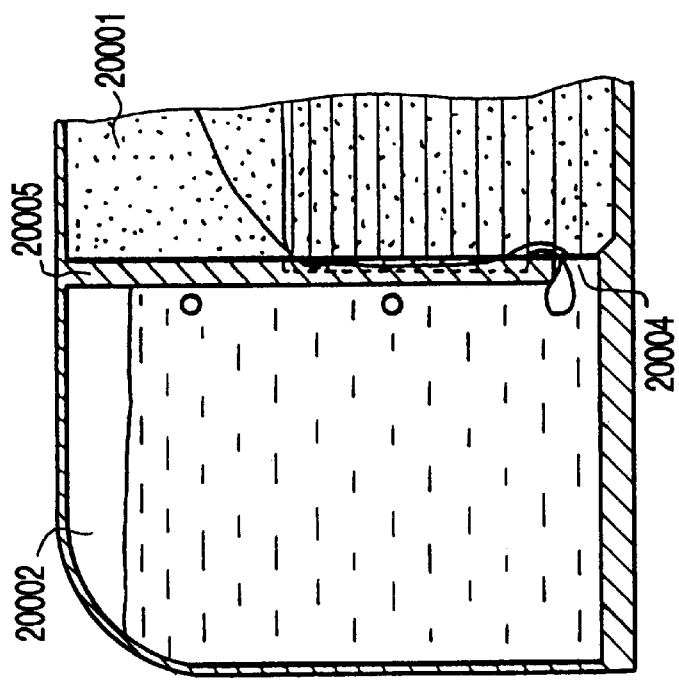

FIGS. 104A, 104B and 104C show a further alternate arrangement for the air introduction path of the present embodiment.

As shown in FIGS. 104A, 104B and 104C, the air introduction path 20511 is provided by forming a groove 20513 in the wall 20005. The groove 20513 extends from a point at least partly up the wall 20005 toward the communication path 20004 and terminates above the communication path 20004.

According to this arrangement, the irregularity of the compression ratio of the negative pressure producing material 20003 contained in the first chamber 20001 is reduced, and therefore, the vacuum control is easy, so that the liquid can be supplied stably.

Figure 105A:
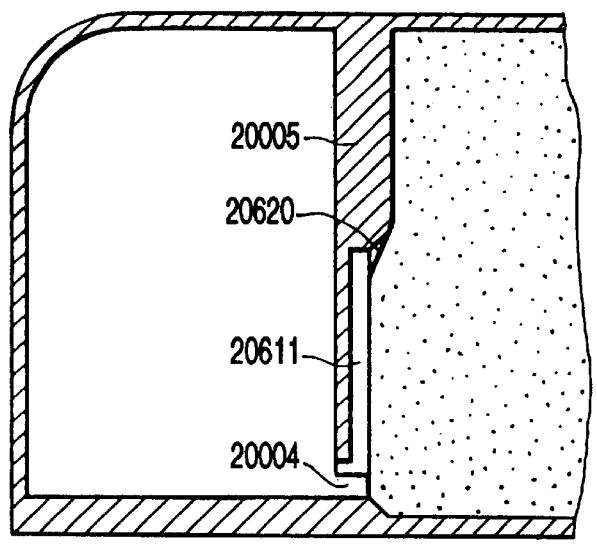
FIGS. 105A, 105B and 105C are views of a further alternate arrangement of the air introduction path for an embodiment 29 of the present invention.
Figure 105B:
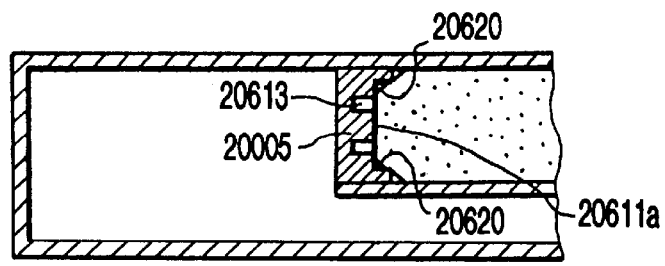
Figure 105C:
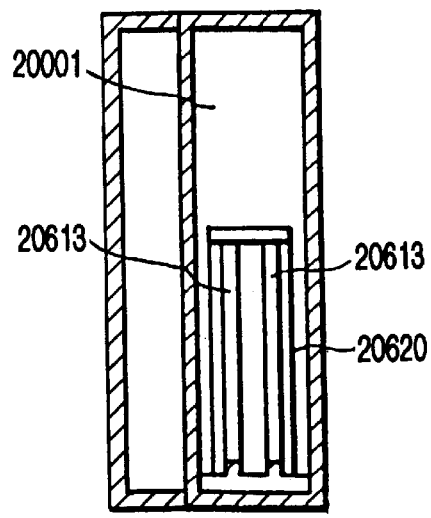

FIGS. 105A, 105B and 105C show a further alternate arrangement for the air introduction path of the present embodiment.

As shown in FIGS. 105A, 105B and 105C, grooves 20613 and negative pressure producing material adjusting chambers 20620 provide an air introduction path 20611. An air introduction groove 20613 and a negative pressure producing material adjusting chamber 20620 are formed on a wall 20005 between the second chamber 20002 and the first chamber 20001. The air introduction groove 20613 is formed in the first chamber 20001 and is extended from the central portion of the wall 20005 to an end of the wall 20005, that is, to the communication path 20004 formed with the bottom wall 20063 of the container. Between the wall 20005 and the negative pressure producing material 20003 contacted to the neighborhood of the air introduction path 20611 of the wall 20005, the negative pressure producing material adjusting chambers 20620 are formed, and are in an excavated form, with the groove 20613 being formed in a recessed portion 20611A in the wall 20005.

Since the negative pressure producing material 20003 is contacted to the inside surface of the first chamber 20001, and therefore, even if the negative pressure producing material 20003 is non-uniformly squeezed into the first chamber 20001, the contact pressure (compression) to the negative pressure producing material 20003 is partially eased, as shown in FIGS. 105A and 105B. Therefore, when the liquid consumption from the liquid jet head is started, the liquid contained in the negative pressure producing material 20003 is consumed and reaches to the adjusting chamber 20620. If the liquid continues to be consumed, the air can easily break the liquid meniscus at the portion where the contact pressure of the negative pressure producing material 20003 is eased by the adjusting chambers 20620, and therefore, the air is quickly introduced into the air introduction path 20611, thus making the vacuum control easier.

In this arrangement, it is desirable to use an elastic porous (i.e. sponge-like) material as the negative pressure producing material 20003.

When the recording operation is not carried out, the capillary force of the negative pressure producing material 20003 itself (the meniscus force at the interface between the liquid and the negative pressure producing material), can be used to prevent the leakage of the liquid from the liquid jet recording head.

FIGS. 106A, 106B, 106C and 106D show an example of a liquid container without the negative pressure producing material adjusting chamber 20620, as a comparison example.

Even in the liquid container of the comparison example, proper operation can be carried out without problem by using the mechanism described in the foregoing, in the usual state. However, further stabilized operation is accomplished because of the provision of the air introduction path.

In order to stabilize the operation even further, or in order to permit use of porous resin material having continuous pores as the negative pressure producing material, further stabilization control is desirable.

Figure 106A:
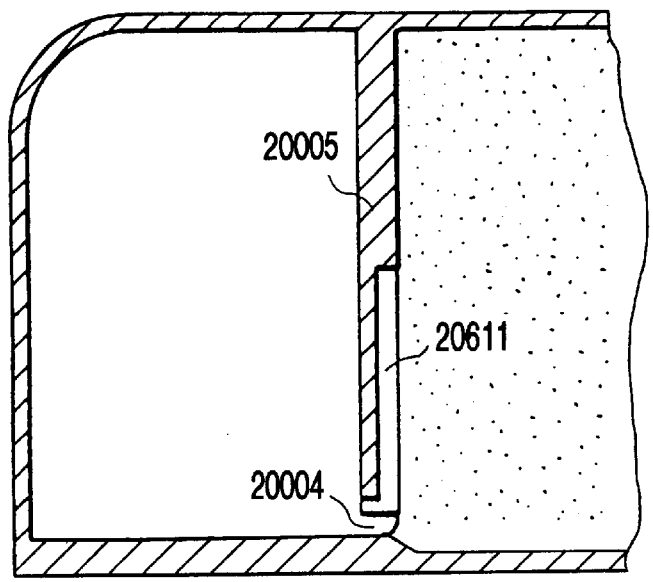
FIGS. 106A, 106B, 106C and 106D are views of a comparison example for the air introduction path shown in FIGS. 105A, 105B and 105C.
Figure 106B:
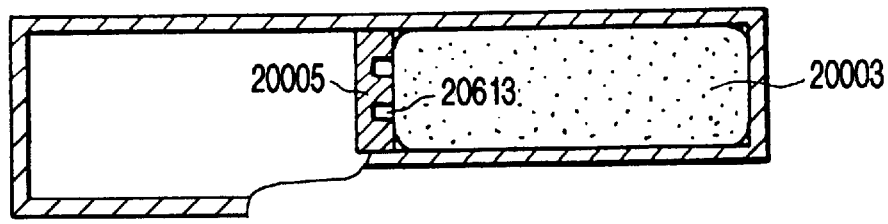
Figure 106C:
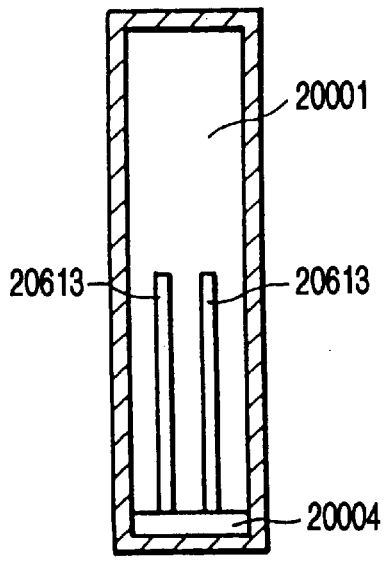
Figure 106D:
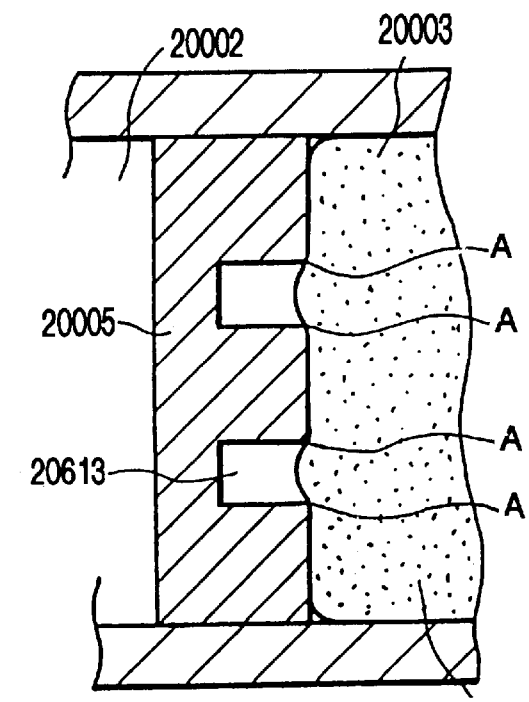

As shown in FIG. 106D, which is an enlarged sectional view, the negative pressure producing material 20003 contacts the wall 20005, and partly enters the air introduction groove 20613. If this occurs, the contact pressure (compression force) to the material 20003 is not eased at the contact portions A. This makes it more difficult for the air to break the liquid meniscus and enter the air introduction path 20611. If this occurs, the air-liquid exchange does not occur even if the liquid continues to be consumed, and the effect of the air introduction path 20611 in not accomplished. There is a liability in that the liquid becomes non-suppliable from the negative pressure producing material 20003.

As contrasted to the comparison example as described in the foregoing, the current arrangement is advantageous in that it effectively addresses this problem.

Figures 107A, 107B:
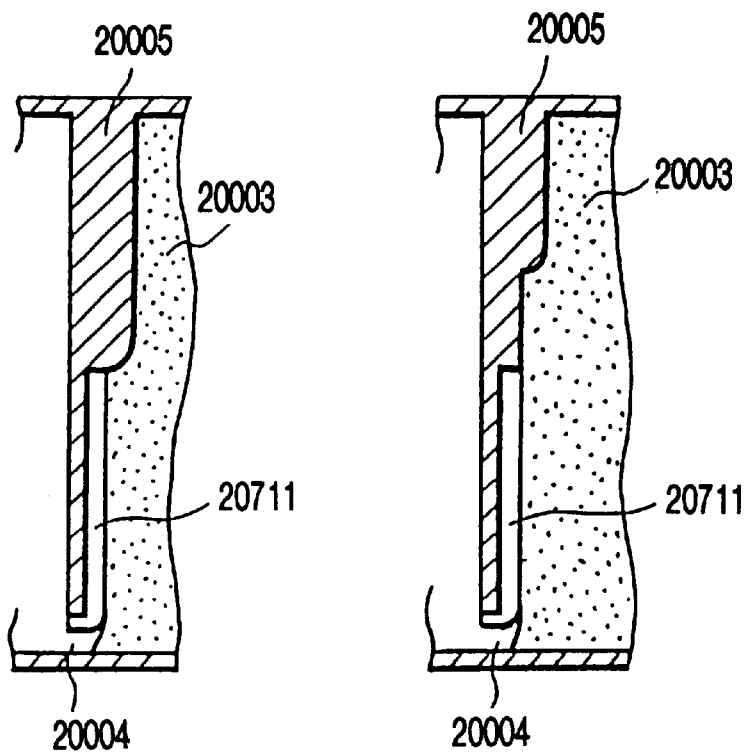
FIGS. 107A and 107B are longitudinal sectional views of a further alternate arrangement air introduction path of an embodiment 29 of the present invention.

FIGS. 107A and 107B show a further alternate arrangement for the air introduction path of the present embodiment.

Figure 108:
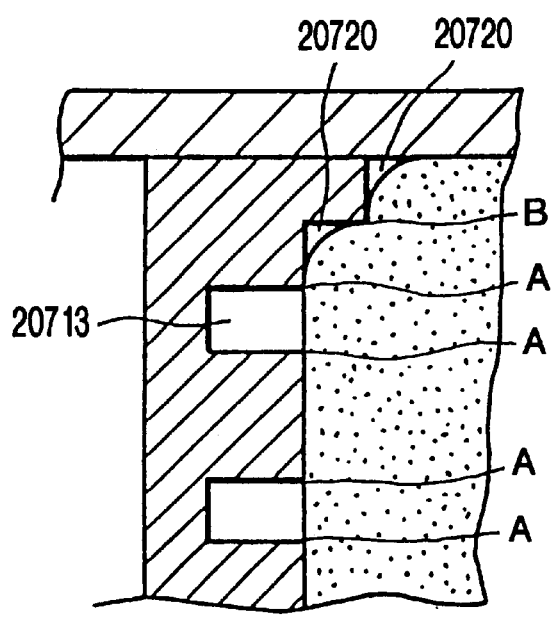
FIG. 108 is an enlarged sectional view of the air introduction path of FIG. 107A and 107B.

FIGS. 107A and 107B show two longitudinal sectional views of wall 20005, each having a different cross-sectional section. FIG. 108 is an enlarged cross-sectional view of a wall 20005.

As shown in FIG. 107B, the configuration of the negative pressure producing material adjusting chamber 20720 and the air introduction groove 20713, are different from that of the previous alternate arrangement.

More particularly, the stepped portion of the wall 20005 contacted to the negative pressure producing material 20003 is rounded to further enhance the effect of easing the press-contact and compression.

In the neighborhood of the wall 20005 adjacent the first chamber 20001 having a rounded surface, air is introduced into the liquid in the negative pressure producing material 20003, and the thus-introduced air moves into the second chamber 20002. With the movement of the air, the liquid in second chamber 20002 is supplied into the first chamber 20001. In an air-liquid exchanging region, the air is introduced into the liquid contained in the negative pressure producing material 20003.

In order to carry out the air-liquid exchange more smoothly, it is desirable that the contact pressure between the negative pressure producing material 20003 and the first chamber 20001 at a lower portion of the air-liquid exchanging region be greater than in the upper part of the air-liquid exchanging region.

This is because the air can move more smoothly from the gas phase to a liquid phase through the capillary tube of the negative pressure producing material 20003 whose contacting force is eased.

Figure 109A:
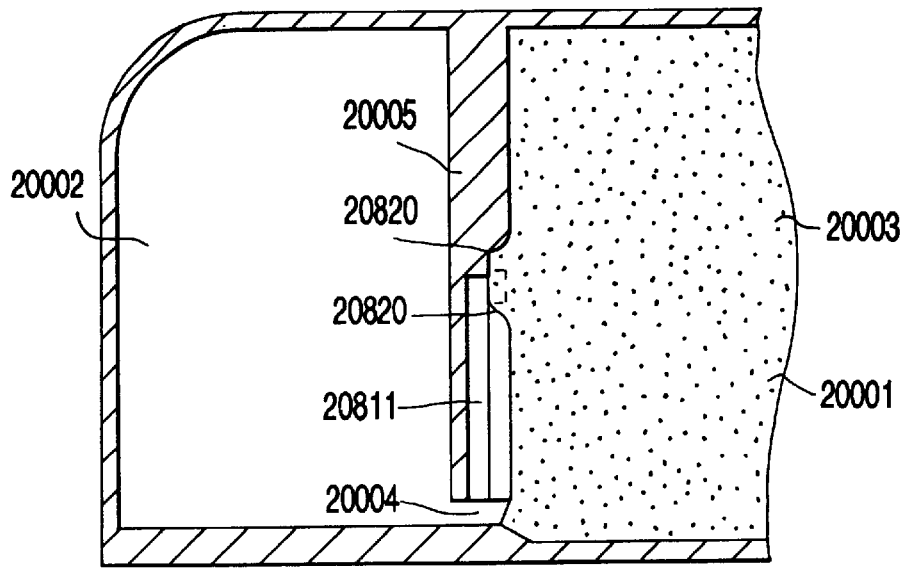
FIGS. 109A, 109B and 109C are longitudinal sectional views of a further alternate arrangement air introduction path of an embodiment 29 of the present invention.
Figure 109B:
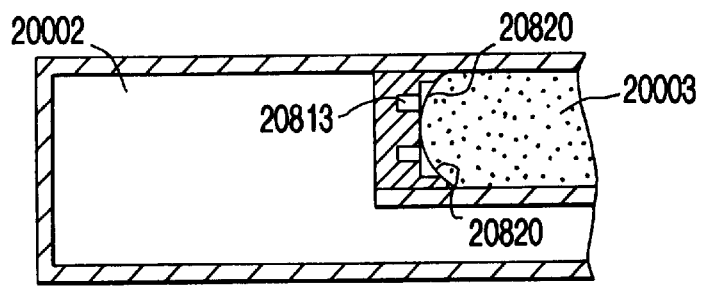
Figure 109C:
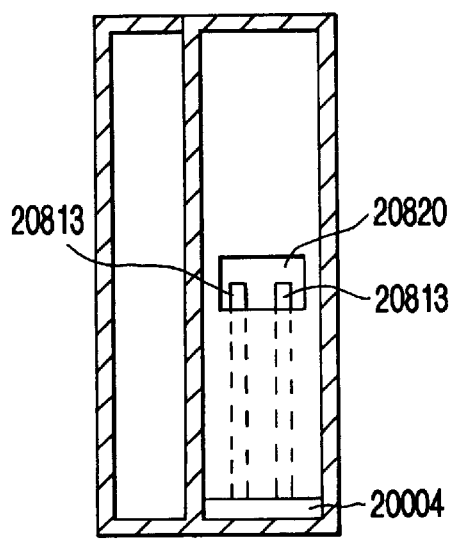

For example, the desired effect can be provided by formation of a partial negative pressure producing material adjusting chamber 20820 at the central portion of the wall 20005 at the end portion of the air introduction groove 20613, such as that shown in FIGS. 109A, 109B and 109C.

In order to provide the equivalent function to the negative pressure producing material adjusting chamber 20820 of this arrangement, the configuration of the negative pressure producing material 20003 may be changed. The configuration and the dimensions are not limited if the above-described requirements are satisfied.

As described in the foregoing, according to this arrangement, the air and the liquid in the second chamber are stably and smoothly exchanged upon the liquid supply operation, and as a result, the internal pressure in the second chamber 20002 can be stably controlled. This enables the recording head to effect stabilized liquid ejection at high speed.

In addition, the liquid container is substantially free from the liquid leakage even if the internal pressure of the liquid container changes due to an ambient condition change or the like.

As can be seen from the above description, the present embodiment 29 is an liquid ink container comprising: a first chamber containing negative pressure producing material having a liquid outlet connectable to a liquid jet head to supply liquid from the container to the liquid jet head and having an air vent for allowing ambient air into the container, wherein the liquid outlet is provided in a bottom portion of said first chamber; a second chamber communicating with the first chamber by means of a communication path, except for which said second chamber is substantially hermetically sealed; a wall extending upwardly from the communication path of said first chamber; and an ambient air introducing path provided between said wall and said negative pressure producing material and extending from a point at least partly up said wall toward said communication path, for introducing the ambient air into said second chamber.

While the invention has been described with reference to the structures disclosed herein, it is not confined to the details set forth herein. In particular, it is ordinarily possible to combine a feature or features of any of the embodiments to any others of the embodiments. This application is intended to cover such modifications or other changes as may come within the purposes of the improvements or the scope of the following claims.

What is claimed is:

1. A liquid container for a liquid jet recording apparatus, comprising:
    a first chamber containing negative pressure producing material and having a liquid outlet connectable to a liquid jet head to supply liquid from the container to the liquid jet head and an air vent for allowing ambient air into the container, wherein said liquid outlet is provided in a bottom portion of said first chamber;
    a second chamber communicating with the first chamber by a communication path, except for which said second chamber is substantially hermetically sealed;
    a wall extending upwardly from the communication path; and
    an ambient air introducing path provided between said wall and said negative pressure producing material and extending from a point partly up said wall toward said communication path, for introducing ambient air into said second chamber.

2. A liquid container according to claim 1, wherein said ambient air introducing path terminates at the point, and extends to said communication path.

3. A liquid container according to claim 1, wherein said ambient air introducing path terminates at the point and terminates before said communication path.

4. A liquid container according to claim 1, wherein the point is above said liquid outlet.

5. A liquid container according to claim 1, wherein said air introducing path is defined by a rib on said wall.

6. A liquid container according to claim 1, 2, 3 or 4, wherein said air introducing path is defined by a groove in said wall.

7. A liquid container according to claim 1, wherein said liquid outlet and said air vent are sealed by one member during transportation.

8. A liquid container according to claim 1, wherein said container is of material through which inside thereof is visible.

9. A liquid container according to claim 1, wherein said container contains liquid which is contributable to image printing, wherein the liquid is supplied from said second chamber into said first chamber through said communication path by introduction of air into said second chamber through said air introducing path.

10. A liquid container according to claim 1, wherein said negative pressure producing material is of sponge which is not heat-compressed and is compressed into said first chamber.

11. A liquid container according to claim 1, wherein said negative pressure producing material is heat-compressed sponge.

12. A liquid container according to claim 1, wherein a path connecting said air vent and the point extends across said negative pressure producing material.

13. A liquid container according to claim 1, wherein a plurality of such air introducing paths are provided.

14. A liquid container according to claim 1, wherein said liquid container is integral with the liquid jet head.

15. A liquid container according to claim 1, wherein the container contains printing liquid.

16. A liquid container according to claim 15, wherein said printing liquid is ink comprising water, coloring material and water-soluble organic solvent, and has a surface tension of 20 dyne/cm to 55 dyne/cm.

17. A liquid container according to claim 15, wherein said printing liquid is ink containing at least one non-ionic surfactant.

18. A liquid container according to claim 1, wherein said first chamber contains liquid.

19. A liquid container according to claim 1, wherein said second chamber contains liquid.

20. A liquid container for a liquid jet recording apparatus, comprising:
    a first chamber containing negative pressure producing material and having a liquid outlet arranged, in use, at a lower part of the container and connectable to a liquid jet head to supply liquid from the container to the liquid jet head and an air vent for allowing ambient air into the container, wherein said liquid outlet is provided in a bottom portion of said first chamber,
    a second chamber communicating with the first chamber by a communication path, except for which said second chamber is substantially hermetically sealed and which is disposed in use at the lower part of the container, said second chamber providing a liquid reservoir for the first chamber; and
    ambient air introducing means comprising an air path substantially free of negative pressure producing material having an inlet in the first chamber separated from the air vent by the negative pressure producing material and an outlet arranged to be lower than the inlet during use of the container to enable air to be supplied to the second chamber through the negative pressure producing material and the air path as liquid is withdrawn from the liquid outlet.

21. A liquid container according to claim 20, further comprising a wall between the first and second chambers, wherein said air path extends from a point partly up the wall toward said communication path, and wherein said air path terminates at the point, and extends to said communication path.

22. A liquid container according to claim 20, further comprising a wall between the first and second chambers, wherein said air path extends from a point partly up the wall toward said communication path, and wherein said air path terminates at the point and terminates before said communication path.

23. A liquid container according to claim 20, further comprising a wall between the first and second chambers, wherein said air path extends from a point partly up the wall toward said communication path, and wherein the point is above said liquid outlet.

24. A liquid container according to claim 20, further comprising a wall between the first and second chambers, wherein said air path extends from a point partly up the wall toward said communication path, and wherein said air path is defined by a rib on said wall.

25. A liquid container according to claim, 21, 22 or 23, wherein said air path is defined by a groove in said wall.

26. A liquid container according to claim 20, wherein said liquid outlet and said air vent are sealed by one member during transportation.

27. A liquid container according to claim 20, wherein said container is of material through which inside thereof is visible.

28. A liquid container according to claim 20, wherein said container contains the liquid which is contributable to image printing, wherein the liquid is supplied from said second chamber into said first chamber through said communication path by introduction of the air into said second chamber through said air path.

29. A liquid container according to claim 20, wherein said negative pressure producing material is of sponge which is not heat-compressed and is compressed into said first chamber.

30. A liquid container according to claim 20, wherein said negative pressure producing material is heat-compressed sponge.

31. A liquid container according to claim 20, further comprising a wall between the first and second chambers, wherein said air path extends from a point partly up the wall toward said communication path, and wherein a path connecting said air vent and the point extends across said negative pressure producing material.

32. A liquid container according to claim 20, wherein a plurality of such air paths are provided.

33. A liquid container according to claim 20, wherein said liquid container is integral with the liquid head.

34. A liquid container according to claim 20, wherein the container contains printing liquid.

35. A liquid container according to claim 34, wherein said printing liquid is ink comprising water, coloring material and water-soluble organic solvent, and has a surface tension of 20 dyne/cm to 55 dyne/cm.

36. A liquid container according to claim 34, wherein said printing liquid is ink containing at least one non-ionic surfactant.

37. A liquid container according to claim 20, wherein said first chamber contains liquid.

38. A liquid container according to claim 20, wherein said second chamber contains liquid.

39. A liquid container for a liquid jet recording apparatus, comprising:
  a first chamber containing negative pressure producing material and having a liquid outlet connectable to a liquid jet head to supply liquid from the container to the liquid jet head and an air vent for allowing ambient air into the container, wherein said liquid outlet is provided in a bottom portion of said first chamber;
  a second chamber communicating with the first chamber by a communication path, except for which said second chamber is substantially hermetically sealed; and
  an ambient air introducing path for introducing the ambient air into said second chamber by permitting air-liquid exchange at said communication path when the liquid is supplied out through said liquid outlet while a liquid level in said first chamber is above said communication path, said ambient air introducing path being provided as a gap formed by said negative pressure producing material being apart from an inside surface of said first chamber.

40. A liquid container according to claim 39, further comprising a wall between the first and second chambers, wherein said ambient air introducing path extends from a point partly up the wall toward said communication path, and wherein said ambient air introducing path terminates at the point, and extends to said communication path.

41. A liquid container according to claim 39, further comprising a wall between the first and second chambers, wherein said ambient air introducing path extends from a point partly up the wall toward said communication path, and wherein said ambient air introducing path terminates at the point and terminates before said communication path.

42. A liquid container according to claim 39, further comprising a wall between the first and second chambers, wherein said ambient air introducing path extends from a point partly up the wall toward said communication path, and wherein the point is above said liquid outlet.

43. A liquid container according to claim 39, further comprising a wall between the first and second chambers, wherein said ambient air introducing path extends from a point partly up the wall toward said communication path, and wherein said ambient air introducing path is defined by a rib on said wall.

44. A liquid container according to claim, 40, 41 or 42, wherein said ambient air introducing path is defined by a groove in said wall.

45. A liquid container according to claim 39, wherein said liquid outlet and said air vent are sealed by one member during transportation.

46. A liquid container according to claim 39, wherein said container is of material through which inside thereof is visible.

47. A liquid container according to claim 39, wherein said container contains the liquid which is contributable to image printing, wherein the liquid is supplied from said second chamber into said first chamber through said communication path by introduction of the air into said second chamber through said ambient air introducing path.

48. A liquid container according to claim 39, wherein said negative pressure producing material is of sponge which is not heat-compressed and is compressed into said first chamber.

49. A liquid container according to claim 39, wherein said negative pressure producing material is heat-compressed sponge.

50. A liquid container according to claim 39, further comprising a wall between the first and second chambers, wherein said ambient air introducing path extends from a point partly up the wall toward said communication path, and wherein a path connecting said air vent and the point extends across said negative pressure producing material.

51. A liquid container according to claim 39, wherein a plurality of such ambient air introducing paths are provided.

52. A liquid container according to claim 39, wherein said liquid container is integral with the liquid jet head.

53. A liquid container according to claim 39, wherein the container contains printing liquid.

54. A liquid container according to claim 53, wherein said printing liquid is ink comprising water, coloring material and water-soluble organic solvent, and has a surface tension of 20 dyne/cm to 55 dyne/cm.

55. A liquid container according to claim 53, wherein said printing liquid is ink containing at least one non-ionic surfactant.

56. A liquid container according to claim 39, wherein said first chamber contains liquid.

57. A liquid container according to claim 39, wherein said second chamber contains liquid.

58. A liquid container for a liquid jet recording apparatus, comprising:
  a first chamber containing negative pressure producing material and having a liquid outlet connectable to a liquid jet head to supply liquid from the container to the liquid jet head and an air vent for allowing ambient air into the container, wherein said liquid outlet is provided in a bottom portion of said first chamber;
  a second chamber communicating with the first chamber by a communication path, except for which said second chamber is substantially hermetically sealed; and
  an ambient air introducing path for introducing the ambient air into said second chamber by permitting air-liquid exchange at said communication path when the liquid is supplied out through said liquid outlet while a liquid level in said first chamber is above said communication path, said ambient air introducing path being provided as a gap formed between said negative pressure producing material and an inside surface of said first chamber.

59. A liquid container according to claim 58, further comprising a wall between the first and second chambers, wherein said ambient air introducing path extends from a point partly up the wall toward said communication path, and wherein said ambient air introducing path terminates at the point, and extends to said communication path.

60. A liquid container according to claim 58, further comprising a wall between the first and second chambers, wherein said ambient air introducing path extends from a point partly up the wall toward said communication path, and wherein said ambient air introducing path terminates at the point and terminates before said communication path.

61. A liquid container according to claim 58, further comprising a wall between the first and second chambers, wherein said ambient air introducing path extends from a point partly up the wall toward said communication path, and wherein the point is above said liquid outlet.

62. A liquid container according to claim 58, further comprising a wall between the first and second chambers, wherein said ambient air introducing path extends from a point partly up the wall toward said communication path, and wherein said air introducing path is defined by a rib on said wall.

63. A liquid container according to claim, 59, 60 or 61, wherein said ambient air introducing path is defined by a groove in said wall.

64. A liquid container according to claim 58, wherein said liquid outlet and said air vent are sealed by one member during transportation.

65. A liquid container according to claim 58, wherein said container is of material through which inside thereof is visible.

66. A liquid container according to claim 58, wherein said container contains the liquid which is contributable to image printing, wherein the liquid is supplied from said second chamber into said first chamber through said communication path by introduction of the air into said second chamber through said ambient air introducing path.

67. A liquid container according to claim 58, wherein said negative pressure producing material is of sponge which is not heat-compressed and is compressed into said first chamber.

68. A liquid container according to claim 58, wherein said negative pressure producing material is heat-compressed sponge.

69. A liquid container according to claim 58, further comprising a wall between the first and second chambers, wherein said ambient air introducing path extends from a point partly up the wall toward said communication path, and wherein a path connecting said air vent and the point extends across said negative pressure producing material.

70. A liquid container according to claim 58, wherein a plurality of such ambient air introducing paths are provided.

71. A liquid container according to claim 58, wherein said liquid container is integral with the liquid jet head.

72. A liquid container according to claim 58, wherein the container contains printing liquid.

73. A liquid container according to claim 72, wherein said printing liquid is ink comprising water, coloring material and water-soluble organic solvent, and has a surface tension of 20 dyne/cm to 55 dyne/cm.

74. A liquid container according to claim 72, wherein said printing liquid is ink containing at least one non-ionic surfactant.

75. A liquid container according to claim 58, wherein said first chamber contains liquid.

76. A liquid container according to claim 58, wherein said second chamber contains liquid.

77. A liquid container for a liquid jet recording apparatus, comprising:
  a first chamber containing negative pressure producing material and having a liquid outlet connectable to a liquid jet head to supply liquid from the container to the liquid jet head and an air vent for allowing ambient air into the container;
  a second chamber communicating with the first chamber by a communication path, except for which said second chamber is substantially hermetically sealed; and
  ambient air introducing means for introducing the ambient air into said second chamber by permitting air-liquid exchange at said communication path when the liquid is supplied out through said liquid outlet while a liquid level in said negative pressure producing material in said first chamber is above said communication path, said ambient air introducing means being formed between said negative pressure producing material and an inside surface of said first chamber.

78. A liquid container according to claim 77, further comprising a wall between the first and second chambers, wherein said ambient air introducing means extends from a point partly up the wall toward said communication path, and wherein said ambient air introducing means terminates at the point, and extends to said communication path.

79. A liquid container according to claim 77, further comprising a wall between the first and second chambers, wherein said ambient air introducing means extends from a point partly up the wall toward said communication path, and wherein said ambient air introducing means terminates ad the point and terminates before said communication path.

80. A liquid container according to claim 77, further comprising a wall between the first and second chambers, wherein said ambient air introducing means extends from a point partly up the wall toward said communication path, and wherein the point is above said liquid outlet.

81. A liquid container according to claim 77, further comprising a wall between the first and second chambers, wherein said ambient air introducing means extends from a point partly up the wall toward said communication path, and wherein said ambient air introducing means is defined by a rib on said wall.

82. A liquid container according to claim, 78, 79 or 80, wherein said ambient air introducing means is defined by a groove in said wall.

83. A liquid container according to claim 77, wherein said liquid outlet and said air vent are sealed by one member during transportation.

84. A liquid container according to claim 77, wherein said container is of material through which inside thereof is visible.

85. A liquid container according to claim 77, wherein said container contains the liquid which is contributable to image printing, wherein the liquid is supplied from said second chamber into said first chamber through said communication path by introduction of the air into said second chamber through said ambient air introducing means.

86. A liquid container according to claim 77, wherein said negative pressure producing material is of sponge which is not heat-compressed and is compressed into said first chamber.

87. A liquid container according to claim 77, wherein said negative pressure producing material is heat-compressed sponge.

88. A liquid container according to claim 77, further comprising a wall between the first and second chambers, wherein said ambient air introducing means extends from a point partly up the wall toward said communication path, and wherein a path connecting said air vent and the point extends across said negative pressure producing material.

89. A liquid container according to claim 77, further comprising a wall between the first and second chambers, wherein said ambient air introducing means extends from a point partly up the wall toward said communication path, and wherein a plurality of such ambient air introducing means are provided.

90. A liquid container according to claim 77, wherein said liquid container is integral with the liquid jet head.

91. A liquid container according to claim 77, wherein the container contains printing liquid.

92. A liquid container according to claim 91, wherein said printing liquid is ink comprising water, coloring material and water-soluble organic solvent, and has a surface tension of 20 dyne/cm to 55 dyne/cm.

93. A liquid container according to claim 91, wherein said printing liquid is ink containing at least one non-ionic surfactant.

94. A liquid container according to claim 77, wherein said first chamber contains liquid.

95. A liquid container according to claim 77, wherein said second chamber contains liquid.

* * * * *